United States Patent
Takenaka et al.

(10) Patent No.: US 8,005,573 B2
(45) Date of Patent: *Aug. 23, 2011

(54) CONTROL DEVICE FOR LEGGED MOBILE ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 1642 days.

This patent is subject to a terminal disclaimer.

(21) Appl. No.: 10/562,168

(22) PCT Filed: Jun. 28, 2004

(86) PCT No.: PCT/JP2004/009472
§ 371 (c)(1),
(2), (4) Date: Dec. 23, 2005

(87) PCT Pub. No.: WO2005/000534
PCT Pub. Date: Jan. 6, 2005

(65) Prior Publication Data
US 2006/0247799 A1 Nov. 2, 2006

(30) Foreign Application Priority Data
Jun. 27, 2003 (JP) .................... 2003-185930

(51) Int. Cl.
*G06F 19/00* (2011.01)
*B62D 57/032* (2006.01)
*B62D 57/024* (2006.01)
*G05B 15/00* (2006.01)
*B62D 57/02* (2006.01)

(52) U.S. Cl. ........ 700/260; 700/245; 700/246; 700/251; 700/253; 700/261

(58) Field of Classification Search .................. 700/245, 700/246, 251, 253, 260, 261; 318/568.1, 318/568.17, 568.2; 901/1, 9, 46
See application file for complete search history.

(56) References Cited

U.S. PATENT DOCUMENTS
5,355,064 A * 10/1994 Yoshino et al. .......... 318/568.12
(Continued)

FOREIGN PATENT DOCUMENTS
EP 0 572 285 12/1993
(Continued)

OTHER PUBLICATIONS
"Ascending and Descending Stairs for a Biped Robot", Ching-Long Shih, IEEE Transactions on Systems, Man and Cybernetics. Part A: Systems and Humans, IEEE Service Center, Piscataway, NJ, US, vol. 29 No. 3, May 1, 1999, XP011056240, ISSN: 1083-4427.

*Primary Examiner* — Khoi Tran
*Assistant Examiner* — Dale Moyer
(74) *Attorney, Agent, or Firm* — Rankin, Hill & Clark LLP

(57) ABSTRACT

On the basis of at least a difference between a desired state amount related to a posture of a robot 1 about a vertical axis or a floor surface normal line axis and an actual state amount of the robot 1 and a permissible range of a restriction object amount, namely, a vertical component of a floor reaction force moment or a component of the floor reaction force moment in a floor surface normal line direction to be applied to the robot 1, instantaneous values of a desired motion and a desired floor reaction force are determined such that a difference between a floor reaction force moment balancing with the desired motion on a dynamic model and a floor reaction force moment of the desired floor reaction force approximates the aforesaid difference to zero, while having the restriction object amount, which is associated with the desired floor reaction force, fall within the permissible range.

19 Claims, 74 Drawing Sheets

U.S. PATENT DOCUMENTS

| | | | |
|---|---|---|---|
| 5,459,659 A * | 10/1995 | Takenaka | 700/260 |
| 6,243,623 B1 * | 6/2001 | Takenaka et al. | 700/245 |
| 6,289,265 B1 * | 9/2001 | Takenaka et al. | 700/245 |
| 6,963,185 B2 * | 11/2005 | Takenaka et al. | 318/568.12 |
| 7,120,518 B2 * | 10/2006 | Takenaka et al. | 700/245 |
| 7,191,036 B2 * | 3/2007 | Takenaka et al. | 700/245 |
| 7,379,789 B2 * | 5/2008 | Takenaka et al. | 700/245 |
| 7,386,366 B2 * | 6/2008 | Dariush | 700/245 |
| 2003/0114960 A1 * | 6/2003 | Takenaka et al. | 700/245 |
| 2005/0110448 A1 * | 5/2005 | Takenaka et al. | 318/568.12 |

FOREIGN PATENT DOCUMENTS

| | | |
|---|---|---|
| EP | 0 856 457 | 8/1998 |
| EP | 1 120 203 | 8/2001 |
| EP | 1 291 137 | 3/2003 |
| JP | 05-305584 | 11/1993 |
| JP | 05-324115 | 12/1993 |
| JP | 05-337849 | 12/1993 |
| JP | 10-086080 | 4/1998 |
| JP | 10-086081 | 4/1998 |
| JP | 10-277969 | 10/1998 |
| JP | 11-300661 | 11/1999 |
| JP | 2002-326173 | 11/2002 |
| WO | WO 02/40224 | 5/2002 |
| WO | WO 03/057423 | 7/2003 |
| WO | WO 03/057425 | 7/2003 |
| WO | WO 03/058355 | 7/2003 |
| WO | WO 03/061917 | 7/2003 |
| WO | WO 03090981 A1 * | 11/2003 |

* cited by examiner

FIG.6
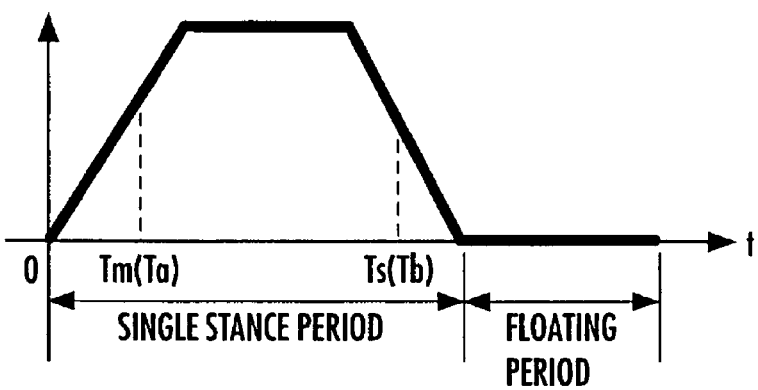
FIG.7
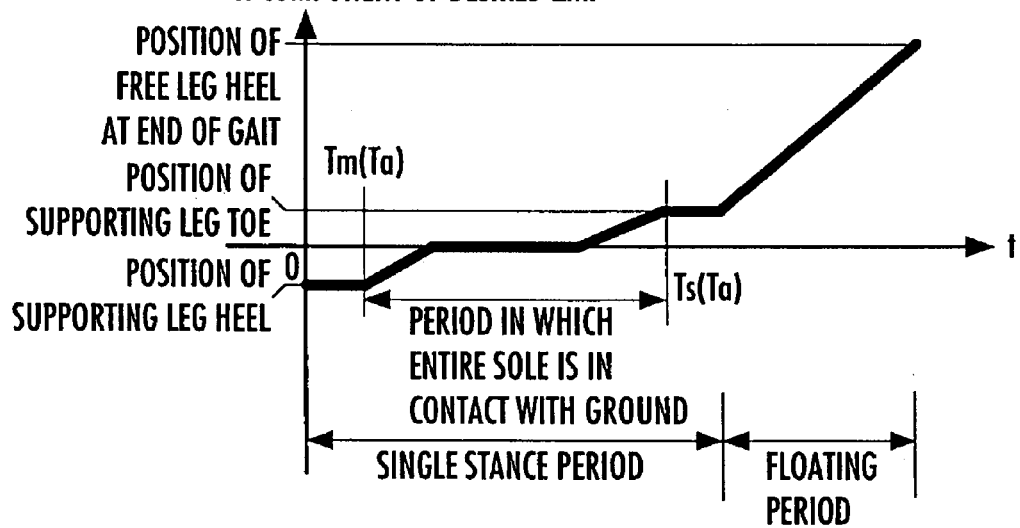
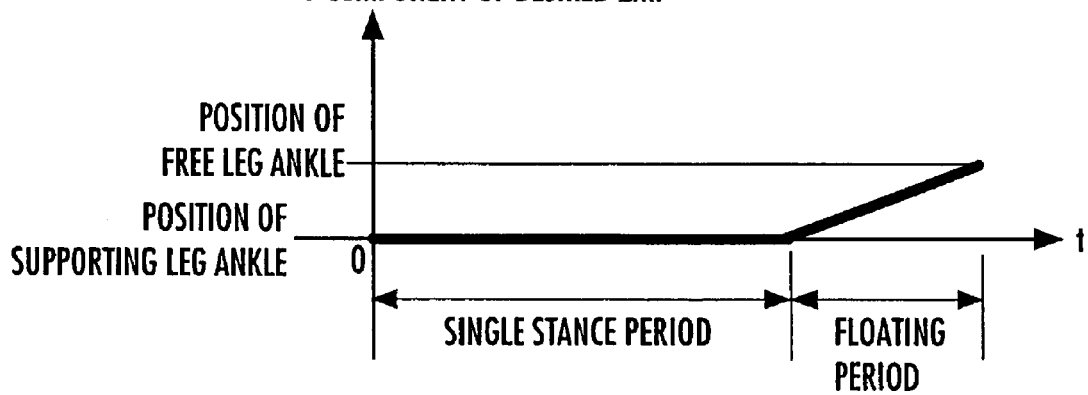

FIG.23

ENTRY

S200: DETERMINE INITIAL STATES (STATES AT START TIME Ts) OF FOOT POSITION/POSTURE, ARM POSTURE AND BODY POSTURE ANGLE ON THE BASIS OF NORMAL TURNING GAIT PARAMETERS.

S202: PROVISIONALLY DETERMINE INITIAL (AT Ts) HORIZONTAL BODY POSITION/VELOCITY CANDIDATES (Xs,Vxs).

S204 ∞

- S206: DETERMINE INITIAL VERTICAL BODY POSITION/VELOCITY (Zs, Vzs).
- S208: USING DYNAMIC MODEL, GENERATE ONE STEP OF GAIT ON THE BASIS OF NORMAL TURNING GAIT PARAMETERS, TAKING (Xs,Vxs), (Zs,Vzs) AS INITIAL STATES OF BODY.
- S210: CONVERT TERMINAL BODY POSITION/VELOCITY OF GENERATED GAIT INTO VALUES OBSERVED FROM SUPPORTING LEG COORDINATE SYSTEM OF NEXT ONE STEP, AND DEFINE THE VALUES AS (Xe,Vxe).
- S212: BOUNDARY CONDITION ERROR (errx,errv)=(Xs,Vxs)−(Xe,Vxe)
- S214: ARE errx AND errv WITHIN PERMISSIBLE RANGE? — yes → LEAVE REPETITION LOOP
- S216: DETERMINE A PLURALITY OF INITIAL VALUE CANDIDATES (Xs+ΔXs,Vxs),(Xs,Vxs+ΔVxs) NEAR (Xs,Vxs), AND TAKE EACH OF THE DETERMINED VALUES AS INITIAL STATE OF BODY TO DETERMINE BOUNDARY CONDITION ERROR ASSOCIATED WITH EACH AS SHOWN ABOVE.
- S218: DETERMINE NEXT INITIAL VALUE CANDIDATES (Xs,Vxs) ON THE BASIS OF BOUNDARY CONDITION ERRORS ASSOCIATED WITH (Xs,Vxs) AND INITIAL VALUE CANDIDATES IN THE VICINITY THEREOF.

S220: DETERMINE INITIAL HORIZONTAL BODY POSITION/VELOCITY (X0,V0), INITIAL VERTICAL BODY POSITION/VELOCITY (Z0,Vz0), AND INITIAL BODY POSTURE ANGLE/ANGULAR VELOCITY AT ORIGINAL START TIME 0.

S222: DETERMINE NORMAL TURNING INITIAL DIVERGENT COMPONENT q[0] ACCORDING TO THE FOLLOWING EQUATION:
q[0] = X0 + V0/$\omega$0

S224: DETERMINE q″, WHICH IS THE VALUE OF NORMAL TURNING INITIAL DIVERGENT COMPONENT q[0] OBSERVED FROM CURRENT TIME'S GAIT SUPPORTING LEG COORDINATE SYSTEM, AND (Z0″,Vz0″), WHICH IS THE VALUES OF INITIAL VERTICAL BODY POSITION/VELOCITY OBSERVED FROM CURRENT TIME'S GAIT SUPPORTING LEG COORDINATE SYSTEM.

S226: DETERMINE INITIAL ANTIPHASE ARM SWING ANGLE AND ANGULAR VELOCITY ($\theta$az0, $\omega$az0) AT ORIGINAL START TIME 0, AND DETERMINE ($\theta$az0″, $\omega$az0″), WHICH IS THE VALUES OF THE ABOVE OBSERVED FROM CURRENT TIME'S GAIT SUPPORTING LEG COORDINATE SYSTEM.

RETURN

FIG.25

ENTRY

↓

S400 DETERMINE DESIRED FLOOR REACTION FORCE VERTICAL COMPONENT AT TIME k ON THE BASIS OF GAIT PARAMETERS.

S402 DETERMINE DESIRED ZMP AT TIME k ON THE BASIS OF GAIT PARAMETERS.

S404 DETERMINE DESIRED POSITIONS/POSTURES OF BOTH FEET, REFERENCE BODY POSTURE AND REFERENCE ARM POSTURE AT TIME k ON THE BASIS OF GAIT PARAMETERS.

S406 CALCULATE TOTAL CENTER-OF-GRAVITY VERTICAL POSITION/VELOCITY THAT SATISFY DESIRED FLOOR REACTION FORCE VERTICAL COMPONENT.

S408 CALCULATE VERTICAL BODY POSITION THAT SATISFIES TOTAL CENTER-OF-GRAVITY VERTICAL POSITION.

S410 DETERMINE FLOOR REACTION FORCE HORIZONTAL COMPONENT PERMISSIBLE RANGE [Fxmin,Fxmax] AT TIME k ON THE BASIS OF GAIT PARAMETERS.

S411 DETERMINE FLOOR REACTION FORCE MOMENT VERTICAL COMPONENT PERMISSIBLE RANGE [Mzmin,Mzmax] AT TIME k ON THE BASIS OF GAIT PARAMETERS.

S412 DETERMINE HORIZONTAL BODY ACCELERATION AND BODY POSTURE ANGULAR ACCELERATION SUCH THAT DESIRED ZMP IS SATISFIED AND THAT FLOOR REACTION FORCE HORIZONTAL COMPONENT Fx DOES NOT EXCEED [Fxmin,Fxmax], AND DETERMINE ANTIPHASE ARM SWING ANGULAR ACCELERATION SUCH THAT FLOOR REACTION FORCE MOMENT VERTICAL COMPONENT Mz DOES NOT EXCEED [Mzmin,Mzmax].

S414 INTEGRATE HORIZONTAL BODY ACCELERATION AND BODY POSTURE ANGULAR ACCELERATION TO CALCULATE HORIZONTAL BODY VELOCITY AND BODY POSTURE ANGULAR VELOCITY. FURTHER INTEGRATE THE RESULT TO DETERMINE HORIZONTAL BODY POSITION AND BODY POSTURE.

S416 INTEGRATE ANTIPHASE ARM SWING ACCELERATION TO CALCULATE ANTIPHASE ARM SWING ANGULAR VELOCITY. FURTHER INTEGRATE THE RESULT TO DETERMINE ANTIPHASE ARM SWING ANGLE.

RETURN

FLOOR REACTION FORCE HORIZONTAL COMPONENT Fxtmp
CREATED WITHOUT TAKING PERMISSIBLE RANGE INTO ACCOUNT FLOOR REACTION FORCE HORIZONTAL COMPONENT Fx
TAKING FLOOR REACTION FORCE HORIZONTAL COMPONENT
PERMISSIBLE RANGE INTO ACCOUNT

BODY INCLINATION ANGULAR ACCELERATION β

FLOOR REACTION FORCE MOMENT VERTICAL COMPONENT Mztmp
CREATED WITHOUT TAKING PERMISSIBLE RANGE INTO ACCOUNT FLOOR REACTION FORCE MOMENT VERTICAL COMPONENT Mz
TAKING FLOOR REACTION FORCE MOMENT VERTICAL COMPONENT
PERMISSIBLE RANGE INTO ACCOUNT ANTIPHASE ARM SWING MOMENT (Maz)

ANTIPHASE ARM SWING ANGULAR ACCELERATION βa

ANTIPHASE ARM SWING RESTORING ANGULAR ACCELERATION (βarec)

ANTIPHASE ARM SWING RESOTRING MOMENT (Mazrec)

FLOOR REACTION FORCE HORIZONTAL COMPONENT PERMISSIBLE LOWER LIMIT VALUE Fxmin
AND FLOOR REACTION FORCE HORIZONTAL COMPONENT PERMISSIBLE UPPER LIMIT VALUE Fxmax

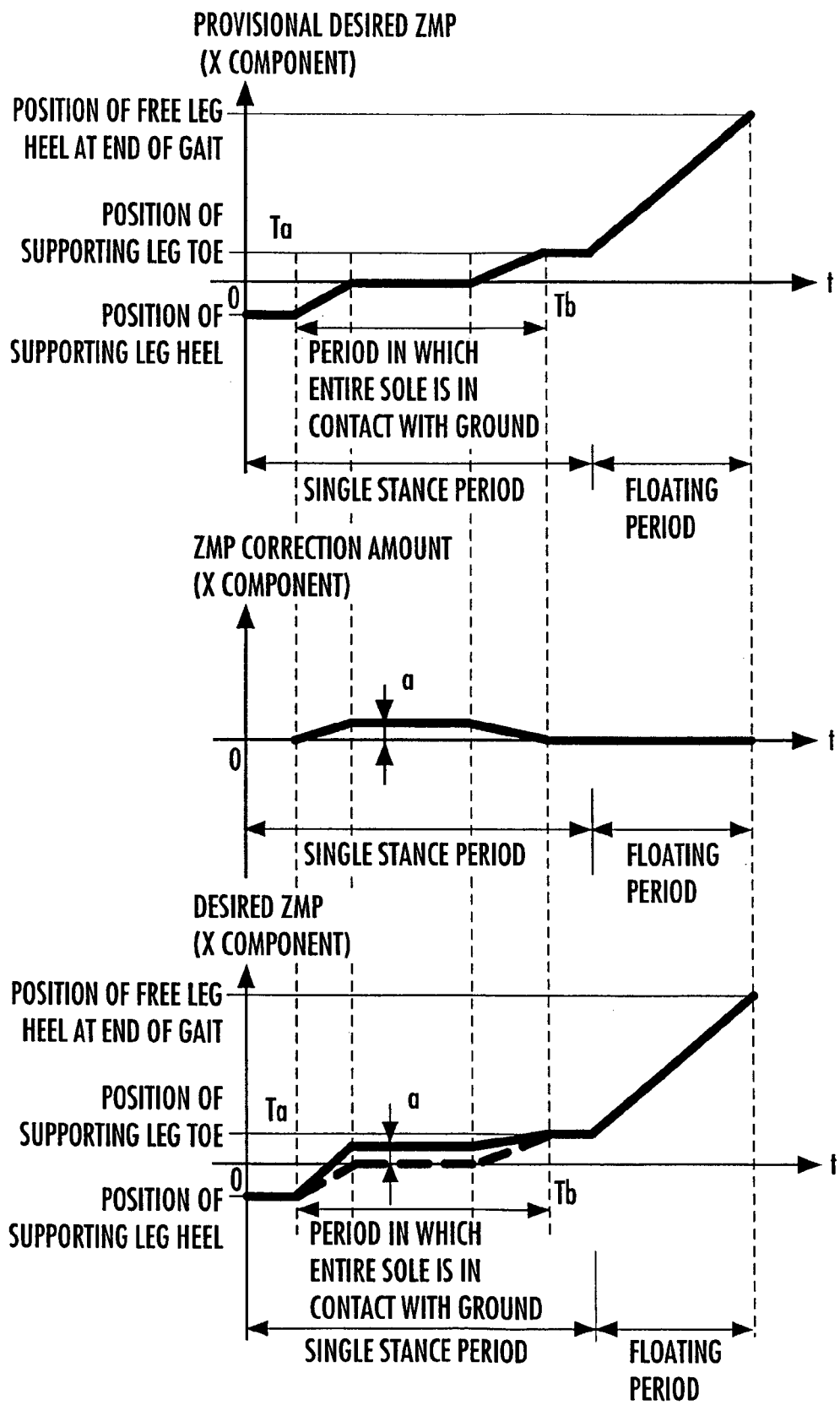

FIG.45

ENTRY

S1400 DETERMINE DESIRED FLOOR REACTION FORCE VERTICAL COMPONENT AT CURRENT TIME ON THE BASIS OF GAIT PARAMETERS.

S1402 DETERMINE DESIRED ZMP AT CURRENT TIME ON THE BASIS OF GAIT PARAMETERS.

S1404 DETERMINE DESIRED POSITIONS/POSTURES OF BOTH FEET, REFERENCE BODY POSTURE AND REFERENCE ARM POSTURE AT CURRENT TIME ON THE BASIS OF GAIT PARAMETERS.

S1406 CALCULATE TOTAL CENTER-OF-GRAVITY VERTICAL POSITION/VELOCITY THAT SATISFIES DESIRED FLOOR REACTION FORCE VERTICAL COMPONENT.

S1408 CALCULATE BODY VERTICAL POSITION THAT SATISFIES TOTAL CENTER-OF-GRAVITY VERTICAL POSITION.

S1410 DETERMINE FLOOR REACTION FORCE HORIZONTAL COMPONENT PERMISSIBLE RANGE [Fxmin,Fxmax] AT CURRENT TIME ON THE BASIS OF GAIT PARAMETERS.

S1411 DETERMINE FLOOR REACTION FORCE MOMENT VERTICAL COMPONENT PERMISSIBLE RANGE [Mzmin,Mzmax] AT CURRENT TIME ON THE BASIS OF GAIT PARAMETERS.

S1412 DETERMINE HORIZONTAL BODY ACCELERATION AND BODY POSTURE ANGULAR ACCELERATION SUCH THAT DEISRED ZMP IS SATISFIED, FLOOR REACTION FORCE HORIZONTAL COMPONENT Fx DOES NOT EXCEED [Fxmin,Fxmax], AND BODY POSTURE ANGLE TRAJECTORY CONVERGES TO NORMAL GAIT, AND ALSO DETERMINE ANTIPHASE ARM SWING ANGULAR ACCELERATION SUCH THAT FLOOR REACTION FORCE MOMENT VERTICAL COMPONENT Mz DOES NOT EXCEED [Mzmin,Mzmax] AND ANTIPHASE ARM SWING ANGLE TRAJECTORY CONVERGES TO NORMAL GAIT.

S1414 INTEGRATE HORIZONTAL BODY ACCELERATION AND BODY POSTURE ANGULAR ACCELERATION TO CALCULATE HORIZONTAL BODY VELOCITY AND BODY POSTURE ANGULAR VELOCITY. FURTHER INTEGRATE THE RESULT TO DETERMINE HORIZONTAL BODY POSITION AND BODY POSTURE.

S1416 INTEGRATE ANTIPHASE ARM SWING ACCELERATION TO CALCULATE ANTIPHASE ARM SWING ANGULAR VELOCITY. FURTHER INTEGRATE THE RESULT TO DETERMINE ANTIPHASE ARM SWING ANGLE.

RETURN

COMPOSITE-COMPLIANCE CONTROL UNIT

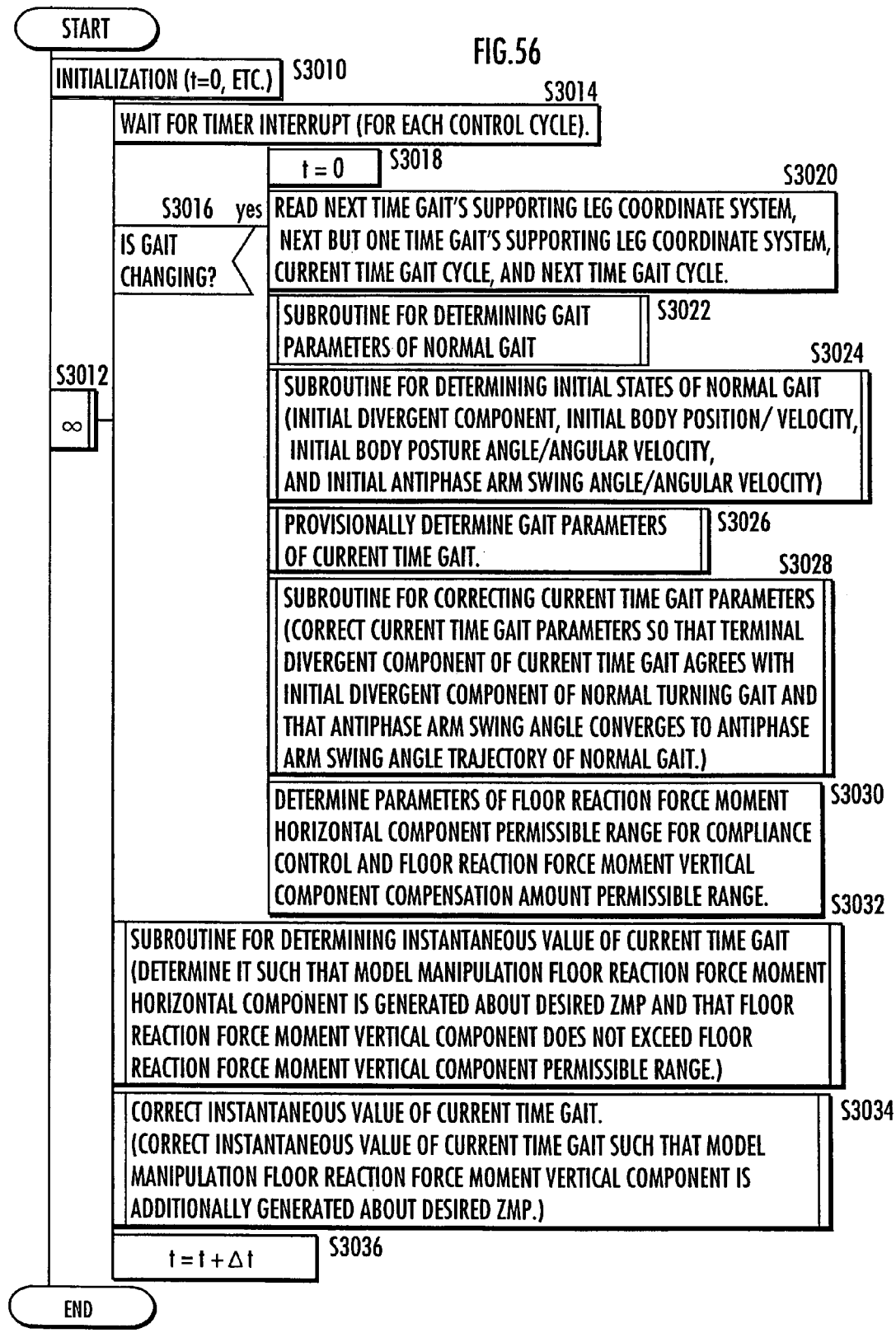

FIG.57

ENTRY

S3400 DETERMINE DESIRED FLOOR REACTION FORCE VERTICAL COMPONENT AT CURRENT TIME ON THE BASIS OF GAIT PARAMETERS.

S3402 DETERMINE DESIRED ZMP AT CURRENT TIME ON THE BASIS OF GAIT PARAMETERS.

S3404 DETERMINE DESIRED POSITIONS/POSTURES OF BOTH FEET, REFERENCE BODY POSTURE AND REFERENCE ARM POSTURE AT CURRENT TIME ON THE BASIS OF GAIT PARAMETERS.

S3406 CALCULATE TOTAL CENTER-OF-GRAVITY VERTICAL POSITION/VELOCITY THAT SATISFY DESIRED FLOOR REACTION FORCE VERTICAL COMPONENT.

S3408 CALCULATE VERTICAL BODY POSITION THAT SATISFIES TOTAL CENTER-OF-GRAVITY VERTICAL POSITION.

S3410 DETERMINE FLOOR REACTION FORCE HORIZONTAL COMPONENT PERMISSIBLE RANGE [Fxmin,Fxmax] AT CURRENT TIME ON THE BASIS OF GAIT PARAMETERS.

S3411 DETERMINE FLOOR REACTION FORCE MOMENT VERTICAL COMPONENT PERMISSIBLE RANGE [Mzmin,Mzmax] AT CURRENT TIME ON THE BASIS OF GAIT PARAMETERS.

S3412 DETERMINE FLOOR REACTION FORCE MOMENT HORIZONTAL COMPONENT PERMISSIBLE RANGE [Mxymin,Mxymax] AND FLOOR REACTION FORCE MOMENT VERTICAL COMPONENT COMPENSATION AMOUNT PERMISSIBLE RANGE [Mzcmin,Mzcmax] AT CURRENT TIME ON THE BASIS OF GAIT PARAMETERS.

S3414 DETERMINE HORIZONTAL BODY ACCELERATION AND BODY POSTURE ANGULAR ACCELERATION SUCH THAT MODEL MANIPULATION FLOOR REACTION FORCE MOMENT IS GENERATED ABOUT DESIRED ZMP, FLOOR REACTION FORCE HORIZONTAL COMPONENT Fx DOES NOT EXCEED [Fxmin,Fxmax], AND BODY POSTURE ANGLE TRAJECTORY CONVERGES TO NORMAL GAIT, AND ALSO DETERMINE ANTIPHASE ARM SWING ANGULAR ACCELERATION SUCH THAT FLOOR REACTION FORCE MOMENT VERTICAL COMPONENT Mz DOES NOT EXCEED [Mzmin,Mzmax] AND ANTIPHASE ARM SWING ANGLE TRAJECTORY CONVERGES TO NORMAL GAIT.

S3416 INTEGRATE HORIZONTAL BODY ACCELERATION AND BODY POSTURE ANGULAR ACCELERATION TO CALCULATE HORIZONTAL BODY VELOCITY AND BODY POSTURE ANGULAR VELOCITY. FURTHER INTEGRATE THE RESULT TO DETERMINE HORIZONTAL BODY POSITION AND BODY POSTURE.

S3418 INTEGRATE ANTIPHASE ARM SWING ACCELERATION TO CALCULATE ANTIPHASE ARM SWING ANGULAR VELOCITY. FURTHER INTEGRATE THE RESULT TO DETERMINE ANTIPHASE ARM SWING ANGLE.

RETURN

FIG.62

```
ENTRY
```

| | |
|---|---|
| DETERMINE DIFFERENCE IN HORIZONTAL BODY POSITION BETWEEN MODELS, WHICH IS THE DIFFERENCE BETWEEN HORIZONTAL BODY POSITION OF CORRECTED GAIT AND HORIZONTAL BODY POSITION OF ORIGINAL GAIT. | S2200 |
| DETERMINE DIFFERENCE IN BODY POSTURE INCLINATION ANGLE BETWEEN MODELS, WHICH IS THE DIFFERENCE BETWEEN BODY POSTURE INCLINATION ANGLE OF CORRECTED GAIT AND BODY POSTURE INCLINATION ANGLE OF ORIGINAL GAIT. | S2202 |
| DETERMINE DIFFERENCE IN ANTIPHASE ARM SWING ANGLE BETWEEN MODELS, WHICH IS THE DIFFERENCE BETWEEN ANTIPHASE ARM SWING ANGLE OF CORRECTED GAIT AND ANTIPHASE ARM SWING ANGLE OF ORIGINAL GAIT. | S2204 |
| DETERMINE REQUIRED VALUE OF MODEL HORIZONTAL BODY POSITION STABILIZATION FLOOR REACTION FORCE MOMENT NECESSARY TO CONVERGE DIFFERENCE TO ZERO ON THE BASIS OF DIFFERENCE IN HORIZONTAL BODY POSITION BETWEEN MODELS. | S2206 |
| DETERMINE REQUIRED VALUE OF MODEL BODY POSTURE INCLINATION ANGLE STABILIZATION FLOOR REACTION FORCE MOMENT NECESSARY TO CONVERGE DIFFERENCE TO ZERO ON THE BASIS OF DIFFERENCE IN BODY POSTURE INCLINATION ANGLE BETWEEN MODELS. | S2208 |
| DETERMINE REQUIRED VALUE OF MODEL ANTIPHASE ARM SWING ANGLE STABILIZATION FLOOR REACTION FORCE MOMENT NECESSARY TO CONVERGE DIFFERENCE TO ZERO ON THE BASIS OF DIFFERENCE IN ANTIPHASE ARM SWING ANGLE BETWEEN MODELS. | S2210 |
| DETERMINE MODEL HORIZONTAL BODY POSITION STABILIZATION MOMENT, MODEL BODY POSTURE ANGLE STABILIZATION MOMENT, MODEL ANTIPHASE ARM SWING ANGLE STABILIZATION MOMENT, HORIZONTAL BODY ACCELERATION, BODY POSTURE ANGULAR VELOCITY, AND ANTIPHASE ARM SWING ANGULAR ACCELERATION SUCH THAT THEY SATISFY RESTORING CONDITIONS. | S2212 |
| MODEL MANIPULATION FLOOR REACTION FORCE MOMENT HORIZONTAL COMPONENT = MODEL HORIZONTAL BODY POSITION STABILIZATION MOMENT + MODEL BODY POSTURE ANGLE STABILIZATION MOMENT | S2214 |
| DESIRED FLOOR REACTION FORCE MOMENT HORIZONTAL COMPONENT FOR COMPLIANCE CONTROL = COMPENSATING TOTAL FLOOR REACTION FORCE MOMENT HORIZONTAL COMPONENT Mdmdxy + MODEL MANIPULATION FLOOR REACTION FORCE MOMENT HORIZONTAL COMPONENT | S2216 |
| DESIRED FLOOR REACTION FORCE MOMENT VERTICAL COMPONENT FOR COMPLIANCE CONTROL = COMPENSATING TOTAL FLOOR REACTION FORCE MOMENT VERTICAL COMPONENT Mdmdz + FLOOR REACTION FORCE MOMENT VERTICAL COMPONENT BALANCING WITH CORRECTED GAIT | S2218 |

```
RETURN
```

BODY POSTURE ANGLE CORRECTING
PERTURBATION MODEL

ANTIPHASE ARM SWING ANGLE CORRECTING PERTURBATION MODEL

CONTROL DEVICE FOR LEGGED MOBILE ROBOT

TECHNICAL FIELD

The present invention relates to a control device suited to walking and also running of a legged mobile robot.

BACKGROUND ART

Hitherto, a major object of generating gaits (desired gaits) for making a legged mobile robot, e.g., a bipedal mobile robot, carry out a traveling motion has been focused mainly on generating gaits (walking gaits) to make the robot carry out a smooth walking motion. In recent years, however, as the development of legged mobile robots advances, it has come to be desired to generate gaits that enable the robots not only to walk but to run also. Furthermore, it has come to be desired to generate gaits that enable the robots to move without trouble even on a slippery floor (so-called low-L path) on which a sufficient frictional force cannot be produced.

Since the Chinese characters for "gait" include a character meaning "walking," the gait tends to be misinterpreted that the definition thereof is limited to walking. However, "gait" originally presents a concept that includes running, as it is used as a term indicating a running mode of a horse, such as "trot."

The description will now be given of the difference in characteristics between walking and running.

A traveling mode that has an instant at which all legs are simultaneously floating is usually defined as running. This definition, however, does not necessarily make it possible to clearly distinguish between walking and running. For instance, most humans have instants at which all legs float at the same time in fast jogging, whereas many humans have one of the legs always in contact with the ground in slow jogging. It is somehow perceptually unreasonable to define fast jogging as running and slow jogging as walking.

FIG. 51 shows a pattern of a vertical body position and a floor reaction force vertical component (a sum of floor reaction force vertical components acting on right and left legs) in typical running, and FIG. 52 shows a pattern of a vertical body position and a floor reaction force vertical component in typical walking.

A vertical body position/velocity means a vertical position of a representative point of a body and a velocity thereof. A horizontal body position/velocity means a horizontal position of a representative point of the body and a velocity thereof. A vertical body position/velocity and a horizontal body position/velocity together will be referred to as body position/velocity.

Strictly speaking, the "floor reaction force vertical component" should be described as "translational floor reaction force vertical component" to distinguish it from a moment component about a vertical axis of a floor reaction force; however, the term is too long, so that the term "translational" will be omitted. Hereinafter, the "translational floor reaction force horizontal component" will be described as "floor reaction force horizontal component," omitting "translational."

First, attention will be focused on the movement of the body. In walking, the body reaches a highest level at the instant the body passes over a supporting leg, while it reaches a lowest level at this instant in running. In other words, the phase of a vertical motion pattern of the body reverses between walking and running.

Meanwhile, a floor reaction force remains relatively constant in walking, whereas it considerably varies in running, the floor reaction force reaching its maximum at the moment the body passes over a supporting leg. Needless to say, the floor reaction force is zero at the instant when all legs are simultaneously floating. More detailed observation reveals that a floor reaction force of a magnitude that is substantially proportional to a compression amount of the supporting leg is generated while running. In other words, it may be said that the legs are used like springs to jump for traveling while running.

Slow jogging has the same body vertical motion phase as that of typical running. In addition, slow jogging frequently has no instants at which all legs are simultaneously floating; however, even in this case, a floor reaction force reaches substantially zero, although not completely zero, at an instant when a supporting leg and an idle leg are switched.

Hence, distinguishing between walking and running on the basis of the aforesaid characteristics of the vertical motions of the body or floor reaction force patterns as described above may be more appropriate and perceptually reasonable, because slow jogging is regarded also as running.

In particular, to distinguish between the two on the basis of a most characteristic aspect, running may be defined as a traveling mode in which the floor reaction force becomes zero or substantially zero at the instant a supporting leg is switched, while walking may be defined as a traveling mode (a floor reaction force vertical component remaining relatively constant) other than that.

The present applicant has previously proposed, in PCT Kokai publication WO/02/40224, an art for generating freely and in real time a gait of a legged mobile robot that includes a floor reaction force while substantially satisfying dynamic balance conditions (This means the conditions of balance among gravity, an inertial force, and a floor reaction force of a desired gait. In a narrow sense, it means that the horizontal component of a moment about a desired ZMP by the resultant force of gravity and an inertial force produced by a motion of a desired gait is zero. Detailed description will be given hereinafter). This art and a series of the control devices of legged mobile robots proposed by the present applicant in, for example, Japanese Unexamined Patent Application Publication No. 10-86081 and Japanese Unexamined Patent Application Publication No. 10-277969 can be applied to walking and also to running.

The present applicant has also proposed the following art in, for example, Japanese Unexamined Patent Application Publication No. 5-337849. According to the art, when an inclination error of a robot (the difference between an actual inclination angle with respect to the vertical direction of the body of the robot and an inclination angle of a desired gait) occurs, an actual ZMP is shifted and a moment in a posture restoring direction is generated about a desired ZMP within a permissible range, and then the motion of the desired gait is determined so as to generate a moment about the desired ZMP on a model used for generating the desired gait. Thus, intentionally generating a moment on a model makes it possible to provide an effect equivalent to generating a moment in the posture restoring direction on an actual robot.

These arts, however, have not considered the magnitude of a floor reaction force moment vertical component about ZMP of a desired gait. Hence, there has been a danger in that the floor reaction force moment vertical component unduly increases and exceeds a frictional limit, leading to a spin. The term "spin" refers to a state in which a yaw angular (a rotational angle about a vertical axis) velocity of an actual robot deviates from a desired yaw angular velocity.

When a robot walks on a floor surface having a high friction coefficient (in this case, at least one leg is always in contact with the ground), a floor reaction force vertical component is always substantially equivalent to a robot's own weight, thus providing a higher limit of a frictional force (i.e., the floor reaction force moment vertical component). This makes it difficult for a spin to occur.

In running, however, the floor reaction force vertical component becomes zero or substantially zero, and in this case, therefore, the limit of a moment vertical component of the frictional force of a floor surface becomes zero or substantially zero even if a friction coefficient is high. Hence, there has been a danger in that the floor reaction force moment vertical component of a desired gait exceeds a limit, resulting in a spin and a fall.

Further, in the case of walking also, there has been a danger of spinning and falling if a floor has a low friction coefficient.

According to the arts described above, there has been a danger in that a traveling trajectory of a robot deviates from a desired gait trajectory, because no arrangement has been provided to compensate for a deviation of a rotational posture in a yaw direction of a body from a desired posture.

Meanwhile, the present applicant has previously proposed an arrangement, in which an arm is swung so as to cancel a moment vertical component generated by anything other than arms in a desired gait, in an embodiment described in, for example, PCT application PCT/JP02/13596.

In this case, the moment vertical component of a desired gait is substantially zero. However, if legs are briskly swung to move, then the arms will be also briskly swung.

Generally, the mass of an arm in a human-type robot is smaller than the mass of a leg. Accordingly, it is necessary to swing arms more briskly than legs in order to fully cancel a moment vertical component.

However, there is a restriction in the range of arm motion, and there are also restrictions in torque and velocity of arm actuators. Hence, there have been some cases where a moment vertical component cannot be fully canceled by arms when a robot moves while briskly swinging its legs.

Furthermore, there has been a danger in that, if arms are swung to cancel out a moment vertical component produced by anything other than arms in a desired gait, then the center of arm swing is gradually offset, causing the swings of the right and left arms to be asymmetrical. Specifically, to make a left turn, if a robot swings its arms to fully offset a moment vertical component generated by anything other than arms, then the left arm is swung more toward the front and swung less toward the rear, while the right arm is swung less toward the front and swung more toward the rear in order to offset the change in an angular momentum caused by the legs and the body having turned to the left. This may cause the left arm to reach a motion limit of the swing toward the front, and the right arm to reach a motion limit of the swing toward the rear.

Furthermore, if a motion is made to correct the center of the arm swinging so as to prevent the swings of the right and left arms from becoming asymmetrical, then a floor reaction force moment vertical component is generated. This in turn causes a floor reaction force moment vertical component of a desired gait to exceed a limit, possibly causing the robot to spin.

Accordingly, an object of the present invention is to provide a control device which solves the problems described above and which is capable of generating a further ideal gait regardless of gait types, such as walking and running, and a friction condition of a floor surface.

More specifically, an object of the present invention is to provide a control device capable of operating a robot by gaits that enable the robot to prevent spinning or falling from a spin, while maintaining a stable posture state in a yaw direction of the robot by considering a limit of a moment vertical component of a frictional force between the robot and a floor surface. Another object is to provide a control device capable of operating a robot by a gait motion pattern that satisfies a dynamic balance condition even in a leg-floating period or even if the limit of a moment vertical component of a frictional force is extremely low. Still another object is to prevent lateral asymmetry of a desired gait from increasing so as to secure continuity of a motion.

DISCLOSURE OF INVENTION

According to a first invention of a gait generating device of a legged mobile robot in accordance with the present invention, there is provided a control device of a legged mobile robot adapted to sequentially determine instantaneous values of a desired motion and a desired floor reaction force of a legged mobile robot that travels by moving legs extended from its body by using a dynamic model that expresses a relationship between at least a motion of the robot and a floor reaction force, and also to control an operation of the robot at the same time so as to make the robot follow the Determined instantaneous values of the desired motion and the desired floor reaction force, comprising:

a permissible range setting means for setting a permissible range of a restriction object amount, the restriction object amount being a vertical component of a floor reaction force moment or a component of the floor reaction force moment in floor surface normal line direction to be applied to a robot in operation, following the desired motion and the desired floor reaction force; and a desired instantaneous value determining means for determining, on the basis of at least a difference between a desired state amount related to a posture of the robot about a vertical axis or about a floor surface normal line axis and an actual state amount of the robot and the permissible range, instantaneous values of the desired motion and the desired floor reaction force such that a deviation between a floor reaction force moment balancing with the desired motion on the dynamic model and a floor reaction force moment of the desired floor reaction force approximates the difference to zero, while having the restriction object amount, which is associated with the desired floor reaction force, fall within the permissible range.

According to the first invention, on the basis of at least a difference between a desired state amount related to a posture of the robot about a vertical axis or about a floor surface normal line axis and an actual state amount of the robot and the permissible range, instantaneous values of the desired motion and the desired floor reaction force are determined such that the deviation between a floor reaction force moment balancing with the desired motion on the dynamic model and a floor reaction force moment of the desired floor reaction force approximates the above difference to zero, while setting a restriction object amount, which is associated with the desired floor reaction force, to fall within the permissible range. Therefore, a restriction object amount, such as a floor reaction force moment vertical component applied to an actual robot, can be set to fall within a permissible range, while bringing a state amount related to the posture of the robot about a vertical axis or a floor surface normal axis (hereinafter referred to as a posture state amount in the yaw direction) close to a desired state amount, that is, a desired posture state amount in the yaw direction in a desired motion (while approximating the difference to zero). In other words, an instantaneous value of a desired motion and a desired floor reaction force are determined, considering a limit of a frictional force moment vertical component and the difference. This makes it possible to prevent the robot from spinning and falling caused by a spin, while stably maintaining the posture state amount of the robot in the yaw direction at a posture state amount of a desired motion. Moreover, it is possible to prevent a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount remains within a permissible range, thus making it possible to prevent the motion of a certain part of the robot from becoming unduly intense.

Preferably, in the first invention, the desired instantaneous value determining means includes a means for determining a compensating floor reaction force moment, which is an additional floor reaction force moment for bringing a difference to zero according to the difference, and a means for determining a correction amount of a predetermined provisional instantaneous value such that the restriction object amount does not exceed the permissible range on the basis of at least a floor reaction force moment that balances with the predetermined provisional instantaneous value of the desired motion on the dynamic model and the compensating floor reaction force moment, wherein the provisional instantaneous value is corrected on the basis of the determined correction amount so as to determine the instantaneous value of the desired motion (a second invention).

According to the second invention, the correction amount of a predetermined provisional instantaneous value is determined on the basis of a floor reaction force moment that is produced on the dynamic model by the predetermined provisional instantaneous value of a desired motion (the floor reaction force moment balancing a desired motion) and a compensating floor reaction force moment for approximating the difference to zero. This arrangement makes it possible to determine an appropriate instantaneous value of a desired motion that makes the restriction object amount remain within a permissible range, while approximating the posture state amount in the yaw direction of a robot to a desired state amount.

Preferably, the second invention includes a means for determining a model correction floor reaction force moment, which is an additional floor reaction force moment for bringing a state amount of the dynamic model to a predetermined state amount, and the means for determining a correction amount of a predetermined provisional instantaneous value of the desired motion determines a correction amount of a provisional instantaneous value of the desired motion such that the restriction object amount does not exceed the permissible range on the basis of at least a floor reaction force moment that balances with the predetermined provisional instantaneous value on the dynamic model, the compensating floor reaction force moment, and the model correcting floor reaction force moment (a third invention).

According to the third invention, not only a floor reaction force moment that balances with a predetermined provisional instantaneous value of a desired motion on a dynamic model and a compensating floor reaction force moment but also a model correction floor reaction force moment related to a state amount of the dynamic model are taken into account to determine a correction amount of the predetermined provisional instantaneous value of the desired motion. This arrangement provides the advantage provided by the second invention, and also prevents a dynamic model from diverging.

Furthermore, in the second and the third inventions described above, the correction amount of the predetermined provisional instantaneous value is preferably a correction amount of a motion that changes a vertical component or a component in floor surface normal line direction of an angular momentum changing rate of the aforesaid robot (a fourth invention).

With this arrangement, a provisional instantaneous value of a desired motion can be corrected so as to maintain a restriction object amount within a permissible range.

In the fourth invention, the motion that changes the vertical component or the component in floor surface normal line direction of the angular momentum changing rate of the robot is preferably a motion of a body of the robot and/or an arm extended from the body of the robot (a fifth invention).

This arrangement facilitates the processing for correcting a provisional instantaneous value of a desired motion.

It is particularly preferable that the motion for changing the vertical component or the component in floor surface normal line direction of the angular momentum changing rate of a robot be a motion that maintains the entire center of gravity of the robot at a constant level.

According to a sixth invention of the control device of a legged mobile robot in accordance with the present invention, there is provided a control device of a legged mobile robot adapted to sequentially determine an instantaneous value of a desired motion of a legged mobile robot that travels by moving legs extended from its body by using a dynamic model that expresses a relationship between at least a motion of the robot and a floor reaction force, and also to control an operation of the robot at the same time so as to make the robot follow the determined instantaneous value of the desired motion, comprising:

a permissible range setting means for setting a permissible range of a restriction object amount, the restriction object amount being a vertical component of a floor reaction force moment or a component of the floor reaction force moment in floor surface normal line direction to be applied to a robot in operation, following the desired motion;

a Compensating floor reaction force moment determining means for determining a compensating floor reaction force moment, which is an additional floor reaction force moment for bringing a difference between a desired state amount related to a posture of the robot about a vertical axis or a floor surface normal line axis and an actual state amount of the robot close to zero on the basis of at least the difference; and a desired instantaneous value determining means for determining an instantaneous value of the desired motion such that the restriction object amount, which is determined on the basis of a floor reaction force moment balancing with the desired motion on the dynamic model and the compensating floor reaction force moment, falls within the permissible range.

According to the sixth invention, an instantaneous value of the desired motion is determined such that the restriction object amount, which is determined on the basis of a floor reaction force moment balancing the desired motion on the dynamic model and the compensating floor reaction force moment (e.g., a sum of the floor reaction force moment balancing the desired motion on the dynamic model and the compensating floor reaction force moment), remains within the permissible range. This arrangement makes it possible to generate a desired motion that allows a restriction object amount, such as a floor reaction force moment vertical component, acting on an actual robot, to remain within a permissible range even if a compensating floor reaction force moment for approximating a posture state amount of the robot in the yaw direction to a desired state amount (a posture state amount in the yaw direction in a desired motion) is additionally generated. In other words, an instantaneous value of a desired motion is determined, considering a limit of a frictional force moment vertical component and the difference. This makes it possible to determine a desired motion of the robot that prevents the robot from spinning and falling caused by spinning, while stably maintaining the posture state amount of the robot in the yaw direction at a posture state amount of a desired motion. Moreover, it is possible to determine a desired motion that prevents a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount remains within a permissible range, thus making it possible to prevent the motion of a certain part of the robot from becoming unduly intense.

The sixth invention preferably includes a means that defines the restriction object amount falling within the permissible range as a desired floor reaction force moment, and controls the operation of the robot so as to make the robot follow the desired floor reaction force moment (a seventh invention).

This makes it possible to prevent the robot from spinning and falling caused by spinning, while stably maintaining the posture state amount of the robot in the yaw direction at a posture state amount of a desired motion. Moreover, it is possible to prevent a travel trajectory of the robot from deviating from the trajectory of a desired gait and to prevent sustained stability of the posture of the robot in the yaw direction from being lost.

In the sixth and the seventh inventions described above, the desired instantaneous value determining means preferably determines an instantaneous value of the desired motion by adjusting a motion that changes a vertical component or a component in floor surface normal line direction of an angular momentum changing rate of the robot among motions of the robot in order to hold the restriction object amount, which depends on a floor reaction force moment balancing with the desired motion on the dynamic model and the compensating floor reaction force moment, within the permissible range (an eighth invention).

With this arrangement, an instantaneous value of a desired motion can be determined so as to set the restriction object amount to a permissible range.

In the eighth invention, the motion for changing a vertical component or a floor surface normal line direction component of an angular momentum changing rate of the robot is preferably a motion of a body of the robot and/or an arm extended from the body (a ninth invention).

This arrangement facilitates the processing for determining an instantaneous value of a desired motion.

It is particularly preferable that the motion for changing a vertical component or a floor surface normal line direction component of an angular momentum changing rate of the robot be a motion for maintaining the entire center of gravity of a robot at a constant level.

According to a tenth invention of the control device of a legged mobile robot in accordance with the present invention, there is provided a control device of a legged mobile robot adapted to sequentially determine an instantaneous value of a desired motion of a legged mobile robot that travels by moving legs extended from its body by using a dynamic model expressing at least a relationship between a motion of the robot and a floor reaction force, and also to control an operation of the robot at the same time so as to make the robot follow the determined instantaneous value of the desired motion, comprising:

permissible range setting means for setting a permissible range of a restriction object amount, the restriction object amount being a vertical component of a floor reaction force moment or a component of the floor reaction force moment in floor surface normal line direction to be applied to a robot in operation, following the desired motion;

provisional instantaneous value determining means for sequentially determining a provisional instantaneous value of the desired motion;

compensating floor reaction force moment determining means for determining a compensating floor reaction force moment, which is an additional floor reaction force moment for bringing a difference between a desired state amount related to a posture of the robot about a vertical axis or a floor surface normal line axis and an actual state amount of the robot close to zero on the basis of at least the difference; and desired instantaneous value determining means for determining an instantaneous value of the desired motion by defining a portion of the restriction object amount, which deviates from the permissible range, as a moment correction manipulated variable, the restriction object amount being determined on the basis of a floor reaction force moment balancing with a provisional instantaneous value of the desired motion on the dynamic model and the compensating floor reaction force moment, and by correcting the provisional instantaneous value of the desired motion on the basis of the moment correction manipulated variable such that the deviating portion indicates a tendency to decrease.

According to the tenth invention, a portion of the restriction object amount, which deviates from the permissible range, the restriction object amount being determined on the basis of a floor reaction force moment balancing a provisional instantaneous value of the desired motion on the dynamic model and the compensating floor reaction force moment (e.g., a sum of the floor reaction force moment balancing a provisional instantaneous value of the desired motion on the dynamic model and the compensating floor reaction force moment) is taken as a moment correction manipulated variable, and an instantaneous value of the desired motion is determined by correcting the provisional instantaneous value of the desired motion on the basis of the moment correction manipulated variable such that the deviating portion indicates a tendency to decrease. This arrangement makes it possible to generate a desired motion that allows a restriction object amount, such as a floor reaction force moment vertical component, acting on an actual robot, to substantially remain within a permissible range even if a compensating floor reaction force moment for approximating a posture state amount of the robot in the yaw direction to a desired state amount (a posture state amount in the yaw direction in a desired motion) is additionally generated. In other words, an instantaneous value of a desired motion is determined, considering a limit of a frictional force moment vertical component and the difference. This makes it possible to determine a desired motion of the robot that prevents the robot from spinning and falling caused by spinning, while stably maintaining the posture state amount of the robot in the yaw direction at a posture state amount of a desired motion. Moreover, it is possible to determine a desired motion that prevents a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount remains within a permissible range, thus making it possible to prevent the motion of a certain part of the robot from becoming unduly intense.

In the tenth invention, the desired instantaneous value determining means preferably determines an instantaneous value of the desired motion by determining a correction amount of a provisional instantaneous value of the desired motion on the basis of a result obtained by passing the moment correction manipulated variable through a low-pass filter, and then by correcting the provisional instantaneous value on the basis of the determined correction amount (an eleventh invention).

The eleventh invention makes it possible to prevent a provisional instantaneous value of a desired motion from being excessively corrected.

The tenth and the eleventh inventions preferably include a means for defining, as a desired floor reaction force moment, a floor reaction force moment corresponding to an already restricted restriction object amount that has been limited by restricting the restriction object amount, which is determined on the basis of a floor reaction force moment balancing with a provisional instantaneous value of the desired motion on the dynamic model and the compensating floor reaction force moment, to fall within the permissible range, and for controlling an operation of a robot so as to make the robot follow the desired floor reaction force moment (a twelfth invention).

The twelfth invention makes it possible to prevent the robot from spinning and falling caused by spinning, while stably maintaining the posture state amount of the robot in the yaw direction at a posture state amount of a desired motion. Moreover, it is possible to prevent a travel trajectory of the robot from deviating from the trajectory of a desired gait and to prevent sustained stability of the posture of the robot in the yaw direction from being lost.

In the tenth to the twelfth inventions, the desired instantaneous value determining means preferably determines an instantaneous value of the desired motion by correcting a motion for changing a vertical component or a floor surface normal line direction component of an angular momentum changing rate of the robot on the basis of a provisional instantaneous value of the desired motion (a thirteenth invention).

With this arrangement, an instantaneous value of a desired motion can be determined such that a restriction object amount lies within the permissible range.

In the thirteenth invention, a motion for changing a vertical component or a floor surface normal line direction component of an angular momentum changing rate of the robot is preferably a motion of a body of the robot and/or an arm extended from the body (a fourteenth invention).

This arrangement facilitates the processing for correcting a provisional instantaneous value of a desired motion.

In the first to the fourteenth inventions, a state amount related to a posture of the robot preferably includes specifically a yaw angle (a rotational angle in the yaw direction) or a yaw angular velocity (an angular velocity of a rotational angle in the yaw direction) of the body of the robot (a fifteenth invention). According to the fifteenth invention, the stability of a posture in the yaw direction of the body of the robot can be enhanced. This applies to a fifteenth to a fifty-first invention, which will be discussed hereinafter.

It is preferred that the first to the fifteenth inventions preferably include a slippage determining means for determining occurrence of a slippage of the robot, and the permissible range setting means variably sets the permissible range according to a determination result of the slippage determining means (a sixteenth invention).

According to the sixteenth invention, a permissible range of a restriction object amount is variably set according to a determination result of the occurrence of a slippage of the robot (the robot in motion, following an instantaneous value of a desired motion or instantaneous values of a desired motion and a desired floor reaction force); therefore, the occurrence of a slippage of the robot can be securely restrained. If it is determined that a slippage has occurred, then the permissible range should be set to be narrower.

According to the sixteenth invention, the occurrence of a slippage can be determined, for example, as described below.

The slippage determining means determines the occurrence of a slippage on the basis of at least the ground speed of a distal portion of a leg in contact with the ground (a seventeenth invention). In this case, if, for example, an absolute value of the ground speed is greater than a predetermined value, then it an be determined that a slippage has occurred.

Alternatively, the slippage determining means includes a means for determining, on the basis of at least a temporal changing rate of an actual floor reaction force acting on a leg in contact with the ground and the ground speed of a distal portion of the leg, an apparent spring constant of the leg, and determines the occurrence of a slippage on the basis of at least the apparent spring constant (an eighteenth invention). In this case, if, for example, the apparent spring constant is smaller than a predetermined value, then it can be determined that a slippage has occurred.

Alternatively, the slippage determining means determines the occurrence of a slippage on the basis of at least a result obtained by passing an actual floor reaction force acting on a leg in contact with the ground through a band-pass filter having a frequency passing characteristic in a range near a predetermined frequency (a nineteenth invention). In this case, the result obtained by passing the actual floor reaction force through the band-pass filter is equivalent to a vibration component of an actual floor reaction force when a so-called slippage vibration is taking place. And if, for example, a magnitude (an absolute value) of this vibration component is larger than a predetermined value, then it can be determined that a slippage vibration has occurred.

The occurrence of a slippage can be determined in any one of the seventeenth to the nineteenth inventions. Two or more of the seventeenth to the nineteenth inventions may be combined to determine the occurrence of a slippage.

According to a twentieth invention of the control device of a legged mobile robot in accordance with the present invention, there is provided a control device for generating a desired gait of a legged mobile robot that travels by moving a plurality of legs extended from its body, and for controlling an operation of the robot so as to make the robot follow the desired gait, comprising:

a means for determining a compensating floor reaction force moment, which is an additional floor reaction force moment for bringing a difference between a desired state amount related to a posture of the robot about a vertical axis or a floor surface normal line axis and an actual state of the robot close to zero on the basis of at least the difference;

a permissible range setting means for setting a permissible range of a restriction object amount, the restriction object amount being a vertical component of a floor reaction force moment or a component of the floor reaction force moment in floor surface normal line direction to be applied to a robot in operation, following the desired gait;

a provisional instantaneous value determining means for determining a provisional instantaneous value of a desired motion constituting the desired gait;

a model calculating means that inputs at least a provisional instantaneous value of the desired motion to a dynamic model representing a relationship between a motion of the robot and a vertical component or a component in floor surface normal line direction of a floor reaction force moment balancing with the motion so as to determine a vertical component or a component in floor surface normal line direction of a floor reaction force moment as an output of the dynamic model, and then determines an instantaneous value of a model restriction object amount, which is a provisional instantaneous value of the restriction object amount by carrying out predetermined calculation from the determined vertical component or the component in floor surface normal line direction and the compensating floor reaction force moment; and a desired instantaneous value determining means for determining an instantaneous value of the desired motion by correcting a provisional instantaneous value of the desired motion such that at least the instantaneous value of the model restriction object amount falls within the permissible range.

According to the twentieth invention, a vertical component or a floor surface normal line direction component of a floor reaction force moment as an output of the dynamic model is determined by supplying at least a provisional instantaneous value of the desired motion to the dynamic model. Then, an instantaneous value of a model restriction object amount, which is a provisional instantaneous value of the restriction object amount (this corresponds to an instantaneous value of a restriction object amount, which is applied if a compensating floor reaction force moment is added to a floor reaction force moment generated by a desired motion on the dynamic model), is determined from the determined vertical component or floor surface normal line direction component and the compensating floor reaction force moment by carrying out predetermined calculation (e.g., addition). An instantaneous value of a desired motion is determined by correcting a provisional instantaneous value of the desired motion such that at least the instantaneous value of the model restriction object amount falls within the permissible range.

This arrangement makes it possible to generate a desired motion that allows a restriction object amount, such as a floor reaction force moment vertical component, acting on an actual robot, to remain within a permissible range even if a compensating floor reaction force moment for approximating a posture state amount of the robot in the yaw direction to a desired state amount (a posture state amount in the yaw direction in a desired motion) is additionally generated. In other words, an instantaneous value of a desired motion is determined, considering a limit of a frictional force moment vertical component and the difference. This makes it possible to determine a desired motion of the robot that prevents the robot from spinning and falling caused by spinning, while stably maintaining the posture state amount of the robot in the yaw direction at a posture state amount of a desired motion. Moreover, it is possible to determine a desired motion that prevents a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount remains within a permissible range, thus making it possible to prevent the motion of a certain part of the robot from becoming unduly intense.

It is preferred to basically use a dynamic model with high proximity accuracy for the aforesaid dynamic model.

In the twentieth invention, the desired instantaneous value determining means preferably determines a floor reaction force moment instantaneous value corresponding to an instantaneous value of a restriction object amount, which is determined from a vertical component or a floor surface normal line direction component of a floor reaction force moment substantially balancing an instantaneous value of the desired motion on the dynamic model and the compensating floor reaction force moment by the predetermined calculation, as an instantaneous value of a floor reaction force moment of a desired floor reaction force constituting the desired gait (twenty-first invention).

This arrangement makes it possible to prevent the robot from spinning and falling caused by spinning, while stably maintaining a posture state amount of the robot in the yaw direction at a posture state amount of a desired motion. It is also possible to prevent a travel trajectory of the robot from deviating from the trajectory of a desired gait and to prevent sustained stability of the posture of the robot in the yaw direction from being lost.

In the twentieth and the twenty-first inventions, the desired instantaneous value determining means preferably includes a perturbation model representing a relationship between a perturbative motion of the robot and a perturbative portion of a vertical component or a floor surface normal line direction component of a floor reaction force moment, a means for determining a perturbation model manipulated variable for manipulating a perturbative portion of the perturbation model on the basis of at least the determined instantaneous value of the model restriction object amount and the permissible range, a means for determining a correction amount of the desired motion by supplying the determined perturbation model manipulated variable to the perturbation model, and a means for determining an instantaneous value of the desired motion by correcting a provisional instantaneous value of the desired motion by using the correction amount (a twenty-second invention).

More specifically, high linearity of the perturbation model facilitates the processing for calculating a proper correction amount of a desired motion in setting the restriction object amount within a permissible range and also facilitates the processing for correcting a provisional instantaneous value of the desired motion by using the correction amount.

In the twenty-second invention, the means for determining the perturbation model manipulated variable preferably includes a means for determining, on the basis of at least the determined instantaneous value of the model restriction object amount, an estimated value of the restriction object amount in a case where the perturbation model manipulated variable is assumed to be zero, and a means for comparing the determined estimated value with the permissible range to determine, on the basis of the comparison, a restricted restriction object amount that has been restricted to fall within the permissible range, and determines the perturbation model manipulated variable on the basis of at least a difference between the determined instantaneous value of the model restriction object amount and the restricted restriction object amount (a twenty-third invention).

According to the twenty-third invention, an estimated value of the restriction object amount in a case where the perturbation model manipulated variable is assumed to be zero is determined first, and then a restricted restriction object amount is determined on the basis of the comparison between the estimated value and a permissible range. In this case, an instantaneous value of the model restriction object amount, for example, may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The perturbation model manipulated variable is determined on the basis of at least the difference between the instantaneous value of the model restriction object amount and the restricted restriction object amount. Thus, it is possible to properly determine a perturbation model manipulated variable that makes it possible to prevent a restriction object amount from exceeding a permissible range even if a compensating floor reaction force moment is additionally generated.

Furthermore, the twenty-second invention preferably includes a means for determining a required value of the perturbation model manipulated variable on the basis of at least a state amount of the perturbation model. The means for determining the perturbation model manipulated variable preferably determines a perturbation model manipulated variable to be supplied to the perturbation model on the basis of at least the determined instantaneous value of the model restriction object amount, the permissible range, and the required value (a twenty-fourth invention).

With this arrangement, the perturbation model manipulated variable is determined, considering a required value of a state amount of a perturbation model (such as a rotational angle and an angular velocity of a rotating member, which provides an element of the perturbation model) in addition to the permissible range and an instantaneous value of a model restriction object amount, which takes a compensating floor reaction force moment into account. This makes it possible to prevent an improper correction amount of a desired motion from being determined, while preventing a state amount of the perturbation model from deviating from a state amount corresponding to the required value.

In the twenty-fourth invention, preferably, the means for determining a required value of the perturbation model manipulated variable sequentially determines the required value according to a feedback control law on the basis of a difference between a state amount of the perturbation model and a desired value relative to the state amount (a twenty-fifth invention).

According to the twenty-fifth invention, a perturbation model manipulated variable is determined such that a state amount of a perturbation model is generally maintained in the vicinity of a certain desired state amount. This arrangement allows a correction amount of a desired motion determined by the perturbation model to be ideal for holding a restriction object amount in a permissible range, while maintaining a stable state of the perturbation model.

Furthermore, in the twenty-fourth and the twenty-fifth invention, the means for determining the perturbation model manipulated variable preferably includes a means for determining an estimated value of the restriction object amount in a case, where the perturbation model manipulated variable is assumed to agree with the required value, on the basis of at least the determined instantaneous value of the model restriction object amount and the required value, and a means for comparing the determined estimated value with the permissible range to determine, on the basis of the comparison, a restricted restriction object amount that has been set to fall within the permissible range, and determines the perturbation model manipulated variable on the basis of at least a difference between the determined instantaneous value of the model restriction object amount and the restricted restriction object amount (a twenty-sixth invention).

According to this, an estimated value of the restriction object amount when the perturbation model manipulated variable is assumed to agree with the required value, i.e., when it is assumed that only the required value is supplied to the perturbation model, is determined first, and then a restricted restriction object amount is determined on the basis of the comparison between the estimated value and a permissible range. In this case, a sum of, for example, an instantaneous value of a model restriction object amount and the required value may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The perturbation model manipulated variable is determined on the basis of at least the difference between the instantaneous value of the model restriction object amount and the restricted restriction object amount. Thus, it is possible to properly determine a perturbation model manipulated variable that makes it possible to prevent a restriction object amount from exceeding a permissible range and to secure stability of a perturbation model even if a compensating floor reaction force moment is additionally generated.

In the twenty-second invention, the desired instantaneous value determining means may include a means for additionally inputting a correction amount of the desired motion to the dynamic model (a twenty-seventh invention).

With this arrangement, since a correction amount of a desired motion is additionally supplied to the dynamic model, a vertical component or a floor surface normal line direction component of a floor reaction force moment that balances with an instantaneous value of a desired motion can be directly determined from the dynamic model.

In the twenty-second to the twenty-seventh inventions equipped with perturbation models, the perturbation model is preferably a model that represents a relationship between a perturbative motion perturbing a vertical component or a floor surface normal line direction component of an angular momentum changing rate of a robot and a perturbation portion of the restriction object amount (a twenty-eighth invention).

This arrangement makes it possible to properly determine a correction amount of a desired motion to set the restriction object amount to fall within a permissible range.

In the twenty-eighth invention, the aforesaid perturbative motion is preferably a perturbative motion that maintains the position of a center-of-gravity of the robot substantially constant (a twenty-ninth invention).

With this arrangement, the correction of a desired motion based on a perturbation model can be accomplished without influencing a translational floor reaction force of a robot.

Furthermore, in the twenty-eighth and the twenty-ninth inventions, the perturbative motion is preferably a perturbative motion of a body of the robot and/or an arm extending from the body (a thirtieth invention).

This arrangement facilitates the processing for calculating a correction amount of a desired motion.

According to a thirty-first invention of a control device of a legged mobile robot in accordance with the present invention, there is provided a control device for generating a desired gait of a legged mobile robot that travels by moving a plurality of legs extended from its body and for controlling an operation of the robot so as to make the robot follow the desired gait, comprising:

means for determining a compensating floor reaction force moment, which is an additional floor reaction force moment for bringing a difference between a desired state amount related to a posture of the robot about a vertical axis or a floor surface normal line axis and an actual state of the robot close to zero on the basis of at least the difference;

a permissible range setting means for setting a permissible range of a restriction object amount, the restriction object amount being a vertical component of a floor reaction force moment or a component in floor surface normal line direction of the floor reaction force moment to be applied to a robot in operation, following the desired gait;

a desired floor reaction force provisional instantaneous value determining means for sequentially determining a provisional instantaneous value of at least a desired floor reaction force out of a desired motion and the desired floor reaction force constituting the desired gait;

a first model calculating means for inputting at least a provisional instantaneous value of the desired floor reaction force to a first dynamic model expressing a relationship between a motion of the robot and a floor reaction force so as to sequentially determine a provisional instantaneous value of a desired motion as an output of the first dynamic model;

a second model calculating means for inputting at least the provisional instantaneous value of the desired motion to a second dynamic model expressing a relationship between a motion of the robot and a vertical component or a component in floor surface normal line direction of a floor reaction force moment balancing with the motion so as to determine the vertical component or the component in floor surface normal line direction of the floor reaction force moment as an output of the second dynamic model, and for determining an instantaneous value of a model restriction object amount, which is a provisional instantaneous value of the restriction object amount, from the determined vertical component or floor surface normal line direction component and the compensating floor reaction force moment by carrying out predetermined calculation; and a first model input correcting means for determining a floor reaction force moment correction amount of a desired floor reaction force so as to hold at least the instantaneous value of the model restriction object amount within the permissible range, and for additionally inputting the determined floor reaction force moment correction amount to the first dynamic model, wherein the instantaneous value of the desired motion is determined on the basis of at least the input of the second dynamic model.

According to the thirty-first invention, a vertical component or a floor surface normal line direction component of a floor reaction force moment as an output of the second dynamic model is determined by supplying at least a provisional instantaneous value of the desired motion to the second dynamic model. Then, an instantaneous value of a model restriction object amount, which is a provisional instantaneous value of the restriction object amount (this corresponds to an instantaneous value of a restriction object amount, which is applied if a compensating floor reaction force moment is added to a floor reaction force moment generated by a desired motion on the dynamic model), is determined from the determined vertical component or floor surface normal line direction component and the compensating floor reaction force moment by carrying out predetermined calculation (e.g., addition). A floor reaction force moment correction amount of a desired floor reaction force is determined to set at least the instantaneous value of the model restriction object amount such that it falls within the permissible range, and the determined floor reaction force moment correction amount is additionally input to the first dynamic model. Hence, based on at least an input to the second dynamic model, an instantaneous value of a desired motion that allows the restriction object amount to lie within a permissible range can be obtained.

This arrangement makes it possible to generate a desired motion that allows a restriction object amount, such as a floor reaction force moment vertical component, acting on an actual robot, to remain within a permissible range even if a compensating floor reaction force moment for approximating a posture state amount of the robot in the yaw direction to a desired state amount (a posture state amount in the yaw direction in a desired motion) is additionally generated. In other words, an instantaneous value of a desired motion is determined, considering a limit of a frictional force moment vertical component and the difference. This makes it possible to determine a desired motion of the robot that prevents the robot from spinning and falling caused by spinning, while stably maintaining the posture state amount of the robot in the yaw direction at a posture state amount of a desired motion. Moreover, it is possible to determine a desired motion that prevents a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount remains within a permissible range, thus making it possible to prevent the motion of a certain part of the robot from becoming unduly intense.

Preferably, the second dynamic model basically has higher proximity accuracy than the first dynamic model.

The thirty-first invention preferably includes a means for determining a floor reaction force moment instantaneous value corresponding to an instantaneous value of a restriction object amount, which is determined from a vertical component or a floor surface normal line direction component of a floor reaction force moment substantially balancing an instantaneous value of the desired motion on the second dynamic model and the compensating floor reaction force moment by the predetermined calculation, as an instantaneous value of a floor reaction force moment of a desired floor reaction force constituting the desired gait (thirty-second invention).

This arrangement makes it possible to prevent the robot from spinning and falling caused by spinning, while stably maintaining a posture state amount of the robot in the yaw direction at a posture state amount of a desired motion. It is also possible to prevent a travel trajectory of the robot from deviating from the trajectory of a desired gait and to prevent sustained stability of the posture of the robot in the yaw direction from being lost.

Preferably, in the thirty-first and the thirty-second inventions, the first model input correcting means, for example, includes a means for determining, on the basis of at least the determined instantaneous value of the model restriction object amount, an estimated value of the restriction object amount in a case where at least a floor reaction force moment correction amount of the desired floor reaction force is assumed to be zero, and a means for comparing the determined estimated value with the permissible range to determine, on the basis of the comparison, a restricted restriction object amount that has been limited to the permissible range, and determines the floor reaction force moment correction amount on the basis of at least a difference between the determined instantaneous value of the model restriction object amount and the restricted restriction object amount (a thirty-third invention).

According to the thirty-third invention, an estimated value of the restriction object amount in a case where the floor reaction force moment correction amount of the aforesaid desired floor reaction force is assumed to be zero is determined first, and then a restricted restriction object amount is determined on the basis of the comparison between the estimated value and a permissible range. In this case, an instantaneous value of the model restriction object amount, for example, may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The floor reaction force moment correction amount is determined on the basis of at least the difference between the instantaneous value of the model restriction object amount and the restricted restriction object amount. It is possible to determine a proper floor reaction force moment correction amount that makes it possible to prevent a restriction object amount from exceeding a permissible range even if a compensating floor reaction force moment is additionally generated.

Further preferably, the thirty-first and the thirty-second inventions include a means for determining a required value of a floor reaction force moment correction amount of the desired floor reaction force. The first model input correcting means preferably includes a means for determining, on the basis of at least the determined instantaneous value of the model restriction object amount and the required value, an estimated value of the restriction object amount when at least the floor reaction force moment correction amount of the desired floor reaction force is assumed to agree with the required value, and a means for comparing the determined estimated value with the permissible range, and then determining a restricted restriction object amount, which has been set to fall within the permissible range, on the basis of the comparison, and determines the floor reaction force moment correction amount on the basis of at least a difference between the determined instantaneous value of the model restriction object amount and the restricted restriction object amount (a thirty-fourth invention).

According to the thirty-fourth invention, an estimated value of the restriction object amount in a case where the floor reaction force moment correction amount of a desired floor reaction force is assumed to agree with the required value, i.e., in a case where it is assumed that only the required value is supplied to the first dynamic model, is determined first, and then a restricted restriction object amount is determined on the basis of the comparison between the estimated value and a permissible range. In this case, a sum of, for example, an instantaneous value of a model restriction object amount and the required value may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The floor reaction force moment correction amount is determined on the basis of at least the difference between the instantaneous value of the model restriction object amount and the restricted restriction object amount. Thus, it is possible to determine a proper floor reaction force moment correction amount which makes it possible to prevent a restriction object amount from exceeding a permissible range even if a compensating floor reaction force moment is additionally generated and which is as close to the required value as possible.

The thirty-first to the thirty-fourth inventions may include a second model input correcting means for determining a correction amount of the desired motion on the basis of at least the determined instantaneous value of the model restriction object amount and the permissible range, and then additionally inputting the determined correction amount to the second dynamic model (a thirty-fifth invention).

With this arrangement, an instantaneous value of a desired motion for further properly setting a restriction object amount so as to fall within a permissible range can be supplied to a second dynamic model, while enhancing the stability of the first dynamic model.

Preferably, the thirty-fifth invention includes a perturbation model that represents a relationship between a perturbative motion of the robot and a perturbation portion of the restriction object amount, a means for determining a manipulated variable of a floor reaction force moment on the basis of at least the determined instantaneous value of the model restriction object amount and the permissible range, and a distributing means for dividing the determined manipulated variable of the floor reaction force moment into a floor reaction force moment correction amount of the desired floor reaction force to be supplied to the first dynamic model and a perturbation model manipulated variable to be supplied to the perturbation model. The second model input correcting means preferably determines a correction amount of the desired motion by supplying the perturbation model manipulated variable to the perturbation model (a thirty-sixth invention).

With this arrangement, the manipulated variable of the floor reaction force moment is divided into a floor reaction force moment correction amount to be input to the first dynamic model and a perturbation model manipulated variable to be input to a perturbation model, so that inputs suited to the characteristics of the first dynamic model and the perturbation model, respectively, can be supplied to the individual models. This makes it possible to properly determine an instantaneous value of a desired motion that allows a restriction object amount to lie within a permissible range, while preventing the first dynamic model or the perturbation model from becoming unstable. Moreover, use of the perturbation model facilitates the processing for calculating a correction amount of a desired motion to be additionally input to the second dynamic model.

The floor reaction force moment correction amount to be input to the first dynamic model is preferably a low-frequency component (DC component) of a manipulated variable of a floor reaction force moment. The perturbation model manipulated variable to be input to a perturbation model is preferably a high-frequency component of the manipulated variable of a floor reaction force moment.

The thirty-sixth invention is preferably equipped with a means for determining a required value of a manipulated variable of the floor reaction force moment on the basis of at least a state amount of the perturbation model. The means for determining a manipulated variable of the floor reaction force moment preferably determines a manipulated variable of the floor reaction force moment to be supplied to the distributing means on the basis of at least the determined instantaneous value of the model restriction object amount, the permissible range, and the required value (a thirty-seventh invention).

According to the thirty-seventh invention, the manipulated variable of a floor reaction force moment to be supplied to the distributing means is determined, considering a state amount of a perturbation model (such as a rotational angle and an angular velocity of a rotating member, which provides an element of the perturbation model) in addition to an instantaneous value of a model restriction object amount, which takes a compensating floor reaction force moment into account, and a permissible range. This makes it possible to prevent an improper correction amount of a desired motion from being determined by the perturbation model, while preventing a state amount of the perturbation model from deviating from a state amount corresponding to the required value.

In the thirty-seventh invention, preferably, the means for determining a required value of a manipulated variable of the floor reaction force moment sequentially determines the required value according to a feedback control law on the basis of a difference between a state amount of the perturbation model and a desired value relative to the state amount (a thirty-eighth invention).

According to the thirty-eighth invention, a manipulated variable of a floor reaction force moment and also a perturbation model manipulated variable are determined such that a state amount of a perturbation model is generally maintained in the vicinity of a certain desired state amount. This arrangement allows a correction amount of a desired motion determined by the perturbation model to be ideal for holding a restriction object amount in a permissible range, while maintaining a stable state of the perturbation model.

In the thirty-sixth to the thirty-eighth inventions provided with the perturbation model as described above, the perturbation model is preferably a model that represents a relationship between a perturbative motion perturbing a component of an angular momentum changing rate of a robot about a vertical axis or about a floor surface normal line axis and a perturbation portion of the restriction object amount (a thirty-ninth invention).

This arrangement makes it possible to properly determine a correction amount of a desired motion to set the restriction object amount to fall within a permissible range.

In the thirty-ninth invention, the aforesaid perturbative motion is preferably a perturbative motion that maintains the position of a center-of-gravity of the robot substantially constant (a fortieth invention).

With this arrangement, the correction of a desired motion based on a perturbation model can be accomplished without influencing a translational floor reaction force of a robot.

Furthermore, in the thirty-ninth and the fortieth inventions, the perturbative motion is preferably a perturbative motion of a body of the robot and/or an arm extending from the body (a forty-first invention).

This arrangement facilitates the processing for calculating a correction amount of a desired motion.

In the thirty-sixth to the forty-first inventions, the means for determining, for example, a manipulated variable of the floor reaction force moment includes a means for determining, on the basis of at least the determined instantaneous value of the model restriction object amount, an estimated value of the restriction object amount in a case where the perturbation model manipulated variable is assumed to be zero, and a means for comparing the determined estimated value with the permissible range to determine, on the basis of the comparison, a restricted restriction object amount that is set to fall within the permissible range, and determines the manipulated variable of the floor reaction force moment on the basis of at least a difference between the determined instantaneous value of the model restriction object amount and the restricted restriction object amount (a forty-second invention).

According to the forty-second invention, an estimated value of the restriction object amount in a case where the perturbation model manipulated variable is assumed to be zero is determined first, and then a restricted restriction object amount is determined on the basis of the comparison between the estimated value and a permissible range. In this case, an instantaneous value of the model restriction object amount, for example, may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The manipulated variable of the floor reaction force moment is determined on the basis of at least the difference between the instantaneous value of the model restriction object amount and the restricted restriction object amount. Thus, it is possible to determine a manipulated variable of a floor reaction force moment that makes it possible to prevent a restriction object amount from exceeding a permissible range even if a compensating floor reaction force moment is additionally generated.

Especially if a required value of a perturbation model manipulated variable is determined in the thirty-seventh to the forty-first inventions, the means for determining the manipulated variable of the floor reaction force moment preferably includes a means for determining an estimated value of the restriction object amount in a case, where the perturbation model manipulated variable is assumed to agree with the required value, on the basis of at least the determined instantaneous value of the model restriction object amount and the required value, and a means for comparing the determined estimated value with the permissible range to determine, on the basis of the comparison, a restricted restriction object amount that has been set to fall within the permissible range, and determines the manipulated variable of the floor reaction force moment on the basis of at least a difference between the determined instantaneous value of the model restriction object amount and the restricted restriction object amount (a forty-third invention).

According to this, an estimated value of the restriction object amount when the perturbation model manipulated variable is assumed to agree with the required value, i.e., when it is assumed that only the required value is supplied to the perturbation model, is determined first, and then a restricted restriction object amount is determined on the basis of the comparison between the estimated value and a permissible range. In this case, a sum of, for example, an instantaneous value of a model restriction object amount and the required value may be directly used as the estimated value of the restriction object amount, or the estimated value of the restriction object amount may be determined, taking a gyro effect into account. Preferably, the restricted restriction object amount is determined to be a value that is as close to the estimated value of the restriction object amount as possible within the permissible range. The manipulated variable of a floor reaction force moment is determined on the basis of at least the difference between the instantaneous value of the model restriction object amount and the restricted restriction object amount, that is, a portion of the instantaneous value of the model restriction object amount that deviates from a permissible range. Thus, it is possible to properly determine a manipulated variable of a floor reaction force moment that makes it possible to prevent a restriction object amount from exceeding a permissible range and to secure stability of a perturbation model even if a compensating floor reaction force moment is additionally generated.

According to a forty-fourth invention of a control device of a legged mobile robot in accordance with the present invention, there is provided a control device for generating a desired gait of a legged mobile robot that travels by moving a plurality of legs extended from its body, and for controlling an operation of the robot so as to make the robot follow the desired gait, comprising:

means for determining a compensating floor reaction force moment, which is an additional floor reaction force moment for bringing a difference between a desired state amount related to a posture of the robot about a vertical axis or a floor surface normal line axis and an actual state amount of the robot close to zero on the basis of at least the difference;

permissible range setting means for setting a permissible range of a restriction object amount, the restriction object amount being a vertical component of a floor reaction force moment or a component in floor surface normal line direction of the floor reaction force moment to be applied to a robot in operation, following the desired gait; desired floor reaction force provisional instantaneous value determining means for sequentially determining a provisional instantaneous value of at least a desired floor reaction force out of a desired motion and a desired floor reaction force constituting the desired gait;

first model calculating means for inputting at least the provisional instantaneous value of a desired floor reaction force to a first dynamic model representing a relationship between a motion of the robot and a floor reaction force so as to determine a first provisional instantaneous value of a desired motion as an output of the first dynamic model;

restricted second model calculating means, which is a means for determining a second provisional instantaneous value of a desired motion, and which determines the second provisional instantaneous value of the desired motion on the basis of at least a provisional instantaneous value of the desired floor reaction force such that an instantaneous value of a restriction object amount that is determined by predetermined calculation from a vertical component or a component in floor surface normal line direction of a floor reaction force moment, which balances with the determined second provisional instantaneous value on a second dynamic model representing a relationship between a motion of a robot and a floor reaction force, and the compensating floor reaction force moment falls within the permissible range;

manipulated variable calculating means for determining a manipulated variable of a floor reaction force moment on the basis of at least a difference between a first provisional instantaneous value and a second provisional instantaneous value of the desired motion such that the difference approaches zero; and model input correcting means for additionally inputting the manipulated variable of the floor reaction force moment to at least one of the first dynamic model and the second dynamic model, wherein the second provisional instantaneous value of the desired motion is determined as a desired instantaneous value of the desired motion.

According to the forty-fourth invention, a provisional instantaneous value of a desired floor reaction force is supplied to the first dynamic model to determine a first provisional instantaneous value of a desired motion, and the provisional instantaneous value of the desired floor reaction force is also supplied to the second dynamic model. The second dynamic model is used to determine a second provisional instantaneous value of the desired motion. In this case, however, the second provisional instantaneous value of the desired motion is determined such that an instantaneous value of a restriction object amount determined by predetermined calculation from a vertical component or a floor surface normal line direction component of a floor reaction force moment that balances with the second provisional instantaneous value of the desired motion on the second dynamic model is set to fall within the permissible range. Then, a manipulated variable of a floor reaction force moment is determined on the basis of at least a difference between the first provisional instantaneous value and the second provisional instantaneous value of the desired motion such that the difference approaches zero. This manipulated variable is additionally supplied to at least one of the first dynamic model and the second dynamic model. Furthermore, a second provisional instantaneous value of a desired motion is determined as a desired instantaneous value of the desired motion.

Thus, a second provisional instantaneous value of a desired motion determined by the limited second model calculating means exhibits high stability, while setting the restriction object amount to fall within a permissible range. As a result, a desired motion can be generated that allows a restriction object amount, such as a floor reaction force moment vertical component, acting on an actual robot, to substantially remain within a permissible range even if a compensating floor reaction force moment for approximating a posture state amount of the robot in the yaw direction to a desired state amount (a posture state amount in the yaw direction in a desired motion) is additionally generated. In other words, an instantaneous value of a desired motion is determined, considering a limit of a frictional force moment vertical component and the difference. This makes it possible to determine a desired motion of the robot that prevents the robot from spinning and falling caused by spinning, while stably maintaining the posture state amount of the robot in the yaw direction at a posture state amount of a desired motion. Moreover, it is possible to determine a desired motion that prevents a travel trajectory of the robot from deviating from the trajectory of a desired gait and to prevent sustained stability of the posture of the robot in the yaw direction from being lost. In addition, it is not required to always maintain the restriction object amount to zero or substantially zero as long as the restriction object amount falls within a permissible range, thus making it possible to prevent the motion of a certain part of the robot from becoming unduly intense.

The first dynamic model may have relatively low dynamic proximity accuracy, and the second dynamic model desirably has higher dynamic proximity accuracy than the first dynamic model.

In the forty-fourth invention, the difference between the first provisional instantaneous value and the second provisional instantaneous value of the desired motion preferably includes a difference in a state amount of a posture of a predetermined part of the robot about a vertical axis or a floor surface normal line axis (a forty-fifth invention).

With this arrangement, the stability of a posture state amount of the predetermined part (e.g., a body) in the yaw direction can be ideally enhanced.

The forty-fourth and the forty-fifth inventions preferably include a means for determining a floor reaction force moment instantaneous value corresponding to an instantaneous value of a restriction object amount, which is determined from a vertical component or a floor surface normal line direction component of a floor reaction force moment substantially balancing an instantaneous value of the desired motion on the second dynamic model and the compensating floor reaction force moment by the predetermined calculation, as an instantaneous value of a floor reaction force moment of a desired floor reaction force constituting the desired gait (forty-sixth invention).

This arrangement makes it possible to prevent the robot from spinning and falling caused by spinning, while stably maintaining a posture state amount of the robot in the yaw direction at a posture state amount of a desired motion. It is also possible to prevent a travel trajectory of the robot from deviating from the trajectory of a desired gait and to prevent sustained stability of the posture of the robot in the yaw direction from being lost.

The forty-fourth invention described above can be easily implemented by using the construction of, for example, the thirty-fourth invention. More specifically, the thirty-fourth invention includes a third model calculating means for inputting at least a provisional instantaneous value of the desired floor reaction force to a third dynamic model representing a relationship between a motion of the robot and a floor reaction force so as to determine a third provisional instantaneous value of a desired motion as an output of the third dynamic model, and the means for determining a required value of a floor reaction force moment correction amount of the desired floor reaction force determines the required value on the basis of a difference between the determined desired instantaneous value of the desired motion and the third provisional instantaneous value of the desired motion such that the difference approximates to zero (a forty-seventh invention).

In the forty-seventh invention, the third dynamic model and the third model calculating means will correspond to the first dynamic model and the first model calculating means, respectively, in the forty-fourth invention. Hence, the forty-seventh invention will be equivalent to the forty-fourth invention and capable of providing the same advantages as those of the forty-fourth invention.

Preferably, the twentieth to the forty-seventh inventions explained above include a slippage determining means for determining the occurrence of a slippage of the robot in operation, following the desired gait, and the permissible range setting means variably sets the permissible range according to a determination result of the slippage determining means (a forty-eighth invention).

According to the forty-eighth invention, a permissible range of a restriction object amount is variably set according to a determination result of the occurrence of a slippage of an actual robot, so that the occurrence of a slippage of the robot can be securely restrained. If it is determined that a slippage has occurred, then the permissible range should be set to be narrower.

According to the forty-eighth invention, the occurrence of a slippage can be determined, for example, in the same manner as that in the seventeenth to the nineteenth.

More specifically, the slippage determining means determines the occurrence of a slippage on the basis of at least the ground speed of a distal portion of a leg in contact with the ground (a forty-ninth invention).

Alternatively, the slippage determining means includes a means for determining, on the basis of at least a temporal changing rate of an actual floor reaction force acting on a leg in contact with the ground and the ground speed of a distal portion of the leg, an apparent spring constant of the leg, and determines the occurrence of a slippage on the basis of at least the apparent spring constant (a fiftieth invention).

Alternatively, the slippage determining means determines the occurrence of a slippage on the basis of at least a result obtained by passing an actual floor reaction force acting on a leg in contact with the ground through a band-pass filter having a frequency passing characteristic in a range near a predetermined frequency (a fifty-first invention).

According to the forty-ninth to the fifty-first inventions, the occurrence of a slippage can be determined in the same manner as that in the seventeenth to the nineteenth inventions.

The occurrence of a slippage can be determined in any one of the forty-ninth to the fifty-first inventions. Alternatively, two or more of the forty-ninth to the fifty-first inventions may be combined to determine the occurrence of a slippage.

BRIEF DESCRIPTION OF THE DRAWINGS

FIG. 6 is a graph showing an example of a vertical component trajectory of a desired floor reaction force, FIG. 7 shows graphs illustrating examples of an X component and a Y component of a desired ZMP trajectory.

FIG. 23 is a flowchart showing subroutine processing of S024 in FIG. 13,

FIG. 25 is a flowchart showing subroutine processing of S306 in FIG. 24,

FIG. 44 is a graph showing examples of a provisional desired ZMP of the present gait, a ZMP correction amount, and a desired ZMP after correction, FIG. 45 is a flowchart showing subroutine processing of S030 in FIG. 13.

FIG. 56 is a flowchart showing main routine processing of a gait generator in the first embodiment, FIG. 57 is a flowchart showing subroutine processing of S3032 in FIG. 56.

FIG. 62 is a flowchart showing subroutine processing of S2114 in FIG. 61.

BEST MODE FOR CARRYING OUT THE INVENTION

Referring now to the accompanying drawings, control devices of legged mobile robots according to embodiments of the present invention will be explained. As the legged mobile robots, bipedal mobile robots will be used as examples.

First, with reference to FIG. 1 to FIG. 47, a reference example related to the control device of a legged mobile robot in accordance with the present invention will be explained. The embodiments of the present invention to be discussed hereinafter share the same mechanical constructions as that of the reference example, while they partly differ from the reference example in gait generation processing and control processing of a robot. For this reason, the explanation of the reference example will be frequently used in the explanation of the embodiments to be discussed hereinafter. Supplementally, the same matters that will be explained with reference to FIG. 1 and FIG. 2, FIG. 3 and FIG. 5 to FIG. 12 to be discussed later will apply to the embodiments to be discussed later.

Figure 1:
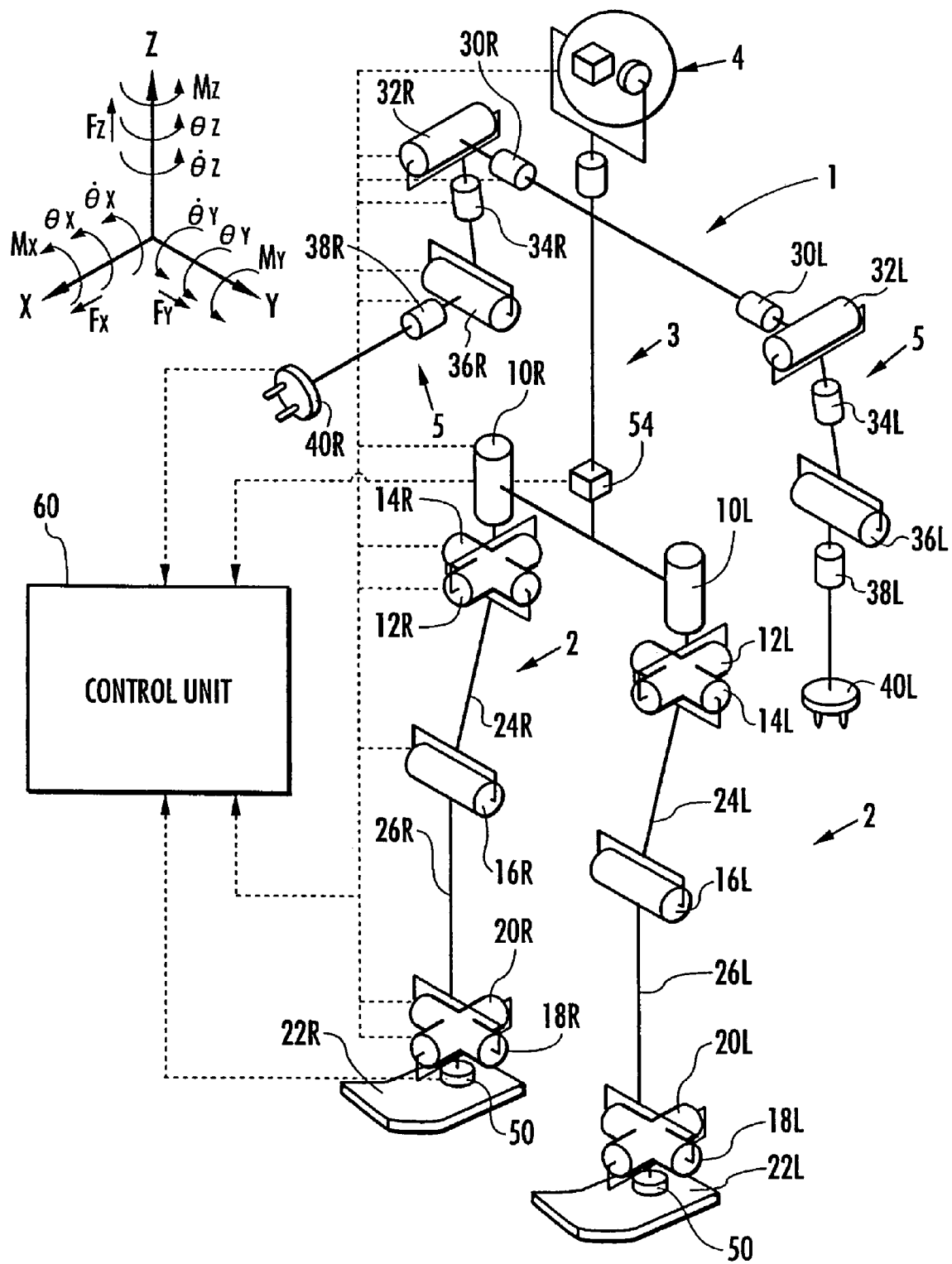
FIG. 1 is a diagram schematically showing a general construction of a bipedal mobile robot as a legged mobile robot in an embodiment of the present invention and a reference example related thereto.

FIG. 1 is a schematic diagram generally showing a bipedal mobile robot representing a legged mobile robot according to the present reference example.

As shown in the figure, a bipedal mobile robot (hereinafter referred to as "the robot") 1 is equipped with a pair of right and left legs (leg links) 2, 2 provided such that they extend downward from a body (a base body of the robot 1) 3. The two legs 2, 2 share the same construction, each having six joints. The six joints of each leg are comprised of, in the following order from the body 3 side, joints 10R, 10L (symbols R and L meaning correspondence to the right leg and the left leg, respectively; the same will be applied hereinafter) for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R (L) constituting a distal portion of each leg 2 is attached to the bottoms of the two joints 18R (L) and 20R (L) of the ankle of each leg 2. The body 3 is installed at the uppermost top of the two legs 2, 2 through the intermediary of the three joints 10R (L), 12R (L) and 14R (L) of the hip of each leg 2. A control unit 60 or the like, which will be discussed in detail hereinafter, is housed inside the body 3. For convenience of illustration, the control unit 60 is shown outside the body 3 in FIG. 1.

In each leg 2 having the aforesaid construction, a hip joint (or a waist joint) is formed of the joints 10R (L), 12R (L) and 14R (L), the knee joint is formed of the joint 16R (L), and the ankle joint is formed of the joints 18R (L) and 20R (L). The hip joint and the knee joint are connected by a thigh link 24R (L), and the knee joint and the ankle joint are connected by a crus link 26R (L).

A pair of right and left arms 5, 5 is attached to both sides of an upper portion of the body 3, and a head 4 is disposed at a top end of the body 3. Each arm 5 is provided with a shoulder joint composed of three joints 30R (L), 32R (L), and 34R (L) an elbow joint composed of a joint 36 R(L), a wrist joint composed of a joint 38R (L), and a hand 40R (L) connected to the wrist joint. The head 4 is not directly connected to a topic of the present invention, so that detailed explanation thereof will be omitted.

According to the construction described above, the foot 22R (L) of each leg 2 is given six degrees of freedom relative to the body 3. During a travel, such as walking, of the robot 1, desired motions of the two feet 22R and 22L can be accomplished by driving 6*2=12 joints of the two Legs 2, 2 together ("*" in the present description will denote multiplication as scalar calculation, while it will denote an outer product in vector calculation) at appropriate angles. This arrangement enables the robot 1 to arbitrarily move in a three-dimensional space. Furthermore, each arm 5 can perform a motion, such as arm swinging, by rotating its shoulder joint, the elbow joint, and the wrist joint.

As shown in FIG. 1, a publicly known six-axis force sensor 50 is provided between the ankle joints 18R (L), 20R (L) and the foot 22R (L) of each leg 2. The six-axis force sensor 50 detects primarily whether the foot 22R (L) of each leg 2 is in contact with the ground, and a floor reaction force (landing load) acting on each leg 2, and it outputs detection signals of three-direction components Fx, Fy, and Fz of a translational force of the floor reaction force and three-direction components Mx, My, and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis direction accelerometer and a three-axis direction gyro sensor. These detection signals of these sensors are used to detect posture angles (an inclination angle and a yaw angle) of the body 3 and an angular velocity thereof, and also used to estimate a self position/posture of the robot 1. Although detailed structures are not shown, each joint of the robot 1 is provided with an electric motor 64 (refer to FIG. 3) for driving the joint, and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) is provided at an appropriate position of the robot 1. The joystick 73 is constructed in such a manner that a request regarding a gait of the robot 1, such as a request for turning the robot 1 that is moving straight, is input to the control unit 60 as necessary by operating the joystick 73.

Figure 2:
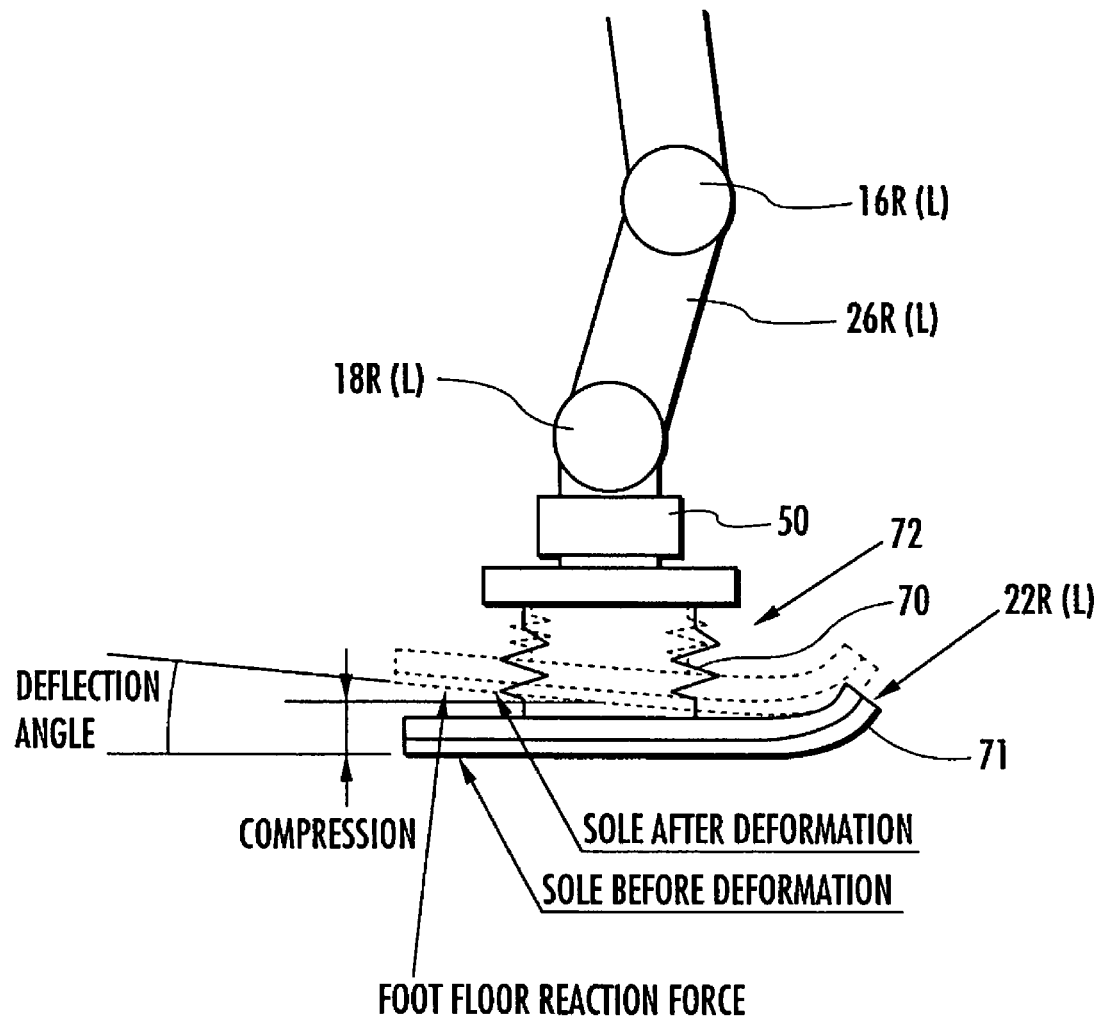
FIG. 2 is a diagram showing a structure of a distal portion of a leg of the robot shown in FIG. 1.

FIG. 2 is a diagram schematically showing a basic construction of a distal portion (including each foot 22R (L)) of each leg 2 in the present reference example. As shown in the diagram, a spring mechanism 70 is installed between each foot 22R (L) and the six-axis force sensor 50, and a foot sole elastic member 71 made of rubber or the like is bonded to a foot sole (the bottom surface of each foot 22R (L)). These spring mechanism 70 and the foot sole elastic member 71 constitute a compliance mechanism 72. The spring mechanism 70, which will be discussed in detail later, is constructed of a square guide member (not shown), which is installed on the upper surface of the foot 22R (L), and a piston-shaped member (not shown) installed adjacently to the ankle joint 18R (L) (the ankle joint 20R (L) being omitted in FIG. 2) and the six-axis force sensor 50, and housed in the guide member through the intermediary of an elastic member (rubber or spring) so that it may be jogged.

The foot 22R (L) indicated by a solid line shown in FIG. 2 is in a state where it is subjected to no floor reaction force. When each leg 2 is subjected to a floor reaction force, the spring mechanism 70 and the foot sole elastic member 71 of the compliance mechanism 72 flex, causing the foot 22R (L) to shift to the position/posture illustrated by a dashed line in the figure. The structure of the compliance mechanism 72 is important not only to ease a landing impact but also to enhance controllability, as explained in detail in, for example, Japanese Unexamined Patent Publication Application No. 5-305584 previously proposed by the present applicant.

Figure 3:
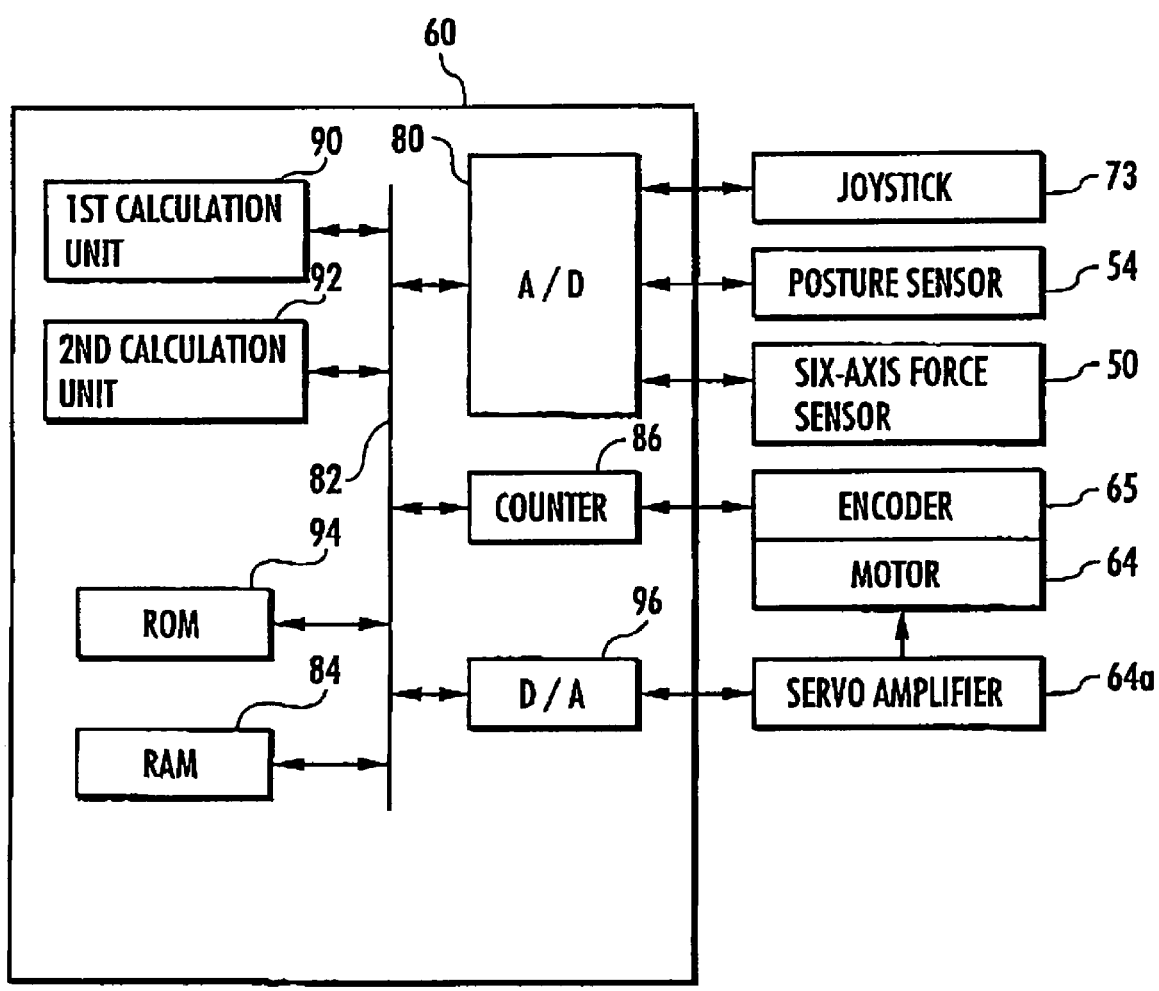
FIG. 3 is a block diagram showing a construction of a control unit provided on the robot shown in FIG. 1.

FIG. 3 is a block diagram showing a construction of the control unit 60. The control unit 60 is comprised of a microcomputer, and includes a first calculator 90 and a second calculator 32 formed of CPUs, an A/D converter 80, a counter 86, a D/A converter 96, a RAM 84, a ROM 94, and a bus line 82 for transferring data among them. In the control unit 60, output signals of the six-axis force sensor 50, the posture sensor 54 (an accelerometer and a rate gyro sensor), the joystick 73, etc. of each leg 2 are converted into digital values by the A/D converter 80 and sent to the RAM 84 via the bus line 82. Outputs of the encoder 65 (rotary encoder) of each joint of the robot 1 are supplied to the RAM 84 via the counter 86.

As will be discussed hereinafter, the first calculator 90 generates desired gaits, calculates a joint angle displacement command (a displacement angle of each joint or a command value of a rotational angle of each electric motor 64), and sends the calculation result to the RAM 84. The second calculator 92 reads an actual measurement value of a joint angle detected on the basis of the joint angle displacement command and an output signal of the encoder 65 from the RAM 84 to calculate a manipulated variable required for driving each joint, and outputs the calculated variable to the electric motor 64 for driving each joint through the intermediary of the D/A converter 96 and a servo amplifier 64a.

Figure 4:
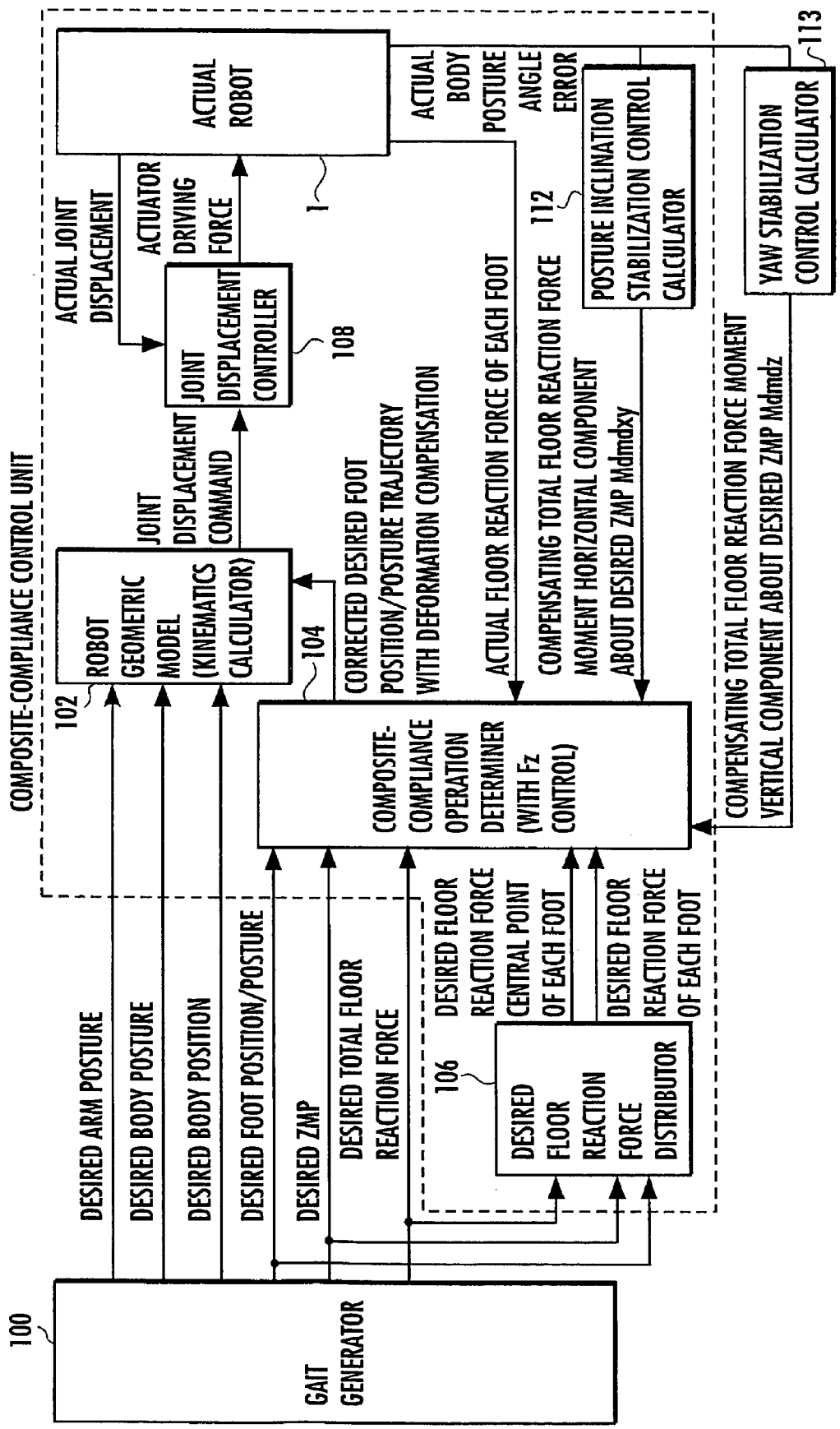
FIG. 4 is a block diagram showing a functional construction of the control unit in the reference example.

FIG. 4 is a block diagram showing the entire functional construction of a control unit of the legged mobile robot in accordance with the present reference example. A portion except for the "actual robot" in FIG. 4 is constituted by processing functions implemented by the control unit 60 (primarily the functions of the first calculator 90 and the second calculator 92). In the following explanation, the symbols R and L will be omitted as long as it is not particularly necessary to discriminate right and left of the legs 2 and the arms 5.

The explanation will now be given. The control unit 60 is equipped with a gait generator 100 for generating and outputting desired gaits of the robot 1 freely and in real time. The functions of the gait generator 100 constitute individual means of the present invention. A desired gait output by the gait generator 100 is constituted of a desired body position/posture trajectory (trajectory of a desired position and a desired posture of the body 3), a desired foot position/posture trajectory (trajectory of a desired position and a desired posture of each foot 22), a desired arm posture trajectory (trajectory of a desired posture of each arm 5), a desired total floor reaction force central point (desired ZMP) trajectory, and a desired total floor reaction force trajectory. If a movable part relative to the body 3 is provided in addition to the legs 2 and the arms 5, then a desired position/posture trajectory of the movable part is added to the desired gait.

Here, the term "trajectory" in the above gait means a temporal change pattern (time series pattern), and may be referred to as "pattern" in place of "trajectory" in the following explanation. Furthermore, a "posture" of each part means a spatial orientation. For example, a posture of a body is represented by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis). A foot posture is represented by means of a spatial azimuth of two axes fixedly set on each foot 22. In the present description, a body posture may be referred to as a body posture angle. Of body postures, a posture relative to a vertical direction may be referred to as a body posture inclination or a body posture inclination angle.

In the following explanation, the term "desired" will be frequently omitted when there is no danger of misunderstanding. Furthermore, among gaits, those gaits related to constituent elements other than those related to a floor reaction force, that is, the gaits related to motions of the robot 1, such as a foot position/posture and a body position/posture, will be collectively referred to as "motion." A floor reaction force (floor reaction force comprised of a translational force and the moment) of each foot 22 is referred to as "each-foot floor reaction force", and a resultant force of the "each-foot floor reaction forces" of all (two) feet 22R and 22L of the robot 1 will be referred to as a "total floor reaction force" In the following explanation, however, each-foot floor reaction forte will hardly be referred to, so that "floor reaction force" will be handled as having the same meaning as "total floor reaction force" unless otherwise specified.

A desired floor reaction force is generally expressed by a point of action and a translational force and the moment acting on the point. The point of action may be set at any location, so that innumerable expressions are possible for the same desired floor reaction force. If, however, a desired floor reaction force is expressed using especially the aforesaid desired floor reaction force central point (a desired position of the floor reaction force central point) as the point of action, then the moment component of the desired floor reaction force will be zero except for a vertical component (the moment about the vertical axis (Z-axis)). In other words, the horizontal component of the moment of the desired floor reaction force about the desired floor reaction force central point (the moment about the horizontal axis (the X-axis and the Y-axis)) will be zero.

In the case of a gait that satisfies dynamic balance conditions, a ZMP calculated from a desired motion trajectory of the robot 1 (a point at which the moment of a resultant force of an inertial force and gravity calculated from the desired motion trajectory acts about the point becomes zero except for a vertical component) agrees with a desired floor reaction force central point. Therefore, providing a desired ZMP trajectory may be regarded as equivalent to providing a desired floor reaction force central point trajectory (refer to, for example, PCT Kokai publication WO/02/40224 by the present applicant for more details).

From the background described above, in the description of PCT Kokai publication WO/02/40224, a desired gait has been defined as follows.
a) In a broad sense, a desired gait is a combination of a desired motion trajectory and a desired floor reaction force trajectory thereof in a period of one step or a plurality of steps.
b) In a narrow sense, a desired gait is a combination of a desired motion trajectory and a ZMP trajectory thereof in a period of one step.

c) A series of gaits is formed of several gaits that are connected.

In walking, a vertical position of the body 3 of the robot 1 (a height of the body) is determined by a body height determining technique proposed previously in Japanese Unexamined Patent Application Publication No. 10-86080 by the present applicant. This subordinately determines a translational floor reaction force vertical component. Furthermore, a translational floor reaction force horizontal component is also determined by determining the horizontal body position trajectory of the robot 1 such that the horizontal component of the moment produced about a desired ZMP by a resultant force of the inertial force and the gravity generated by the motion of a desired gait becomes zero. For this reason, a desired ZMP alone has been adequate as a physical amount to be explicitly set for the floor reaction force of a desired gait in the description of PCT Kokai publication WO/02/40224. Thus, the definition in the above b) has been adequate as the definition of a desired gait in the narrow sense. However, in the running gait of the robot 1 explained in the present reference example (the details will be described hereinafter), a floor reaction force vertical component (a translational floor reaction force vertical component) is also important for control. In the present invention, therefore, a desired trajectory of the floor reaction force vertical component is explicitly set, and then a trajectory of a desired vertical body position or the like of the robot 1 is determined. Hence, in the present description, the following b') will be adopted as the definition of a desired gait in a narrow sense. b') A desired gait in a narrow sense is a combination of a desired motion trajectory and a desired floor reaction force trajectory including at least a ZMP trajectory of the desired motion trajectory and a desired translational floor reaction force vertical component trajectory in a period of one step.

In the present description, a desired gait used hereinafter will mean the desired gaits in the narrow sense of the above b') unless otherwise specified for the purpose of easy understand. In this case, "one step" of a desired gait will mean a period from the moment one leg 2 of the robot 1 touches the ground to the moment the other leg 2 touches the ground. Supplementally, in the reference example and embodiments in the present description, a desired gait is used to mean a gait for one-step period. This, however, does not have to be necessarily the one-step period; it may alternatively be a period for a plurality of steps or a period that is shorter than one step (e.g., a half step). In the following explanation, "floor reaction force vertical component" will mean "translational floor reaction force vertical component," and the term "moment" will be used for the vertical component (the component about the vertical axis) of a moment of a floor reaction force so as to distinguish it from the "floor reaction force vertical component." Similarly, "floor reaction force horizontal component" will mean "translational floor reaction force horizontal component."

Needless to say, a double stance period in a gait will refer to a period during which the robot 1 supports its own weight by the two legs 2, 2. A single stance period will refer to a period during which the robot 1 supports its own weight only by one leg 2, and a floating period will refer to a period during which both legs 2, 2 are apart from a floor (floating in the air). In the single stance period, the leg 2 not supporting the self-weight of the robot 1 will be referred to as a "free leg." The running gait explained in the present reference example does not have the double stance period, but alternately repeats the single stance period (landing period) and the floating period. In this case, during the floating period of running, both legs 2, 2 do not support the self-weight of the robot 1; however, the leg 2 that was a free leg and the leg 2 that was a supporting leg during a single stance period immediately before the floating period will be referred to as a "free leg" and a "supporting leg," respectively, even in the floating period.

Taking the running gait shown in FIG. 5 as an example, an outline of a desired gait generated by the gait generator 100 will be explained. More definitions and details related to gaits have been given also in Japanese Unexamined Patent Application Publication No. 10-86081 previously proposed by the present applicant, so that the following will mainly give a description not covered by the Japanese Unexamined Patent Application Publication No. 10-86081.

First, the running gait shown in FIG. 5 will be explained. This running gait is a gait similar to a typical human running gait. In this running gait, the single stance period in which the foot 22 of only either the right or left leg 2 (supporting leg) of the robot 1 lands (contacts the ground) and a floating period in which both the legs 2, 2 float in the air are alternately repeated. In FIG. 5, the first state illustrates a state wherein a single stance period has begun (initial stage), the second state illustrates a state of a midpoint of the single stance period, the third state illustrates a state wherein a floating period following the single stance period has begun (an end of the single stance period), the fourth state illustrates a state of a midpoint of the floating period, and the fifth state illustrates an end of the floating period (a start of the next single stance period).

Figure 5:
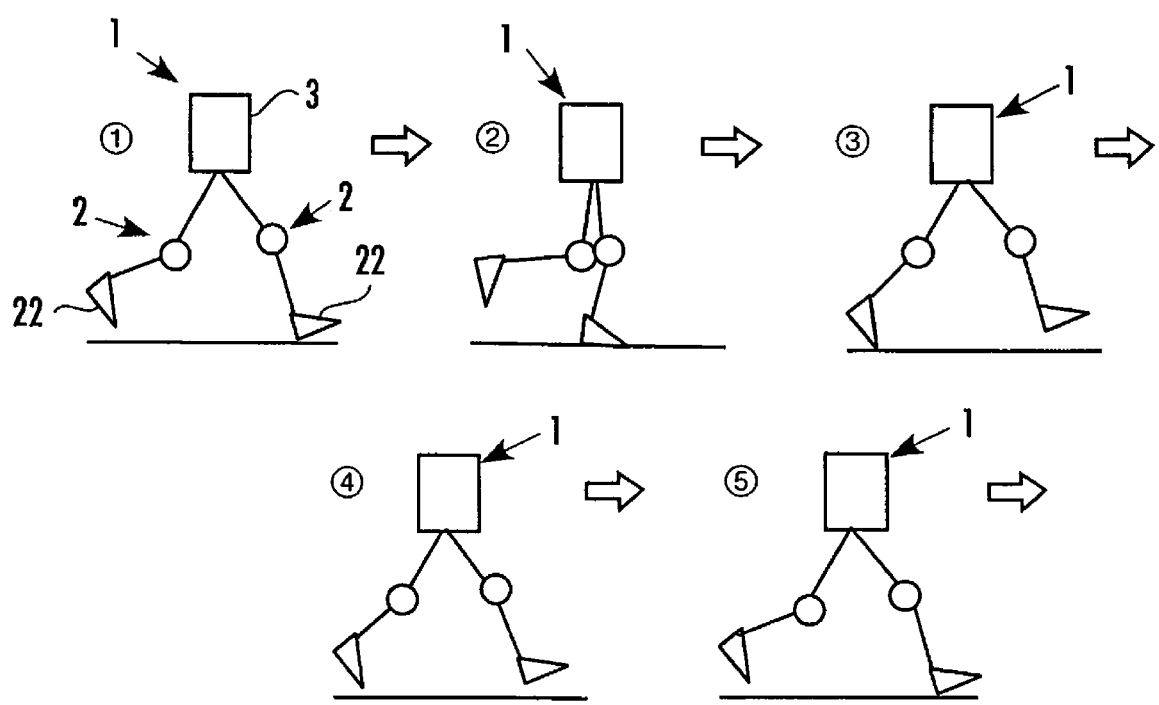
FIG. 5 is a diagram for explaining a walking gait generated in the embodiment and the reference example.

In this running gait, the robot 1 lands at the heel of the foot 22 of the supporting leg (the leg 2 on the front side in the advancing direction of the robot 1) at the beginning of the single stance period, as shown in the first state of FIG. 5. Subsequently, the robot 1 brings substantially the entire surface of the sole of the landed foot 22 (the foot 22 of the supporting leg) into contact with the ground as shown in the second state of FIG. 5, and then kicks the floor with the tiptoe of the foot 22 (the foot 22 of the leg 2 on the rear side with respect to the advancing direction of the robot 1 in the third state of FIG. 5) of the supporting leg to jump into the air as shown in the third state of FIG. 5. This ends the single stance period and starts the floating period at the same time. The free leg in the single stance period exists behind the supporting leg at the beginning of the single stance period as shown in the first state of FIG. 5, but swung out to the front of the supporting leg toward the next predetermined landing position, as shown in the second and the third states of FIG. 5. Next, following the floating period shown in the fourth state of FIG. 5, the robot 1 lands at the heel of the foot 22 of the free leg (the leg 2 that was the free leg in the single stance period immediately before the floating period started), and the next single stance period is begun.

Considering the running gait shown in FIG. 5, a basic outline of a desired gait generated by the gait generator 100 will be explained. Although more details will be discussed later, when the gait generator 100 generates a desired gait, basic required values (required parameters) for generating the desired gait, such as a landing position/posture (expected landing position/posture) of the foot 22 of a free leg and a landing time (expected landing time), are supplied to the gait generator 100 according to a required operation or the like of the joystick 73. The gait generator 100 then generates the desired gait using the required parameters. More detailedly, the gait generator 100 determines parameters (referred to as gait parameters) that specify some constituent elements of the desired gait, such as a desired foot position/posture trajectory and a desired floor reaction force vertical component trajectory, on the basis of the above required parameters, and then sequentially determines instantaneous values of the desired gait by using the gait parameters so as to generate a time series pattern of the desired gait.

In this case, a desired foot position/posture trajectory (to be more specific, a desired trajectory of each spatial component (X-axis component or the like) of the position and the posture of a foot) is generated for each foot 22 by using a finite-duration setting filter proposed in U.S. Pat. No. 3,233,450 by the present applicant. This finite-duration setting filter includes a plurality of stages (3 states or more in the present reference example) of first-order lag filters of variable time constants, that is, filters represented in terms of a transfer function of $1/(1+\tau s)$ ($\tau$ is a variable time constant. Hereinafter, the filter will be referred to as a unit filter), the plurality of stages of the filters being connected in series. This arrangement makes it possible to generate and output a trajectory that reaches a specified value at desired specified time. In this case, every time constant $\tau$ of the unit filter of each stage is variably set in sequence according to remaining time until the above specified time after starting the generation of an output of the finite-duration setting filter. More specifically, the setting is made such that, the value of $\tau$ is decreased from a predetermined initial value (>0) as the remaining time reduces, and the value of $\tau$ finally reaches zero at the specified time at which the remaining time reaches zero. A step input of a height based on the specified value (more specifically, a change amount from an initial value to the specified value of an output of the finite-duration setting filter) is supplied to the finite-duration seating filter. The finite-duration setting filter not only generates an output that reaches a specified value at specified time but also makes it possible to set a changing rate of an output of the finite-duration setting filter at specified time to zero or substantially zero. Especially when three stages or more (three stages will do) of the unit filters are connected, the changing acceleration (a differential value of a changing rate) of an output of the finite-duration setting filter can be reduced to zero or substantially zero.

The desired foot position/posture trajectory generated by the finite-duration setting filter as described above is the desired position/posture trajectory of each foot 22 on a supporting leg coordinate system, which is fixed on a floor surface and which is to be discussed later.

The desired foot position/posture trajectory generated as described above is generated such that the position of each foot 22 begins moving, while gradually accelerating from the initial in-contact-with-the-ground state (the state at the initial time of a desired gait) toward an expected landing position. The desired foot position/posture trajectory is generated such that the changing rate of the position is gradually decelerated to zero or substantially zero until the expected landing time is finally reached, and the expected landing position is reached at the expected landing time, stopping the movement. Hence, the ground speed at the moment each foot 22 lands becomes zero or substantially zero (the changing rate of the position of each foot 22 on the supporting leg coordinate system secured to a floor). Accordingly, a landing impact will be low even when the robot 1 lands from the state wherein all legs 2, 2 are simultaneously present in the air (the state in the floating period) in a running gait.

In the aforesaid running gait, the vertical velocity of the body 3 switches downward from the latter half of the floating period due to the gravity acting on the robot 1, and remains downward at the time of landing. Therefore, the relative velocity of the foot 22 of a free leg with respect to the body 3 switches upward immediately before landing if the desired foot position/posture trajectory is generated such that the ground speed at the moment each foot 22 lands reaches zero or substantially zero, as described above, and if the desired position/posture trajectory of the body 3 is generated to satisfy a dynamic balance condition, as will be discussed later. This means that the desired gait of the robot 1 is such that the robot 1 lands, withdrawing the leg 22 that is a free leg toward the body 3. In other words, according to the desired gait in the present reference example, the robot 1 lands while pulling the foot 22 up, as observed from the body 3, so that the ground speed of the foot 22 of the free leg reaches zero or substantially zero. This restrains a landing impact to prevent the landing impact from becoming excessive.

Furthermore, in the present reference example, the finite-duration setting filter is composed of three stages of more (e.g., three stages) of the unit filters connected in series, so that the velocity of each foot 22 (the changing rate of a foot position) reaches zero or substantially zero by expected landing time and the acceleration of each foot 22 also reaches zero or substantially zero at the expected landing time when the movement stops. This means that the ground acceleration also becomes zero or substantially zero at the landing instant. Hence, the landing impact will be further restrained. Especially, even if actual landing time of the robot 1 deviates from desired landing time, the impact no longer increases much. Supplementally, the number of stages of the unit filters of the finite-duration setting filter may be two to make setting so that the ground speed of each foot 22 reaches zero or substantially zero at expected landing time. In this case, however, the acceleration of each foot 22 at expected landing time does not usually become zero.

Regarding a foot posture, after each foot 22 lands at its heel at expected landing time, the foot continues to move until substantially the entire sole of the foot 22 comes in contact with a floor. For this reason, the time at which substantially the entire sole of the foot 22 comes in contact with the floor is set to the above specified time, and the foot posture trajectory is generated by the finite-duration setting filter.

In the present reference example, the foot position trajectory has been generated using the finite-duration setting filter. Alternatively, however, a desired foot position trajectory may be generated using a function, such as a polynomial, that is set such that the changing rate of a foot position at the expected landing time (a time differential value of a foot position) reaches zero or substantially zero and further the changing acceleration of the foot position at the expected landing time (a time differential value of the changing rate) reaches zero or substantially zero. This applies also to the generation of a desired foot posture trajectory. However, regarding the generation of the desired foot posture trajectory, a function, such as a polynomial, is set such that the changing rate of the posture of each foot 22 and the changing acceleration thereof reaches zero or substantially zero at the time when substantially the entire sole of each foot 22 comes in contact with a floor, as described above.

A desired floor reaction force vertical component trajectory is set as shown in, for example, FIG. 6. In the present reference example, the shape of a desired floor reaction force vertical component trajectory in a running gait (strictly speaking, the shape in a single stance period) is (specified to be trapezoidal (a shape projecting to an increasing side of a floor reaction force vertical component). The height of the trapezoid and the time of a bending point are regarded as gait parameters defining a desired floor reaction force vertical component trajectory, and the gait parameters (floor reaction force vertical component trajectory parameters) are determined. In a floating period of a running gait, the desired floor reaction force vertical component is steadily set to zero. A desired floor reaction force vertical component trajectory is desirably set so that it is virtually continuous (so that values are not discontinuous), as in the case of the present example. This is for ensuring smooth operations of joints of the robot 1 when controlling a floor reaction force. The term "virtually continuous" means that a skipped value that inevitably takes place when a trajectory that is continuous in an analog fashion (a continuous trajectory in a true meaning) is digitally expressed by a discrete-time system does not cause the continuity of the trajectory to be lost.

A desired ZMP trajectory is set as follows. In the running gait shown in FIG. 5, the robot 1 lands at the heel of the foot 22 of a supporting leg, and then kicks at the tiptoe of the foot 22 of the supporting leg to jump into the air. Lastly, the robot 1 lands at the heel of the foot 22 of a free leg, as described above. Therefore, as shown in the upper diagram of FIG. 7, the desired ZMP trajectory in the single stance period is set such that it takes the heel of the foot 22 of the supporting leg as its initial position, and then extends to the center in the longitudinal direction of the foot 22 in the period in which substantially the entire sole of the foot 22 of the supporting leg comes on contact with the ground, and thereafter, reaches the tiptoe of the foot 22 of the supporting leg by floor leaving time. Here, the upper diagram of FIG. 7 shows a desired ZMP trajectory in an X-axis direction (longitudinal direction), while a lower diagram of FIG. 7 shows a desired ZMP trajectory in a Y-axis direction (lateral direction). The desired ZMP trajectory in the Y-axis direction in a single stance period is set at the same position as the central position of an ankle joint of a supporting leg 2 in the Y-axis direction, as shown in the lower diagram of FIG. 7.

In a running gait, after a single stance period ends, both legs 2, 2 leave a floor, and the floor reaction force vertical component becomes zero. When the floor reaction force vertical component is zero, that is, during a floating period, the total center of gravity of the robot 1 is subject to free fall motion, and an angular momentum change about the total center of gravity is zero. At this time, the moment of a resultant force of gravity and an inertial force that acts on the robot 1 is zero at an arbitrary point of a floor, so that a desired ZMP is indefinite. This means that any point of the floor satisfies a condition of ZMP represented by "a point of action at which the horizontal component of the moment, in which a resultant force of gravity and an inertial force acts, is zero." In other words, setting the desired ZMP at an arbitrary point satisfies a dynamic balance condition in that the horizontal component of the moment in which the above resultant force acts about the desired ZMP is zero. Hence, the desired ZMP may be set discontinuously. For example, the desired ZMP may be set so that it does not move from a desired ZMP position when leaving a floor (when a single stance period ends) in a floating period, and it moves discontinuously (in steps) to a desired ZMP position for landing at the end of the floating period. In the present reference example, however, the position of the desired ZMP trajectory in the X-axis direction in a floating period has been set so as to continuously move to the landing position of the heel of the foot 22 of a free leg from the tiptoe of the foot 22 of a supporting leg by the time the next free leg 2 lands, as shown in the upper diagram of FIG. 7. Further, as shown in the lower diagram of FIG. 7, the position of the desired ZMP trajectory in the Y-axis direction in a floating period has been set so as to continuously move to the Y-axis directional position of the center of the ankle joint of a free leg from the Y-axis directional position of the center of the ankle joint of a supporting leg 2 by the time the next free leg 2 lands. In other words, the desired ZMP trajectory has been set so that it is continuous (virtually continuous) in all periods of a gait. As it will be discussed hereinafter, a desired gait has been generated so that a moment of the resultant force of gravity and an inertial force (excluding a vertical component) about the desired ZMP becomes zero (to be more specific, a desired body position/posture trajectory has been adjusted). Taking an approximation error into account, the desired ZMP trajectory is desirably set to be continuous (virtually continuous) also in a floating period in order to ensure a smooth generated gait. However, a dynamic model, which is used in the present reference example and which will be discussed later, makes it possible to uniquely generate a desired gait that sets the horizontal component of a moment about a desired ZMP at a certain value (the value is zero in the present reference example, whereas it is not necessarily zero in embodiments, which will be described hereinafter) independently of the position of a desired ZMP. Therefore, the desired ZMP does not have to be always continuous.

In the present reference example, the positions and time of the bending points of the desired ZMP trajectory as shown in FIG. 7 are set as ZMP trajectory parameters (parameters defining the desired ZMP trajectory). The meaning of "virtually continuous" of the aforementioned ZMP trajectory is the same as that in the case of the above floor reaction force vertical component trajectory.

The ZMP trajectory parameters are determined such that a high stability margin is secured and no sudden change Lakes place. Here, a state in which a desired ZMP exists near the center of a least convex polygon (so-called supporting polygon) that includes a ground contact surface of the robot 1 indicates a high safety margin (refer to Japanese Unexamined Patent Application Publication No. 10-86081 for more detail). The desired ZMP trajectory shown in FIG. 7 has been set to meet such a condition.

A desired body position/posture, a desired foot position/posture, and a reference body posture, which will be discussed hereinafter, are described in terms of a global coordinate system. The global coordinate system is a coordinate system fixed to a floor. More specifically, a supporting leg coordinate system to be discussed hereinafter is used as the global coordinate system.

In the present reference example, the gait generator 100 generates a reference body posture in addition to a desired body posture. The reference body posture is a body posture generated directly on the basis of requests regarding a gait (requests from a unit, such as an action scheduler, or from an external source (the joystick 73 or the like) sent to the gait generator 100).

A desired body posture (representing hereinafter a desired body posture unless "reference" is added) is generated such that it follows or agrees with a reference body posture in a long term.

In walking, generally, a desired body posture may be always set to agree with a reference body posture as in the case of an embodiment disclosed in the description of PCT Kokai publication WO/02/40224. Although the PCT Kokai publication WO/02/40224 does not refer to the concept of the reference body posture, it explicitly and preferentially gives desired body posture patterns, which is equivalent to steady agreement of desired body postures with a reference body posture.

However, in a gait including a floating period, as in running, or walking on a low-friction floor surface, simply adjusting a body horizontal acceleration or the like is not enough to satisfy a dynamic balance condition while maintaining a floor reaction force horizontal component and a floor reaction force vertical component of a desired gait within a permissible range (or within a friction limit) at the same time.

In the present reference example, therefore, a desired body posture is deliberately deviated from a reference body posture, as necessary. To be more specific, motion modes explained below are generated in a combined manner so as to satisfy the dynamic balance condition while having a floor reaction force horizontal component and a floor reaction force moment vertical component of a desired gait falling within a permissible range (or within a friction limit).

Figure 8:
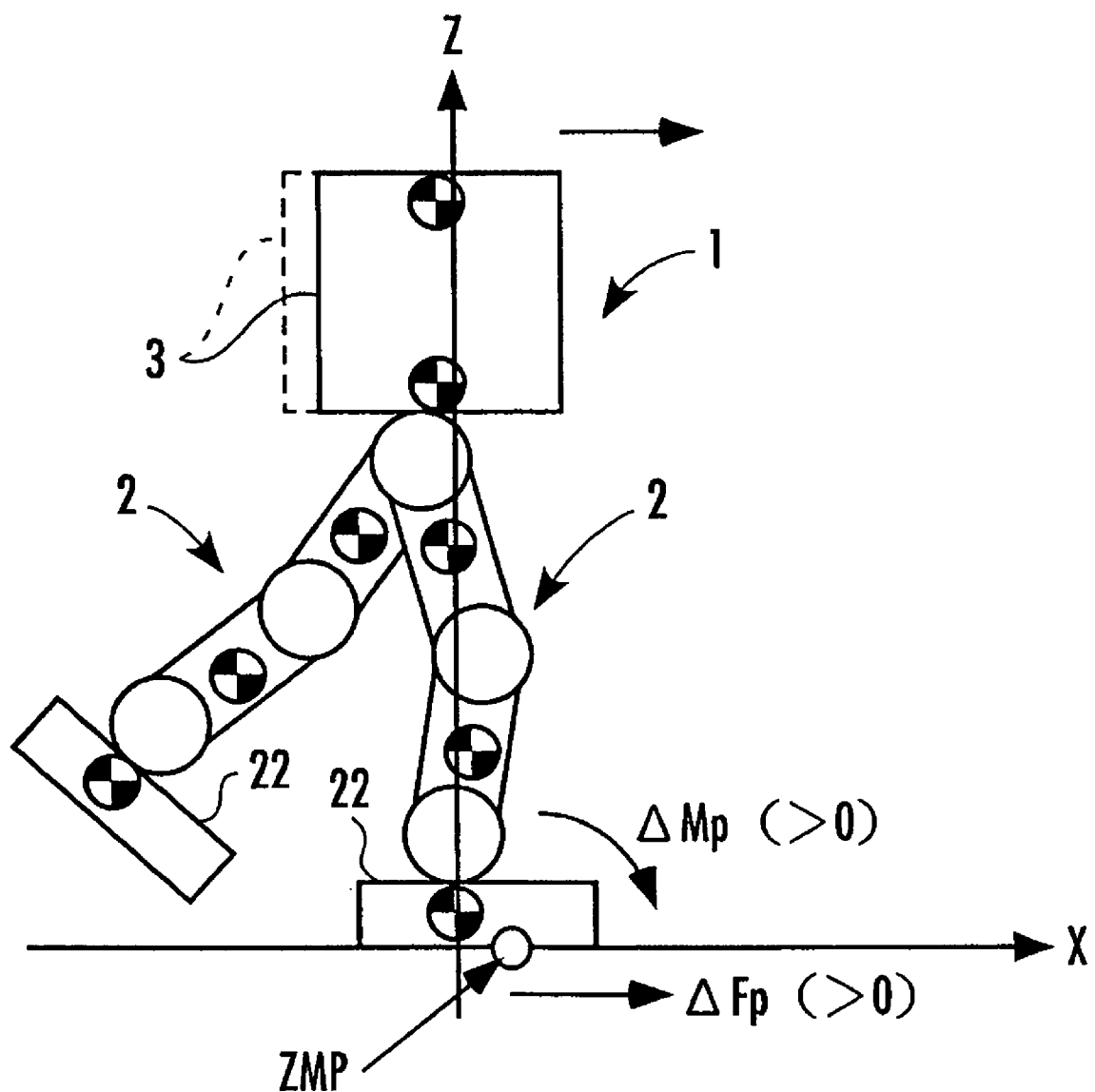
FIG. 8 is a diagram for explaining a body translational mode of a robot.

As shown in FIG. 8, when the robot 1 is in a certain motion state, if only a body horizontal acceleration is perturbated (slightly changed), a total center-of-gravity horizontal acceleration and an angular momentum about the total center-of-gravity of the robot 1 are perturbated. More specifically, perturbating the body horizontal acceleration perturbates the floor reaction force moment horizontal component about a desired ZMP (a component about the horizontal axis) and the floor reaction force horizontal component without perturbating the floor reaction force vertical component that dynamically balances with a resultant force of an inertial force and gravity of the robot 1 produced by the perturbation of the body horizontal acceleration (without perturbating a total center-of-gravity vertical acceleration of the robot 1). The motion mode that perturbs the body horizontal acceleration of the robot 1 as described above is referred to as a body translational mode.

In other words, a motion in which the floor reaction force moment horizontal component about the desired ZMP and the floor reaction force horizontal component are changed without changing the floor reaction force vertical component is referred to as the body translational mode. In the body translational mode, the floor reaction force moment vertical component (the component about the vertical axis) is also perturbated; however, no attention will be paid to this aspect in this case.

A change in the floor reaction force moment horizontal component per unit acceleration at this time is denoted by $\Delta Mp$ and a change in the floor reaction force horizontal component per unit acceleration is denoted by $\Delta Fp$. If the body 3 is horizontally accelerated forward in the situation illustrated in FIG. 8, then $\Delta Mp$ and $\Delta Fp$ act in the directions of the arrows shown in FIG. 8.

To facilitate perceptual understanding, the floor reaction force that balances with the resultant force of an inertial force and gravity generated by a motion has been used for expression. However, it is theoretically more accurate to express using the resultant force of an inertial force and gravity. The above resultant force and the floor reaction force have the same magnitude but opposite directions.

Figure 9:
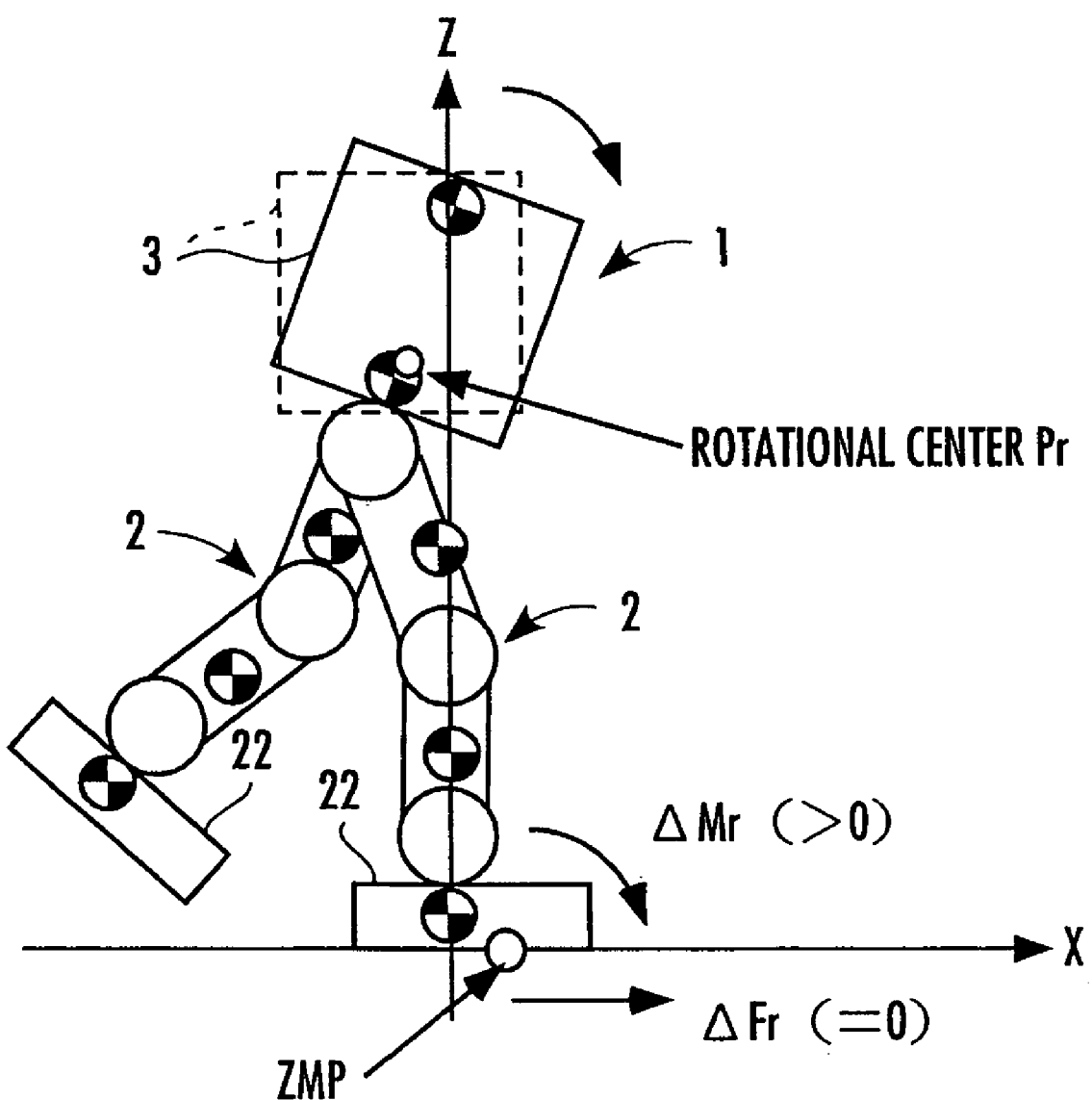
FIG. 9 is a diagram for explaining a body inclination mode of the robot.

In comparison with the above, if the body inclination angular acceleration (the angular acceleration of the inclination angle of the body 3) is perturbated about a certain point Pr from a certain motion state of the robot 1, as shown in FIG. 9, then the angular momentum (excluding the component about the vertical axis) about the total center-of-gravity is perturbated, while the total center-of-gravity of the robot 1 is not perturbated. This means that perturbating the body inclination angle acceleration about the point Pr perturbates the floor reaction force moment horizontal component about a desired ZMP without perturbating the floor reaction force vertical component and the floor reaction force horizontal component. The motion mode in which the body inclination angle acceleration of the robot 1 is perturbated as described above is referred to as the body inclination mode.

In other words, the motion in which the floor reaction force moment horizontal component about a desired ZMP is changed without changing a floor reaction force vertical component and a floor reaction force horizontal component is called the body inclination mode.

A change in the floor reaction force moment horizontal component per unit angular acceleration at this time is denoted by $\Delta Mr$ and a change in the floor reaction force horizontal component per unit angular acceleration is denoted by $\Delta Fr$. $\Delta Fr$ is zero. If an angular acceleration of a body inclination angle is generated to cause the body 3 to lean forward in the situation shown in FIG. 9, then $\Delta Mr$ acts in the direction of the arrow shown in FIG. 9.

Figure 10:
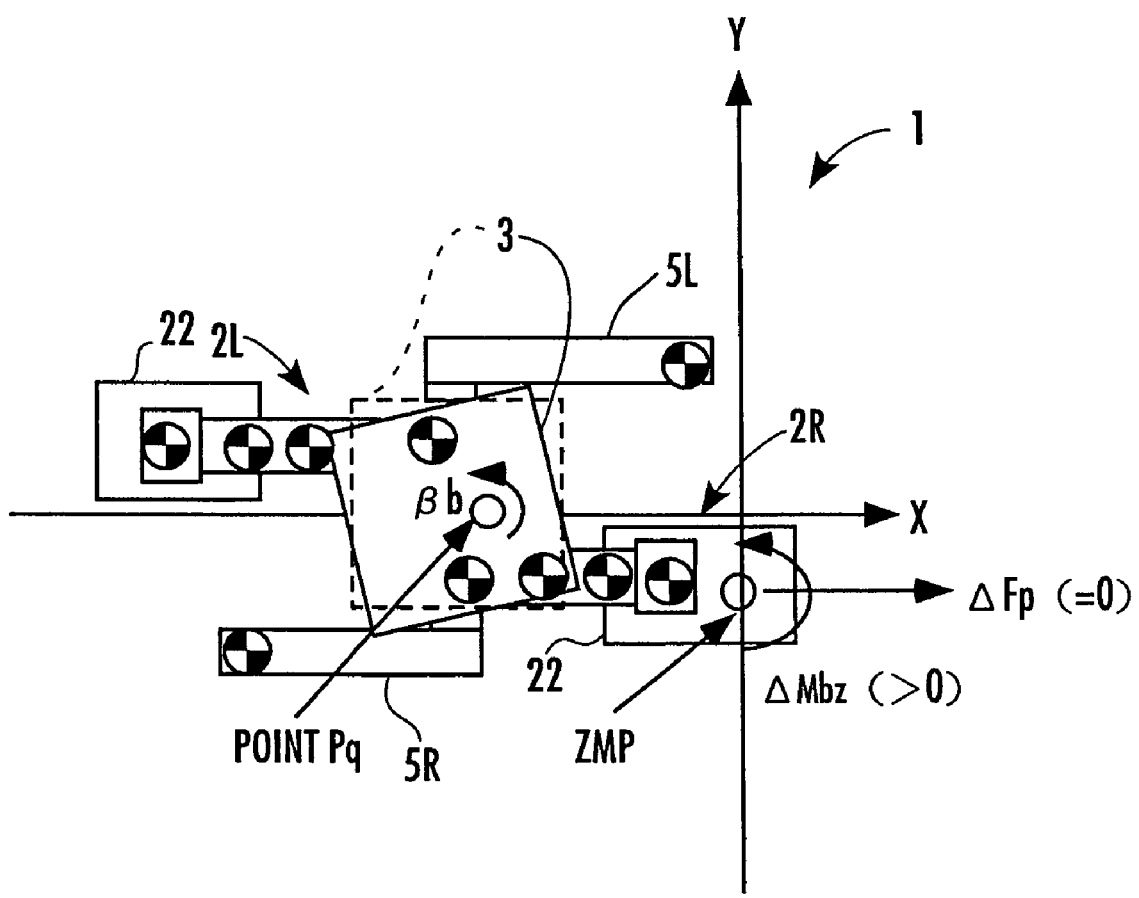
FIG. 10 is a diagram for explaining a body yaw rotation mode of the robot, FIG. 11($a$) is a diagram for explaining an antiphase arm swing mode of the robot in a plan view and FIG. 11($b$) is a diagram for explaining an antiphase arm swing mode of the robot in a side view.

Further, if a body yaw angle acceleration (the rotational angular acceleration about the vertical axis of the body 3) is perturbated about a certain point Pq from a certain motion state of the robot 1, as shown in FIG. 10, then the angular momentum vertical component about the total center-of-gravity is perturbated, while the total center-of-gravity of the robot 1 is not perturbated. Incidentally, if the total center-of-gravity of the robot 1 is not perturbated, then the perturbation of the angular momentum vertical component does not depend on a point of action. Hence, perturbating the body yaw angular acceleration about the point Pq perturbates the floor reaction force moment vertical component about a desired ZMP without perturbating the floor reaction force vertical component, the floor reaction force horizontal component, and the floor reaction force moment horizontal component. The motion mode in which the body yaw angular acceleration of the robot 1 is perturbated as described above is referred to as the body yaw rotation mode.

In other words, the body motion in which the floor reaction force moment vertical component about a desired ZMP is changed without changing a floor reaction force vertical component, a floor reaction force horizontal component, and a floor reaction force moment horizontal component is called the body yaw rotation mode.

A change in the floor reaction force moment vertical component per unit angular acceleration at this time is denoted by $\Delta Mbz$, and a change in the floor reaction force horizontal component per unit angular acceleration is denoted by $\Delta Fb$. $\Delta Fb$ is zero. If the body 3 is rotated in the direction of the arrow at the unit angular acceleration (rotated at an angular acceleration $\beta b=1$) in the situation shown in FIG. 10, then $\Delta Mbz$ acts in the direction of the arrow shown in FIG. 10.

In the motion shown in FIG. 10, the body 3 has been rotated so that the positions of the distal ends of both arms 5, 5 remain unchanged as observed from the supporting leg coordinate system (the coordinate system fixed to a floor). However, a motion in which an arm 5 is rotated together with the body 3 without changing the relative position/posture of the arm 5 in relation to the body 3 may be defined as the body yaw rotation mode. In this case, however, a motion equation to be discussed hereinafter has to be slightly changed.

Figure 11A:
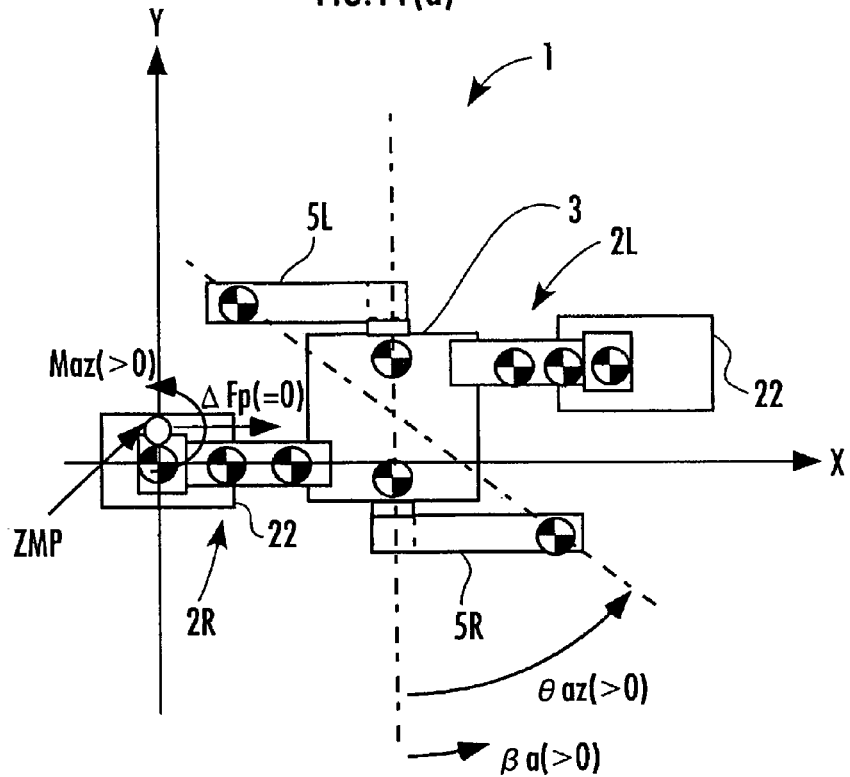
Figure 11B:
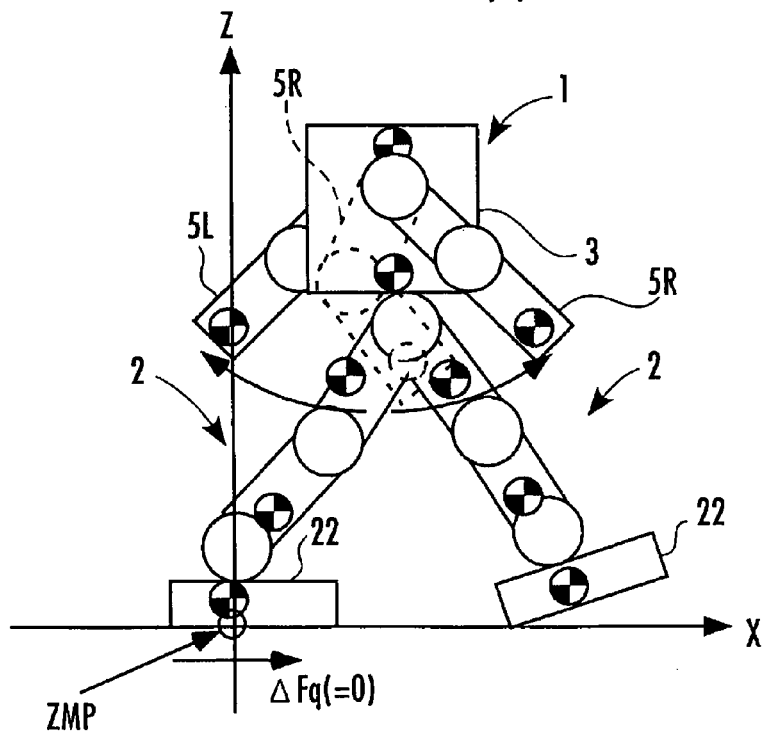

Further, if the distal ends of both arms 5, 5 are perturbated longitudinally in opposite directions from each other from a motion state of the robot 1, as illustrated in FIGS. 11 (a) and (b), then the angular momentum vertical component about the total center-of-gravity is perturbated, while the total center-of-gravity of the robot 1 is not perturbated. Hereinafter, this motion mode will be referred to as an antiphase arm swing mode. In other words, the arm swing motion mode in which the floor reaction force moment vertical component about a desired ZMP is perturbated without perturbating a floor reaction force vertical component, a floor reaction force horizontal component, and a floor reaction force moment horizontal component is referred to as the antiphase arm swing mode.

A motion in which a right arm 5R is moved forward by a unit amount and a left arm 5L is moved backward by a unit amount is referred to as an antiphase arm swing of a unit angle. FIGS. 11 (a) and (b) illustrate a state wherein an antiphase arm swing angle is θaz.

A change in the floor reaction force moment vertical component per unit angular acceleration in the antiphase arm swing mode is denoted by ΔMaz, and a change in the floor reaction force horizontal component per unit angular acceleration is denoted by ΔFa. ΔFa is zero. In the situation shown in FIGS. 11 (a) and (b), if the right arm 5R is accelerated forward, while the left arm 5L is accelerated backward (swinging at an angular acceleration βa>0), then a floor reaction force moment vertical component Maz acts in the direction of the arrow (a positive direction of the vertical axis) shown in FIG. 11 (a).

A description will now be given of a dynamic model of the robot 1 used in the present reference example. In the present, reference example, a simplified (approximated) dynamic model shown below is used. However, regarding the dynamic model shown below, a kinematics model (a model representing the structures and dimensions of joints and links, i.e., a model representing a relationship between joint displacements and the positions/postures of links) will be also necessary.

Figure 12:
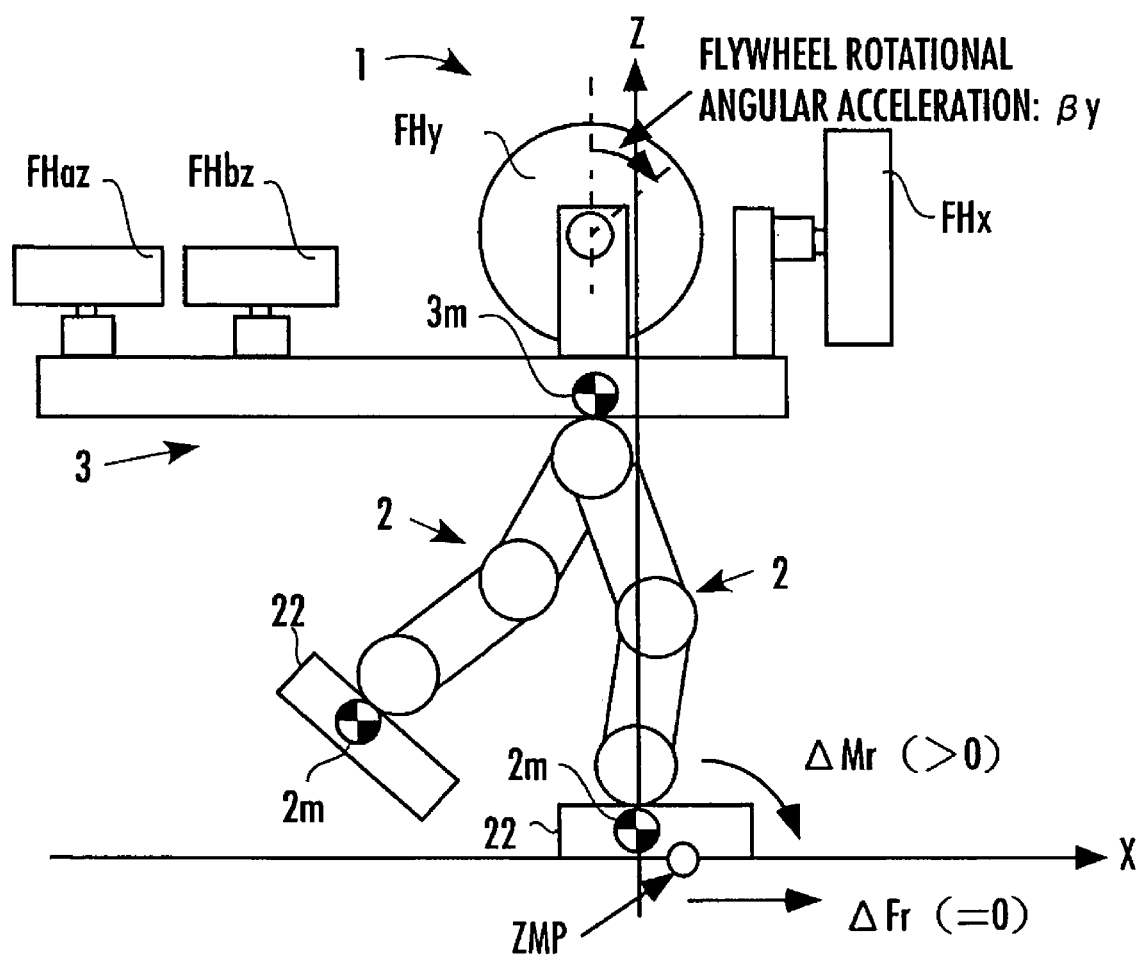
FIG. 12 is a diagram for explaining a dynamic model used in the embodiment.

FIG. 12 shows a dynamic model of the robot 1 used in the present reference example. As illustrated, the dynamic model is a model composed of a total of three mass points, namely, two mass points 2m, 2m corresponding to the legs 2 of the robot 1 and a mass point 3m corresponding to the body 3, and four flywheels FHx, FHy, FHbz, and FHaz having inertias but no mass. The flywheels FHx, FHy, FHbz, and FHaz can be rotated about an X-axis (longitudinal axis), a Y-axis (lateral axis), a Z-axis (vertical axis), and a Z-axis (vertical axis), respectively. This dynamic model is decoupled, that is, the dynamic model is constructed such that the dynamics (the dynamics of the mass points 2m, 2m) of the legs 2, 2, the dynamics of the body 3 (the dynamics of the mass point 3m and the flywheels FHx, FHy and FHbz), and the dynamics of the arms 5, 5 (the dynamics of the flywheel FHaz) do not interfere with each other, and the dynamics of the entire robot 1 is represented by their linear connection. In addition, a relationship between a motion of the body 3 and a floor reaction force is separated into a relationship between a translational motion of the body 3 (body translation mode) and a floor reaction force, a relationship between an inclination motion of the body 3 (body inclination mode) and a floor reaction force, a relationship between a yaw rotational motion of the body 3 (body yaw rotation mode) and a floor reaction force, and a relationship between an antiphase arm swing motion of both arms 5, 5 (antiphase arm swing mode) and a floor reaction force. To be more specific, a floor reaction force generated by a horizontal motion of the body mass point 3m corresponds to a floor reaction force generated by a horizontal translational motion of the body 3 (body translation mode), and a floor reaction force generated by a rotational motion of the flywheels FHx and FHy corresponds to a floor reaction force generated by a rotational motion of an inclination angle of the body 3 (body inclination mode). The rotational motion of the flywheel FHx corresponds to the rotational motion of an inclination angle of the body 3 in the roll direction (about the X-axis), and the rotational motion of the flywheel FHy corresponds to the rotational motion of an inclination angle of the body 3 in the pitch direction (about the y-axis). A floor reaction force generated by the rotational motion of the flywheel FHbz corresponds to a floor reaction force generated by a yaw rotational motion of the body 3 (the body yaw rotation mode). A floor reaction force generated by the rotational motion of the flywheel FHaz corresponds to a floor reaction force generated by an antiphase arm swing motion (the antiphase arm swing mode).

The mass of the arms of the robot 1 is assumed to be included in the body 3, and the body mass point 3m has a mass that includes the mass of the arms 5, 5.

For the convenience of explanation, variables and parameters related to the dynamic model will be defined as follows. Each of the mass points 2m, 2m and 3m corresponds to a representative point of a part with which it is associated or a point uniquely decided geometrically from the position/posture of the part. For instance, the position of the mass point 2m of a supporting leg 2 is defined as the point above the aforesaid representative point of the sole of the foot 22 of the leg 2 by a predetermined distance.

Zsup: Supporting leg mass point vertical position
Zswg: Free leg mass point vertical position
Zb: Body mass point vertical position (usually different from a vertical body position)
ZGtotal: Overall gravitational center vertical position
Xsup: Supporting leg mass point X position
Ysup: Supporting leg mass point Y position
Xswg: Free leg mass point X position
Yswg: Free leg mass point Y position
Xb: Body mass point X position (The body mass point position is the position offset by a predetermined distance in the longitudinal direction of the body from the aforesaid point Pr. The offset is determined such that the gravitational center position of an exact model and the gravitational center position of the present dynamic model agree with each other as much as possible in an upright stance or the like. This is usually different from a horizontal body position.)
Yb: Body mass point Y position
XGtotal: Overall gravitational center horizontal X position
YGtotal: Overall gravitational center horizontal Y position
θbx: Body inclination angle about X-axis relative to vertical direction
θby: Body inclination angle about Y-axis relative to vertical direction
θbz: Body yaw rotational angle
θaz: Antiphase arm swing angle
mb: Body mass point mass
msup: Supporting leg mass point mass
mswg: Free leg mass point mass
mtotal: Total mass of robot (=mtotal+msup+mswg)
J: Body inertial moment (Equivalent inertial moment in the body inclination mode. In other words, this is an inertial moment of FHx and FHy. Usually, it does not agree with the inertial moment of the body 3 part of the actual robot 1.)
Jbz: Body inertial moment about a vertical axis (Equivalent inertial moment in the body yaw rotation mode. Usually, this does not agree with the inertial moment of the body 3 part of the actual robot 1.)
Jaz: Arm swing inertial moment about a vertical axis (Equivalent inertial moment in antiphase arm swing to cancel a spin. In other words, it is an inertial moment of FHz.)
Fx: Floor reaction force X component (More specifically, a longitudinal (X-axis) component of a translational floor reaction force)
Fy: Floor reaction force Y component (More specifically, a lateral (Y-axis) component of a translational floor reaction force)
Fz: Floor reaction force vertical component (More specifically, a vertical (Z-axis) component of a translational floor reaction force. This is equivalent to a desired translational floor reaction force vertical component in the present reference example.)

Mx: X component of a floor reaction force moment about a desired ZMP (More specifically, a component about a longitudinal axis (X-axis) of a floor reaction force moment)

My: Y component of a floor reaction force moment about a desired ZMP (More specifically, a component about a lateral axis (Y-axis) of a floor reaction force moment)

Mz: Z component of a floor reaction force moment about a desired ZMP (More specifically, a component about a vertical axis (Z-axis) of a floor reaction force moment)

An X position and a Y position of each of the mass points $2m$ and $3m$ mean a position in the longitudinal direction (X-axis direction) and a position in the lateral direction (Y-axis direction), respectively. In the present reference example, a positional relationship between a position of the mass point $2m$ of each leg 2 and a position of the foot 22 of the leg 2 (a position of a predetermined representative point of the foot 22) is determined in advance, so that one of the positions is decided, then the other position is uniquely decided. Further, a positional relationship between the body mass point $3m$ and the position of the body 3 (a position of a predetermined representative point of the body 3) is determined in advance on the basis of a posture angle of the body 3 (hereinafter, regarding the body, a posture angle will mean an inclination angle and a yaw angle), and if a position and a posture angle of one of them are determined, then a position of the other is uniquely determined.

For an arbitrary variable X, dX/dt denotes first order differentiation of X, and d2X/dt2 denotes second order differentiation. Therefore, if the variable X denotes displacement, then dX/dt means velocity and d2X/dt2 means acceleration. g denotes a gravity acceleration constant. Here, g takes a positive value.

A notional equation of the above dynamic model (an equation expressing a dynamic balance condition) is represented by equation 01, equation 02x, equation 02y, equation 03x, equation 03y, and equation 03z.

$Fz=mb*(g+d2Zb/dt2)+msup*(g+d2Zsup/dt2)+mswg*(g+d2Zswg/dt2)$  Equation 01

$Fx=mb*d2Xb/dt2+msup*d2Xsup/dt2+mswg*d2Xswg/dt2$  Equation 02x $Fy=mb*d2Yb/dt2+msup*d2Ysup/dt2+mswg*d2Yswg/dt2$  Equation 02y $Mx=mb*(Yb-Yzmp)*(g+d2Zbidt2)-mb*(Zb-Zzmp)*(d2Yb/dt2)+msup*(Ysup-Yzmp)*(g+d2Zsup/dt2)-msup*(Zsup-Zzmp)*(d2Ysup/dt2)+mswg*(Yswg-Yzmp)*(g+d2Zswg/dt2)-mswg*(Zswg-Zzmp)*(d2Yswg/dt2)+J*d2\theta bx/dt2$  Equation 03x $My=-mb*(Xb-Xzmp)*(g+d2Zb/dt2)+mb*(Zb-Zzmp)*(d2Xb/dt2)-msup*(Xsup-Xzmp)*(g+d2Zsup/dt2)+msup*(Zsup-Zzmp)*(d2Xsup/dt2)-mswg*(Xswg-Xzmp)*(g+d2Zswg/dt2)+mswg*(Zswg-Zzmp)*(d2Xswg/dt2)+J*d2\theta by/dt2$  Equation 03y $Mz=mb*(Xb-Xzmp)*(d2Yb/dt2)-mb*(Yb-Yzmp)*(d2Xb/dt2)+msup*(Xsup-Xzmp)*(d2Ysup/dt2)-msup*(Ysup-Yzmp)*(d2Xsup/dt2)+mswg*(Xswg-Xzmp)*(d2Yswg/dt2)-mswg*(Yswg-Yzmp)*(d2Xswg/dt2)+Jbz*d2\theta bz/dt2+Jaz*d2\theta az/dt2$  Equation 03z Furthermore, for a total center-of-gravity position of the robot, the following relational expressions hold:

$ZGtotal=(mb*Zb+msup*Zsup+mswg*Zswg)/mtotal$  Equation 04

$XGtotal=(mb*Xb+msup*Xsup+mswg*Xswg)/mtotal$  Equation 05x $YGtotal=(mb*Yb+msup*Ysup+mswg*Yswg)/mtotal$  Equation 05y The following will show a relationship between the above dynamic model and the above $\Delta Fp$, $\Delta Mp$, $\Delta Fr$, and $\Delta Mr$.

The above $\Delta Fp$ is a perturbation amount of Fx or Fy when d2Xb/dt2 or d2Yb/dt2 is perturbed by a unit amount in equation 02x or equation 02y, so that it is determined according to the following equation:

$\Delta Fp=mb$  Equation 06

More specifically, the change $\Delta Fp$ of a floor reaction force horizontal component per unit acceleration in the direction of each horizontal axis (X-axis, Y-axis) in the body translation mode corresponds to the mass of the body mass point $3m$ of the dynamic model.

The above $\Delta Mp$ is a perturbation amount of My or Mx when d2Xb/dt2 or d2Yb/dt2 is perturbed by a unit amount in equation 03y or equation 03x, so that it is determined according to the following equation:

$\Delta Mp=mb*(Zb-Zzmp)$.  Equation 07

More specifically, the change $\Delta Mp$ of a floor reaction force moment horizontal component per unit acceleration in the direction of each horizontal axis (X-axis, Y-axis) in the body translation mode is obtained by multiplying a body mass point mass of the dynamic model by a height (vertical position) of the body mass point $3m$ from a desired ZMP. The relationship between the positions of the body mass point $3m$ and the desired ZMP and the motion of the body mass point $3m$ corresponds to the behavior of an inverted pendulum obtained when the body mass point $3m$ is associated with an inverted pendulum mass point and when the desired ZMP is associated with an inverted pendulum supporting point. To be more accurate, $\Delta Mp$ in the Y-axis direction is obtained by reversing the sign of the right side of equation 07.

The above $\Delta Fr$ is a perturbation amount of Fx or Fy when d2$\theta$by/dt2 is perturbed by a unit amount in equation 02x or equation 02y, so that it is determined according to the following equation:

$\Delta Fr=0$  Equation 08

This means that the change $\Delta Fr$ of a floor reaction force horizontal component per unit acceleration in the direction of each horizontal axis (X-axis, Y-axis) in the body inclination mode is zero.

The above $\Delta Mr$ is a perturbation amount of Mx or My when d2$\theta$bx/dt2 or d2$\theta$by/dt2 is perturbed by a unit amount in equation 03x or equation 03y, so that it is determined according to the following equation:

$\Delta Mr=J$  Equation 09

More specifically, the change $\Delta Mr$ of a floor reaction force moment horizontal component per unit acceleration in the direction of each horizontal axis (X-axis, Y-axis) in the body inclination mode corresponds to the inertial moments of horizontal axis flywheels (FHx and FHy).

The above $\Delta Mbz$ is a perturbation amount of Mz when d2$\theta$bz/dt2 is perturbed by a unit amount in equation 03z, so that it is determined according to the following equation:

$\Delta Mbz=Jbz$  Equation 09b

More specifically, the change $\Delta Mbz$ of a floor reaction force moment component per unit acceleration in the body yaw rotation mode corresponds to the inertial moment of a flywheel FHbz corresponding to body yaw rotation.

The above $\Delta Maz$ is a perturbation amount of Mz when d2$\theta$az/dt2 is perturbed by a unit amount in equation 03z, so that it is determined according to the following equation:

$\Delta Maz=Jaz$  Equation 09a

More specifically, the change ΔMaz of a floor reaction force moment component per unit angular acceleration of an antiphase arm swing corresponds to the inertial moment of a flywheel FHaz corresponding to an arm swing.

The gait generator 100 in the present reference example generates a desired gait for one step in order, the desired gait (the desired gait in the narrow sense described above) for one step from the moment one leg 2 of the robot 1 lands to the moment the other leg 2 lands. Hence, for the running gait shown in FIG. 5 to be generated in the present reference example, a desired gait from the beginning of a single stance period to the end of the following floating period (the beginning of the next single stance period) is generated in sequence. Here, a desired gait that is being newly generated will be referred to as a "current time gait," the next desired gait will be referred to as a "next gait," and a desired gait after next will be referred to as a "next but one time gait." Furthermore, a desired gait generated one step before the "current time gait" will be referred to as a "last time's gait."

When the gait generator 100 newly generates a current time gait, expected positions/postures of landing of the foot 2; of a free leg and required values (requests) of expected landing time for the next two steps of the robot 1 are input as required parameters to the gait generator 100 (or the gait generator 100 reads the required parameters from a memory). Then, the gait generator 100 uses these required parameters to generate a desired body position/posture trajectory, a desired foot position/posture trajectory, a desired ZMP trajectory, a desired floor reaction force vertical component trajectory, a desired arm posture trajectory, etc. At this time, some of the gait parameters specifying these trajectories are corrected, as necessary, to secure continuity of walking.

Figure 13:
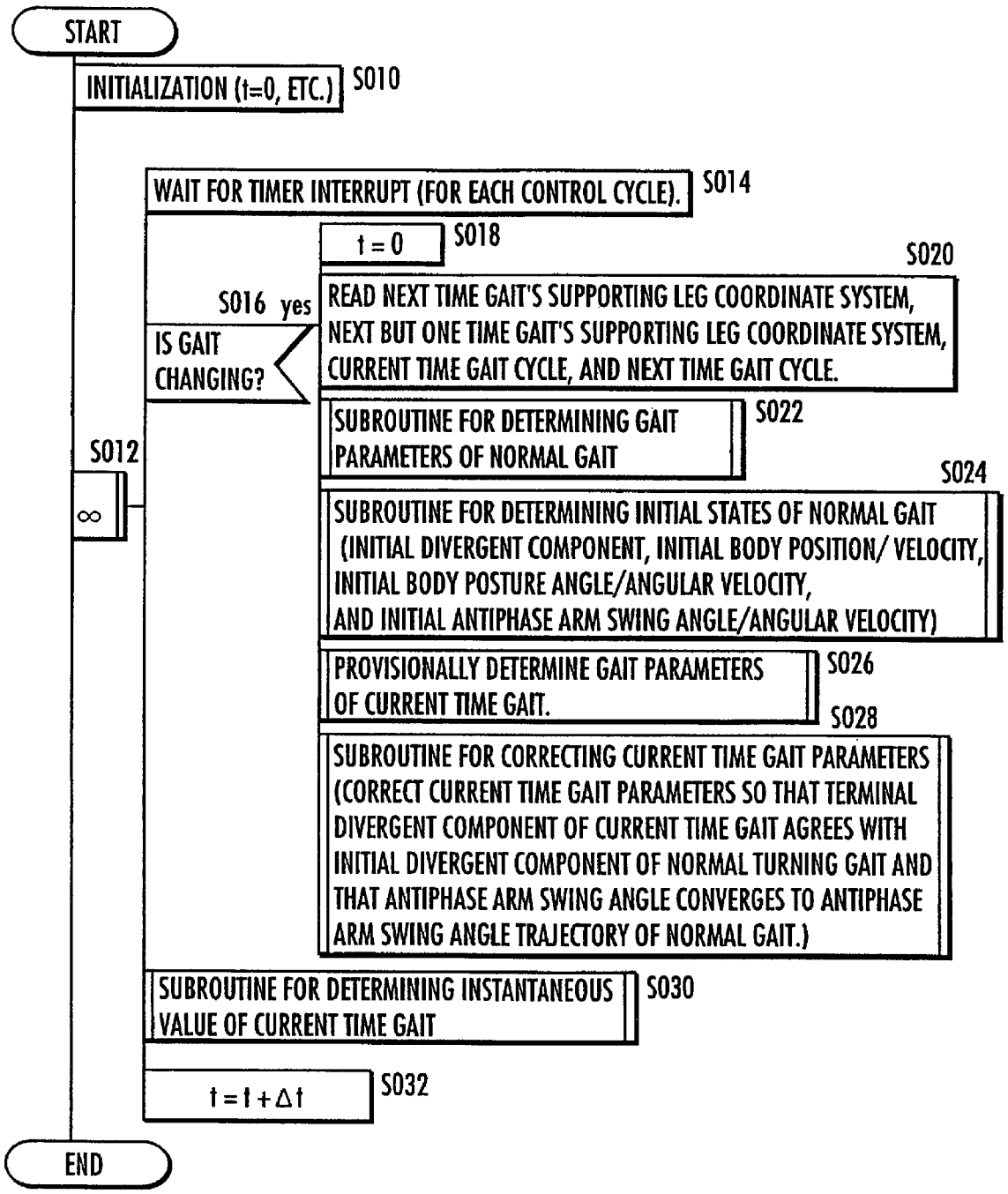
FIG. 13 is a flowchart showing a main routine processing of a gait generator in the reference example.

Taking the generation of the running gait shown in FIG. 5 as an example, gait generation processing of the gait generator 100 in the present reference example will be explained in detail with reference to FIG. 13 to FIG. 46. FIG. 13 is a flowchart (structured flowchart) illustrating a main routine of the gait generation processing carried out by the gait generator 100.

First, various initializing operations, including initialization of time t to zero, are performed in S010. This processing is implemented primarily when starting up the gait generator 100. Next, the processing proceeds to S014 via S012 and waits for a timer interrupt for each control cycle (the calculation processing cycle of the flowchart shown in FIG. 13). The control cycle is denoted by Δt.

Then, the processing proceeds to S016 and determines whether a shift in a gait is taking place. If a shift in the gait is taking place, then the processing proceeds to S018, or if a shift in a gait is not taking place, then it proceeds to S030. Here, "the shift in a gait" means a timing at which the generation of the last time's gait has been completed and the generation of the current time gait is about to start. For instance, a control cycle following the control cycle in which the generation of a last time's gait has been completed refers to the shift in a gait.

When proceeding to S018, time t is initialized to zero. The gait generator 100 then proceeds to S020 and reads a next time's gait supporting leg coordinate system, a next but one time's gait supporting leg coordinate system, a current time gait cycle, and a next time gait cycle. These supporting leg coordinate systems and the gait cycles are determined by the above required parameters. More specifically, in the present reference example, the required parameters supplied to the gait generator 100 from the joystick 73 or the like include required values of expected landing positions/postures (foot positions/postures in a state wherein the foot 22 has been rotated without slippage such that its sole is substantially in full contact with a floor surface after landing) and expected landing time of the foot 22 of a free leg for up to two steps ahead. The required value for the first step and the required value for the second step are supplied to the gait generator 100 as the values associated with a current time gait and a next gait, respectively, before the generation of the current time gait is begun (the shift in a gait in S016 mentioned above). These required values can be changed in the middle of generating the current time gait.

Then, the next time's gait supporting leg coordinate system is determined on the basis of the required value of the expected landing position/posture of the free leg foot 22 of the first step (the free leg foot 22 in the current time gait) in the above required parameters.

Figure 16:
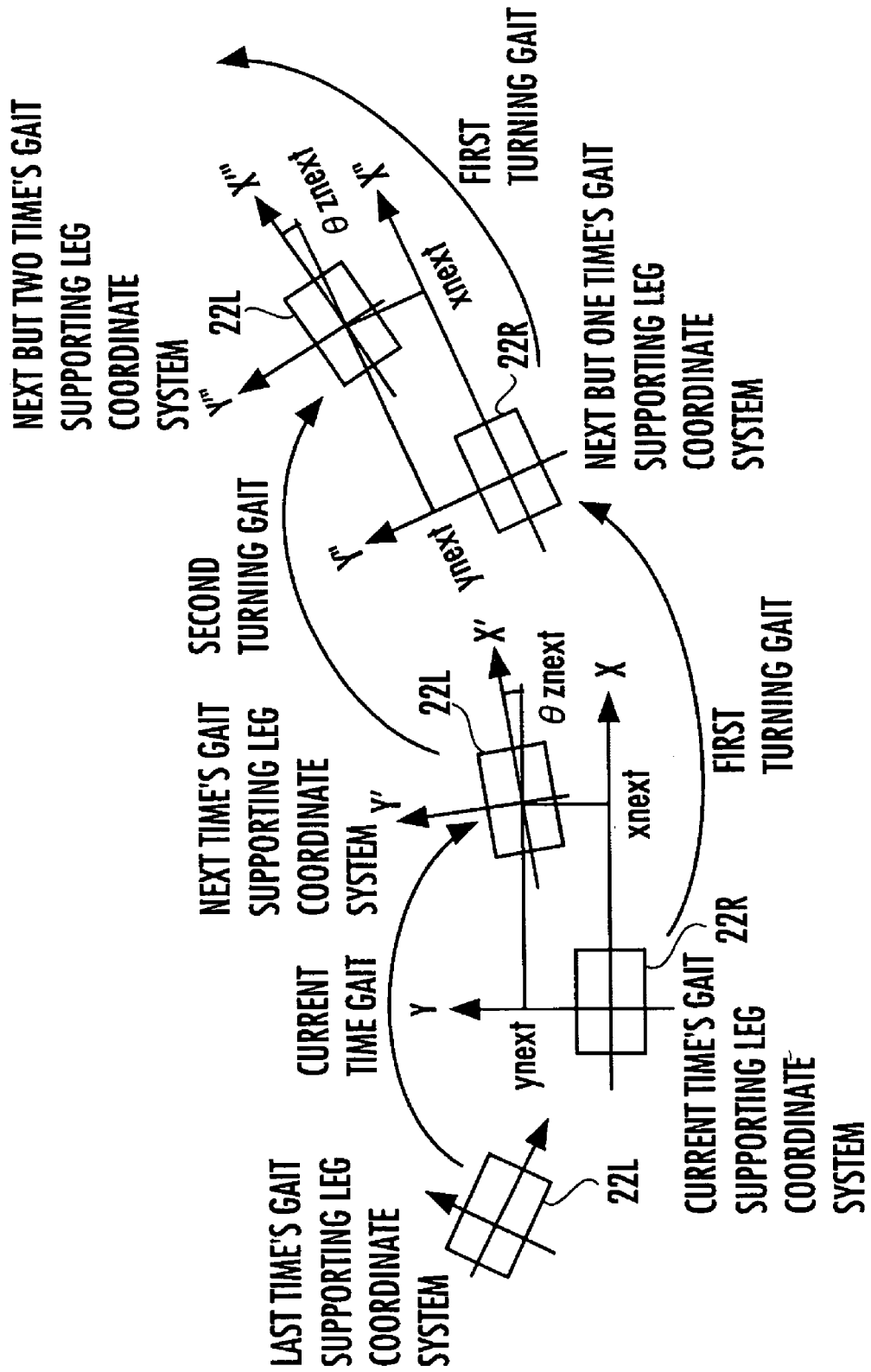
FIG. 16 is a diagram for explaining a normal gait and a supporting leg coordinate system.

Referring to, for example, FIG. 16, it is assumed that the required value for an expected landing position/posture of the free leg foot 22 (22L in the figure) related to the current time gait (first step) specifies a position/posture obtained by moving by xnext and ynext in the X-axis direction (in the longitudinal direction of a supporting leg foot 22R of the current time gait) and in the Y-axis direction (in the lateral direction of the supporting leg foot 22R of the current time gait), respectively, of a current time's gait supporting leg coordinate system, and by rotating about the Z-axis (about the vertical axis) by θznext with respect to a landing position/posture of the supporting leg foot 22 (22R in the figure) of the current time gait. Here, the supporting leg coordinate system is a global coordinate system (a coordinate system fixed to a floor) in which a point, at which a perpendicular line extended onto a floor surface from the center of the ankle of a supporting leg foot 2 intersects with the floor surface (this point agreeing with a representative point of the foot 22 in a state, wherein substantially the entire surface of the sole of the supporting leg foot 22 is in contact with the floor surface in the present reference example), in a state wherein the supporting leg foot 22 is set in a horizontal posture (more generally, a posture parallel to the floor surface) and substantially the entire surface of the sole of the supporting leg foot 22 is in contact (in close contact) with the floor surface, is defined as an origin thereof, and a horizontal plane passing the origin is defined as an XY plane. In this case, the X-axis direction and the Y-axis direction correspond to the longitudinal direction and the lateral direction, respectively, of the supporting leg foot 22. The origin of the supporting leg coordinate system does not have to agree with the representative point of the foot 22 (a point representing the position of the foot 22) in the state wherein substantially the entire surface of the sole of the supporting leg foot 22 is in contact with the floor surface. Alternatively, the origin may be set at a point on the floor surface that is different from the representative point.

At this time, the next time's gait supporting leg coordinate system is a coordinate system that takes, as its origin, the representative point (more specifically, a point on a floor that agrees with the representative point) of the foot 22L in a case where the foot 22 is landed according to a required value of the expected landing position/posture of the free leg foot 22L of the current time gait as illustrated (in a case where the representative point of the foot 22 is made to agree with the required value of an expected landing position and the posture (orientation) of the foot 22 is made to agree with the required value of an expected landing posture), the longitudinal direction and the lateral direction of the foot 22L in the horizontal plane passing the origin corresponding to an X'-axis direction and Y'-axis direction, respectively.

In the same manner described above, a next but one time's gait supporting leg coordinate system (refer to the X" Y"

coordinates shown in FIG. 16) is determined on the basis of the required values for the expected landing position/posture of the free leg foot 22 of the second step. A current time gait cycle is determined as the duration from the expected landing time (required value) of the supporting leg foot 22 of the current time gait to the expected landing time (required value) of the free leg foot 22 of the first step (current time gait). The next time gait cycle is determined as the duration from the expected landing time (required value) of the free leg foot 22 of the first step to the expected landing time (required value) of the free leg foot 22 of the second step.

The required parameters are input to the gait generator 100 by necessary manipulation of the joystick 73 in the present reference example. Alternatively, however, the required parameters or the positions/postures and gait cycles of the aforesaid supporting leg coordinate systems associated with the required parameters may be stored in advance as a travel schedule of the robot 1. Alternatively, the aforesaid next time and the next but one time's gait supporting leg coordinate systems and the current time and the next time gait cycles may be determined on the basis of commands (requests) from a control device, such as the joystick 73, and a travel history of the robot 1 up to that moment.

Subsequently, the processing proceeds to S022 and determines gait parameters of a normal turning gait as a virtual cyclic gait that follows the current time gait. The gait parameters include a foot trajectory parameter defining a desired foot position/posture trajectory, a reference body posture trajectory parameter defining a body posture trajectory to be based on, a reference arm posture trajectory parameter defining an arm posture trajectory to be based on, a ZMP trajectory parameter defining a desired ZMP trajectory, and a floor reaction force vertical component trajectory parameter defining a desired floor reaction force vertical component trajectory in the normal turning gait. Furthermore, parameters that define a floor reaction force horizontal component permissible range and a floor reaction force moment vertical component permissible range are also included in gait parameters.

In the present description, "the normal turning gait" is used to mean a cyclic gait that does not cause discontinuity in motional states (states of foot position/posture, body position/posture, etc.) of the robot 1 in a boundary of gait when the gait is repeated (the boundary of a gait for each step in the present reference example). Hereinafter, "the normal turning gait" may be abbreviated as "the normal gait."

According to the present reference example, the normal turning gait, which is a cyclic gait, may be defined as follows. A gait for two steps of the robot 1, i.e., a gait composed of a first turning gait following a current time gait and a second turning gait following the first turning gait, as the gait for one cycle. The normal turning gait consists of a repetition of the gait for one cycle. The term "turning" is used here, because it would mean straight advancement when the turning rate is set to zero, and straight advancement can be also included in turning in a broad sense. If a desired gait to be generated is the running gait shown in FIG. 5, then a current time gait of the desired gait is a running gait that has a single stance period and a floating period. Hence, the first turning gait and the second turning gait of the normal turning gait are both gaits that also have a single stance period and a floating period, as in the current time gait. In other words, a basic gait form of the first turning gait and the second turning gait is the same as the current time gait.

Supplemental explanation of the normal turning gait will be added. In a bipedal mobile robot, the normal turning gait for one cycle requires the gaits in the aforesaid narrow sense for at least two steps. It is further possible to set a complicated normal turning gait using a gait for three steps or more as the gait for one cycle. The normal turning gait, however, is used only to determine a divergent component (to be discussed in detail hereinafter) at the end (finish time) of the current time gait. For this reason, using the normal turning gait composed of a gait for three or more steps for one cycle will provide low effect despite the complicated processing for generating the gait. Therefore, the gait for one cycle in the normal turning gait in the present reference example is composed of a gait for two steps (the first and the second turning gaits). For a legged mobile robot having three or more feet, the number of gaits for defining the normal turning gait will increase accordingly. In the following description, for the convenience of explanation, the normal turning gait composed of a plurality of gaits in the narrow sense (the gait for two steps in the present reference example) will be regarded as the gait for one step.

A normal turning gait is prepared, by the gait generator 100, for provisional use to determine motional states of the robot 1, including a divergent component at the end of a current time gait or a vertical body position velocity, a body posture angle, and an angular velocity thereof, and it is not directly output from the gait generator 100.

Figure 14:
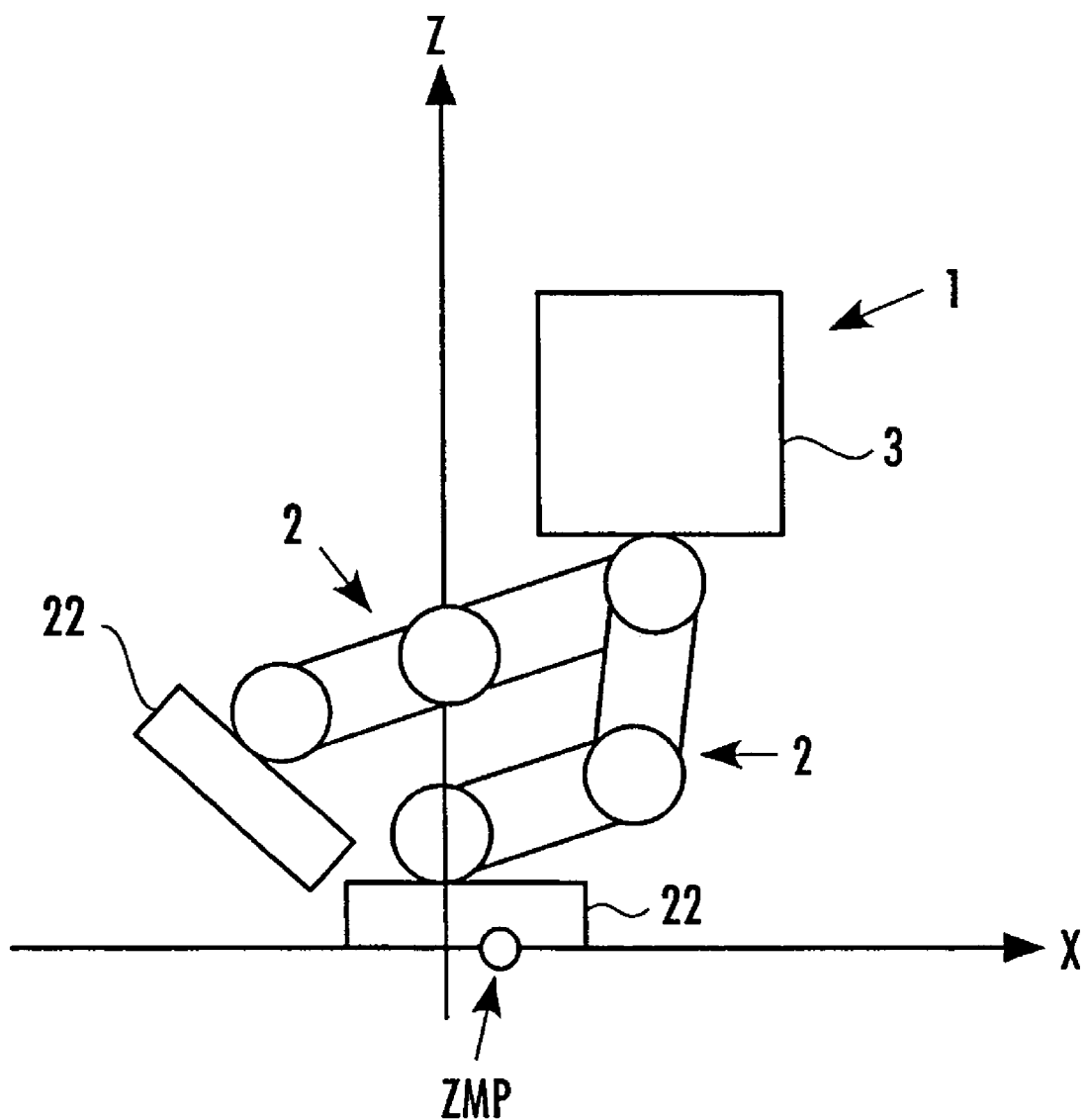
FIG. 14 is a diagram for explaining a diversion state of the robot.

The term "divergent" means that the position of the body 3 of the bipedal mobile robot 1 is undesirably shifted to a position away from the positions of both feet 22 and 22, as shown in FIG. 14. The value of a divergent component is a numeral value indicating how far the position of the body 3 of the bipedal mobile robot 1 is away from the positions of both feet 22 and 22 (to be more specific, the origin of a global coordinate system (a supporting leg coordinate system) set on the surface with which a supporting leg foot 22 is in contact).

In the present reference example, gaits are generated using a divergent component as an indicator so that a desired gait can be continuously generated without causing the divergence. However, even if it is an initial divergent component (divergent component at initial time of the normal turning gait) of the normal gait, which is a typical example of a continuous gait (a cyclic gait that permits repetition of a gait of the same pattern without causing discontinuity of a gait trajectory, and that does not theoretically diverge after an infinite number of repetitions), the initial divergent component is not simply zero. The initial divergent component changes if a parameter of a normal gait changes. In other words, a proper divergent component changes according to a gait form, such as the manner of walking or the manner of running, or the like. In the present reference example, therefore, a normal gait following a current time gait to be generated is set on the basis of required parameters involved in the current time gait, and the initial divergent component of the normal gait is determined, and then a current time gait is generated such that the divergent component at the end of the current time gait agrees with the initial divergent component of the normal gait (more generally, the current time gait is made to continue or approximate to the normal gait). The basic guideline for generating such gaits is the same as that disclosed in PCT Kokai publication WO/02/40224 previously proposed by the present applicant.

The reference example of the present invention does not use a linear dynamic model with three mass points used in the first embodiment of PCT Kokai publication WO/02/40224. Nevertheless, the concept of the divergent component and a convergent component defined by the equation given below can be applied with adequate approximate accuracy to a perturbation of a behavior of a nonlinear dynamic model such as the one shown in FIG. 12.

Divergent component=Body mass point horizontal position+Body mass point horizontal velocity/$\omega 0$     Equation 10

Convergent component=Body mass point horizontal position−Body mass point horizontal velocity/$\omega 0'$     Equation 11 where the body mass point horizontal position in this case indicates a body mass point horizontal position Xb in the dynamic model shown in FIG. 12.

ω0 and ω0' take predetermined values. The values of these ω0 and ω0' are substantially the same, although they do not exactly coincide. Further, the values for generating walking gaits in PCT Kokai publication WO/02/40224 must be slightly changed for running.

More details of the divergent component and the convergent component have been given in PCT Kokai publication WO/02/40224, so that no more description will be given here.

In the present reference example, in addition to the method disclosed in PCT Kokai publication WO/02/40224, a gait parameter defining a desired floor reaction force vertical component trajectory is set, and a total center-of-gravity vertical position of the robot 1 is determined so as to dynamically satisfy the desired floor reaction force vertical component, as will be discussed hereinafter. In this case, a second order integrated value of the floor reaction force vertical component will define the total center-of-gravity vertical position of the robot 1. Hence, if the desired floor reaction force vertical component is improperly set, then the total center-of-gravity vertical position or the vertical body position of the robot 1 will be too high or too low. Therefore, the method for setting a desired floor reaction force vertical component is also an important issue. However, the relationship between a floor reaction force vertical component and a vertical body position is similar to the relationship between ZMP and a horizontal body position, so that a part of a technique for determining a desired ZMP for setting a proper horizontal body position velocity can be applied to a technique for determining a desired floor reaction force vertical component for setting a proper vertical body position velocity simply by slightly changing a part thereof, as shown in the following present reference example.

Returning to the main subject, in S022, the processing below is carried out according to the flowchart shown in FIG. 15.

First, in S100, a foot trajectory parameter among the gait parameters of a normal gait is determined to provide a foot position/posture trajectory composed of a current time gait, a first turning gait, and a second turning gait in succession in this order. The following will explain a specific setting method with reference to FIG. 16. In the following explanation, the foot 22 of a supporting leg 2 will be referred to as the supporting leg foot and the foot 22 of a free leg 2 will be referred to as the free leg foot. Further, "start" and "end" will mean start time and end time of a gait or instantaneous gaits at the start time and the end time.

The foot trajectory parameter is constructed primarily of the positions/postures of the supporting leg foot and the free leg foot, respectively, at the start and the end, respectively, of a first turning gait and a second turning gait, and a gait cycle of each turning gait. In the foot trajectory parameter, the free leg foot position/posture at the start of the first turning gait is defined as the supporting leg foot position/posture at the end of a current time gait observed from a next time's gait supporting leg coordinate system. In this case, the supporting leg foot 22 at the end of the current time gait is moving in the air in a running gait. And the supporting leg foot position/posture at the end of the current time gait is determined by generating a required value of an expected landing position/posture of the free leg foot 22 of a second step in the required parameter (a required value of an expected landing position/posture in a next time gait of the supporting leg foot 22 of the current time gait) or a foot position/posture trajectory for reaching a free leg position/posture at the end of the next time gait determined on the basis of a next but one time's gait supporting leg coordinate system that corresponds to the above required value (more specifically, the trajectory observed from a next time's gait supporting leg coordinate system) from the supporting leg foot position/posture at the start of the current time gait (=the free leg foot position/posture at the end of the last time's gait) by using the finite-duration setting filter until the end of the current time gait.

The free leg foot position/posture at the end of the next time gait is determined such that the position/posture of the foot obtained when the foot 22 is turned from that position/posture by a predetermined angle in the pitch direction until it reaches a horizontal posture by lowering its tiptoe while holding the foot 22 in contact with the ground agrees with the position/posture in the next but one time's gait supporting leg coordinate system. In other words, the free leg foot position/posture at the end of the next time gait is the position/posture of the foot 22 in a state wherein the foot 22 has been turned, from a required value of the landing position/posture of the free leg foot 22 of the second step in the required parameter, by a predetermined angle in the pitch direction by lifting its tiptoe while holding the foot 22 in contact with the ground so that it does not slip (a state wherein the heel has been landed with the tiptoe lifted).

Further, the supporting leg foot position/posture at the start of the first turning gait is defined as the free leg foot position/posture at the end of the current time gait observed from the next time's gait supporting leg coordinate system. In this case, the free leg foot position/posture at the end of the current time gait is determined on the basis of the above next time's gait supporting leg coordinate system or a required value of an expected landing position/posture of the free leg of the first step (the current time gait) of the required parameter corresponding thereto, as in the case of the free leg foot position/posture at the end of the next time gait. In other words, the free leg foot position/posture at the end of the current time gait is determined such that a representative point of the foot obtained when substantially entire surface of the sole of the foot 22 is brought into contact with a floor surface by turning the foot 22 from the position/posture so as to lower its tiptoe while holding the foot 22 in contact with the ground agrees with the origin of the next time's gait supporting leg coordinate system.

The free leg foot position/posture at the end of the first turning gait is determined on the basis of a position/posture on the next but one time's gait supporting leg coordinate system observed from the next time's gait supporting leg coordinate system, as in the case of the technique for determining the free leg foot position/posture at the end of the current time gait or the free leg foot position/posture at the end of the next time gait. To be more specific, the free leg foot position/posture at the end of the first turning gait is determined such that the position/posture of the foot obtained when the foot 22 is turned from that position/posture by a predetermined angle until it reaches a horizontal posture while avoiding a slippage and while holding the foot 22 in contact with the ground agrees with the position/posture in the next but one time's gait supporting leg coordinate system as observed from the next time's gait supporting leg coordinate system.

At the end of the first turning gait, the supporting leg foot 22 is in the air, being off the floor. To determine the trajectory after the supporting leg foot 22 leaves the floor, an expected landing position/posture of the supporting leg foot of the first turning gait is set. The expected landing position/posture of the supporting leg foot of the first turning gait is set on the basis of a position/posture on a next but two time's gait supporting leg coordinate system observed from the next time's gait supporting leg coordinate system. To be more specific, the expected landing position/posture of the supporting leg foot of the first turning gait is the position/posture on the next but two time's gait supporting leg coordinate system observed from the next time's gait supporting leg coordinate system. The next but two time's gait supporting leg coordinate system is set such that the relative position/posture relationship between the next but one time's gait supporting leg coordinate system and the next but two time's gait supporting leg coordinate system agrees with the relative position/posture relationship between the current time's gait supporting leg coordinate system and the next time's gait supporting leg coordinate system.

The supporting leg foot position/posture at the end of the first turning gait is determined by generating a foot position/posture trajectory for reaching the expected landing position/posture of the supporting leg foot of the first turning gait from the supporting leg foot position/posture at the start of the first turning gait (more specifically, the trajectory observed from a next time's gait supporting leg coordinate system) by using the finite-duration setting filter until the end of the first turning gait, as in the case where the supporting leg foot position/posture at the start of the first turning gait is determined.

The free leg foot position/posture at the start of the second turning gait is regarded as the supporting leg foot position/posture at the end of the first turning gait observed from the next but one time's gait supporting leg coordinate system. The supporting leg foot position/posture at the start of the second turning gait is regarded as the free leg foot position/posture at the end of the first turning gait observed from the next but one time's gait supporting leg coordinate system.

The free leg foot position/posture at the end of the second turning gait is regarded as the free leg foot position/posture at the end of the current time gait observed from the current time's gait supporting leg coordinate system. The supporting leg foot position/posture at the end of the second turning gait is regarded as the supporting leg foot position/posture at the end of the current time gait observed from the current time's gait supporting leg coordinate system.

The gait cycles of the first turning gait and the second turning gait are set to be identical to a next time gait cycle. These gait cycles of the first turning gait and the second turning gait do not have to be the same with each other; however, both cycles are preferably determined on the basis of at least a next time gait cycle. Motion parameters (including a time parameter, such as double stance period duration) of the current time gait, the first turning gait, and the second turning gait other than the above described motion parameters are determined, as necessary, to satisfy gait conditions (such as an actuator velocity falling within a permissible range, a movable angle being not exceeded, and no interference with a floor) on the basis of the parameters determined above.

Next, the processing proceeds to S102 and determines a reference body posture trajectory parameter that defines the reference body posture trajectory to be followed by a desired body posture. The reference body posture does not have to be constant as long as it is set to ensure connection at the start (the start of the first turning gait) and the end (the end of the second turning gait) of a normal gait (to ensure that the posture angle of the reference body posture and the angular velocity thereof at the start of a normal gait agrees with those at the end of the normal gait). In the present reference example, however, for the purpose of easy understanding, a posture related to an inclination angle (an inclination angle relative to the vertical direction) in the reference body posture is set to an upright posture (vertical posture). This means that, in the present reference example, the reference body posture related to an inclination angle of the body 3 is set to the upright posture in all periods of the normal gait Accordingly, in the present reference example, the angular velocity and angular acceleration of an inclination angle of the reference body posture is zero. A yaw angle trajectory (hereinafter referred to also as a reference yaw angle trajectory) θbz of the reference body posture may be, for example, a motion at a constant angular velocity (an average turning velocity of a normal gait), or may take a sinusoidal wave shape, as in the example (FIG. 18) of a reference antiphase arm swing trajectory, which will be discussed hereinafter. However, the yaw angle trajectory is to be set such that a reference yaw angle and its angular velocity are in succession when the normal gait is repeated.

In the present reference example, the yaw angle trajectory (hereinafter referred to also as a desired yaw angle trajectory) of a desired body posture is set to agree with a reference yaw angle trajectory.

Figure 17:
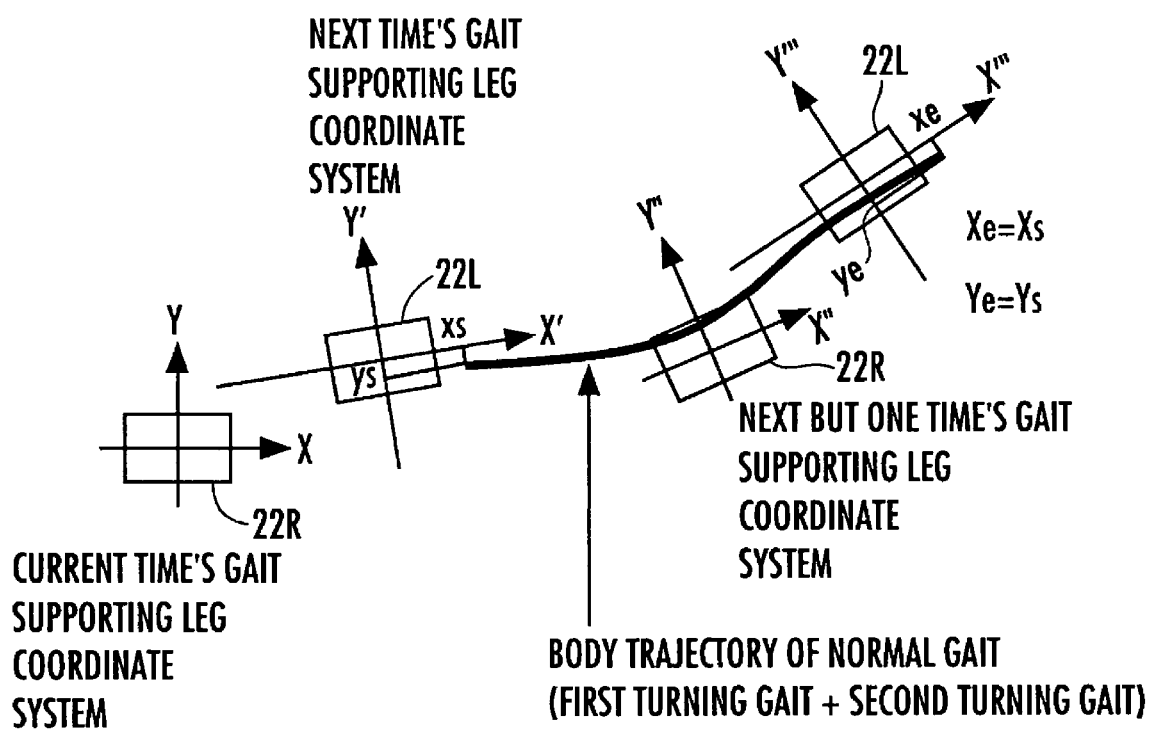
FIG. 17 is a diagram illustrating a body trajectory of the normal gait and the supporting leg coordinate system.
Figure 18:
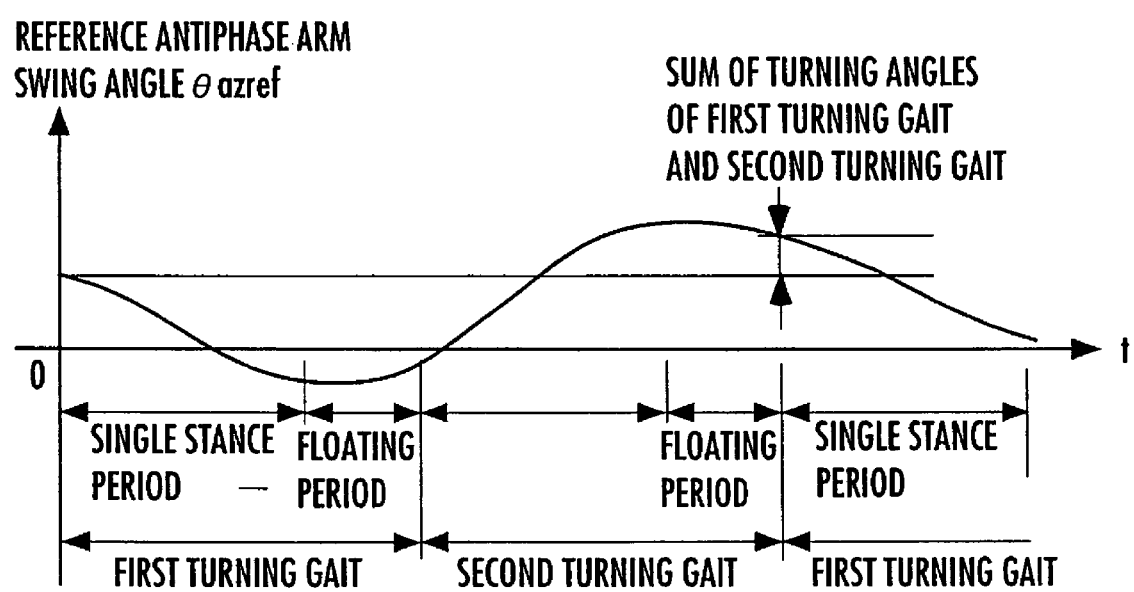
FIG. 18 is a graph showing an example of a reference antiphase arm swing angle.

Subsequently, the processing proceeds to S104 to determine reference arm posture trajectory parameters. To be more specific, parameters related to a total center-of-gravity position of both arms 5, 5 (a relative center-of-gravity position with respect to the body 3), a lateral interval between right and left hands (the distal ends of both arms 5, 5), and an antiphase arm swing angle are determined. For turning, for example, to the left as shown in FIG. 17, the reference antiphase arm swing angle may be set as shown in FIG. 18. As illustrated in FIG. 18, a reference antiphase arm swing angle θazref is set such that, when a normal gait is repeated, an antiphase arm swing angle and an angular velocity will be both continuous at a boundary of gaits (the boundary between the end of a second turning gait and the next first turning gait) and the relative relationship between the supporting leg at the start of the first turning gait and an antiphase arm swing angle agrees with the relative relationship between the supporting leg at the start of the next first turning gait and an antiphase arm swing angle. In other words, the antiphase arm swing angular velocity at the start of the first turning gait and the antiphase arm swing angular velocity at the end of the second turning gait agree with each other, and the antiphase arm swing angle at the end of the second turning gait is set to a value obtained by adding the antiphase arm swing angle at the start of the first turning gait to the turning angle of the normal gait (the sum of the turning angles of the first turning gait and the second turning gait). In FIG. 18, the reference antiphase arm swing angle θazref has the sinusoidal waveform; however, it may alternatively be set to a constant angular velocity, or it may take an average value of a supporting leg yaw angle and a free leg yaw angle.

In the present reference example, the total center-of-gravity position of both arms 5, 5 of the desired arm posture (the relative position with respective to the body 3) is set to be maintained constant with respect to the body 3.

Next, the processing proceeds to S106 and sets a floor reaction force vertical component trajectory parameter. In this case, the floor reaction force vertical component trajectory parameter is set such that the floor reaction force vertical component trajectory defined by the parameter is virtually continuous (values do not jump in steps), as shown in FIG. 6, in both the first turning gait and the second turning gait. In other words, a desired floor reaction force vertical component trajectory of the normal turning gait is set to have the pattern shown in FIG. 19. According to the pattern, for both the first turning gait and the second turning gait, the floor reaction force vertical component exhibits a trapezoidal change in a single stance period, and the floor reaction force vertical component is maintained at zero in a floating period. The time of break points of the pattern and the height of a trapezoid (peak value) are set as the floor reaction force vertical component trajectory parameters.

When setting the floor reaction force vertical component trajectory parameters, an average value throughout a gait period of the floor reaction force vertical component (the period equivalent to the sum of the periods of the first turning gait and the second turning gait, or the period equivalent to one cycle of a normal gait) is made to agree with the self weight of the robot 1. This means that the average value of the floor reaction force vertical component is set so that it provides the same magnitude as that of the gravity acting on the robot 1 but in an opposite direction.

Setting the floor reaction force vertical component trajectory as described above is necessary to satisfy a normal gait condition. The normal gait conditions is such that a beginning state (a beginning state of a first turning gait) of any state variables (a position, a posture, a velocity or the like of each part of the robot 1) of a gait observed from a supporting leg coordinate system (a coordinate system set on a plane with which the supporting leg foot 22 is in contact) and a terminal state (a terminal state of a second turning gait) of a gait observed from the next supporting leg coordinate system (the supporting leg coordinate system of the next first turning gait) agree with each other (hereinafter, this condition may be referred to as a boundary condition of a normal gait). Therefore, the difference between a total center-of-gravity vertical velocity of the robot 1 at the end of the normal gait and a total center-of-gravity vertical velocity at the start of the normal gait (more specifically, the difference between the total center-of-gravity vertical velocity at the end of a second turning gait and the total center-of-gravity vertical velocity at the start of the first turning gait) must be also zero. The difference is an integrated value of the difference between the floor reaction force vertical component and gravity (first order integrated value); therefore, the floor reaction force vertical component trajectory must be set as described above in order to set the difference to zero.

In the present reference example, the average value of the floor reaction force vertical component in the period of each of the first turning gait and the second turning gait has been made to agree with the self weight of the robot 1. More specifically, based on, for example, the gait cycle of the first turning gait and the second turning gait, the time of the break points of the trapezoidal portions of the floor reaction force vertical component trajectory in each turning gait has been set, and then the heights of the trapezoidal portions have been determined such that the average value of the floor reaction force vertical component in the period of each of the first turning gait and the second turning gait agrees with the self weight of the robot 1 (the heights of the trapezoids are determined by solving an equation representing the condition under which the average value and the self weight coincide, taking the heights of the trapezoids as unknown numbers).

Thus, the difference between the total center-of-gravity vertical velocity at the end of the first turning gait and the total center-of-gravity vertical velocity at the start of the first turning gait will be zero, and the difference between the total center-of-gravity vertical velocity at the end of the second turning gait and the total center-of-gravity vertical velocity at the start of the second turning gait will be also zero. This, however, is not a must. If, for instance, a vertical body position becomes excessively high or low at about a boundary of the first turning gait and the second turning gait, leading to a likelihood of an unreasonable posture, then the heights or the like of trapezoids of the floor reaction force vertical component trajectory of each turning gait may be corrected in the state in which the average value and the self weight agree in each turning gait.

Figure 19:
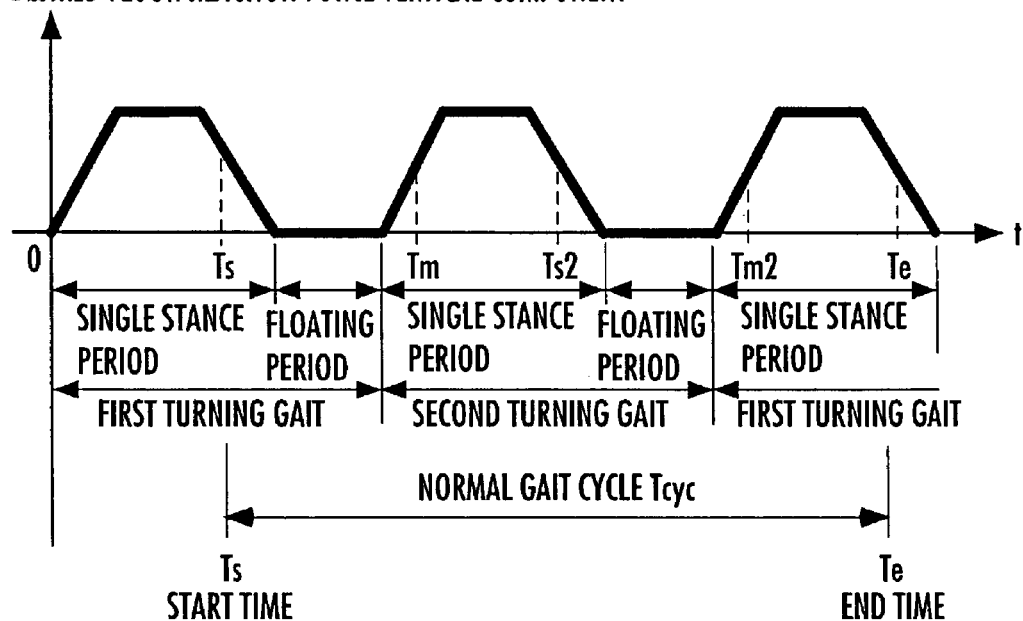
FIG. 19 is a graph showing a setting example of a desired floor reaction force vertical component trajectory in a normal gait.
Figure 20:
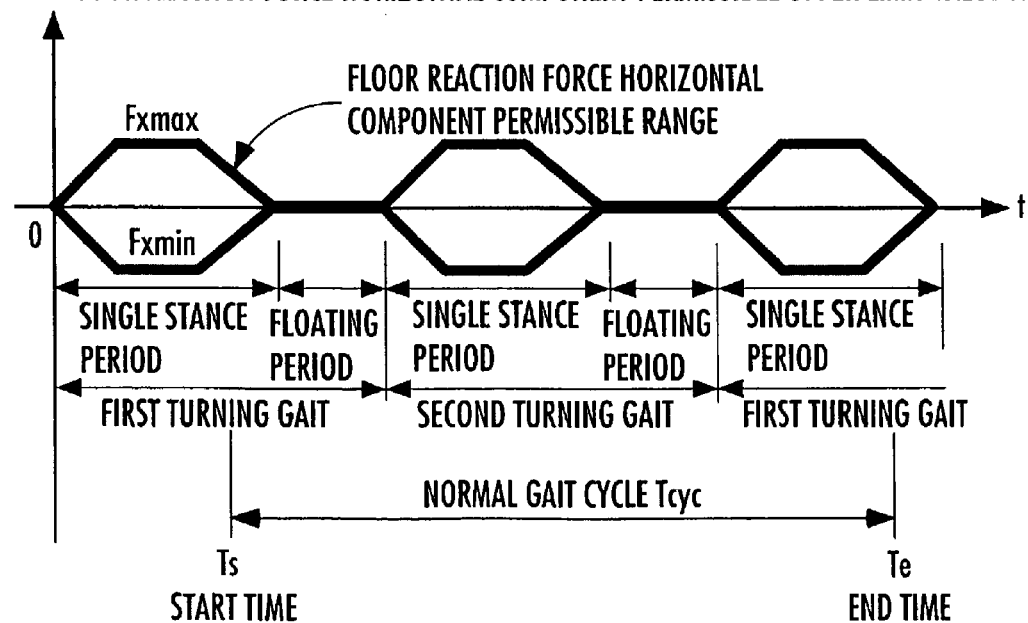
FIG. 20 is a graph showing a setting example of a floor reaction force horizontal component permissible range in a normal gait.

Next, the processing proceeds to S108 to set a permissible range of a floor reaction force horizontal component [Fxmin, Fxmax] (more specifically, a parameter defining it), as shown in FIG. 20, on the basis of the floor reaction force vertical component trajectory set as shown in FIG. 19, as described above. The polygonal line on the negative side in FIG. 20 indicates the permissible lower limit value Fxmin of the floor reaction force horizontal component, while the polygonal line on the positive side indicates the permissible upper limit value Fxmax of the floor reaction force horizontal component. A supplemental description will be given of a method for setting them. The following will explain a case where a floor surface is horizontal.

The floor reaction force horizontal component is generated from friction between a floor and a foot 22. The friction cannot be generated limitlessly; it has a limit. Hence, the floor reaction force horizontal component of a desired gait has to be always within a friction limit in order to prevent the robot 1 from slipping when the actual robot 1 moves according to a generated desired gait. To meet this condition, a permissible range of the floor reaction force horizontal component will be set, and a desired gait will be generated such that the floor reaction force horizontal component of the desired gait falls within the permissible range, as it will be discussed hereinafter.

When the coefficient of friction between the floor and the foot 22 is denoted by $\mu$, Fxmin must be always set to be not less than $-\mu$*floor reaction force vertical component, and Fxmax must be set to be not more than $\mu$*floor reaction force vertical component. A simplest setting method is to set according to the following expression, in which ka is a positive constant that is smaller than 1.

$$F\text{xmin}=-ka*\mu*\text{Floor reaction force vertical component}$$

$$F\text{xmax}=ka*\mu*\text{Floor reaction force vertical component} \quad \text{Equation 12}$$

The permissible range of the floor reaction force horizontal component shown in FIG. 20 is an example set according to Equation 12. The values and time at the break points of the trapezoidal waveforms or the like in FIG. 20 may be set as the parameters for defining the permissible range of the floor reaction force horizontal component. Alternatively, however, if the permissible range of the floor reaction force horizontal component is determined according to Equation 12, then the value of (ka*$\mu$) in Equation 12 may be simply set as a parameter.

As long as the above condition (the condition in that the floor reaction force horizontal component of a desired gait always falls within a frictional limit) is satisfied, a different setting method may be used to set the permissible range of the floor reaction force horizontal component.

Figure 21:
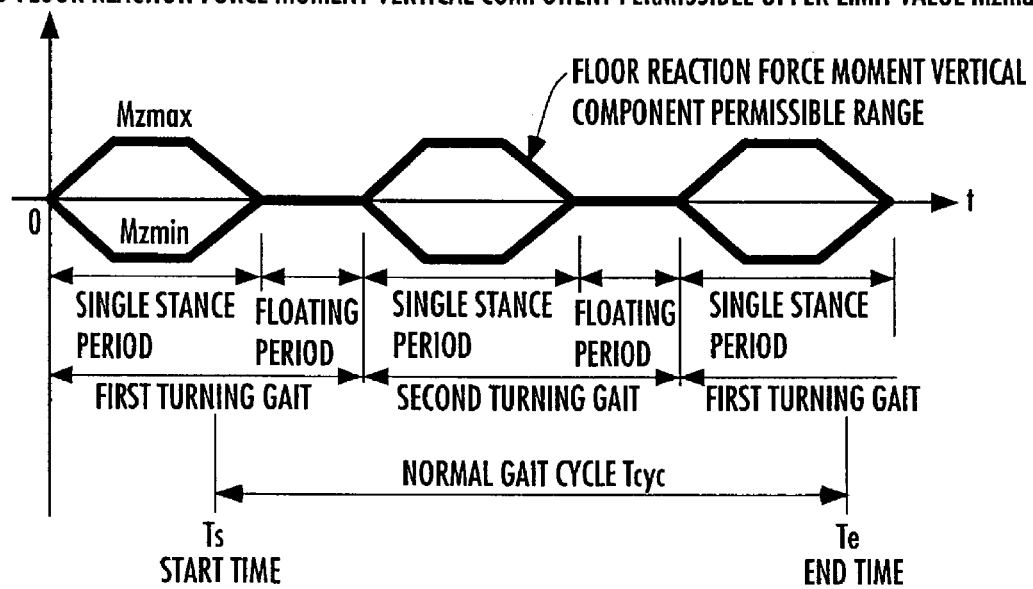
FIG. 21 is a graph showing a setting example of a floor reaction force moment vertical component permissible range in the normal gait.

The gait generator 100 then proceeds to S109 and sets the permissible range of a floor reaction force moment vertical component [Mzmin, Mzmax] (more specifically, a parameter defining it), as shown in FIG. 21, on the basis of the floor reaction force vertical component trajectory or the like set as shown in FIG. 19, as described above.

The polygonal line on the negative side in FIG. 21 indicates the permissible lower limit value Mzmin of the floor reaction force moment vertical component, while the polygonal line on the positive side indicates the permissible upper limit value Mzmax of the floor reaction force moment vertical component. A supplemental description will be given of a method for setting them. The following will explain a case where a floor surface is horizontal.

The floor reaction force moment vertical component is generated from friction between a floor and a foot 22. The friction cannot be generated limitlessly; it has a limit. Hence, the floor reaction force moment vertical component of a desired gait has to be always within a friction limit in order to prevent the robot 1 from slipping when the actual robot 1 moves according to a generated desired gait. To meet this condition, a permissible range of the floor reaction force moment vertical component will be set, and a desired gait will be generated such that the floor reaction force moment vertical component of the desired gait falls within the permissible range, as it will be discussed hereinafter.

If the coefficient of friction between the floor and the foot 22 is denoted by μ, and an effective radius of the surface of contact between the floor and the foot 22 to generate a moment vertical component (or a square root of a sectional secondary moment about a desired ZMP of the surface of contact between the floor and the foot 22) is denote by r, then Mzmin must be always set to be not less than −μ*r*floor reaction force vertical component, and Mzmax must be set to be not more than μ*r*floor reaction force vertical component. A simplest setting method is to set according to the following expression, in which ka is a positive constant that is smaller than 1.

$Mz\text{min} = -ka*\mu*r*$Floor reaction force vertical component $Mz\text{max} = ka*\mu*r*$Floor reaction force vertical component    Equation 1012

The permissible range of the floor reaction force moment vertical component shown in FIG. 21 is an example set according to Equation 1012. The values and time at the break points of the trapezoidal waveforms or the like in FIG. 21 may be set as the parameters for defining the permissible range of the floor reaction force moment vertical component. Alternatively, however, if the permissible range of the floor reaction force moment vertical component is determined according to Equation 1012, then the value of (ka*μ) in Equation 1012 may be simply set as a parameter. r is desirably calculated from a desired ZMP and a contact surface at each instant; alternately, however, r may be a constant.

As long as the above condition (the condition in that the floor reaction force moment vertical component of a desired gait always falls within a frictional limit) is satisfied, a different setting method may be used to set the permissible range of the floor reaction force moment vertical component.

Further alternatively, a permissible range may be set by combining a floor reaction force horizontal component and a floor reaction force vertical component moment rather than independently setting the permissible range of a floor reaction force horizontal component and the permissible range of a floor reaction force moment vertical component. This is because the permissible range of a floor reaction force moment vertical component becomes narrower as a floor reaction force horizontal component increases, while the permissible range of the floor reaction force horizontal component becomes narrower as the floor reaction force moment vertical component increases.

Next, the processing proceeds to S110 and sets ZMP trajectory parameters defining the ZMP trajectory of the normal gait that combines the first turning gait and the second turning gait. In this case, a desired ZMP trajectory is set so as to exhibit a high stability margin and no sudden changes, as described above.

Figure 22:
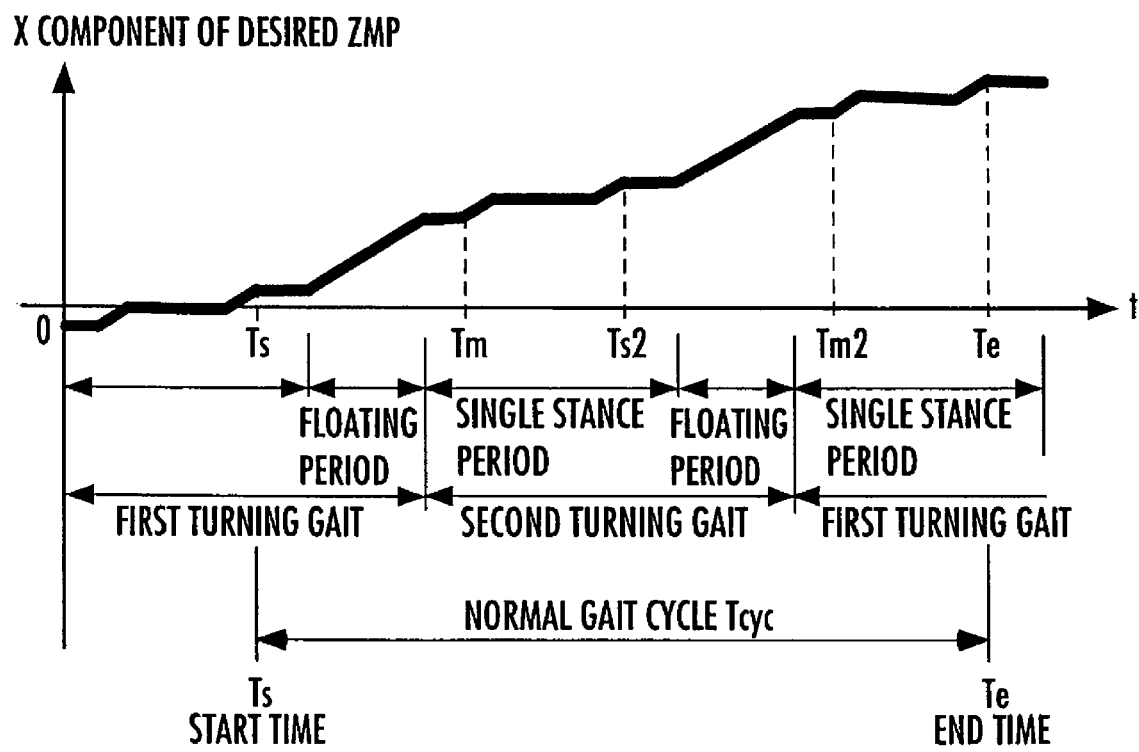
FIG. 22 is a graph showing a setting example of the desired ZMP trajectory in the normal gait.

To be more specific, according to the running gait shown in FIG. 5, a few moments after the heel of the supporting leg foot 22 lands, substantially the entire surface of the sole of the supporting leg foot 22 comes in contact with the ground, and then, following a few moments, only the tiptoe of the supporting leg foot 22 comes in contact with the ground. Thereafter, the robot 1 kicks the ground with the tiptoe of the supporting leg foot 22 to jump into the air. Lastly, the robot 1 lands at the heel of the free leg foot 22. The desired ZMP has to be in a ground contact surface. In the present reference example, therefore, the position of the desired ZMP in the X-axis direction for the first turning gait and the second turning gait of the normal gait is set so that it takes the heel of the supporting leg foot 22 as its initial position and stays at this position until substantially the entire sole of the foot 22 comes in contact with the ground, as illustrated in the upper diagram of FIG. 7 described above. Subsequently, the desired ZMP is set to move to the center of the supporting leg foot 22, and then move to the tiptoe by the time the tiptoe of the foot 22 comes in contact with the ground and remain at the tiptoe of the supporting leg foot 22 until the foot 22 leaves the floor. Thereafter, the desired ZMP is set such that the desired ZMP continuously moves from the tiptoe of the supporting leg foot 22 to the landing position of the heel of the free leg foot 22 by the time the next free leg foot 22 lands, as previously described. Thus, the desired ZMP trajectory (the trajectory in the X-axis direction) of the normal gait composed of the first turning gait and the second turning gait will be as illustrated in FIG. 22. The time and positions of the break points of the desired ZMP trajectory are set as the ZMP trajectory parameters. In this case, the time of the break points is set on the basis of gait cycles of the first turning gait and the second turning gait determined based on the required parameters. The positions of the break points are set on the basis of the positions/postures on the next time's gait supporting leg coordinate system and the next but one time's gait supporting leg coordinate system or on the basis of the required values of the expected free leg foot landing positions/postures of the first step and the second step of the required parameters that define these coordinate systems. The position of the ZMP trajectory in the Y-axis direction is set in the same manner as that illustrated in the lower diagram of FIG. 7. More specifically, the trajectory of the positions of the desired ZMP in the Y-axis direction in the first turning gait is set according to the same pattern as that shown in the lower diagram of FIG. 7. The trajectory of the positions of the desired ZMP in the Y-axis direction in the second turning gait is set to have the same shape as that for the first turning gait and continues from the end of the trajectory.

Subsequently, the processing proceeds to S112 and redefines the start time, the end time, and duration of one step (one cycle) of the normal gait as follows.

A normal gait must be a gait in which state variables continuously connect at the start and the end thereof. To easily determine such a gait, in the present reference example, the start, the end, and the duration of one step of a normal gait are determined as illustrated in FIG. 19 for convenience sake, which is different from the definition of a gait in the narrow sense described above. Specifically, in the latter half of a single stance period of the first turning gait, the time at which the floor reaction force vertical component has reduced to a certain degree is set as start time Ts of the normal gait. The start time Ts is preferably set to the time of the moment at which the state wherein substantially the entire surface of the sole of the supporting leg foot 22 is in contact with the ground is switched to tiptoe contact with the ground or at the time immediately preceding it, as shown in FIG. 7 (the time when the period of the entire sole surface in contact with the ground ends or the time immediately preceding it, as shown in FIG. 7). A description will now be given of the relationship between the desired ZMP and time Ts shown in FIG. 22 (or FIG. 7) set in S110. After substantially the entire surface of the sole of the supporting leg foot 22 comes in contact with the ground in the first turning gait, the desired ZMP moves to the center of the supporting leg foot 22. The instant the movement to the tiptoe is completed by the tiptoe contact with the ground is established is preferably time Ts. The start time Ts is set on the basis of, for example, the desired ZMP trajectory parameters previously set. The reason for setting the start time Ts as described above will be discussed hereinafter.

As shown in FIG. 19, a cycle Tcyc of the normal gait is a sum of the gait cycles of the first turning gait and the second turning gait. The end time of the normal gait is denoted by Te. Te is set to the time obtained by adding Tcyc to Ts.

The definition of the start, the end, or the like of a gait will be returned to the definition of the gait in the aforesaid narrow sense again from the moment the normal gait is determined (the moment the program leaves the loop of S204 shown in FIG. 23). In the following explanation, the start time (the time at which the supporting leg foot 22 lands first) according to the definition of a gait based on the aforesaid narrow sense will be set to 0, and the above start time Ts used until the normal gait is determined will be distinguished from the original start time 0 by using the reference mark Ts (abbreviated to "Ts" in some cases).

Lastly, the processing proceeds to S114 and sets a body posture angle and antiphase arm swing angle restoring period [Tm, Ts2] and [Tm2, Te] of the normal gait. Supplementally, when the normal gait is repeated, the body posture angle and the antiphase arm swing angle should be continuous in a boundary of gaits. For this purpose, the beginning body posture angular velocity and the ending body posture angular velocity of the normal gait must agree with each other, and the beginning antiphase arm swing angular velocity and the ending antiphase arm swing angular velocity must agree with each other. The aforesaid period is the period for adjusting a body posture angle trajectory and an antiphase arm swing angle trajectory to implement the agreement.

To be more specific, the gait goes through the floating period of the first turning gait from the start time Ts and reaches the second turning gait. The time at which the floor reaction force vertical component has increased to a predetermined magnitude is set as time Tm. Further, in the latter half of a single stance period of the second turning gait, the time at which the floor reaction force vertical component has reduced to a certain degree is set as time Ts2. Further, the gait goes through the floating period of the second turning gait and reaches the first turning gait. The time at which the floor reaction force vertical component has increased to a predetermined magnitude is set as time Tm2.

FIG. 19 shows these times. The time Tm is preferably set to be the moment substantially the entire surface of the sole of the supporting leg foot 22 comes in contact with the ground or immediately after that. The same applies to time Tm2. The time Ts2 is preferably set to the time of the moment at which the state wherein substantially the entire surface of the sole of the supporting leg foot 22 is in contact with the ground is switched to tiptoe contact with the ground or at the time immediately preceding it, as in the case of the start time Ts.

A description will now be given of the relationship between the desired ZMP of FIG. 22 and these times Tm, Ts2 and Tm2 set in the afore-mentioned S110 of FIG. 15. In the second turning gait, the desired ZMP takes the heel of the supporting leg foot 22 as the beginning position and remains at this position until substantially the entire surface of the sole of the supporting leg foot 22 comes in contact with the ground, and then the desired ZMP begins to move to the center of the supporting leg foot 22. It is desired to set this moment the desired ZMP beings to move the center as time Tm. Thereafter, the instant the movement of the desired ZMP to the tiptoe is completed by the time only the tiptoe of the supporting leg foot 22 comes in contact with the ground is preferably set as time Ts2. Furthermore, in the next first turning gait, the desired ZMP takes the heel of the supporting leg foot 22 as the beginning position and remains at this position until substantially the entire surface of the sole of the supporting leg foot 22 comes in contact with the ground, and then the desired ZMP begins to move to the center of the supporting leg foot 22. It is desired to set this moment the desired ZMP begins to move to the center as time Tm2.

The reason for setting as described above will be discussed hereinafter. The period for restoring (adjusting) the body posture angle and the period for restoring (adjusting) the antiphase arm swing angle may be separately set.

After the processing from S010 to S022 shown in FIG. 13 is carried out, the processing proceeds to S024 and calculates an initial state of the normal gait. The initial state calculated here includes an initial horizontal body position/velocity (an initial body position and initial body velocity in the horizontal direction), an initial vertical body position/velocity (an initial body position and an initial body velocity in the vertical direction), an initial divergent component, an initial body posture angle, and an angular velocity of the normal gait, and an initial antiphase arm swing angle and an angular velocity. The initial state is exploratorily calculated according to the flowchart of FIG. 23.

In the flowchart of FIG. 23, first, in S200, an initial state (a state at the start time Ts) of a desired foot position/posture, a desired arm posture, and a desired body posture angle (an inclination angle and a yaw angle) are determined on the basis of the gait parameters of the normal gait (the parameters set in S022 of FIG. 13 described above). The state here represents positions and posture angles and their changing rates (time derivative).

Figure 15:
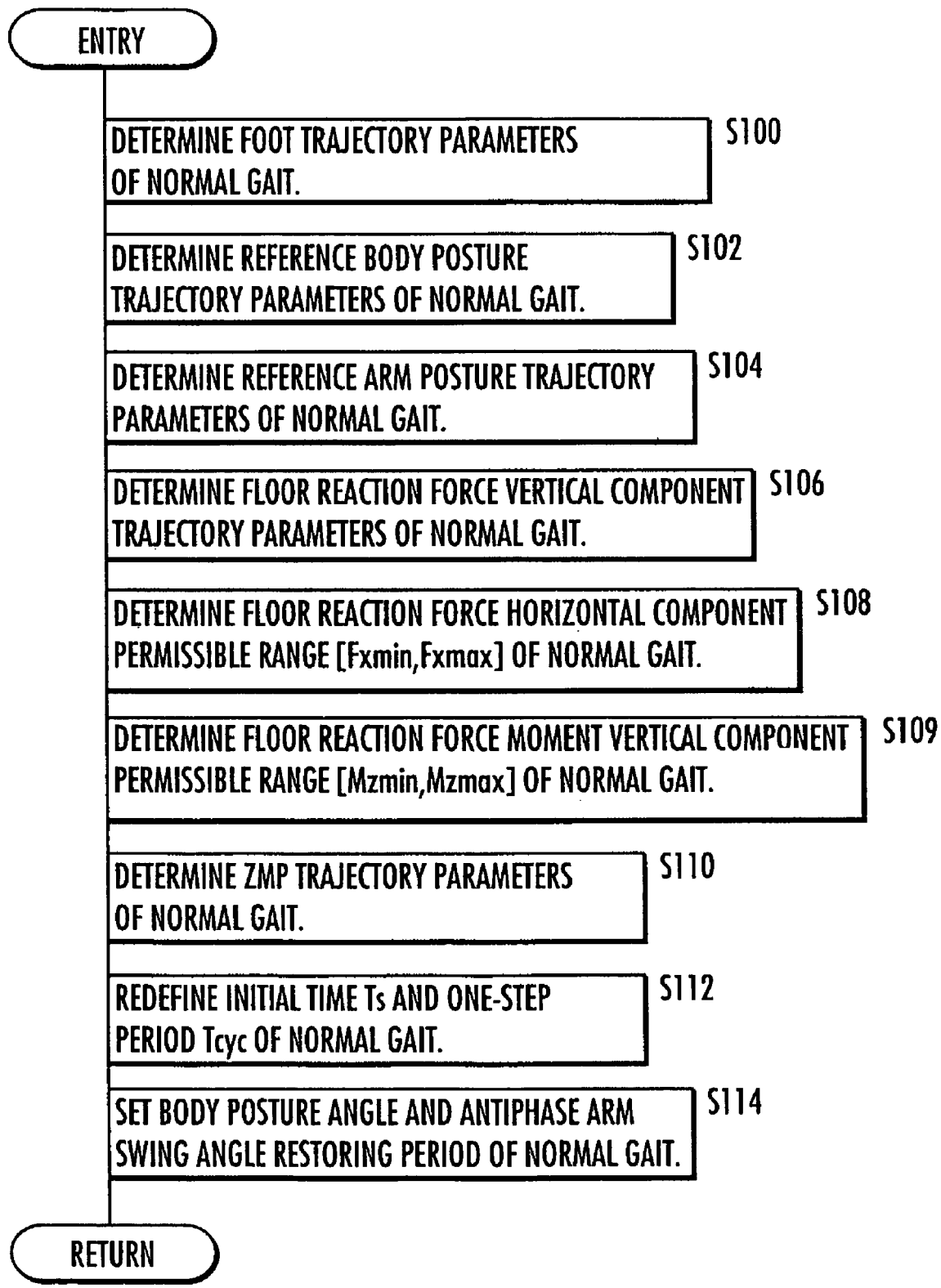
FIG. 15 is a flowchart showing a subroutine processing of S022 of FIG. 13.

In this case, the initial state of a desired foot position/posture of a supporting leg is determined by generating, using a finite-duration setting filter, a foot position/posture trajectory (a trajectory observed from a next time's gait supporting leg coordinate system) from the supporting leg foot position/posture at the start of the first turning gait of the foot trajectory parameter determined in S100 of FIG. 15 to the free leg foot position/posture at the end of the second turning gait until time Ts is reached. The initial state of a desired foot position/posture of the free leg is determined by generating, using a finite-duration setting filter, a foot position/posture trajectory from the supporting leg foot position/posture at the start of the current time gait observed from a next time's gait supporting leg coordinate system to the free leg foot position/posture at the end of the first turning gait until time Ts is reached. The initial state of a desired arm posture is determined to be a reference arm posture at time Ts that is determined on the basis of the reference arm posture trajectory parameters determined in S104 of FIG. 15. To be more specific, a total center-of-gravity position of both arms 5, 5 (a relative position with respect to the body 3) of a desired arm posture, a lateral interval between right and left hands (the distal ends of both arms 5, 5), and an antiphase arm swing angle and an angular velocity are determined. However, the antiphase arm swing angle and the angular velocity are corrected so that they are continuous in a boundary of gaits when a normal gait is repeated, as it will be discussed hereinafter; therefore, they have been just temporarily determined.

For an initial state of a desired body posture angle, a reference body posture (an inclination angle and a yaw angle) and an angular velocity thereof at time Ts determined by the reference body posture trajectory parameter determined in S102 of FIG. 15 are determined as an initial state of the desired body posture angle. In the present reference example, the reference body posture related to the inclination angle of the body 3 is a vertical posture, so that the initial state (the inclination angle and the angular velocity thereof) of the inclination angle in the desired body posture is zero.

Further, in the present reference example, a desired foot position/posture trajectory, a floor reaction force vertical component trajectory, and a desired ZMP trajectory of a normal gait are determined independently from each other on the basis of a foot trajectory parameter, a floor reaction force vertical component trajectory parameter, and a ZMP trajectory parameter, respectively, which have been determined in the flowchart of FIG. 15. For example, a desired foot position/posture at each instant of a normal gait is determined on the basis of a foot trajectory parameter without depending on an instantaneous value of a floor reaction force vertical component.

Subsequently, in S202, (Xs, Vxs) (Xs: horizontal position; Vxs: horizontal velocity), which is a candidate of an initial horizontal body position velocity (that is, a candidate of the horizontal body position velocity at the start time Ts), is provisionally determined. The candidate (Xs, Vxs) to be provisionally determined may be arbitrary. For example, the horizontal body position velocity in the initial state of the normal gait determined when the last time's gait was generated may be used as a provisionally determined candidate (Xs, Vxs).

To simplify the explanation, a case where the initial state of a normal gait in the X-direction (longitudinal direction) on a sagittal plane is searched for will be taken as an example. However, for the initial state of a normal gait (the initial state that meets the aforesaid boundary condition of a normal gait), it is actually required to search for the position and the velocity in the X direction (longitudinal direction) and the Y direction (lateral direction) separately or simultaneously.

Supplementally, there is no concept related to a yaw rotation or a moment vertical component or others about a vertical axis on the sagittal plane. For this reason, at least the yaw rotation and a moment vertical component are calculated in a three-dimensional space.

As an exploratory determining technique, a method in which a pseudo-Jacobian (sensitivity matrix) is determined and then a next candidate is determined by the steepest descent method or the like, or the simplex method or the like may be used. In the present reference example, the steepest descent method will be used.

Next, the processing proceeds to S206 via S204 and determines the initial (time Ts) vertical body position velocity (Zs, Vzs)(Zs: vertical position; Vzs: vertical velocity) so that the vertical body position velocity is continuous and angles of joints, such as knees, will not be excessively large or small when the normal gait is repeated. More details regarding this have been described in, for example, PCT/JP02/13592 previously applied by the present applicant, and will be therefore omitted here.

After the processing of S206, the processing proceeds to S208 to provisionally generate a normal turning gait (the normal turning gait provisionally generated may be hereinafter referred to as the provisional gait). To be more specific, based on the gait parameters of the normal gait determined in S022 of FIG. 13 described above, a desired ZMP, a desired floor reaction force vertical component, a desired foot position/posture, a reference body posture, a desired arm posture, a floor reaction force horizontal component permissible range, and a floor reaction force moment vertical component permissible range at each instant from the start time Ts to the end time Te are sequentially determined. Then, gaits from time Ts to the end time Te are generated by sequentially determining the body position/posture, taking the horizontal body position velocity (Xs, Vxs) and the vertical body position velocity (Zs, Vzs) mentioned above as the initial (time Ts) state of the body 3, and by using the aforesaid dynamic model (the model in FIG. 12) so as to satisfy the dynamic balance condition related to the determined desired ZMP and the desired floor reaction force vertical component and the condition of the floor reaction force horizontal component permissible range. At this time, the gaits are generated so that the body posture agrees with the reference body posture as much as possible.

Moreover, an antiphase arm swing motion is determined such that the condition related to the floor reaction force moment vertical component, i.e., the floor reaction force moment vertical component permissible range, is satisfied.

Incidentally, the gait generation of the normal gait is performed merely inside the gait generator 100, and the generated gaits are not output to a composite-compliance operation determiner 104, which will be discussed later, as desired values for driving the actual robot 1.

The following will explain in detail the processing for generating a normal gait by sequential calculation, which is the processing in S208.

Figure 24:
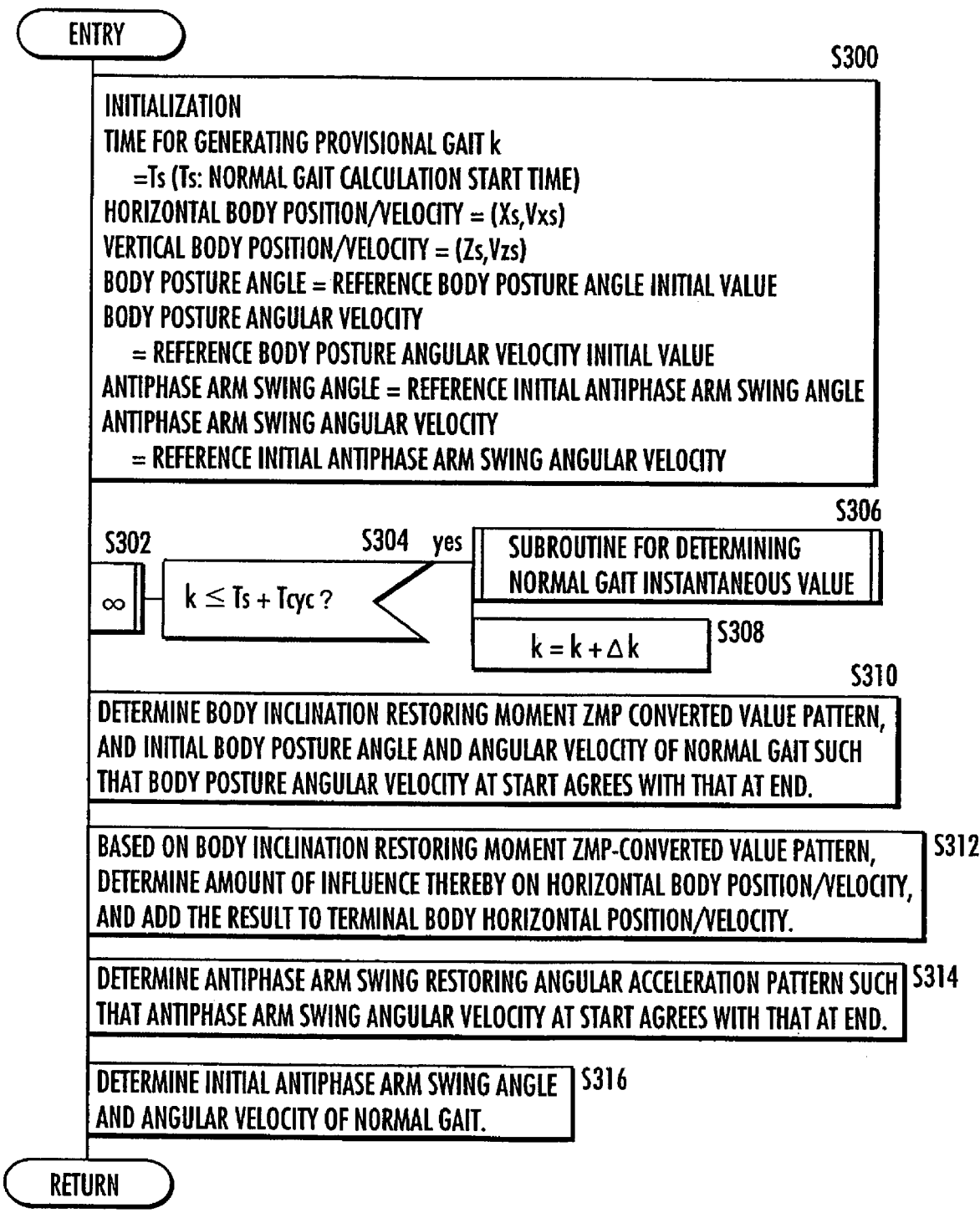
FIG. 24 is a flowchart showing subroutine processing of S208 in FIG. 23.

FIG. 24 is a subroutine flowchart illustrating the processing.

The explanation will now be given. In S300, various elements are initialized. Specifically, the start time Ts is substituted into time k for generating a provisional gait. Furthermore, a currently determined (Xs, Vxs) (determined in S202, or S216 or S218 of FIG. 23 to be discussed hereinafter) is substituted into the horizontal body position velocity, and the latest (Zs, Vzs) determined in the aforesaid S206 is substituted into the vertical body position velocity. In addition, an initial value of a reference body posture angle (angle at the start time Ts) is substituted into the body posture angle, and an initial value of a reference body posture angular velocity (an angular velocity at the start time Ts) is substituted into the body posture angular velocity.

A reference initial antiphase arm swing angle (angle at the start time Ts) is substituted into the antiphase arm swing angle, and a reference initial antiphase arm swing angular velocity (angular velocity at the start time Ts) is substituted into the antiphase arm swing angular velocity.

Subsequently, the processing proceeds to S304 via S302 and determines whether time k for generating a provisional gait is before gait end time (whether $k \leq Ts+Tcyc$). If the determination result is YES, then the processing proceeds to a gait instantaneous value determining subroutine of S306 to determine a gait instantaneous value. Subsequently, the processing of the gait generator 100 proceeds to S308 to increment time k for generating a provisional gait by $\Delta k$, and then returns to S304.

Here, $\Delta k$ is an interval of the generation of provisional gaits and normally set to agree with a control cycle $\Delta t$. If the dynamic accuracy of provisional gaits is not demanding, then $\Delta k$ may be set to be longer than $\Delta t$ in order to reduce the volume of calculation.

If the determination result of S304 is NO, then the processing proceeds to S310. The processing described above generates a normal gait (provisional gait) from its start to end before proceeding to S310.

A gait instantaneous value determining subroutine of S306 will now be explained in detail with reference to FIG. 25.

First, in S400 of FIG. 25, based on a normal gait parameter (the floor reaction force vertical component trajectory parameter), a value (current time value) of the desired floor reaction force vertical component shown in FIG. 19 at time k is determined. Further, in S402, a value (current time value) of the desired ZMP trajectory shown in FIG. 22 at time k is determined on the basis of a normal gait parameter (the ZMP trajectory parameter).

Then, the processing proceeds to S404 and determines the values (current time values) of desired positions/postures of both feet (desired foot positions/postures of both supporting leg and free leg), the reference body posture, and the reference arm posture at time k on the basis of the normal gait parameters (the foot trajectory parameter, the reference body posture trajectory parameter, and the arm posture trajectory parameter). To be more specific about the reference arm posture, the values (current time values) of the total center-of-gravity position of both arms 5, 5 (the relative position with respect to the body 3), the lateral interval between right and left hands (the distal ends of both arms 5, 5), and the antiphase arm swing angle are determined.

The current time value (the value at time k) of the desired foot position/posture is determined in the same manner as in the case where the foot position/posture at the start time Ts was determined in S200 of FIG. 23.

Then, the processing proceeds to S406 and calculates a value (current time value) of the total center-of-gravity vertical position velocity at time k that satisfies the desired floor reaction force vertical component (balances the sum of the inertial force in the vertical direction and gravity of the robot 1 with the desired floor reaction force vertical component). To be more specific, the total center-of-gravity vertical position velocity is calculated on the basis of, for example, the above Equation 01 and Equation 04 related to the dynamic model shown in FIG. 12. In other words, Equation 01 and Equation 04 provides a relational expression (a dynamic equation related to the vertical direction of the total center of gravity of the robot 1) indicating that the result obtained by multiplying the sum of the total center-of-gravity vertical acceleration from a motion of the robot 1 and the gravity acceleration by the total mass of the robot 1 is equal to a floor reaction force vertical component. Thus, the total center-of-gravity vertical acceleration is determined from the relational expression and the desired floor reaction force vertical component.

The relational expression itself generally holds without depending on a model of the robot 1. The total center-of-gravity vertical velocity is calculated by integrating the determined total center-of-gravity vertical acceleration, and further, the total center-of-gravity vertical velocity is integrated to calculate the total center-of-gravity vertical position. More generally, these calculations are carried out using the dynamic relational expressions represented by the following Equation 15 and Equation 16 (discretized equations of Newton's dynamic equations).

Total center-of-gravity vertical velocity at time
$k$=Total center-of-gravity vertical velocity at time
$(k-\Delta k)$+((Floor reaction force vertical component/Total mass of the robot)+acceleration of gravity)*$\Delta k$(where the acceleration of gravity takes a negative value)     Equation 15

Total center-of-gravity vertical position at time
$k$=Total center-of-gravity vertical position at time
$(k-\Delta k)$+Total center-of-gravity vertical velocity
at time $k$*$\Delta k$     Equation 16

Subsequently, the processing proceeds to S408 and calculates the vertical body position that satisfies the total center-of-gravity vertical position. To be more specific, the vertical body position is calculated using, for example, Equation 04 related to the model in FIG. 12. Specifically, the vertical positions of the supporting leg mass point $2m$ and the free leg mass point $2m$ of the model in FIG. 12 are determined from the current time values of the desired foot positions/postures of the supporting leg and the free leg. Then, these determined vertical positions of the supporting leg mass point $2m$ and the free leg mass point $2m$ and the current time value of the total center-of-gravity vertical position determined in S407 are applied to Equation 04 so as to determine the vertical position of the body mass point $3m$. Furthermore, the vertical body position is determined from the determined vertical position of the body mass point $3m$ and the current time value of the desired body posture angle (the reference body posture angle set in S404 or the last time's (time $k-\Delta k$) desired body posture angle determined in S414 to be discussed hereinafter).

The processing then proceeds to S410 wherein the values (current time value), at time k, of the floor reaction force horizontal component permissible range [Fxmin, Fxmax] shown in FIG. 20 are determined on the basis of the gait parameter (the parameter defining the floor reaction force horizontal component permissible range) determined in S108 of FIG. 15 described above.

Subsequently, the processing proceeds to S411 wherein the values (current time value), at time k, of the floor reaction force moment vertical component permissible range [Mzmin, Mzmax] shown in FIG. 21 are determined on the basis of the gait parameter (the parameter defining the floor reaction force moment vertical component permissible range) determined in S109 of FIG. 15 described above.

Then, the processing proceeds to S412 wherein the current time values of the desired body horizontal acceleration and the desired body posture acceleration are determined such that the dynamic balance condition related to the desired ZMP (the condition in that the horizontal component of a moment generated about the desired ZMP by a resultant force of an inertial force and the gravity of the robot 1 is zero) is satisfied. The body horizontal acceleration and the body posture angular acceleration (more specifically, the body inclination angular acceleration) are determined such that the floor reaction force horizontal component Fx does not exceed [Fxmin, Fxmax]. Further, the current time value of the desired antiphase arm swing angular acceleration is determined such that the floor reaction force moment vertical component Mz does not exceed [Mzmin, Mzmax].

Of the body posture angle, the yaw angle is determined so as to agree with the yaw angle of the reference body posture angle. Regarding the desired arm posture, components other than the antiphase arm swing angle are determined to agree with the reference arm posture. At this time, the desired body inclination angle and the desired antiphase arm swing angle are determined to follow the reference body inclination angle and the reference antiphase arm swing angle, respectively, as much as possible, while satisfying the aforesaid condition. This will be explained in detail below.

At this point, the instantaneous values (current time values) of the foot position/posture and the vertical body position have been determined as described above. Regarding the arm posture, the components other than the antiphase arm swing angle have been determined to agree with those of the reference arm posture. Therefore, once the remaining horizontal body position, body posture angle and antiphase arm swing angle are determined, then the desired motion of the robot 1 will be uniquely determined. Hence, all floor reaction forces will be also uniquely determined. In the present reference example, the desired floor reaction force vertical component and the desired ZMP of a normal gait are defined by the floor reaction force vertical component trajectory parameter and the desired ZMP trajectory parameter, respectively, determined in S022 of FIG. 13 described above.

When generating a gait, if the body inclination mode is primarily used to satisfy a desired ZMP (to set the horizontal component of a floor reaction force moment about a desired ZMP to zero) without using the aforesaid body translational mode, then the body posture angle may become excessively large. To prevent this, therefore, the body translational mode should be used as much as possible. However, the body translational mode involves floor reaction force horizontal component changes, so that slippage may occur if the body translational mode is intensely effected when the floor reaction force horizontal component permissible range is narrow. In this case, depending upon the body inclination mode is an inevitable choice. Especially during a period in which the floor reaction force horizontal component permissible range is zero, as in the aforesaid running gait, it is impossible to generate a gait for generating a floor reaction force horizontal component. Hence, depending upon the body inclination mode is an inevitable choice.

Meanwhile, an antiphase arm swing motion allows only the floor reaction force moment vertical component to be changed without changing any of the horizontal component of a floor reaction force moment about a desired ZMP and the floor reaction force horizontal component, so that it can be used to prevent the floor reaction force moment vertical component from exceeding the aforesaid floor reaction force moment vertical component permissible range. Considering the above, in the present reference example, the body horizontal acceleration, the body posture angular acceleration, and the antiphase arm swing acceleration are determined according to the flowchart shown in FIG. 26. For the convenience of understanding, regarding the determination of the body horizontal acceleration and the body posture angular acceleration (the angular acceleration of an inclination angle of the body 3), a case where the body horizontal acceleration and the body posture angular acceleration in the X direction (longitudinal direction) are determined on a sagittal plane will be taken as an example. Actually, however, the body horizontal acceleration and the body posture angular acceleration in the Y direction (lateral direction) are also determined in the same manner as that for the X direction.

First, in S500, the value of the reference body yaw angle at time k is substituted into the desired body yaw angle. Further, the value of a reference arm posture at time k is substituted into the desired arm posture, excluding the antiphase arm swing angle and the angular velocity component of an arm posture.

Then, in S502, it is determined whether the current time (the value of a timer for generating a normal gait) k is in the period of restoring a body posture angle and an antiphase arm swing angle (the period of restoring a body posture angle and an antiphase arm swing angle being the period from time Tm to time Ts2 and the period from time Tm2 to Te in the case of a normal gait). The processing proceeds to S504 if the determination result of S502 is NO, or to S530 if the determination result is YES.

In S504, a body horizontal acceleration αtmp necessary to satisfy the current (time k) desired ZMP is determined, assuming that the robot 1 is made to perform a motion of the body translational mode, the angular acceleration of the body inclination mode being set to zero, from a last time's instantaneous gait state (the gait state at time k−1) of the robot 1. The αtmp is determined using, for example, the above Equation 03y related to the dynamic model of FIG. 12 described above. To be more specific, for example, time series values of desired foot positions/postures determined by the current time k are used to determine the vertical accelerations of the supporting leg mass point $2m$ and the free leg mass point $2m$ at the current time k, and a desired foot position/posture at the current time k (current time) is used to determine the vertical positions of the supporting leg mass point $2m$ and the free leg mass point $2m$. Furthermore, the floor reaction force vertical position at the current time k (current time) is used to determine the vertical position of the body mass point $3m$, and the vertical acceleration of the body mass point $3m$ at the current time k is determined by using time series values of the desired vertical body positions determined by the current time k. Then, these determined values are substituted into the above Equation 03y, and an equation obtained by setting My and $d2\theta by/dt2$ of the Equation 03y to zero is solved on $d2Xb/dt2$ so as to determine the body mass point horizontal acceleration as the body horizontal acceleration αtmp. A more precise dynamic model may be used to exploratorily determine the body horizontal acceleration αtmp that sets the horizontal component of the floor reaction force moment about the desired ZMP to zero. Further, in the present reference example, the reference body posture related to the inclination angle of the body 3 is the vertical posture and the body posture angular acceleration (the angular acceleration of the inclination angle of the body 3) in the reference body posture is zero, so that the angular acceleration in the body inclination mode was set to zero to determine the body horizontal acceleration αtmp. If, however, the reference body posture trajectory parameter is set so that the inclination angle of the reference body posture changes and if the reference body posture angular acceleration (the reference angular acceleration of the inclination angle of the body 3) at the current time k determined thereby is not zero, then the angular acceleration in the body inclination mode may be set to the value of that reference body posture angular acceleration, which is not zero, to determine the body horizontal acceleration αtmp by using a dynamic model (for example, $d2\theta by/dt2$ of Equation 03y may be set to a reference body posture angular acceleration that is not zero to determine the body horizontal acceleration αtmp in the same manner as described above).

Next, the processing proceeds to S506 wherein a floor reaction force horizontal component Fxtmp at time k when the body horizontal acceleration is αtmp is determined using a dynamic model. In the present reference example, Fxtmp is determined using Equation 02x of the dynamic model. In other words, Fxtmp is determined according to the following Equation 17, where $d2Xsup/dt2$ and $d2Xswg/dt2$ denote the supporting leg foot mass point horizontal acceleration and the free leg foot mass point horizontal acceleration.

$$Fxtmp=mb*(tmp+msup*d2Xsup/dt2+mswg*d2Xswg/dt2 \quad \text{Equation 17}$$

Figure 27:
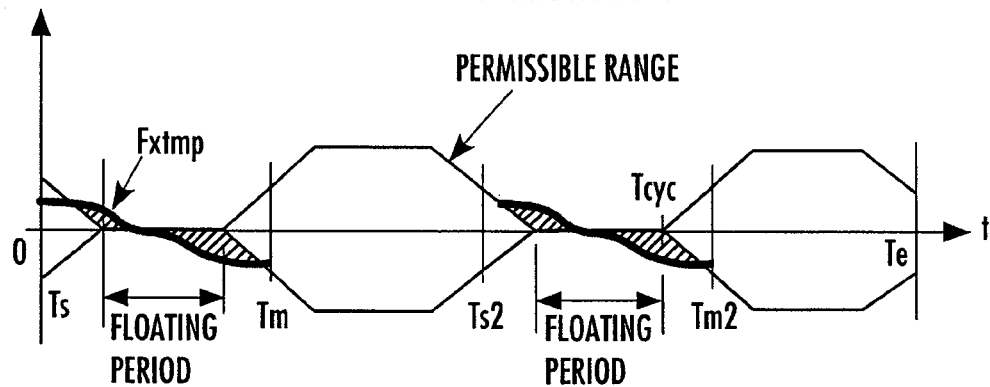
FIG. 27 is a graph showing an example of a floor reaction force horizontal component in which a permissible range is not considered.

An example of Fxtmp determined as described above is shown in FIG. 27. In FIG. 27, a portion wherein Fxtmp exceeds the floor reaction force horizontal component permissible range [Fxmin, Fxmax] is hatched.

Subsequently, the processing proceeds to S508 wherein a body Horizontal acceleration a in the body translational mode and a floor reaction force horizontal component Fx generated thereby, and a body angular acceleration D in the body inclination mode are determined as shown below (S508 to S516).

Specifically,

If Fxtmp>Fxmax, then the processing proceeds to S510 wherein Fx is determined according to the following equation.

$$Fx=Fxmax \quad \text{Equation 18}$$

If Fxtmp<Fxmin, then the processing proceeds to S512 wherein Fx is determined according to the following equation.

$$Fx = Fxmin \qquad \text{Equation 19}$$

In other cases, that is, if Fxtmp lies within the floor reaction force horizontal component permissible range [Fxmin, Fxmax], then the processing proceeds to S514 wherein Fx is determined according to the following equation.

$$Fx = Fxtmp \qquad \text{Equation 20}$$

In any case, the processing proceeds to S516 wherein the body horizontal acceleration α and the body posture angular acceleration (body inclination angular acceleration) β are determined according to the following equations.

$$\alpha = \alpha tmp + (Fx - Fxtmp)/\Delta Fp \qquad \text{Equation 21}$$

$$\beta = (\alpha tmp - \alpha) * \Delta Mp/\Delta Mr \qquad \text{Equation 22}$$

where ΔFp, ΔMp, and ΔMr are determined according to the above Equations 06, 07, and Equation 09, respectively.

Supplementally, if higher accuracy of the dynamic calculation is required, then, after determining the body angular acceleration β as described above, the body horizontal acceleration α in the body translational mode should be analytically or exploratorily determined by using a more precise dynamic model so that a motion obtained by combining the body translational mode and the body inclination mode of the above determined body angular acceleration β satisfies the desired ZMP. As an exploratory determining method, a method in which a pseudo-Jacobian (sensitivity matrix) is determined and then a next candidate is determined by the pseudo-Newton method or the like, or the simplex method or the like may be used.

Further, in order to strictly prevent the floor reaction force horizontal component Fx from exceeding the floor reaction force horizontal component permissible range [Fxmin, Fxmax], a set of the body horizontal acceleration α and the body angular acceleration β may be exploratorily searched for such that Fx=Fxmax and the horizontal component of the floor reaction force moment about the desired ZMP is zero in S510 and also Fx=Fxmin and the horizontal component of the floor reaction force moment about the desired ZMP is zero in S512.

Figure 28:
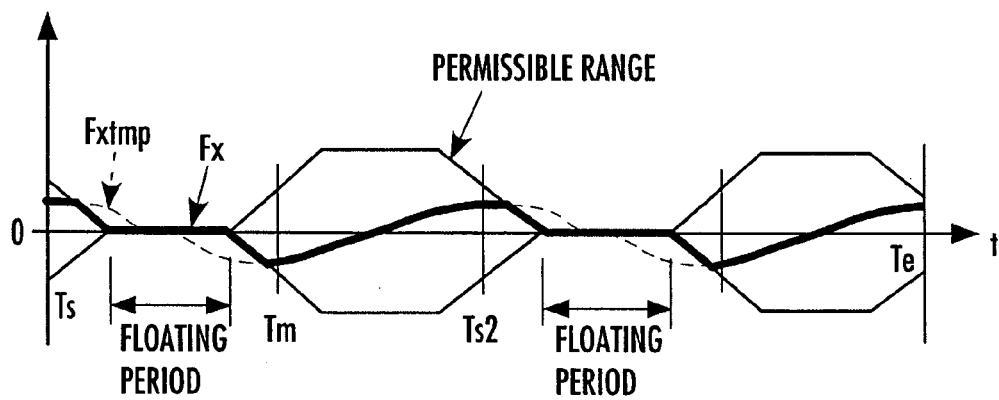
FIG. 28 is a graph showing an example of the floor reaction force horizontal component in which the permissible range is considered.

FIG. 28 shows Fx determined as described above. Fx has been limited (saturated) so that a value of Fxtmp does not exceed the floor reaction force horizontal component permissible range [Fxmin, Fxmax]. More specifically, Fxtmp is directly used as Fx if Fxtmp based on the body horizontal acceleration αtmp only by the body translational mode lies within the permissible range [Fxmin, Fxmax]. If Fxtmp based on the body horizontal acceleration αtmp only by the body translational mode exceeds an upper limit of the permissible range [Fxmin, Fxmax] or reduces below a lower limit thereof, then Fx is forcibly limited to Fxmax and Fxmin, respectively. Especially in a floating period of a running gait, Fxmax=Fxmin=0 applies all the times, so that Fx=0.

Figure 29:
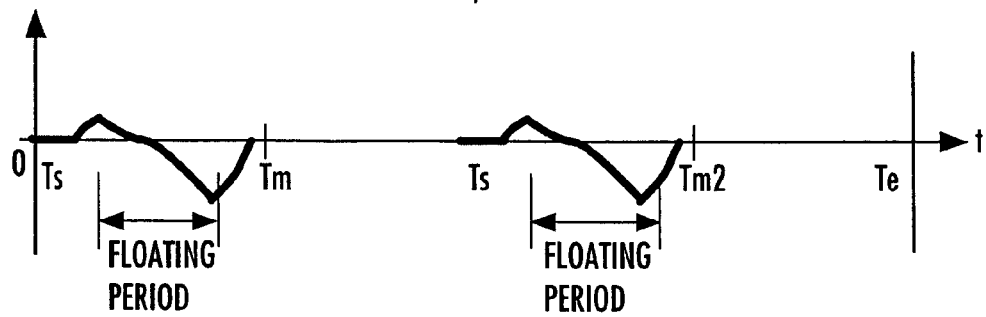
FIG. 29 is a graph showing an example of a body inclination angle acceleration.

FIG. 29 shows the body posture angular acceleration D determined as described above. Thus, an insufficient portion of the floor reaction force moment caused by limiting the acceleration in the body translational mode so as to prevent Fx generated by the body translational mode from exceeding the permissible range [Fxmin, Fxmax] (more specifically, the moment obtained by subtracting a moment component produced by a limited body horizontal motion and the motions of both legs 2, 2 from an inertial force moment required for reducing the horizontal component of a floor reaction force moment about the desired ZMP to zero) has been compensated for by the body inclination mode. During a floating period of a running gate, the body horizontal acceleration α by the body translational mode is always limited to zero, so that the insufficient portion of the floor reaction force moment is compensated for only by the body posture angular acceleration β by the body inclination mode.

Subsequently, the processing proceeds to S518 to determine a floor reaction force moment vertical component Mztmp when a motion in which, for example, a body horizontal acceleration in the body translational mode is α, a body angular acceleration (body inclination angular acceleration) in the body inclination mode is β, a body acceleration in the body yaw rotation mode (body yaw angular acceleration) is a reference yaw angular acceleration d2θbzref/dt2, and an antiphase arm swing angular acceleration βa is a reference antiphase arm swing angular acceleration d2θazref/dt2, is performed. Hereinafter, d2θbzref/dt2 will be βbref, and d2θazref/dt2 will be βaref.

To be more specific, Mz obtained by substituting Equation 1001 through Equation 1004 into Equation 03z is Mztmp.

$$d2Xb/dt2 = \alpha x \qquad \text{Equation 1001}$$

$$d2Yb/dt2 = \alpha y \qquad \text{Equation 1002}$$

$$d2\theta bz/dt2 = \beta bref \qquad \text{Equation 1003}$$

$$d2\theta az/dt2 = \beta aref \qquad \text{Equation 1004}$$

where αx denotes an X component of the body horizontal acceleration α; αy denotes a Y component of the body horizontal acceleration α. Furthermore, A horizontal body position at time k−1 is substituted into Xb and Yb, and a value of time k is substituted into Xzmp, Yzmp, Xsup, d2Ysup/dt2, Xswg, and d2Yswg/dt2.

Figure 32:
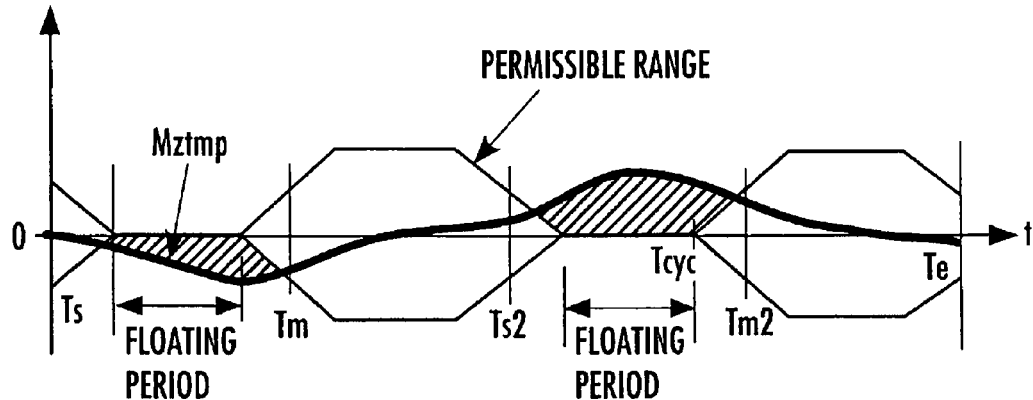
FIG. 32 is a graph showing an example of a floor reaction force moment vertical component in which a permissible range is not considered.
Figure 33:
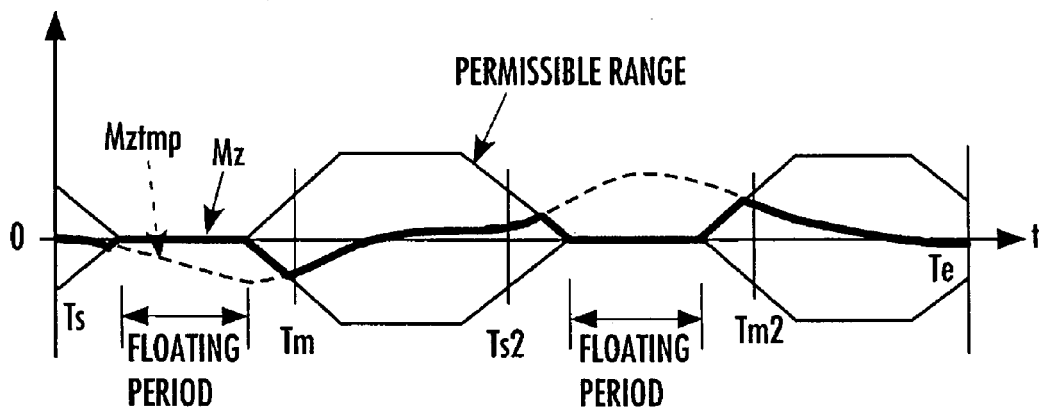
FIG. 33 is a graph showing an example of a floor reaction force moment vertical component in which the permissible range is considered.

FIG. 32 shows an example Mztmp determined as described above. In FIG. 32, the portions of Mztmp that exceeds the floor reaction force moment vertical component permissible range [Mzmin, Mzmax] are shown by hatching.

Next, the processing proceeds to S520 wherein an antiphase arm swing angular acceleration βa is determined as shown below (S520-S528).

Specifically,

If Mztmp>Mzmax, then the processing proceeds to S522 wherein Mz is determined according to the following equation.

$$Mz = Mzmax \qquad \text{Equation 1018}$$

If Mztmp<Mzmin, then the processing proceeds to S524 wherein Mz is determined according to the following equation.

$$Mz = Mzmin \qquad \text{Equation 1019}$$

In other cases, that is, if Mztmp lies within the floor reaction force horizontal component permissible range [Mzmin, Mzmax], then the processing proceeds to S526 wherein Mz is determined according to the following equation.

$$Mz = Mztmp \qquad \text{Equation 1020}$$

In any case, the processing proceeds to S528 wherein the antiphase arm swing angular acceleration βa is determined according to the following equation.

$$\beta a = \beta aref + (Mztmp - Mz)/\Delta Maz \qquad \text{Equation 1021}$$

where ΔMaz is determined according to Equation 09a.

The following will explain the processing from S518 to S528.

Mz determined as described above denotes a floor reaction force moment vertical component from a motion of the entire robot, including an antiphase arm swing.

In the above processing, the antiphase arm swing angular acceleration βa has been determined such that the Mz does not exceed the floor reaction force moment vertical component permissible range [Mzmin, Mzmax]. Too be more specific, Mz has been determined to be limited (saturated) so that a value of Mztmp does not exceed the floor reaction force horizontal component permissible range [Mzmin, Mzmax]. More detailedly, Mztmp is directly used as Mz if Mztmp lies within the permissible range [Mzmin, Mzmax]. If Mztmp exceeds an upper limit of the permissible range [Mzmin, Mzmax] or reduces below a lower limit thereof, then Mz is forcibly limited to Mzmax and Mzmin, respectively. Especially in a floating period of a running gait, Mzmax=Mzmin=0 applies all the times, so that Mz=0.

Figure 34:
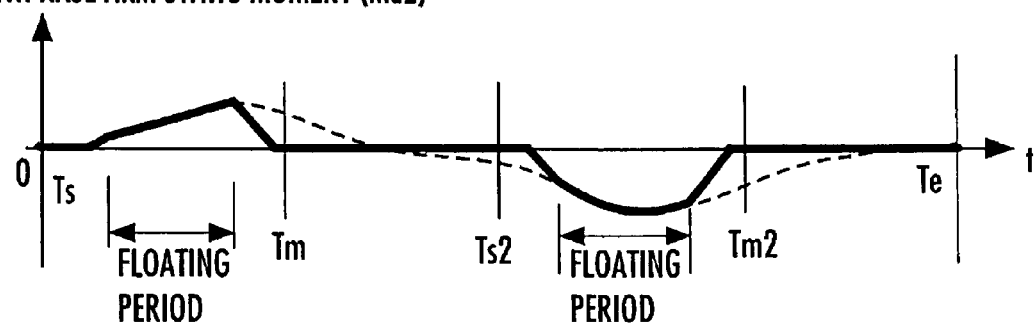
FIG. 34 is a graph showing an example of an antiphase arm swing moment.

A moment vertical component Maz to be generated by an antiphase arm swing in order to prevent Mz from exceeding the floor reaction force moment vertical component permissible range [Mzmin, Mzmax] is (Mz−Mztmp). Maz(=Mz−Mztmp) is shown in FIG. 34.

Figure 35:
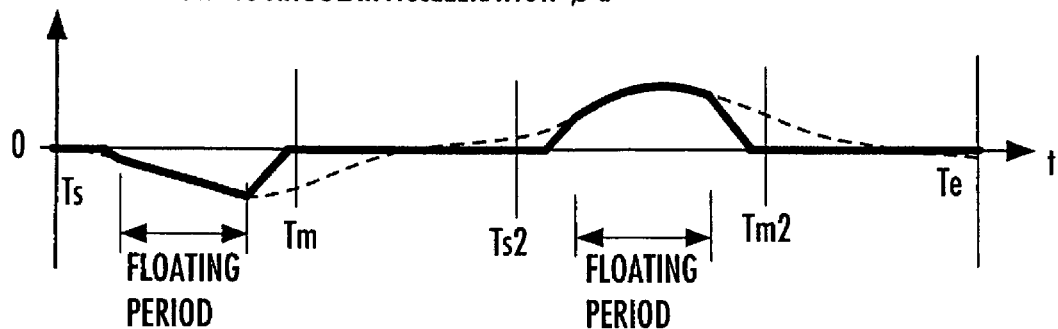
FIG. 35 is a graph showing an antiphase arm swing angular acceleration corresponding to the antiphase arm swing moment shown in FIG. 34.

The antiphase arm swing angular acceleration βa can be obtained by adding the result obtained by dividing Maz by an equivalent inertial moment ΔMaz of an antiphase arm swing to a reference antiphase arm swing angular acceleration βaref (a value obtained by subjecting a reference antiphase arm swing angle to second order differentiation). Specifically, βa is determined according to the above Equation 1021. The antiphase arm swing angular acceleration βa is shown in FIG. 35.

As described above, in the processing from S504 to S528, the antiphase arm swing angular acceleration βa is determined such that the floor reaction force moment vertical component Mz generated by a motion of the entire robot, including an antiphase arm swing, does not exceed the permissible range [Mzmin, Mzmax] (such that the floor reaction force moment vertical component Mztmp offsets (cancels) the portion of the floor reaction force moment vertical component Mztmp that exceeds the permissible range, the floor reaction force moment vertical component Mztmp being generated when an antiphase arm swing angular acceleration is set to agree with the reference antiphase arm swing angular acceleration βaref).

Supplementally, to strictly prevent the floor reaction force moment vertical component Mz from exceeding the floor reaction force moment vertical component permissible range [Mzmin, Mzmax], the antiphase arm swing angular acceleration βa should be analytically or exploratorily searched for by using a more precise dynamic model in place of the processing from S504 to S528. As an exploratory determining method, a method in which a pseudo-Jacobian (sensitivity matrix) is determined and then a next candidate is determined by the pseudo-Newton method or the like, or the simplex method or the like may be used.

The above processing is performed if time k is not found during the period of restoring a body posture angle and an antiphase arm swing angle.

If a determination result of S502 is YES, then the following processing will be carried out. First, the processing proceeds to S530 wherein the body horizontal acceleration a required to satisfy the desired ZMP of current time (time k) when the angular acceleration in the body inclination mode is set to zero from the last time's instantaneous gait state (the gait state at time k−1) of the robot 1 so as to make the robot 1 perform a motion of the body translational mode is determined, and this is determined as a final body horizontal acceleration.

Next, the processing proceeds to S532 wherein the floor reaction force horizontal component Fx in the aforesaid case is determined.

Next, the processing proceeds to S534 wherein the body posture angular acceleration (the body inclination angular acceleration) β is determined to be zero. The body yaw angular acceleration is determined to be the reference body yaw angular acceleration βbref (the value obtained by subjecting the reference body yaw angle to second order differentiation).

Lastly, the processing proceeds to S536 wherein the reference antiphase arm swing angular acceleration βaref (the value obtained by subjecting the reference antiphase arm swing angle to second order differentiation) is substituted into the antiphase arm swing angular acceleration βa.

The above is the processing carried out if the determination result of S502 is YES. More specifically, in this case, the body posture angular acceleration (the body inclination angular acceleration and the body yaw angular acceleration) is set to agree with the reference body posture angular acceleration, and the antiphase arm swing angular acceleration is set to agree with a reference antiphase arm swing angular acceleration. It is expected that this setting will not cause a floor reaction force generated by a motion to exceed the floor reaction force horizontal component permissible range and the floor reaction force moment vertical component permissible range; therefore, determining as described above will present no problem.

After the processing of S528 or S536, the processing proceeds to S414 of FIG. 25 wherein the body horizontal acceleration determined in S412 is sequentially integrated (cumulative addition from time Ts to current time k) so as to determine a horizontal body velocity, and further, the horizontal body velocity is sequentially integrated (cumulative addition from time Ts to current time k) so as to determine a horizontal body position (current time value). Further, the body posture angular acceleration determined in S412 is sequentially integrated (cumulative addition from time Ts to the current time k) so as to determine a body posture angular velocity, and further, the body posture angular velocity is sequentially integrated (cumulative addition from time Ts to the current time k) so as to determine a body posture angle (current time value).

The processing then proceeds to S416 wherein the antiphase arm swing acceleration βa is sequentially integrated (cumulative addition from time Ts to the current time k) so as to determine an antiphase arm swing velocity, and further, the determined antiphase arm swing velocity is sequentially integrated (cumulative addition from time Ts to the current time k) so as to determine an antiphase arm swing angle θaz (current time value).

After the normal gait instantaneous value determining subroutine of S306 in FIG. 24 is carried out, the processing proceeds to S308 wherein the value of time k for generating a gait is incremented by a gait generation interval Δk. Then, the processing returns to S304 to repeat the processing of S306 and S308 as long as the condition shown in S304 is satisfied. When the condition shown in S304 is no longer satisfied, that is, when the generation of provisional gaits up to the end (time Te=Ts+Tcyc) is completed, the processing proceeds to S310.

For a normal gait, an initial body posture angle and its angular velocity must be determined such that motional states of the robot 1 are not discontinuous at boundaries when the normal gait is repeated.

Hence, in S310, a pattern of a ZMP-converted value (hereinafter referred to as the body posture restoring moment ZMP-converted value and abbreviated to ZMPrec) of a floor reaction force moment for generating a body posture angular acceleration for setting a body posture angular velocity back to an initial value (the value at time Ts) by time Te is set.

This will be explained in detail below.

The following will discuss the procedure for setting a body posture angular velocity back to an initial value (the value at time Ts) by generating a body posture angular acceleration by using the body inclination mode during the period of restoring a body posture angle and an antiphase arm swing angle (the period from time Tm to time Ts2 and from time Tm2 to Te). A body posture angular acceleration pattern for this purpose is denoted by β(k). In periods other than the above-mentioned period, β(k)=0 will apply.

In the body inclination mode, generating the body posture angular acceleration β(k) will generate a floor reaction force moment β(k)*ΔMr. As a result, if the floor reaction force vertical component at that instant is denoted by Fz(k), then ZMP(k) calculated from a motion (rather than a desired ZMP) will be shifted by ΔZMP determined according to the following equation.

$$\Delta ZMP(k) = -\beta(k) * \Delta Mr/Fz(k) \qquad \text{Equation 23}$$

Therefore, if the pattern of ΔMr and the pattern of Fz(k) have been determined (known), then the body posture angular velocity can be set back to the initial value (the value at time Ts), that is, the body posture angular velocity in an initial (time Ts) state of the reference body posture trajectory by appropriately setting a pattern of ΔZMP(k) to generate a body posture angular acceleration pattern that satisfies Equation 23.

The aforesaid body posture restoring moment ZMP-converted value (ZMPrec) means ΔZMP(k) that has been appropriately set as described above. Strictly speaking, ΔMr varies when setting the body posture restoring moment ZMP-converted value by using the above Equation 23, but it may be approximately set at a constant value. This is because the normal gait is merely generated for temporary use and not used to make an actual robot follow the gait, so that the dynamic accuracy of a normal gait does not have to be very high.

Figure 30:
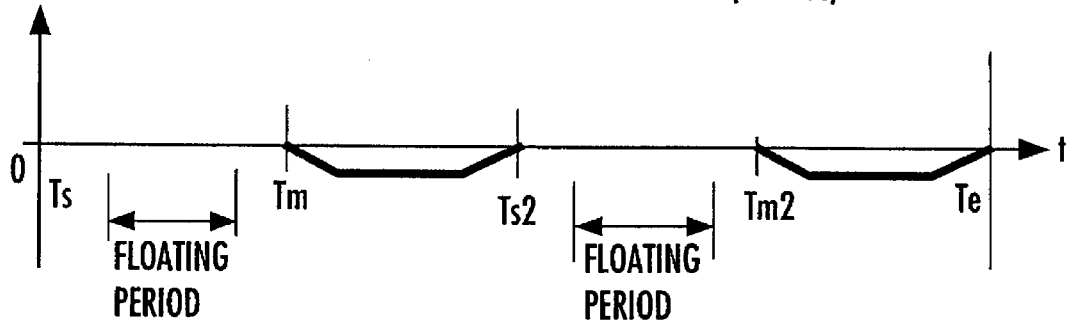
FIG. 30 is a graph showing an example of a body inclination restoring moment ZMP-converted value for restoring a body inclination angle of the robot.

FIG. 30 illustrates an example of ZMPrec. In FIG. 30, as a pattern of ZMPrec, trapezoidal patterns are formed for the period from time Tm to time Ts2 and for the period from time Tm2 to time Te. The times of break points of the trapezoidal portions are set to agree with the times of break points of a desired ZMP pattern in the period between time Tm and time Ts2 and the period from Tm2 to Te (refer to FIG. 22). This is because correction of the desired ZMP pattern of a current time gait will be easier, as it will be discussed hereinafter.

Substituting ZMPrec(k) into ΔZMP(k) of Equation 23 provides the following equation.

$$\beta(k) = -ZMPrec(k) * Fz(k)/\Delta Mr \qquad \text{Equation 24}$$

Figure 31:
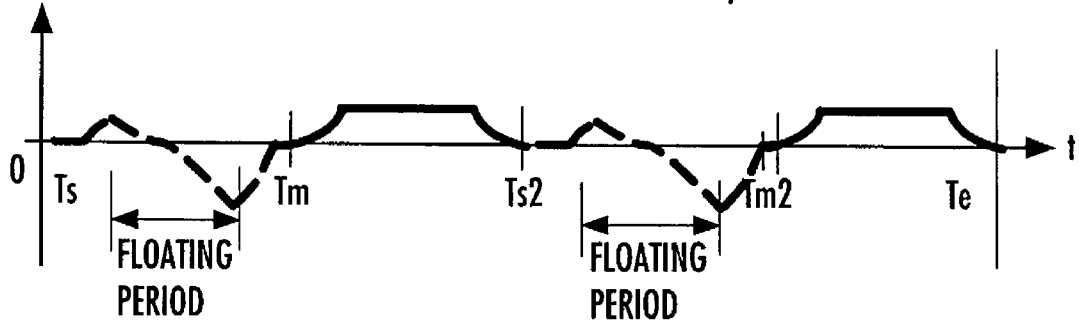
FIG. 31 is a graph showing an example of a body inclination angle acceleration in which the body inclination restoring moment ZMP-converted value is reflected.

Therefore, β(k) determined in this Equation 24 will be as indicated by the solid lines in FIG. 31. The dashed lines in FIG. 31 indicate the body posture angular acceleration during the period from time Ts to time Tm and the period from time Tm2 to Te (indicated by the solid lines in FIG. 29). (Hereinafter, (k) may be omitted if a value is obviously the value at time k.)

The initial (time Ts) body posture angle is set to agree with the initial (time Ts) reference body posture angle.

Further, the initial body posture angular velocity is determined to satisfy Equations 37a and 37b.

Terminal body posture angle−Initial body posture angle=Second order integration of a body posture angular acceleration that has been determined to satisfy a floor reaction force horizontal component permissible range+Second order integration of a body posture angular acceleration generated by ZMPrec+Initial body posture angular velocity*Cycle of normal gait    Equation 37a Terminal body posture angular velocity−Initial body posture angular velocity=First order integration of a body posture angular acceleration that has been determined to satisfy a floor reaction force horizontal component permissible range+First order integration of a body posture angular acceleration generated by ZMPrec    Equation 37b The integration period of the first term of the right side of each of Equations 37a and 37b is the period combining the period from time Ts to Tm and the period from Ts2 to Tm2, while the integration period of the second term of the right side is the period combining the period from time Tm to Ts2 and the period from Tm2 to Te.

To explain more specifically, in a normal gait, an initial state posture angle and an angular velocity observed from a supporting leg coordinate system of a first turning gait (the next time's gait supporting leg coordinate system) must agree with a terminal body posture angle and angular velocity, respectively, observed from a supporting leg coordinate system of the next first turning gait (the next but two time's gait supporting leg coordinate system). Therefore, in the present reference example, the initial (time Ts) body posture angle is determined to be the value of the initial (time Ts) reference body posture angle, and this value and the value obtained by subjecting this value to coordinate conversion into a value observed from the next time's gait supporting leg coordinate system by a matrix (matrix of rotational coordinate conversion) based on a total turning angle (turning angle about a vertical axis) of the robot 1 in a normal gait are substituted into the initial body posture angle and the terminal body posture angle, respectively, in the left side of Equation 37a. The body posture angular acceleration determined in S518 of FIG. 26 described above is used as the body posture angular acceleration related to the integration of the first term of the right side of Equations 37a and 37b.

Then, the initial body posture angular velocities of Equations 37a and 37b and the heights of the trapezoids of ZMPrec (the trapezoidal patterns shown in FIG. 30) related to the integration of the second terms of the right sides of Equations 37a and 37b are taken as unknown numbers (However, the times of the break points of the trapezoidal patterns of ZMPrec are determined beforehand. Further, a trapezoidal height acyc1 of ZMPrec of a first turning gait and a trapezoidal height acyc2 of ZMPrec of a second turning gait are set to have the same value.) An initial body posture angular velocity determined by solving the simultaneous equation of Equations 37a and 37b including the unknown numbers is decided as a new initial body posture angular velocity. In this case, the terminal body posture angular velocity in Equation 37b is obtained by coordinate-converting the initial body posture angular velocity, which is an unknown number, into a value observed from a next time's gait supporting leg coordinate system by a matrix based on the above total turning angle of a normal gait.

Subsequently, the processing proceeds to S312 wherein an amount of influence exerted by a body inclination restoring moment ZMP-converted value (ZMPrec) pattern on a horizontal body position and a velocity is determined on the basis thereof, and the determined amount is added to the horizontal body position and velocity at an end.

This processing will be explained. The details have been explained in PCT/JP02/13592 by the present applicant, so that only a brief explanation will be given here.

During the period from time Ts to Tm and the period from time Ts2 to Te, if the body posture angular acceleration β is changed to generate the body inclination restoring moment ZMP-converted value (ZMPrec) pattern, as described above, then the body posture angular acceleration β is determined according to the following equation.

$$\beta = -ZMPrec \cdot Fz/\Delta Mr \qquad \text{Equation 1025}$$

The body horizontal acceleration that satisfies the desired ZMP when no body inclination restoring moment is generated is αtmp as determined in S532. When the body posture angular acceleration β is changed as described above, the body horizontal acceleration α required to satisfy the desired ZMP is determined according to the following equation.

$$\alpha = \alpha tmp - (\Delta Mr/\Delta Mp) \cdot \beta \qquad \text{Equation 1026}$$

From Equations 1025 and 1026, $$\alpha = \alpha tmp + ZMPrec \cdot Fz/\Delta Mp \qquad \text{Equation 1027}$$

In other words, the acceleration is increased by an equivalent to the second term of the right side of Equation 1027 by the body inclination restoring moment ZMP-converted value (ZMPrec).

Using the linearity of the equations, the body horizontal velocity at an end obtained when the body posture angular acceleration β is changed to generate the body inclination restoring moment ZMP-converted value (ZMPrec) pattern as described above will be determined by adding the first order integration of (ZMPrec*Fz/ΔMp) from time Ts to Te to the body horizontal velocity at an end obtained when the body inclination restoring moment ZMP-converted value (ZMPrec) pattern is not generated, i.e., the end value of the body horizontal velocity determined in S414. Further, the horizontal body position at an end obtained when the body posture angular acceleration β is changed to generate the body inclination restoring moment ZMP-converted value (ZMPrec) pattern as described above will be determined by adding the second order integration of (ZMPrec*Fz/ΔMp) from time Ts to Te to the horizontal body position at an end obtained when the body inclination restoring moment ZMP-converted value (ZMPrec) pattern is not generated, i.e., the end value of the horizontal body position determined in S414.

After completing the processing of S312, the processing proceeds to S314 wherein an antiphase arm swing restoring angular acceleration (βarec) pattern is determined such that the antiphase arm swing angular velocities at a start and an end agree.

Figure 36:
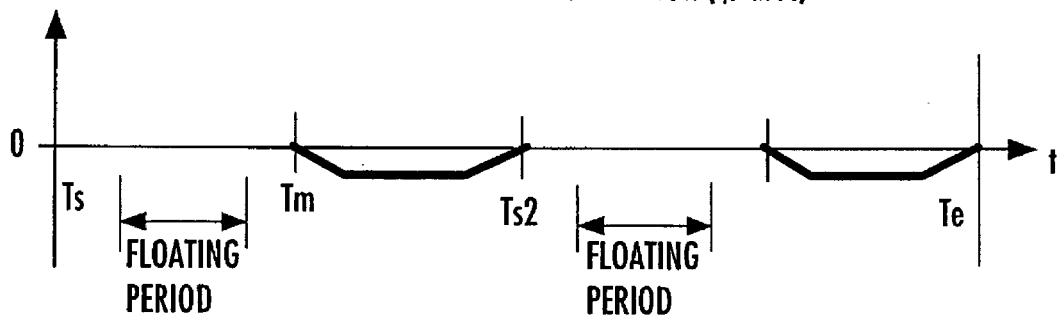
FIG. 36 is a graph showing an example of an antiphase arm swing restoring angular acceleration for restoring an antiphase arm swing angle.
Figure 37:
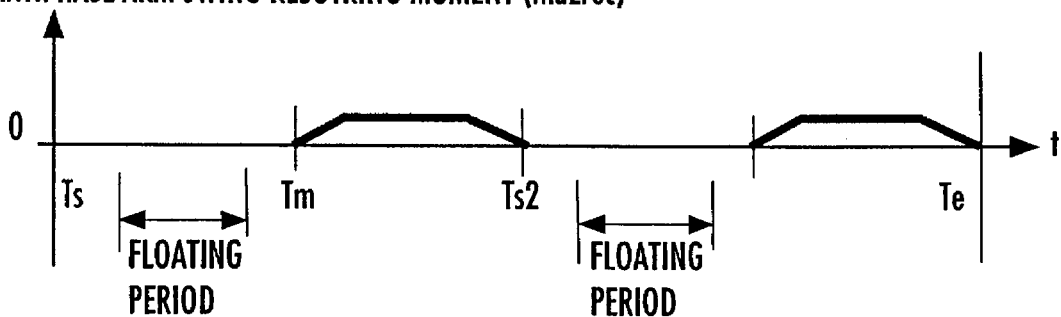
FIG. 37 is a graph showing an antiphase arm swing restoring moment corresponding to an antiphase arm swing restoring angular acceleration shown in FIG. 36.

To be more specific, the antiphase arm swing restoring angular acceleration patterns are set to be trapezoidal, as shown in FIG. 36, and a trapezoidal height azcyc2 in the period from time Tm to Ts2 and a trapezoidal height azcyc1 in the period from time Tm2 to Te are set to be the same. The trapezoidal heights azcyc1 and azcyc2 are determined such that the sum of the integrated value of βarec from time Ts to Te and the integrated value of the above determined antiphase arm swing acceleration βa for preventing the floor reaction force moment vertical component Mz from exceeding a permissible range becomes zero. The trapezoidal heights in the two periods do not have to be the same.

Figure 38:
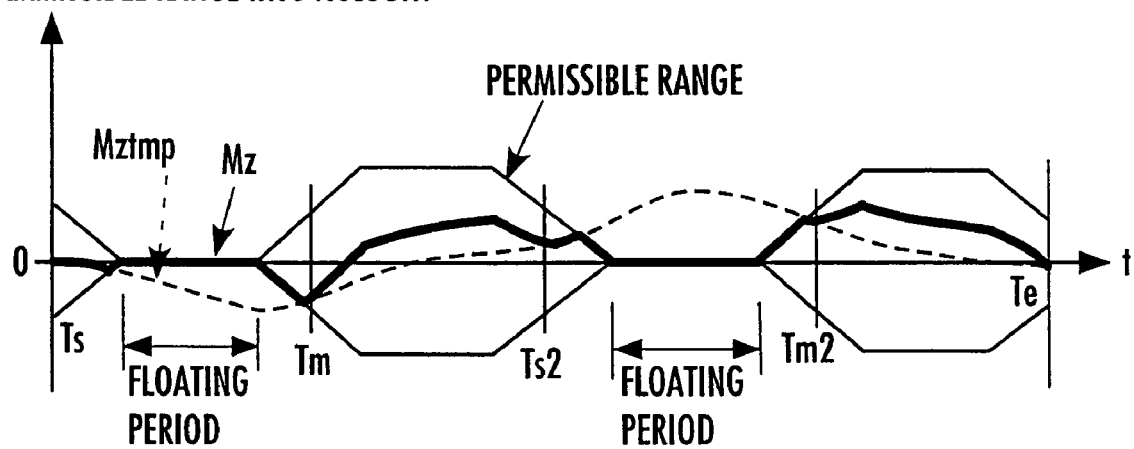
FIG. 38 is a graph showing a floor reaction force moment vertical component formed by combining the floor reaction force moment vertical component shown in FIG. 33 and the antiphase arm swing restoring moment shown in FIG. 37.
Figure 39:
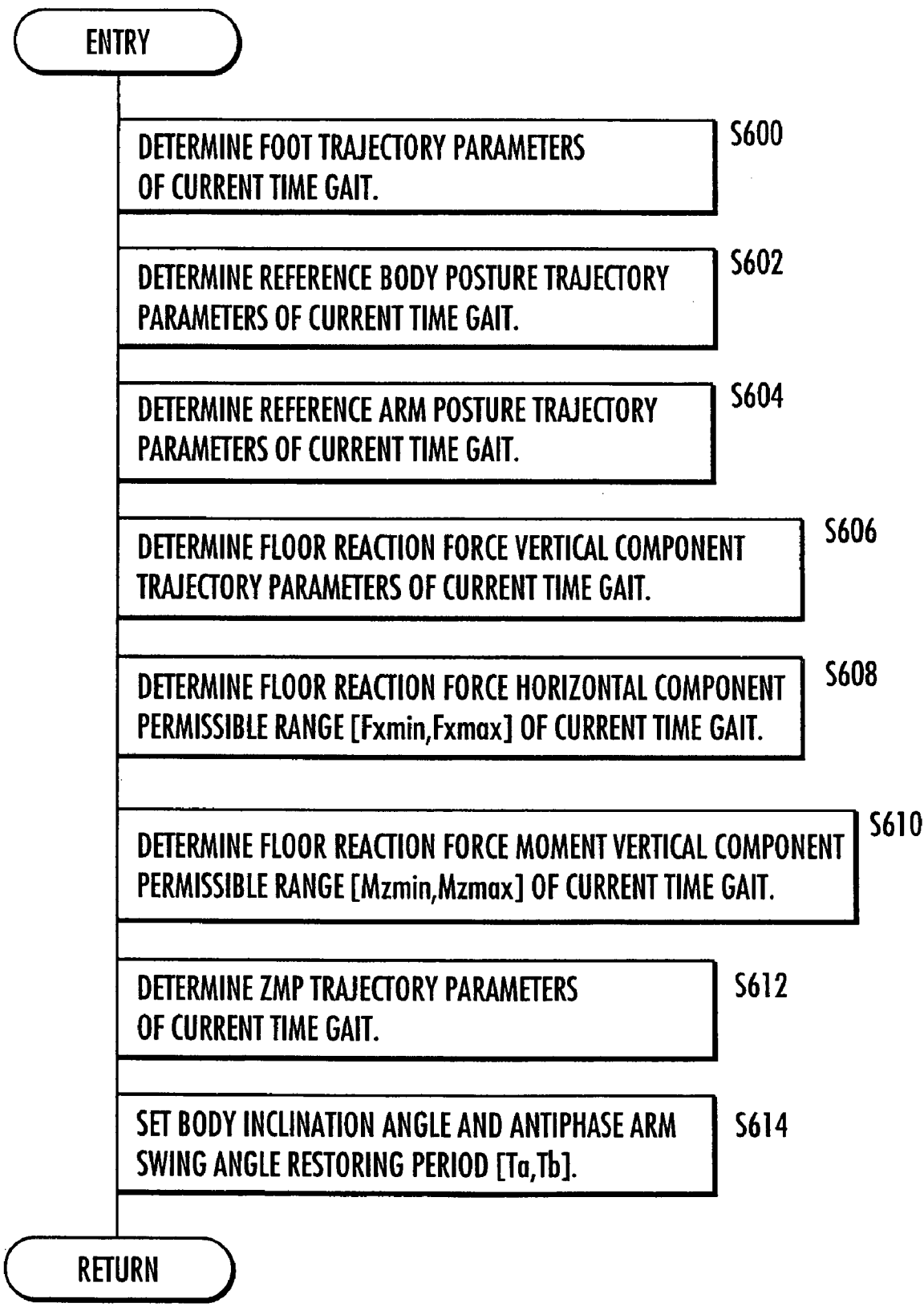
FIG. 39 is a flowchart showing subroutine processing of S026 in FIG. 13.
Figure 40:
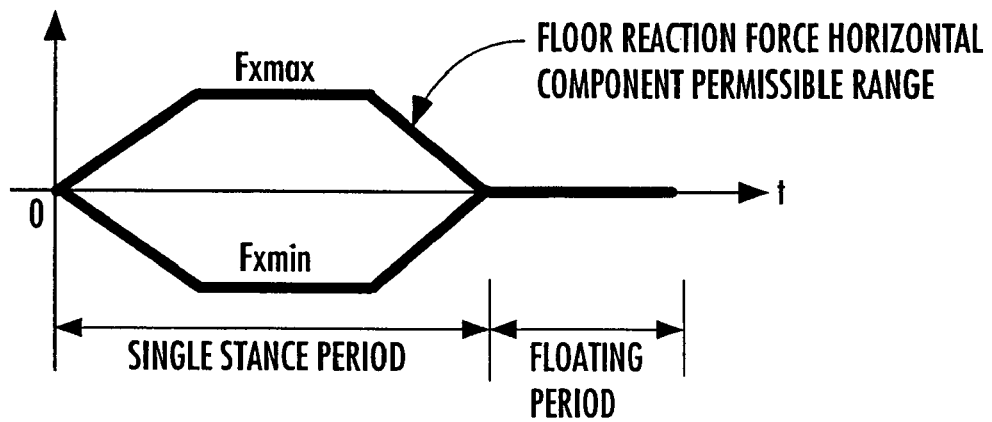
FIG. 40 is a graph showing a setting example of a floor reaction force horizontal component permissible range of a present gait.

Supplementally, a floor reaction force moment vertical component (Mazrec) generated by the antiphase arm swing restoring angular acceleration pattern determined as described above is as shown in FIG. 37. Accordingly, as shown in FIG. 38, the floor reaction force moment vertical component Mz generated by a motion of the robot, including an antiphase arm swing, will be eventually the sum of Mztmp of FIG. 32, Maz of FIG. 34, and Mazrec of FIG. 37, i.e., the sum of Mz of FIG. 33 and Mazrec of FIG. 37. In the period from time Tm to Ts2 and the period from time Tm2 to Te, trapezoidal restoring moments are added. These periods are set so as to provide a sufficiently wide permissible range; therefore, the floor reaction force moment vertical components generated by motions of the robot, including antiphase arm swings, do not exceed the permissible range.

The processing then proceeds to S316 wherein an initial (time Ts) antiphase arm swing angle and an angular velocity of a normal gait are determined.

To be more specific, the initial antiphase arm swing angular velocity is determined according to the following equation.

Initial Antiphase Arm Swing Angular Velocity=Reference initial antiphase arm swing angular velocity−(Antiphase arm swing angle when βarec is 0+Second order integration of βarec pattern)/Tcyc       Equation 1030 where in the above equation, the antiphase arm swing angle when βarec is zero is the antiphase arm swing angle (the antiphase arm swing angle at time Te) determined in S416. The second order integration of βarec refers to a second order integrated value of the antiphase arm swing restoring angular acceleration from time Ts to Te set as shown in FIG. 36. The reference initial antiphase arm swing angular velocity refers to the value of the aforesaid reference antiphase arm swing angular velocity (the first order differential value of the reference antiphase arm swing angle θaref) at time Ts.

The initial antiphase arm swing angle is set to agree with the reference initial antiphase arm swing angle. Alternatively, based on a finally determined antiphase arm swing angular acceleration (that is, the above determined sum of antiphase arm swing acceleration βa and the restoring angular acceleration βarec for preventing the floor reaction force moment vertical component Mz from exceeding a permissible range) and the above determined initial antiphase arm swing angular velocity, the average value of the difference between an arm swing angle calculated when an initial antiphase arm swing angle is set to agree with a reference initial antiphase arm swing angle and a reference antiphase arm swing angle, or an average value of the maximum value and the minimum value of the difference may be determined, and then the value obtained by subtracting a half of the determined average value from the reference initial antiphase arm swing angle may be determined as the final initial antiphase arm swing angle. This arrangement makes it possible to prevent the absolute value of the difference between a calculated arm swing angle and the reference antiphase arm swing angle from becoming excessively large.

One of the reasons that times Ts, Tm, Ts2, and Tm2 have been set as described above is to prevent the floor reaction force horizontal component Fx from exceeding the permissible range [Fxmin, Fxmax] even if the body posture angular acceleration β is generated to set the body posture angular velocity back to the initial angular velocity of a reference body posture trajectory during the period from time Tm to Ts2 and the period from time Tm2 to Te. In other words, the floor reaction force horizontal component permissible range is sufficiently wide in the period from time Tm to Ts2 and the period from time Tm2 to Te, so that the floor reaction force horizontal component Fx does not exceed the permissible range even if the body posture angular acceleration β is generated to restore the body posture angular velocity, while satisfying the desired ZMP.

Another reason that the times Ts, Tm, Ts2, and Tm2 have been set as described above is to prevent the floor reaction force moment vertical component Mz from exceeding the permissible range [Mzmin, Mzmax] even if the antiphase arm swing angular acceleration Ha is generated to set the antiphase arm swing angular velocity back to the initial angular velocity of a reference antiphase arm swing angle trajectory during the period from time Tm to Ts2 and the period from time Tm2 to Te. In other words, the floor reaction force moment vertical component permissible range is sufficiently wide in the period from time Tm to Ts2 and the period from time Tm2 to Te, so that the floor reaction force moment vertical component Mz does not exceed the permissible range even if the antiphase arm swing angular acceleration βa is generated to restore the antiphase arm swing angular velocity.

After the processing of S316 of FIG. 24 is completed as described above, the processing proceeds to S210 of FIG. 23 wherein the horizontal body position and velocity at the end of a generated gait (provisional normal gait) are converted into values observed from a supporting leg coordinate system (the coordinate system of X''', Y''', and Z''' shown in FIG. 17) associated with the supporting leg of that particular instant, and the values are defined as (Xe, Vxe) (Xe: Body horizontal position at the end; and Vxe: Body horizontal velocity at the end).

Subsequently, the processing proceeds to S212 wherein the difference between the initial horizontal body position and velocity (Xs, Vxs) and the horizontal position and velocity at the end (Xe, Vxe) is calculated, as illustrated. This difference (Xs−Xe, Vxs−Vxe) is referred to as a horizontal body position and velocity boundary condition error (errx, errvx). In a normal gait, the boundary condition must be satisfied, so that (Xs, Vxs) and (Xe, Vxe) must agree. Hence, the horizontal body position and velocity boundary condition error (errx, errvx) must be zero or substantially zero. In the present reference example, (Xs, Vxs) that sets the horizontal body position and velocity boundary condition error (errx, errvx) to substantially zero is exploratorily determined.

Subsequently, the processing proceeds to S214 wherein it is determined whether the calculated horizontal body position and velocity boundary condition error (errx, errvx) falls within the permissible range appropriately set beforehand. Instead of setting the permissible range of a horizontal body position and velocity boundary condition error as described above, it may be determined whether the difference between an initial divergent component (Xs+Vxs/ω0) and a divergent component at an end (Xe+Vxe/ω0) and the difference between an initial convergent component (Xs−Vxs/ω0') and a convergent component at an end (Xe−Vxe/ω0') respectively fall within certain permissible ranges. As previously mentioned, ω0 and ω0' denote certain predetermined values.

If the determination result of S214 is NO, then the processing proceeds to S216. In this S216, a plurality of (two in the present reference example) initial value candidates (Xs+ΔXs, Vxs) and (Xs, Vxs+ΔVxs) is determined in the vicinity of (Xs, Vxs). Here, ΔXs and ΔVxs mean predetermined minute variation associated with Xs and Vxs, respectively. Then, taking each of these initial value candidates as an initial state of the horizontal body position and velocity, a normal gait is generated using a gait parameter by the same processing as that of the above S208. Further, the body position and velocity at the end of the generated normal gait are converted to obtain values (Xe+ΔXe1, Vxe+ΔVxe1) and (Xe+ΔXe2, Vxe+ΔVxe2) observed from a supporting leg coordinate system (the coordinate system of X''', Y''', and Z''' shown in FIG. 17) associated with the supporting leg at that particular instant. Here, (Xe+ΔXe1, Vxe+ΔVxe1) means the body position and velocity at an end that corresponds to (Xs+ΔXs, Vxs), and (Xe+ΔXe2, Vxe+ΔVxe2) corresponds to the body position and velocity at an end that corresponds to (Xs, Vxs+ΔVxs). In the processing for generating a normal gait (provisional gait) in this case, the initial state (the state at time Ts) of a variable other than the horizontal body position and velocity may be set to the same value as that in a case where, for example, the initial value candidate of the horizontal body position and velocity is set to (Xs, Vxs). In S216, the same processing as that of the above S210 is carried out to determine the difference between each initial value candidate and the body position and velocity at an end corresponding thereto, i.e., the horizontal body position and velocity boundary condition error corresponding to each initial value candidate (Xs+ΔXs, Vxs), (Xs, Vxs+ΔVxs).

Next, the processing proceeds to S218 wherein, based on the horizontal body position and velocity boundary condition error corresponding to each of (Xs, Vxs) and the initial value candidates in the vicinity thereof (Xs+ΔXs, Vxs), (Xs, Vxs+ΔVxs), an initial value candidate following (Xs, Vxs) is determined by a searching method (a method in which a pseudo-Jacobian (sensitivity matrix) is determined and then a next candidate is determined by the steepest descent method or the like, or the simplex method or the like). More specifically, a sensitivity matrix indicating a changing degree of a horizontal body position and velocity boundary condition error observed when a horizontal body position and a body horizontal velocity are respectively changed minutely from the initial value candidate (Xs, Vxs) on the basis of the horizontal body position and velocity boundary condition errors associated with each of (Xs, Vxs) and the initial value candidates in the vicinity thereof (Xs+ΔXs, Vxs), (Xs, Vxs+ΔVxs) is determined, and then, based on the determined sensitivity matrix, an initial value candidate (Xs, Vxs) that will further reduces the horizontal body position and velocity boundary condition error is newly determined. After the new initial value candidate (Xs, Vxs) of the horizontal body position and velocity is determined as described above, the processing returns to S206.

The aforesaid processing (the processing from S206 to S218) is repeated as long as the determination result of S214 is NO. In this case, in S300 (refer to FIG. 24) of the processing for generating a normal gait corresponding to a new initial value candidate (Xs, Vxs) of the horizontal body position and velocity (S208), the initial value of the body posture angular velocity is set to the value determined in S310 (refer to FIG. 24) in the processing of S208 that corresponds to the last time's initial value candidate (Xs, Vxs) of the horizontal body position and velocity rather than being set to the initial value of the reference body posture angular velocity. And if the determination result of S214 is YES, then the processing leaves the repetition loop (S204) and proceeds to S220. The provisional normal gait generated immediately before leaving the repetition loop of S204 will be obtained as the normal gait that satisfies the boundary condition.

In S220, an initial horizontal body position and velocity (X0, V0) at an original initial time 0 (the end time of the current time gait), an initial vertical body position and velocity (Z0, Vz0) at the original initial time 0, and initial body posture angle and angular velocity at the initial time 0 are determined.

Specifically, (X0, V0) and (Z0, Vz0) are determined to be the values obtained by converting the horizontal body position/velocity and the vertical body position/velocity, which are determined at the time of instant when a second turning gait is switched to a first turning gait, i.e., at time k=Tcyc (time Te−Ts), into the values observed from the supporting leg coordinate system (the X''', Y''', and Z''' coordinate system of FIG. 17) associated with the supporting leg of the first step starting from time Tcyc (i.e., a second 1st turning gait) in a case where a gait is generated to satisfy a gait condition on the basis of a body inclination restoring moment ZMP-converted value pattern and the initial body posture angle and angular velocity of a normal gait at time Ts that have been determined in S310 and the horizontal body position and velocity (Xs, Vxs) at time Ts after leaving the loop of S204. Similarly, the initial state posture angle and angular velocity are determined to be the values obtained by converting the body posture angle and angular acceleration determined when time k=Tcyc (time Te−Ts) into values observed from the supporting leg coordinate system (the X''', Y''', and Z''' coordinate system of FIG. 17) associated with the supporting leg of one step starting from time Tcyc (i.e., a second first turning gait).

Subsequently, the processing proceeds to S222 wherein a normal gait initial divergent component q[0] is determined according to the following equation.

$$q[0]=X0+V0/\omega 0 \qquad \text{Equation 40}$$

where ω0 takes a certain predetermined value, as explained above in relation to the divergence.

Subsequently, the processing proceeds to S224 wherein the normal gait initial divergent component q[0] is converted into a value observed from a current time's gait supporting leg coordinate system, and this is determined as q''[0]. Further, the initial vertical body position and velocity (Z0, Vz0) is converted into a value observed from the current time's gait supporting leg coordinate system, and this is determined as (Z0'', Vz0'').

Supplementally, (Z0'', Vz0'') agrees with the vertical body position and velocity at the end of a second turning gait observed from the supporting leg coordinate system of the second turning gait (the X'', Y'', and Z'' coordinate system of FIG. 17). In addition, q''[0] also agrees with the divergent component at the end of the second turning gait observed from the supporting leg coordinate system of the second turning gait (the X'', Y'', and Z'' coordinate system of FIG. 17). Alternatively, therefore, (Z0'', Vz0'') and q''[0] may be calculated by utilizing these properties.

The processing further proceeds to S226 wherein initial antiphase arm swing angle and angular velocity (θaz0, θaz0) at the original initial time 0 (the end time of the current time gait) are determined, and further, (θaz0'', ωaz0''), which is the value observed from the current time's gait supporting leg coordinate system is determined. To be more specific, (θaz0, ωaz0) is determined to be the value obtained by converting the antiphase arm swing angle and angular velocity, which are determined at the time of instant when a second turning gait is switched to a first turning gait, i.e., at time k=Tcyc (time Te−Ts), in a case where a gait is generated to satisfy a gait condition on the basis of an antiphase arm swing restoring angular acceleration pattern, and initial (time Ts) antiphase arm swing angle and angular velocity of a normal gait that have been determined in S314 and S316 (more specifically, in a case where an antiphase arm swing angle trajectory is determined such that a floor reaction force moment vertical component does not exceed a permissible range in a period other than the body posture angle and antiphase arm swing angle restoring period, and the antiphase arm swing angle trajectory is determined such that the sum of the reference antiphase arm swing angular acceleration βaref and the antiphase arm swing restoring angular acceleration βarec is generated in the body posture angle and antiphase arm swing angle restoring period), into a value observed from the supporting leg coordinate system (the X''', Y''', and Z''' coordinate system of FIG. 17) associated with the supporting leg of one step starting from time Tcyc (i.e., a second 1st turning gait).

Thus, the processing of S024 of FIG. 13, that is, the subroutine processing for determining an initial state of a normal gait is finished.

Subsequently, the processing proceeds to S026 of FIG. 13 wherein the gait parameters of the current time gait are determined (some are provisionally determined). To be more specific, in S026, the following processing is carried out according to the flowchart shown in FIG. 39.

First, in S600, the foot trajectory parameters of the current time gait are set such that the foot position/posture trajectory of the current time gait continues to the foot position/posture trajectory of a normal gait.

Specifically, the free leg foot position/posture at the start of the current time gait (the initial value of the free leg foot position/posture of the current time gait) is set to current free leg position/posture observed from the current time's gait supporting leg coordinate system (the free leg position/posture at the end of the last time's gait). The supporting leg foot position/posture at the start of the current time gait (the initial value of the current time's gait supporting leg foot position/posture) are set to current supporting leg foot position/posture observed from the current time's gait supporting leg coordinate system (the supporting leg foot position/posture at the end of the last time's gait). The free leg foot position/posture at the end of the current, time gait is determined on the basis of a next time's gait supporting leg coordinate system observed from the current time's gait supporting leg coordinate system (a required value of the free leg landing position/posture of the first step related to the current time gait). More specifically, the free leg foot position/posture at the end of the current time gait are determined such that a representative point of a free leg foot 22 agrees with the origin of the next time's gait supporting leg coordinate system observed from the current time's gait supporting leg coordinate system when the free leg foot 22 is turned, from the free leg foot position/posture at the end of the current time gait, until substantially the entire surface of the sole of the foot 22 comes in contact with the ground without slippage, while maintaining the free leg foot 22 in contact with a floor.

At the end of the current time gait, the supporting leg foot 22 is off the floor and floating. To determine the trajectory after the supporting leg foot 22 leaves the floor, an expected supporting leg foot landing position/posture is set. The expected supporting leg foot landing position/posture is set on the basis of the next but on time's gait supporting leg coordinate system observed from the current time's gait supporting leg coordinate system (a required value of the free leg foot position/posture of the second step related to the current time gait). To be more specific, the expected supporting leg foot landing position/posture is determined such that a representative point of the foot 22 obtained when the foot 22 is turned from that position/posture without slippage until substantially entire surface of the sole of the foot 22 is brought into contact with the floor while holding the foot 22 in contact with the floor agrees with the origin of the next but one time's gait supporting leg coordinate system observed from the current time's gait supporting leg coordinate system.

The supporting leg foot position/posture at the end of the current time gait is determined by generating a foot position/posture trajectory from a current supporting leg position/posture (the supporting leg foot position/posture at the start of the current time gait) to the expected foot landing position/posture corresponding to the next time's gait supporting leg coordinate system (the required value of the free leg foot landing position/posture of the second step in the aforesaid required parameter) by using the finite-duration setting filter until the end of the current time gait.

Subsequently, the processing proceeds to S602 wherein the reference body posture trajectory parameter of the current time gait is determined in the same manner as that for the first turning gait and the second turning gait of a normal gait. The aforesaid parameter, however, is set such that the reference body posture trajectory of the current time gait continuously connects to the reference body posture trajectory of the above normal gait (such that the reference body posture angle and the angular velocity at the end of the current time gait agree with the reference body posture angle and the angular velocity, respectively, at the start of a normal gait). In the present reference example, the reference body posture related to an inclination angle refers to a steady vertical posture in both a current time gait and a normal gait.

Next, the processing proceeds to S604 wherein the reference arm posture trajectory parameters of the current time gait are determined in the same manner as that for the first turning gait and the second turning gait of the normal gait. The above parameters, however, are set such that the reference arm posture at the start of the current time gait and the changing rate thereof agree with the current instantaneous values of a reference arm posture and the changing rate thereof, and the arm posture trajectory of the current time gait continuously connects with the arm posture trajectory of the normal gait. For the arm posture trajectory parameters determined here, the parameters related to, for example, a total center-of-gravity position of both arms 5, 5 (a relative position with respect to the body 3), a lateral interval between right and left hands (the distal ends of both arms 5, 5), and an antiphase arm swing angle are determined, as in the case where the normal gait parameters are determined (S104 in FIG. 15). In the present reference example, the total center-of-gravity position of both arms 5, 5 is set so as to be maintained at a constant level with respect to the body 3.

The processing then proceeds to S606 wherein the floor reaction force vertical component trajectory parameters of the current time gait are determined such that the floor reaction force vertical component trajectory defined by the parameters will be a substantially continuous (values are not jumping in steps) trajectory as illustrated in FIG. 6 mentioned above, as in the case of the first turning gait and the second turning gait of a normal gait.

The floor reaction force vertical component trajectory parameters, however, are determined such that both the total center-of-gravity vertical position and velocity and the floor reaction force vertical component trajectory of the current time gait continuously connect with the normal gait.

To be specific, first, the value (Z0", Vz0") obtained by converting the vertical body position and velocity at the start of the normal gait that has been finally determined by the processing of S024 of FIG. 13 mentioned above (the processing for determining the initial state of the normal gait) into the value observed from a current time's gait supporting leg coordinate system, i.e., the total center-of-gravity vertical position and velocity at the start of the normal gait observed from the current time's gait supporting leg coordinate system are determined using, for example, the above Equation 04 (or a kinematics model of the robot 1) on the basis of (Z0", Vz0") or the like determined in S224 of FIG. 23. To be more specific, the total center-of-gravity vertical position at the start of the normal gait observed from the current time's gait supporting leg coordinate system is determined by substituting the body mass point vertical position of the model shown in FIG. 12, which corresponds to the vertical body position Z0" of the normal gait determined in S224, and the leg mass point vertical positions of a supporting leg and a free leg, which correspond to the values obtained by converting individual foot positions at the start of the normal gait into the values observed from the current time's gait supporting leg coordinate system, into Equation 04. Further, the total center-of-gravity vertical velocity at the start of the normal gait observed from the current time's gait supporting leg coordinate system is determined by substituting the body mass point vertical velocity of the model shown in FIG. 12, which corresponds to the body vertical velocity Vz0" of the normal gait determined in S224, and the leg mass point vertical velocities of a supporting leg and a free leg, which correspond to the values obtained by converting individual foot vertical velocities at the start of the normal gait into the values observed from the current time's gait supporting leg coordinate system, into an equation derived from differentiating both sides of Equation 04. Alternatively, the initial total center-of-gravity vertical position and velocity may be calculated by using a more precise model.

Then, the initial body posture angular velocities of Equations 37a and 37b and the heights of the trapezoids of ZMPrec (the trapezoidal patterns shown in FIG. 30) related to the integration of the second terms of the right sides of Equations 37a and 37b are taken as unknown numbers (However, the times of the break points of the trapezoidal patterns of ZMPrec are determined beforehand. Further, a trapezoidal height acyc1 of ZMPrec of a first turning gait and a trapezoidal height acyc2 of ZMPrec of a second turning gait are set to have the same value.) An initial body posture angular velocity determined by solving the simultaneous equation of Equations 37a and 37b including the unknown numbers is decided as a new initial body posture angular velocity. In this case, the terminal body posture angular velocity in Equation 37b is obtained by coordinate-converting the initial body posture angular velocity, which is an unknown number, into a value observed from a next time's gait supporting leg coordinate system by a matrix based on the above total turning angle of a normal gait.

Terminal total center-of-gravity vertical position−
Initial total center-of-gravity vertical
position=Second order integration of (Floor reaction force vertical component/Total mass of the robot)+Second order integration of acceleration of gravity+Initial total center-of-gravity vertical velocity*Duration of one step    Equation 41a Terminal total center-of-gravity vertical velocity−Initial total center-of-gravity vertical velocity=First order integration of (Floor reaction force vertical component/Total mass of the robot)+First order integration of acceleration of gravity    Equation 41b where the acceleration of gravity takes a negative value.

To be more specific, first, at least two parameters out of the floor reaction force vertical component parameters (e.g., times of break points) that define the floor reaction force vertical component pattern as shown in FIG. 6 are taken as independent unknown variables. The values of the unknown variables are determined by solving a simultaneous equation composed of Equations 41a and 41b.

The floor reaction force vertical component parameters to be selected as the unknown variables may be, for example, the height (the peak value of the floor reaction force vertical component) and the width (duration of single stance period) of the trapezoid shown in FIG. 6. In this case, the slopes of both sides of the trapezoid shown in FIG. 6 take values determined beforehand on the basis of a current time gait cycle or the like, or the values of times of the break points of the floor reaction force vertical component pattern, excluding the time at which a single stance period is switched to a floating period, that has been determined beforehand on the basis of a current time gait cycle or the like. Supplementally, if only one unknown variable is given, then no solution generally exists that satisfies the simultaneous equation of Equations 41a and 41b.

Subsequently, the processing proceeds to S608 wherein a floor reaction force horizontal component permissible range [Fxmin, Fxmax] (to be more specific, the parameters defining the pattern of the floor reaction force horizontal component permissible range) is set in the same manner as that for the first turning gait and the second turning gait of a normal gait. For instance, the floor reaction force horizontal component permissible range is set according to the pattern shown in FIG. 40. In the present reference example, the floor reaction force horizontal component permissible range is set according to the aforesaid Equation 12 on the basis of the floor reaction force vertical component pattern determined previously in S606.

Then, the processing proceeds to S610 wherein a floor reaction force moment vertical component permissible range [Mzmin, Mzmax] (to be more specific, the parameters defining the pattern of the floor reaction force moment vertical component permissible range) is set in the same manner as that for the first turning gait and the second turning gait of a normal gait. For instance, the floor reaction force moment vertical component permissible range is set according to the pattern shown in FIG. 41. In the present reference example, the floor reaction force moment vertical component permissible range is set according to the aforesaid Equation 1012 on the basis of the floor reaction force vertical component pattern determined previously in S606.

Subsequently, the processing proceeds to S612 wherein the ZMP trajectory of the current time gait (specifically, the parameters defining the ZMP trajectory, such as times and positions of break points of the trajectory) is set, as shown in FIG. 7, such that it exhibits a high stability margin and no sudden changes, as in the first turning gait and the second turning gait of a normal gait. The parameters are set such that the ZMP trajectory of the current time gait continuously connects with the ZMP trajectory of the aforesaid normal gait. In other words, the ZMP trajectory parameters are determined so that the ZMP position at the end of the current time gait agrees with the ZMP position at the start of the normal gait. In this case, in a running gait, the times and positions of break points of the ZMP trajectory in a single stance period may be set in the same manner as that for setting the ZMP trajectory parameters of the normal gait described above. And the ZMP trajectory parameters may be set so that a desired ZMP trajectory in a floating period linearly changes in succession from the start of the floating period to the ZMP position at the start of a normal gait.

It should be rioted that the ZMP trajectory parameters of the current time gait determined in S612 are merely temporary, and will be corrected, as it will be discussed hereinafter. For this reason, the ZMP trajectory of the current time gait set as described above will be hereinafter referred to as a provisional desired ZMP trajectory of a current time gait.

Lastly, the processing proceeds to S614 wherein a body posture angle and antiphase arm swing angle restoring period [Ta, Tb] is set. The body posture angle and antiphase arm swing angle restoring start time Ta corresponds to Tm in the second turning gait of a normal gait, while body posture angle and antiphase arm swing angle restoring end time Tb corresponds to Ts2 in the second turning gait of the normal gait. These times Ta and Tb are set in the same manner as that for setting Tm and Ts2.

Returning to the explanation of FIG. 13, after carrying out the processing shown in S026 (the processing for determining the gait parameters of the current time gait) as described above, the program proceeds to S028 wherein the gait parameters (ZMP trajectory parameters) of the current time gait are corrected, and the parameter of the antiphase arm swing angle is determined. In this processing, the ZMP trajectory parameters are corrected so as to make the body position/posture trajectory continue or approximate to a normal gait, and a parameter related to the antiphase arm swing angle of the current time gait is determined to make the antiphase arm swing angle converge to the antiphase arm swing angle trajectory of the normal gait.

Figure 42:
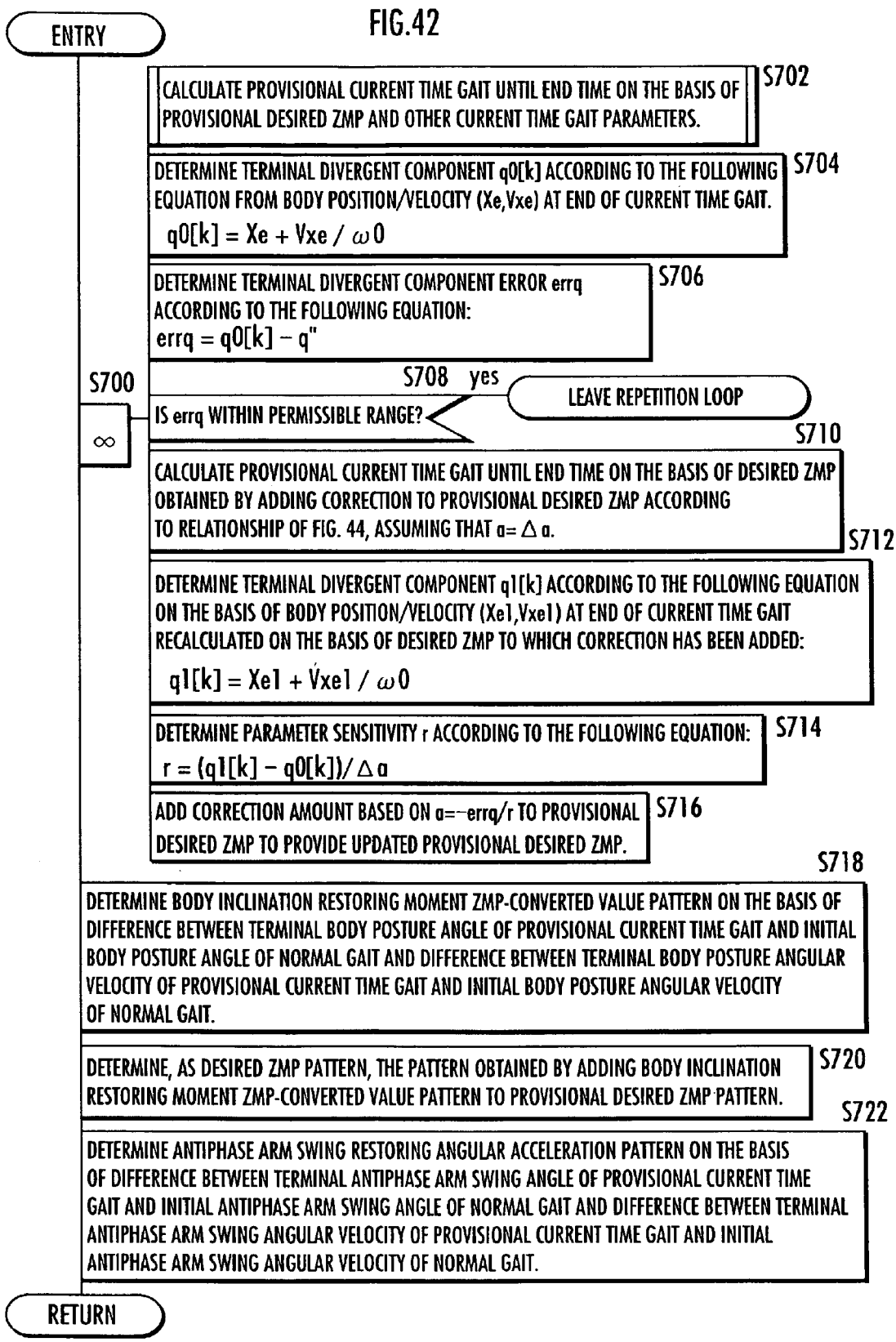
FIG. 42 is a flowchart showing subroutine processing of S028 in FIG. 13.

FIG. 42 shows the subroutine flowchart illustrating the processing.

First, the processing proceeds to S702 via S700 and temporarily generates a provisional current time gait until the time at which the current time gait ends on the basis of a provisional desired ZMP pattern and other current time gait parameters.

Figure 43:
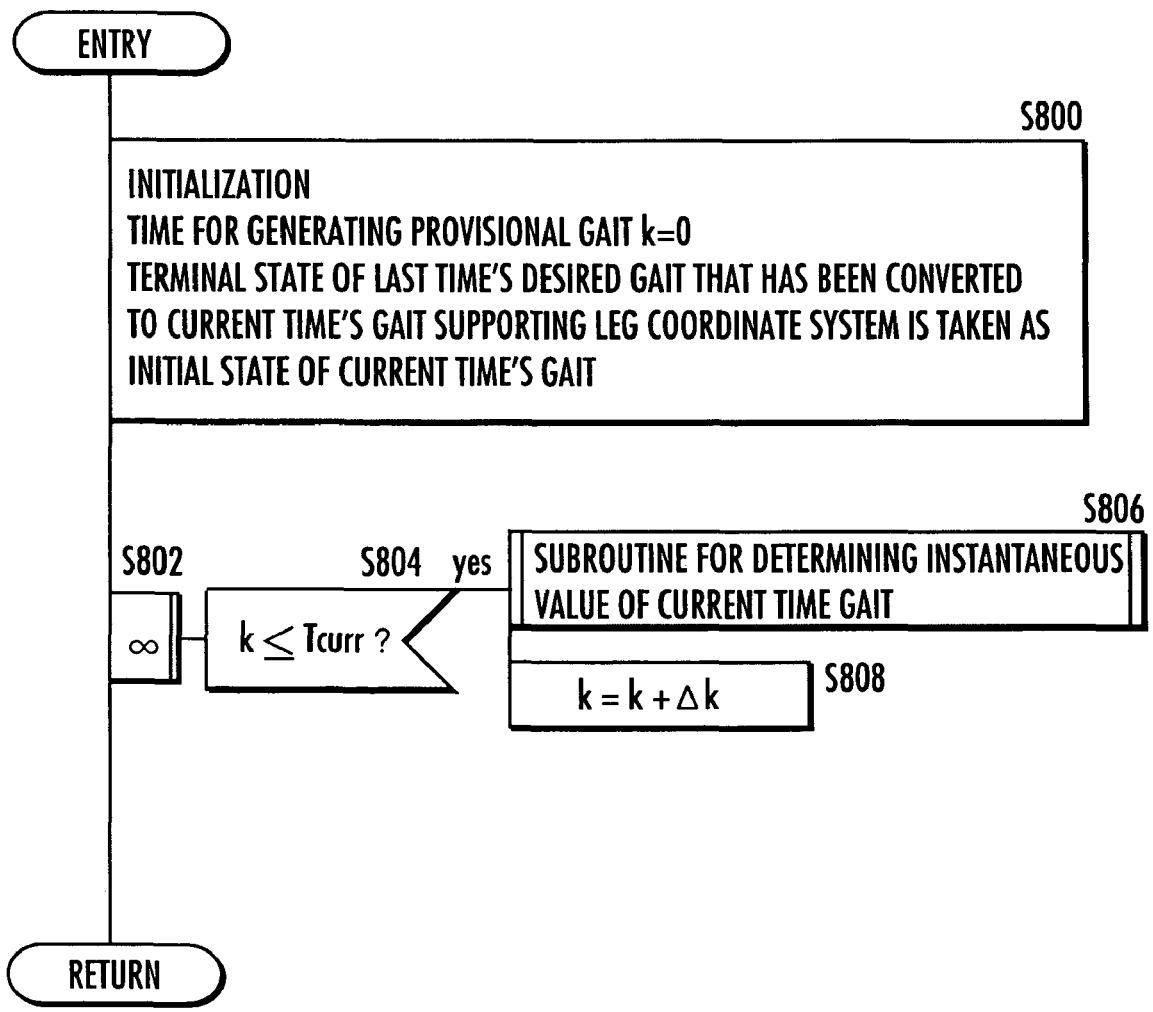
FIG. 43 is a flowchart showing subroutine processing of S702 in FIG. 42.

In S702, the following processing will be carried out according to the flowchart shown in FIG. 43.

The explanation will now be given. In S800, various elements are initialized. Specifically, zero is substituted into time k for generating a provisional gait. Furthermore, the initial state of the current time gait is obtained by converting the terminal state of the last time's desired gait (to be more specific, the end values of the gait states, including a horizontal body position and velocity, a vertical body position and velocity, a body posture angle and its angular velocity, a desired foot position/posture, and a desired arm posture) into a current time's gait supporting leg coordinate system.

Supplementally, the desired arm posture includes desired antiphase arm swing angle and angular velocity.

Subsequently, the processing goes through S802 and proceeds to S804 wherein it is determined whether time k for generating a provisional gait is before current time gait end time Tcurr (whether k≦Tcurr). If the determination result is YES, then the processing proceeds to a current time gait instantaneous value determining subroutine of S806 to determine an instantaneous value of time k of the current time gait. In the gait instantaneous value determining subroutine of S806, a provisional gait is generated as shown in FIG. 25. However, current time gait parameters are used in place of normal gait parameters, as the gait parameters, in the same manner as that of S306 previously described.

Subsequently, the processing proceeds to S808 to increment time k for generating a provisional gait by Δk, and then returns to S804.

If the determination result of S804 is NO, then the processing of the flowchart shown in FIG. 43 is completed.

The processing discussed above generates the provisional current time gait from the start and the end thereof.

Subsequently, the processing proceeds to S704 wherein a terminal divergent component q0[k](k=Tcurr) is determined according to the equation shown in the figure (Equation 10 given above) from the horizontal body position/velocity (Xe, Vxe) at the end of the current time gait determined in S702 as described above.

The proceeding then proceeds to S706 wherein a terminal divergent component error errq, which is the difference between a current time gait end divergent component q0[k] and a normal gait initial divergent component q" (the one determined in S224 of FIG. 23), is determined using the illustrated equation. Further, the processing proceeds to S708 wherein it is determined whether the determined terminal divergent component error errq falls within a permissible range (a range in the vicinity of zero).

If the determination result of S708 is NO, then the processing proceeds to S710 wherein a=Δa (Δa being a predetermined extremely small amount) is set, and a provisional current time gait to the end thereof is calculated, as in the aforesaid S702, on the basis of the desired ZMP obtained by adding a trapezoidal correction to the current provisional desired ZMP pattern according to the relationship shown in FIG. 44. Here, referring to FIG. 44, "a" denotes the height of the trapezoidal pattern for correcting a provisional desired ZMP so as to make the current time gait terminal divergent component agree with the normal gait initial divergent component as much as possible (so as to approximate the horizontal body position/posture trajectory of the current time gait to the horizontal body position/posture trajectory of the normal gait). In this case, in the present reference example, the provisional desired ZMP is corrected during the period in which substantially the entire surface of the sole of the supporting leg foot 22 comes in contact with the ground (the entire-sole-in-contact-with-the-ground period), that is, during the period in which the floor reaction force horizontal component permissible range is sufficiently wide, and the times of the break points of the above trapezoidal pattern are set to balance with the times of the break points of the provisional desired ZMP in the entire-sole-in-contact-with-the-ground period. The setting a=Δa is given in S710 to observe a change in the terminal divergent component error errq when the current provisional desired ZMP trajectory is corrected by an extremely small amount according to the aforesaid trapezoidal pattern.

After generating the provisional current time gait to the end with the provisional desired ZMP trajectory corrected using a=Δa in S710 as described above, the processing further proceeds to S712 wherein a terminal divergent component q1[k] in this provisional current time gait is determined according to the equation shown in the figure (the above Equation 10) on the basis of a horizontal body position/velocity (Xe1, Vxe1) at the end of the provisional current time gait determined in S710.

In S710, Δa has been a constant of an extremely small amount appropriately set in the present reference example. Alternatively, Δa may be set such that Δa decreases as the terminal divergent component error errq is decreased by repeated calculation, which will be explained below. However, even if it is set as a constant, it is possible to maintain the terminal divergent component error errq within a permissible range by performing a few repetitive calculations.

Subsequently, the processing proceeds to S714 wherein a parameter sensitivity r (changing rate of the terminal divergent component error with respect to Δa) is determined according to the equation shown in the figure. The processing further proceeds to S716 wherein the correction amount of the trapezoidal pattern having, as its height a, the value obtained by a=−errq/r, that is, the value obtained by dividing the terminal divergent component error errq determined in S706 by the parameters sensitivity r determined in S714, is added to the provisional desired ZMP pattern according to the relationship shown in FIG. 44, thereby correcting the provisional desired ZMP pattern (a new provisional desired ZMP pattern is determined).

Then, the processing returns to S702. As long as the determination result of S708 is NO, the processing from S702 to S716 described above is repeated. When the determination result of S708 changes to YES, the processing leaves the repetition loop (S700) and moves forward to S718.

In S718, the pattern of the body posture restoring moment ZMP-converted value (ZMPrec) of the current time gait is determined primarily on the basis of the difference between a terminal body posture angle of the provisional current time gait and an initial body posture angle of a normal gait, and the difference between a terminal body posture angular velocity of the provisional current time gait and an initial body posture angular velocity of a normal gait such that the body posture angle trajectory of the current time gait approximates the body posture angle trajectory of the normal gait. The ZMPrec determined here is used for correcting a provisional desired ZMP so that the agreement between the divergent component at the end of the current time gait and the divergent component at the start of the normal gait (the condition in S708) may be maintained even when a body posture angular acceleration is generated to connect (bring close) the body posture angle trajectory to the normal gait in the period, wherein the floor reaction force horizontal component permissible range becomes sufficiently wide (the period in a single stance period), by the processing for generating a current time gait instantaneous value, which will be described hereinafter.

The ZMPrec exhibits a trapezoidal pattern similar to that explained in relation to the processing for generating the normal gait. To be more precise, the ZMPrec is determined as follows. The trapezoidal pattern of the ZMPrec of the current time gait is set in the same manner as that for the trapezoidal pattern of the ZMPrec in the period of the second turning gait shown in FIG. 30, the times (break points) of apexes of the trapezoid being known (more specifically, the times of the break points of the trapezoid are balanced with the break point times of the desired ZMP), and the height of the trapezoid (parameter) of the ZMPrec is determined as described below, taking the height of the trapezoid as an unknown number. In this case, the time at which the trapezoid pattern of the ZMPrec begins to rise is denoted by Ta, and the time at which the trapezoid pattern returns to zero is denoted by Tb.

It is usually impossible to continuously connect both body posture angle and body posture angular velocity to a normal gait at the end of the current time gait if there is only one unknown parameter of the body posture restoring moment ZMP-converted value pattern. For this reason, in the present reference example, an unknown parameter is determined so that the state of a gait generated gradually approximates the state of a normal gait over a plurality of steps.

Supplementally, the ZMPrec pattern in a single gait may be complicated to produce two or more unknown parameters to continuously connect both the body posture angle and the body posture angular velocity to the normal gait at the end of the current time gait. This, however, may lead to a ZMPrec pattern with excessive staggered variation.

The following will explain the principle of calculation and then the procedure of the calculation.

As previously described, the difference between the terminal body posture angle of the provisional current time gait that has been determined with the height of the trapezoid of the ZMPrec pattern being zero in S702 as discussed above and the initial body posture angle of the normal gait is determined, and the determined difference is defined as θerr. Further, the difference between the terminal body posture angular velocity of the provisional current time gait and the initial body posture angular velocity of the normal gait is determined, and the determined difference is denoted by vθerr.

Here, it is assumed that the current time gait is generated, defining the height of the trapezoid of the ZMPrec pattern as a certain value bcurr, and then the first turning gait is generated by the same algorithm as that of the current time gait. It is assumed that the body posture restoring moment ZMP-converted value ZMPrec pattern of the first turning gait is based on the sum of the ZMPrec pattern of the first turning gait (the trapezoidal pattern shown in FIG. 30, the height of which is acyc1 as mentioned above), determined in S310 of FIG. 24 and a certain value b1.

The gait generated as described above is referred to as a ZMPrec corrected gait, and its end (the end of the first turning gait) body posture angle and angular velocity are denoted by θ1 and vθ1, respectively.

The body posture angle and angular velocity at the end of the first turning gait are denoted by θ1org and vθ1org, respectively, of the original normal gait determined at the point when the subroutine processing for determining the initial state of the normal gait in S024 is completed (the normal gait in a case where the body posture angle and angular velocity at the start of the normal gait finally determined in S310 are taken as the initial values, and the ZMPrec pattern is the pattern determined in S310 (the trapezoidal pattern shown in FIG. 30, the height thereof being acyc1)).

Here, $\Delta\theta1$ and $\Delta v\theta1$ are defined as follows:

$$\Delta\theta1 = \theta1org \quad \text{Equation 50}$$

$$\Delta v\theta1 = v\theta1 - v\theta1org \quad \text{Equation 51}$$

$\Delta\theta1$ and $\Delta v\theta1$ mean the differences in body posture angle and angular velocity, respectively, between the corrected ZMPrec gait and the original normal gait at the point when these two gaits have been generated to the end of the first turning gait. If $\Delta\theta1$ and $\Delta v\theta1$ are zero, then the second turning gait generated according to the same algorithm as that of the current time gait, setting the height of the trapezoid of the ZMPrec pattern as acyc2, and following the corrected ZMPrec, will agree with the original normal gait.

Thus, the height bcurr of the trapezoid of the current time gait and the height b1 of the trapezoid of the first turning gait at which $\Delta\theta1$ and $\Delta v\theta1$ reach zero may be determined, and the determined bcurr may be taken as the finally determined height of the trapezoid of the current time gait.

The dynamic model related to the body posture angle of the robot 1 has the linear characteristic represented by flywheels FHx and FHy shown in FIG. 12. Hence, $\Delta\theta1$ and $\Delta v\theta1$ share the relationships shown below with the height bcurr of the trapezoid of the current time gait, the height b1 of the trapezoid of the first turning gait, the difference θerr between the terminal body posture angle of the provisional current time gait and the initial body posture angle of the normal gait, and the difference vθerr between the terminal body posture angular velocity of the provisional current time gait and the initial body posture angular velocity of the normal gait.

$$\Delta\theta1 = c11*bcurr + c12*b1 + \theta err + e1*v\theta err \quad \text{Equation 52}$$

$$\Delta v\theta1 = c21*bcurr + c22*b1 + e2*v\theta err \quad \text{Equation 53}$$

where c11, c12, c21, c22, e1, and e2 are coefficients uniquely determined primarily by the gait cycles of a current time gait and a first turning gait and the parameters (particularly the parameters related to time) of a body posture restoring moment ZMP-converted value ZMPrec pattern.

Based on the aforementioned principle, the calculation procedure first determines the body posture angle difference θerr and the angular velocity difference Vθerr in the boundary between the provisional current time gait and the normal gait.

Then, the coefficients c11, c12, c21, c22, e1, and e2 of Equations 52 and 53 are determined primarily on the basis of the gait cycles of a current time gait and a first turning gait and the parameters (particularly the parameters related to time) of a body posture restoring moment ZMP-converted value ZMPrec pattern.

Next, the height bcurr of the trapezoid of the current time gait and the height b1 of the trapezoid of the first turning gait are determined such that the right sides of Equations 52 and 53 become zero. In other words, bcurr and b1 are determined by solving the simultaneous equation having the left sides of Equation 52 and Equation 53 set to zero.

Lastly, the height of the trapezoid of the trapezoidal pattern of the body posture restoring moment ZMP-converted value (ZMPrec) of the current time gait is set to the height bcurr of the trapezoid of the above determined current time gait.

Subsequently, the processing proceeds to S720 wherein the pattern obtained by adding the body posture restoring moment ZMP-converted value pattern determined as described above in relation to S718 to the current provisional desired ZMP pattern (the provisional desired ZMP pattern when the processing leaves the repetition loop of S700) is determined as the desired ZMP pattern of the current time gait. This processing is the same as the processing for adding the trapezoidal pattern having the height of $\Delta a$ in S710 to the provisional desired ZMP pattern.

The following will describe the reason for adding the body posture restoring moment ZMP-converted value pattern to the provisional desired ZMP pattern.

The provisional current time gait generated in the loop of S700 is generated by setting the body posture restoring moment ZMP-converted value ZMPrec to zero (by setting the height parameter of the trapezoidal pattern of ZMPrec to zero). In the provisional current time gait finally generated in the loop of S700, the body position/velocity continues to or approximates a normal gait, whereas the body posture angle deviates from the body posture angle of the normal gait and undesirably diverts in some cases.

The body posture restoring moment ZMP-converted value pattern determined in S718 is used to generate a body posture angular acceleration for approximating a deviation of a body posture angle with respect to a normal gait to zero.

If, however, a body posture angular acceleration based on the body posture restoring moment ZMP-converted value pattern determined in S718 is generated without correcting the provisional desired ZMP pattern finally obtained in the loop of S700, then the horizontal body position trajectory has to be deviated from a horizontal body position trajectory of the above provisional current time gait in order to satisfy the dynamic balance condition (the moment in which the resultant force of the gravity and the inertial force of the robot acting on the desired ZMP, excluding a vertical component, is zero). For this reason, in the present reference example, the provisional desired ZMP pattern is corrected by ZMPrec in order to obviate the need for deviation of the horizontal body position trajectory from the one finally obtained in the loop of S700.

If a body posture angular acceleration based on the body posture restoring moment ZMP-converted value pattern determined in S718 is generated in addition to the motion of the above provisional current time gait, then the ZMP (the point at which the moment of the resultant force of the gravity and the inertial force produced by a motion, excluding vertical component, reaches zero) deviates by the body posture restoring moment ZMP-converted value. Conversely, therefore, by using the pattern, which is obtained by adding the body posture restoring moment ZMP-converted value pattern to a provisional desired ZMP pattern, as a desired ZMP pattern, the same body translational motion as that of the above provisional current time gait can be obtained by generating the current time gait that satisfies the desired ZMP pattern while generating a body posture angular acceleration of the body inclination mode based on the body posture restoring moment ZMP-converted value pattern determined in S718.

The above is the reason why the pattern obtained by adding the body posture restoring moment ZMP-converted value pattern to the provisional desired ZMP pattern is used as the desired ZMP pattern.

Subsequently, the processing proceeds to S722 wherein an antiphase arm swing restoring angular acceleration pattern is determined such that the antiphase arm swing angle trajectory approximates to the antiphase arm swing angle trajectory of a normal gait on the basis of the difference between the terminal antiphase arm swing angle of the provisional current time gait and the initial antiphase arm swing angle of the normal gait and the difference between the terminal antiphase arm swing angular velocity of the provisional current time gait and the initial antiphase arm swing angular velocity of the normal gait. The method for determining the pattern is almost the same as the method for determining the body posture restoring moment ZMP-converted value pattern in S718, except that variable names are different as shown below:
Body posture restoring moment ZMP-converted value pattern→Antiphase arm swing restoring angular acceleration pattern
Horizontal component→Moment vertical component This will be explained in detail below. The antiphase arm swing restoring angular acceleration pattern is used in the processing for generating a current time gait instantaneous value, which will be discussed hereinafter, to make a correction so as to connect (approximate) the antiphase arm swing angle trajectory to the normal gait in the period wherein the floor reaction force moment vertical component permissible range becomes sufficient wide (a single stance period).

The antiphase arm swing restoring angular acceleration pattern is a trapezoidal pattern similar to that explained in relation to the processing for generating the normal gait. To be more precise, the antiphase arm swing restoring angular acceleration pattern is determined as follows. The trapezoidal pattern of the antiphase arm swing restoring angular acceleration of the current: time gait is set in the same manner as that for the trapezoidal pattern of the antiphase arm swing restoring angular acceleration pattern in the period of the second turning gait shown in FIG. 36, the times (break points) of apexes of the trapezoid being known (more specifically, the times of the break points of the trapezoid are matched to the break point times of the desired ZMP), and the height of the trapezoid (parameter) of the antiphase arm swing restoring angular acceleration is determined as described below, taking the height of the trapezoid as an unknown number. In this case, the time at which the trapezoid pattern of the antiphase arm swing restoring angular acceleration begins to rise is denoted by Ta, and the time at which the trapezoid pattern returns to zero is denoted by Tb.

It is usually impossible to continuously connect both antiphase arm swing angle and antiphase arm swing angular velocity to a normal gait at the end of the current time gait if there is only one unknown parameter of the antiphase arm swing restoring angular acceleration pattern. For this reason, in the present reference example, an unknown parameter is determined so that the state of a gait generated gradually approximates the state of a normal gait over a plurality of steps.

Supplementally, the antiphase arm swing restoring angular acceleration pattern in a single gait may be complicated to produce two or more unknown parameters to continuously connect both the antiphase arm swing angle and antiphase arm swing angular velocity to the normal gait at the end of the current time gait. This, however, may lead to an antiphase arm swing restoring angular acceleration pattern with excessive staggered variation.

As previously described, the difference between the terminal antiphase arm swing angle of the provisional current time gait that has been determined with the height of the trapezoid of the antiphase arm swing restoring angular acceleration pattern set to zero in S702 as discussed above and the initial antiphase arm swing angle of the normal gait is determined, and the determined difference is defined as θazerr. Further, the difference between the terminal antiphase arm swing angular velocity of the provisional current time gait and the initial antiphase arm swing angular velocity of the normal gait is determined, and the determined difference is denoted by vθzerr.

Here, it is assumed that the current time gait is generated, defining the height of the trapezoid of the antiphase arm swing restoring angular acceleration pattern as a certain value bzcurr, and then the first turning gait is generated by the same algorithm as that of the current time gait. It is assumed that the antiphase arm swing restoring angular acceleration pattern of the first turning gait is based on the sum of the antiphase arm swing restoring angular acceleration pattern (the trapezoidal pattern shown in FIG. 36, the height of which is azcyc1 as mentioned above), determined in S314 of FIG. 24 and a certain value bz1.

The gait generated as described above is referred to as an antiphase arm swing restoring angular acceleration corrected gait, and its end (the end of the first turning gait) antiphase arm swing angle and angular velocity are denoted by θz1 and vθz1, respectively.

The antiphase arm swing angle and angular velocity at the end of the first turning gait are denoted by θz1org and vθz1org, respectively, of the original normal gait determined at the point when the subroutine processing for determining the initial state of the normal gait in S024 is completed (the normal gait in a case where the antiphase arm swing angle and angular velocity at the start of the normal gait finally determined in S314 are taken as the initial values, and the antiphase arm swing restoring angular acceleration pattern is the pattern determined in S314 (the trapezoidal pattern shown in FIG. 36, the height thereof being azcyc1)).

Here, $\Delta\theta z1$ and $\Delta v\theta z1$ are defined as follows:

$$\Delta\theta z1 = \theta z1 - \theta z1 \text{org} \qquad \text{Equation 1050}$$

$$\Delta v\theta z1 = v\theta z1 - v\theta z1 \text{org} \qquad \text{Equation 1051}$$

$\Delta\theta z1$ and $\Delta v\theta z1$ mean the differences in antiphase arm swing angle and angular velocity, respectively, between the corrected antiphase arm swing restoring angular acceleration gait and the original normal gait at the point when these two gaits have been generated to the end of the first turning gait. If $\Delta\theta z1$ and $\Delta v\theta z1$ are zero, then the second turning gait generated according to the same algorithm as that of the current time gait, setting the height of the trapezoid of the antiphase arm swing restoring angular acceleration pattern as azcyc2, and following the corrected antiphase arm swing restoring angular acceleration gait, will agree with the original normal gait.

Thus, the height bzcurr of the trapezoid of the current time gait and the height bz1 of the trapezoid of the first turning gait at which $\Delta\theta z1$ and $\Delta v\theta z1$ reach zero may be determined, and the determined bzcurr may be taken as the finally determined height of the trapezoid of the current time gait.

The dynamic model related to the antiphase arm swing angle of the robot 1 has the linear characteristic represented by a flywheel FHaz shown in FIG. 12. Hence, $\Delta\theta z1$ and $\Delta v\theta z1$ share the relationships shown below with the height bzcurr of the trapezoid of the current time gait, the height bz1 of the trapezoid of the first turning gait, the difference θzerr between the terminal antiphase arm swing angle of the provisional current time gait and the initial antiphase arm swing angle of the normal gait, and the difference v$\theta$zerr between the terminal antiphase arm swing angular velocity of the provisional current time gait and the initial antiphase arm swing angular velocity of the normal gait.

$$\Delta\theta z1 = cz11*bzcurr + cz12*bz1 + \theta zerr + ez1*v\theta zerr \quad \text{Equation 1052}$$

$$\Delta v\theta z1 = cz21*bzcurr + cz22*bz1 + ez2*v\theta zerr \quad \text{Equation 1053}$$

where cz11, cz12, cz21, cz22, ez1, and ez2 are coefficients uniquely determined primarily by the gait cycles of a current time gait and a first turning gait and the parameters (particularly the parameters related to time) of an antiphase arm swing restoring angular acceleration pattern.

Based on the aforementioned principle, the calculation procedure first determines the antiphase arm swing angle difference $\theta$zerr and the angular velocity difference V$\theta$zerr in the boundary between the provisional current time gait and the normal gait.

Then, the coefficients cz11, cz12, cz21, cz22, ez1, and ez2 of Equations 1052 and 1053 are determined primarily on the basis of the gait cycles of a current time gait and a first turning gait and the parameters (particularly the parameters related to time) of an antiphase arm swing restoring angular acceleration pattern.

Next, the height bzcurr of the trapezoid of the current time gait and the height bz1 of the trapezoid of the first turning gait are determined such that the right sides of Equations 1052 and 1053 become zero. In other words, bzcurr and bz1 are determined by solving the simultaneous equation having the left sides of Equation 1052 and Equation 1053 set to zero.

Lastly, the height of the trapezoid of the trapezoidal pattern of the antiphase arm swing restoring angular acceleration of the current time gait is set to the height bzcurr of the trapezoid of the above determined current time gait.

Returning to FIG. 13, after the current time gait parameters are corrected in S028 described above or if the determination result in S016 is NO, then the processing proceeds to S030 to determine a current time gait instantaneous value.

In S030, the subroutine processing shown in FIG. 45 is carried out.

Figure 46:
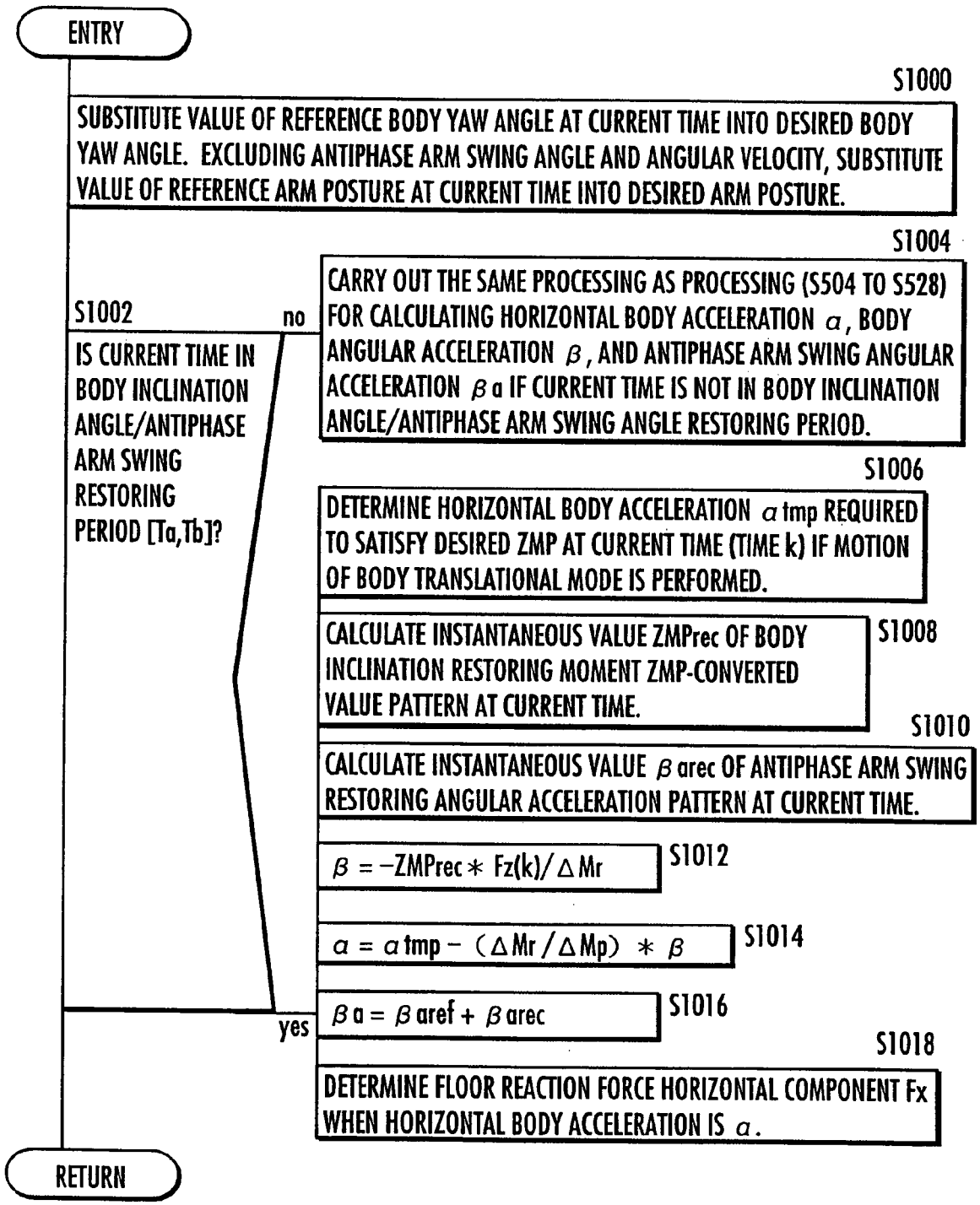
FIG. 46 is a flowchart showing subroutine processing of S1412 in FIG. 45.
Figure 47:
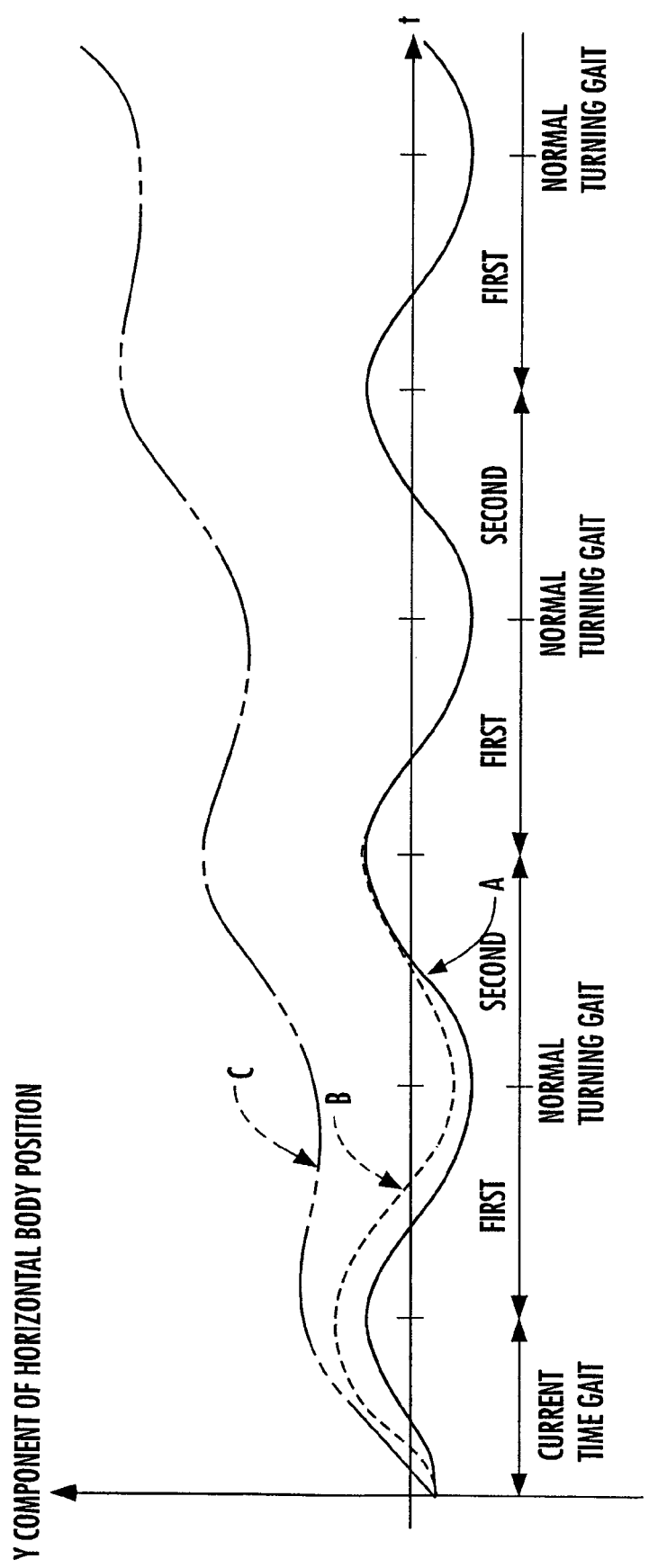
FIG. 47 is a graph showing a relationship between normal gaits and desired gaits relative to body position trajectories.

The same processing as that from S400 to S411 of FIG. 25 is carried out from S1400 to S1411 of FIG. 45, and then the processing from S1000 to S1018 of FIG. 46, which is a subroutine of S1412, is carried out.

To be specific, first, in S1000, the value of the reference body yaw angle at the current time is substituted into the desired body yaw angle. Further, the value of a reference arm posture at the current time is substituted into the desired arm posture, excluding the arm posture antiphase arm swing angle and the angular velocity.

Then, the processing proceeds to S1002 wherein it is determined whether the current time is in the period of restoring a body posture angle and an antiphase arm swing angle (the period from time Ta to time Tb). The processing proceeds to S1004 if the determination result of S1002 is NO, or to S1006 if the determination result is YES.

In S1004, the same processing as that for calculating the body horizontal acceleration $\alpha$, the body angular acceleration $\beta$, and the antiphase arm swing angular acceleration $\beta$a (from S504 to S528 of FIG. 26) in a period other than the body inclination angle/antiphase arm swing angle restoring period is carried out.

In the case where the processing proceeds to S1006, the body horizontal acceleration $\alpha$tmp, which is required to satisfy the current time (time k) desired ZMP if a motion of the body translational mode is to be performed, is determined in S1006.

Then, the processing proceeds to S1008 wherein the instantaneous value ZMPrec of a body inclination restoring moment ZMP-converted value pattern at the current time is calculated on the basis of the parameters related to the body inclination restoring moment ZMP-converted value pattern determined in S718.

The processing proceeds to S1010 wherein an instantaneous value $\beta$arec of the antiphase arm swing restoring angular acceleration pattern at the current time is calculated on the basis of the parameters related to the antiphase arm swing restoring angular acceleration pattern determined in S722.

Subsequently, the processing proceeds to S1012 wherein the body angular acceleration (body inclination angular acceleration) $\beta$ of the body inclination mode is determined according to the equation shown in the figure.

Subsequently, the processing proceeds to S1014 wherein the body horizontal acceleration a is determined according to the equation shown in the figure.

Subsequently, the processing proceeds to S1016 wherein the sum of the instantaneous value $\beta$arec of an antiphase arm swing restoring angular acceleration pattern calculated in S1010 and a reference antiphase arm swing angular acceleration $\beta$aref (a value obtained by subjecting a reference antiphase arm swing angle to second order differentiation) is substituted into a desired antiphase arm swing angular acceleration $\beta$a.

Subsequently, the processing proceeds to S1018 wherein a floor reaction force horizontal component Fx when the body horizontal acceleration is $\alpha$ is determined.

Subsequently, the processing proceeds to S1414 wherein the body horizontal acceleration and the body posture angular acceleration are integrated to calculate a body horizontal velocity and a body posture angular velocity (body inclination angular velocity). The calculated result is further integrated to determine a horizontal body position and a body posture (the body inclination angle). A body yaw angle in the body posture is determined by a reference body yaw angle in the present reference example.

Subsequently, the processing proceeds to S1416 wherein the antiphase arm swing acceleration is integrated to calculate an antiphase arm swing angular velocity. The calculation result is further integrated to determine an antiphase arm swing angle.

Thus, the processing of S030 of FIG. 13 is completed.

Subsequently, the processing proceeds to S032 wherein time t for generating a gait is incremented by $\Delta$t, and returns to S014 to continue to generate gaits as described above.

The above is the processing for generating desired gaits in the gait generator 100.

The operation of the gait generator 100 according to the present reference example will be further explained with reference to FIG. 4. In the gait generator 100, a desired gait is generated as described above. In the generated desired gait, a desired body position posture (trajectory) and a desired arm posture (trajectory) are sent out to a robot geometric model (an inverse kinematics calculator) 102.

A desired foot position/posture (trajectory), a desired ZMP trajectory (desired total floor reaction force central point trajectory), and a desired total floor reaction force (trajectory) (a desired floor reaction force horizontal component and a desired floor reaction force vertical component) are sent to a composite-compliance operation determiner 104 and also to a desired floor reaction force distributor 106. In the desired floor reaction force distributor 106, the floor reaction force is distributed to the feet 22R and 22L, and a desired floor reaction force central point of each foot and a desired floor reaction force of each foot are determined. The determined desired floor reaction force central point of each foot and the desired floor reaction force of each foot are sent to the composite-compliance operation determiner 104.

A corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates joint displacement commands (values) of twelve joints (10R(L), etc.) of the legs 2, 2 that satisfy them and sends the calculated commands to a displacement controller 108. The displacement controller 108 performs follow-up control on the displacements of the twelve joints of the robot 1, using the joint displacement commands (values) calculated by the robot geometric model 102 as desired values. In addition, the robot geometric model 102 calculates arm joint displacement commands (values) that satisfy the desired arm postures and sends the calculated commands to the displacement controller 108. The displacement controller 108 performs follow-up control on the displacements of the twelve joints of the arms of the robot 1, using the joint displacement commands (values) calculated by the robot geometric model 102 as desired values.

A floor reaction force generated in the robot 1 (more specifically, an actual floor reaction force of each foot) is detected by a six-axis force sensor 50. The detected value is sent to the composite-compliance operation determiner 104.

In the actual body posture angular error (the difference between the desired body posture and an actual body posture (the actual posture of the body 3)) occurring in the robot 1, posture inclination angle errors θerrx and θerry (specifically, the error of the inclination angle of an actual body posture relative to the vertical direction with respect to the inclination angle of a desired body posture relative to the vertical direction, a posture inclination angle error in the roll direction (about the X-axis) being θerrx, and a posture inclination angle error in the pitch direction (about the Y-axis) being θerry) is detected via a posture sensor 54, and the detected value is sent to a posture inclination stabilization control calculator 112. The posture inclination stabilization control calculator 112 calculates the horizontal component of a compensating total floor reaction force moment about a desired total floor reaction force central point (desired ZMP) for restoring the actual body inclination angle of the robot 1 to the desired body posture angle, and sends it to the composite-compliance operation determiner 104.

More specifically, in the present reference example, a compensating total floor reaction force moment horizontal component Mdmdxy is determined according to the following equation by using, for example, PD control law:

Compensation total floor reaction force moment horizontal component $Mdmdxy = K\theta b$*Body posture inclination angle error+$K\omega b$*Body posture inclination angular velocity error  d25 where $K\theta b$ and $K\omega b$ are predetermined gains. The body posture inclination angular velocity error is a temporal differential value of the body posture inclination angle error, and means an error of an actual body posture inclination angular velocity with respect to a desired body posture inclination angular velocity. The body posture inclination angle error is, more specifically, a vector composed of a posture inclination angle error of the body 3 of the robot 1 in the roll direction (about the X-axis) and a posture inclination angle error thereof in the pitch direction (about the Y-axis).

Furthermore, a yaw angle error θerrz in the above actual body posture angle error occurring in the robot 1 (more specifically, the posture angle error in the yaw direction (about the Z-axis) in the actual body posture angle error is θerrz) is detected through the intermediary of the posture sensor 54, and the detected value is sent to a yaw stabilization control calculator 113. The yaw stabilization control calculator 113 calculates the vertical component of the compensating total floor reaction force moment about a desired total floor reaction force central point (desired ZMP) for converging an actual body yaw angle and/or an angular velocity of the robot 1 to a desired body yaw angle and/or an angular velocity, and sends it to the composite-compliance operation determiner 104. The composite-compliance operation determiner 104 corrects the desired floor reaction force on the basis of the input value. Specifically, the desired floor reaction force is corrected such that the compensating total floor reaction force moment acts about the desired total floor reaction force central point (desired ZMP)

More specifically, in the present reference example, a compensating total floor reaction force moment vertical component Mdmdz is determined according to the following equation by using, for example, the PD control law:

Compensation total floor reaction force moment vertical component $Mdmdz = K\theta bz$*Body yaw angle error+$K\omega bz$*Body yaw angular velocity error  d26 where $K\theta bz$ and $K\omega bz$ are predetermined gains. The body yaw angular velocity error is a temporal differential value of the body yaw angle error, and means an error of an actual body yaw angular velocity with respect to a desired body yaw angular velocity.

Supplementally, when the compensating total floor reaction force moment vertical component Mdmdz is determined according to the Equation d26 given above, $K\theta bz$ is set to zero if the purpose is merely to prevent a rotational slippage about the vertical axis or a vibration about the vertical axis between the feet 22 and a floor. This is because an attempt to approximate also the body yaw angle error to zero tends to cause an increase in an actual floor reaction force moment vertical component.

The composite-compliance operation determiner 104 corrects the desired floor reaction force on the basis of the input value. Specifically, the desired floor reaction force moment horizontal component is corrected such that the compensating total floor reaction force moment horizontal component acts about the desired total floor reaction force central point (desired ZMP). In addition, the desired floor reaction force moment vertical component is corrected by adding the compensating total floor reaction force moment vertical component to the desired floor reaction force vertical component about the desired total floor reaction force central point (desired ZMP) that dynamically balances with the desired gait.

The composite-compliance operation determiner 104 determines the aforesaid corrected desired foot position/posture (trajectory) with deformation compensation such that the state of the actual robot 1 and the floor reaction force calculated from sensor detection values or the like agree with the corrected desired floor reaction force. It is actually impossible, however, to make every state agree with a desired state, so that a trade-off relationship is established therebetween to make them compromisingly agree with each other as much as possible. More specifically, control errors with respect to desired values are weighted, and control is carried out to minimize the weighting average of control errors (or squares of control errors). With this arrangement, the control is conducted such that actual foot position/posture and a total floor reaction force almost follow desired foot position/posture and a desired total floor reaction force.

The main point of the present invention is the generation of gaits of the robot 1 by the gait generator 100, and the construction and operation of the composite-compliance operation determiner 104 or the like described above are disclosed in detail primarily in Japanese Unexamined Patent Application Publication No. 11-300661 previously applied by the present applicant; therefore, no more explanation will be given.

In S028, as previously discussed, the current time gait parameters are corrected such that a terminal divergent component of the current time gait agrees with q", which is a value obtained by observing an initial divergent component q[0] of a normal turning gait from the current time's gait supporting leg coordinate system.

Actually, the divergent component is an indicator for assessing whether the horizontal body position of a generated gait converges to a normal turning gait when the gait is generated on the basis of current time gait parameters by using a dynamic model and the gait is repeatedly generated in succession on the basis of normal turning gait parameters. Basically, the divergent component must be defined so that a terminal divergent component of the current time gait agrees with q", which is a value obtained by observing a normal turning initial divergent component q[0] from the current time's gait supporting leg coordinate system at convergence.

The divergent component defined by Equation 10 is actually a divergent component that approximately satisfies the aforesaid properties.

Hence, in the present reference example, it may be said that the current time gait parameters have been corrected so that the horizontal body position of a generated gait converges (approximates) to the horizontal body position of a normal turning gait when the gait is generated on the basis of current time gait parameters by using a dynamic model and the gait is repeatedly generated in succession on the basis of normal turning gait parameters.

This is the same as that disclosed in PCT publication of unexamined application WO/02/40224.

Especially in the present reference example, the desired ZMP pattern of the gait parameters of the current time gait has been corrected so as to satisfy the condition (the current time gait approximating to the normal gait). This will be explained with reference to FIG. 47. The trajectory indicated by reference mark B in the figure shows the horizontal body position trajectory generated so that divergent components agree at a gait boundary, as described above.

The trajectory indicated by reference mark A in the figure shows the horizontal body position trajectory obtained when a current time gait is generated so that horizontal body positions/velocities at boundaries of normal turning gaits agree, and then a normal gait is repeatedly generated.

As shown in the figure, the trajectory indicated by reference mark B generally deviates from the trajectory indicated by reference mark A at the boundary of the current time gait and a first normal turning gait. Thereafter, however, the trajectory indicated by reference mark B gradually converges to (approximates) the trajectory indicated by reference mark A and substantially agrees with the trajectory indicated by reference mark A in the next normal turning gait period. Thus, the gait generating technique for making only the divergent components agree at a gait boundary also permits the prevention of gait divergence, as the gait generating technique for making both position and velocity agree at a gait boundary.

The example indicated by reference mark C in the figure shows an example wherein a trajectory has been generated without considering them. In such a case, the generated trajectory diverges as time elapses. It is of course possible to complicate a desired ZMP pattern and a plurality of parameters is adjusted to make both position and velocity agree. This, however, may lead to a staggered desired ZMP pattern. Incidentally, if both position and velocity agree, then divergent components also agree, so that the method for making both position and velocity agree may be said to be a special example of the method for making divergent components agree.

Furthermore, in the present reference example, it may be said that the current time gait parameters have been corrected so that the body posture angle of a generated gait converges (approximates) to or agrees with the body posture angle of a normal turning gait when the gait is generated on the basis of current time gait parameters by using a dynamic model and the gait is repeatedly generated in succession on the basis of normal turning gait parameters. However, strictly speaking, only the first turning gait immediately following the current time gait must be a gait that has been corrected by the heights b1 and bz1 of the trapezoid of the first turning gait determined as described above. In other words, if the gait combining the current time gait and the first turning gait is regarded as the current time gait, then it may be said in the present reference example that the current time gait parameters have been corrected such that the body posture angle of the generated gait converges to (approximates) or agrees with the body posture angle of the normal gait composed of a second turning gait and the first turning gait.

A few modifications of the present reference example will be explained below. The modifications explained below apply to the embodiments, which will be discussed hereinafter.

In the present reference example, for easier understanding, it has been arranged so that the floor reaction force horizontal component permissible range can be independently set for the longitudinal direction (X-axis direction) component and the lateral direction (Y-axis direction) component. More slippage-resistant gaits are generated by representing it by a relational expression of the longitudinal direction and the lateral direction.

For instance, a so-called friction circle shown by the following equation may be used as a permissible range.

$$(X \text{ component of floor reaction force horizontal component})*(X \text{ component of floor reaction force horizontal component})+(Y \text{ component of floor reaction force horizontal component})*(Y \text{ component of floor reaction force horizontal component}) \leq (ka*\mu*Fz)*(ka*\mu*Fz) \quad \text{Equation 59}$$

where Fz denotes a desired floor reaction force vertical component, μ denotes a frictional coefficient, and ka denotes a positive constant of 1 or less.

However, if the floor reaction force horizontal component permissible range is represented by the relational expression of the longitudinal direction and the lateral direction, as described above, then it is necessary to simultaneously or alternately determine a motion on a sagittal plane and a motion on a lateral plane so as to simultaneously or alternately satisfy the permissible range.

A permissible range composed of a set of a floor reaction force horizontal component and a floor reaction force moment vertical component may be set instead of setting the floor reaction force horizontal component permissible range and the floor reaction force moment vertical component permissible range separately, as described above. As the floor reaction force horizontal component increases, the friction limit of a floor reaction force moment vertical component diminishes. Further, as the floor reaction force moment vertical component increases, the friction limit of the floor reaction force horizontal component diminishes. Taking this into account, therefore, setting a permissible range composed of the set of a floor reaction force horizontal component and a floor reaction force moment vertical component makes it possible to set a permissible range that is closer to an actual friction limit characteristic. Specifically, a permissible range may be set for a weighed average of an absolute value of a floor reaction force horizontal component and an absolute value of a floor reaction force moment vertical component.

In the present reference example, two motion modes, namely, the body inclination mode and the body translational mode, have been used to obtain proper values for the floor reaction force horizontal component and the floor reaction force moment horizontal component about a desire ZMP; however, motion modes other than these may be used.

Figure 48:
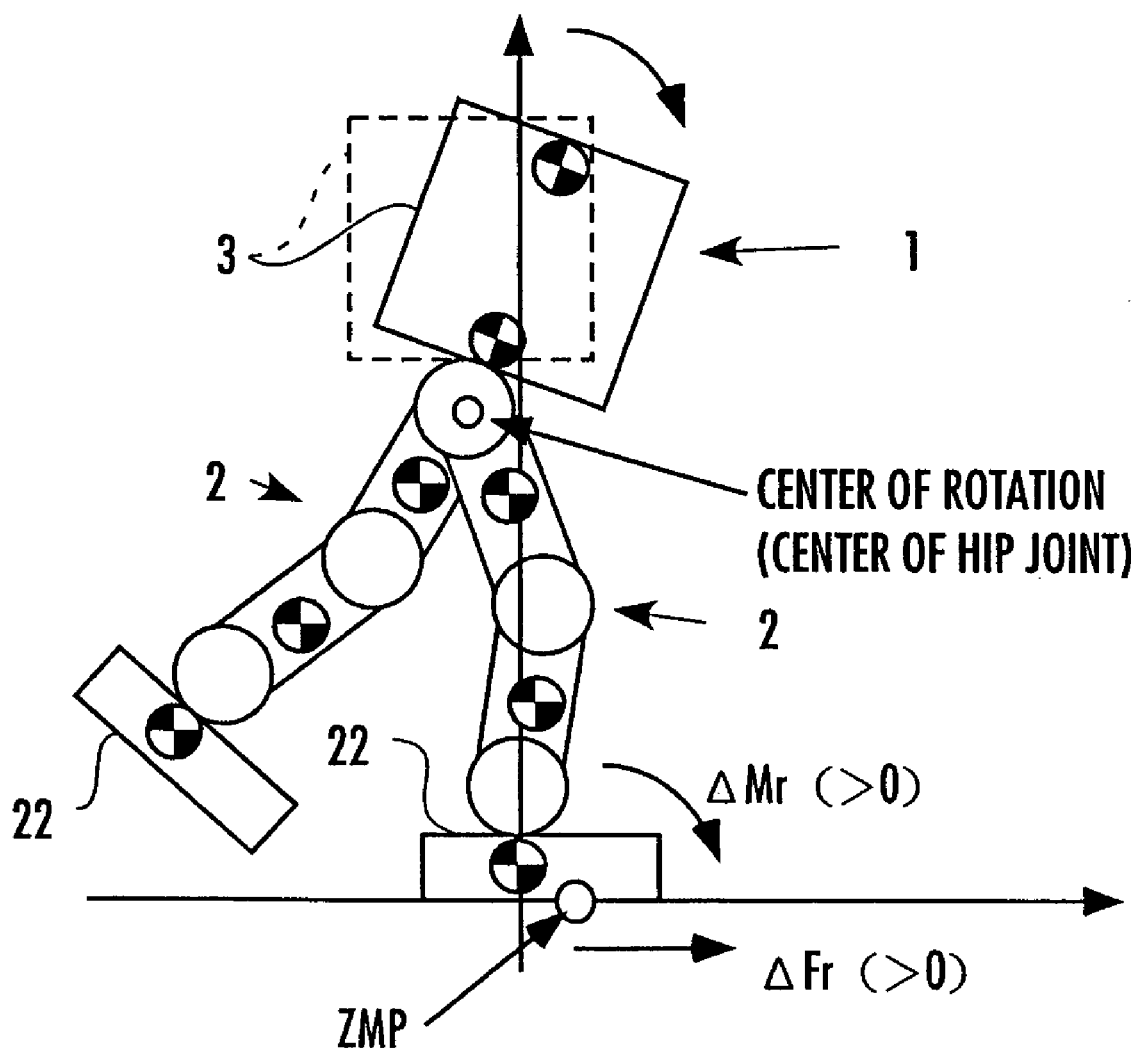
FIG. 48 is a diagram showing another example of a body inclination mode (body inclination about waist)

For example, as shown in FIG. 48, when the body posture is turned with the hip joints being as the turning center, the angular momentum about the total center of gravity changes and the total center of gravity also changes. Overlapping (combining) this motion and the above-mentioned body translational mode at a predetermined ratio produces almost the same motion as that of the body inclination mode, and the floor reaction force horizontal component is no longer generated. Hence, if this is regarded again as the body inclination mode, then a similar gait can be generated according to the algorithm of the present reference example.

Thus, it is not required that one of the motion modes is a motion mode that does not produce a floor reaction force horizontal component. This is because any floor reaction force horizontal component and a floor reaction force cement about a desired ZMP can be generated as in the aforesaid example by any combination of modes as long as two motion modes having different generation ratios of a floor reaction force horizontal component and a floor reaction force moment about a desired ZMP are used.

A motion mode other than the motion mode that changes a body posture may be used. It is preferable, however, to select a motion mode that allows a large floor reaction force horizontal component or a floor reaction force moment about a desired ZMP to be generated in response to a minimized displacement.

For example, a motion mode for swinging the distal positions of right and left arms in the same direction, or a motion mode for perturbating the position of a foot not in contact with the ground (existing in the air) may be selected. However, when perturbating a free leg trajectory, the amount of perturbation should be return to virtually zero by the time immediately before landing so that a landing position will not change. It is of course possible to combine the motion mode for swinging the distal positions of right and left arms in the same direction and an antiphase arm swing mode.

Further alternatively, three or more motion modes may be used.

In at least two of selected motion modes, the ratios of a floor reaction force horizontal component to a floor reaction force moment about a desired ZMP generated by the motion modes must be different from each other. Otherwise, there will be usually no solution of a simultaneous equation (the behavior of each motion mode cannot be uniquely determined).

In addition, it is preferred to combine, as much as possible, a motion mode that allows a sufficiently large change to take place in a floor reaction force moment about a desired ZMP while minimizing the change of a floor reaction force horizontal component, and a motion mode that allows a sufficiently large change to take place in a floor reaction horizontal component while minimizing the change of a floor reaction force moment about a desired ZMP.

In other words, it is desirable to combine a motion mode that allows a sufficiently large change to take place in an angular momentum while minimizing the change of a total center of gravity, and a motion mode that allows a sufficiently large change to take place in a total center of gravity while minimizing the change of an angular momentum. This is because a displacement of a motion mode will be smaller.

Further, a body yaw rotation mode may be used in place of the antiphase arm swing mode to prevent a floor reaction force moment vertical component from exceeding a permissible range (to cancel a spinning force). When the body yaw rotation mode is used, it is preferred to divide the body 3 of the robot 1 into a part close to the waist (e.g., the part below a member 54 shown in FIG. 1) and the part above it (e.g., the part above the member 54) such that the upper part may turn in the yaw direction (e.g., about a trunk axis of the body 3) relative to the part close to the waist. This makes it possible to allow the upper part of the body 3 to rotate so as to adjust a floor reaction force moment vertical component without affecting the postures of the legs 2 and 2. As a reference example in such a case, the rotational angle of the upper part of the body 3, and the angular velocity and the angular acceleration thereof may be determined instead of determining the antiphase arm swing angle and the angular velocity and the angular acceleration in, for instance, the aforementioned reference example. In this case, the relative positions of the two arms 5 and 5 with respect to, for example, the upper part of the body 3 may be fixed. An antiphase arm swing operation of the two arms 5 and 5 may be of course added to the yaw rotation of the upper part of the body 3.

Alternatively, a motion mode may be used that displaces a part other than the arms and the body as long as it generates a floor reaction force moment vertical component.

For example, a motion mode may be used that moves the distal ends of both legs in opposite longitudinal directions in a floating period.

Alternatively, a few motion modes generating a floor reaction force moment vertical component may be used at the same time. For example, the antiphase arm swing mode and the body yaw rotation mode may be used at the same time.

The body yaw rotation mode and the antiphase arm swing mode are the modes that generate a floor reaction force moment vertical component in such a manner that a total center-of-gravity position remains unchanged (in other words, without generating a floor reaction force horizontal component). However, motions causing a total center-of-gravity position to change (in other words, motions that generate floor reaction force horizontal components) may be also used. This is because the floor reaction force horizontal component can be adjusted by combining these modes with the body translational mode.

In addition to the dynamic model used in the aforesaid reference example (the dynamic model shown in FIG. 12), the following models may be used.

Figure 49:
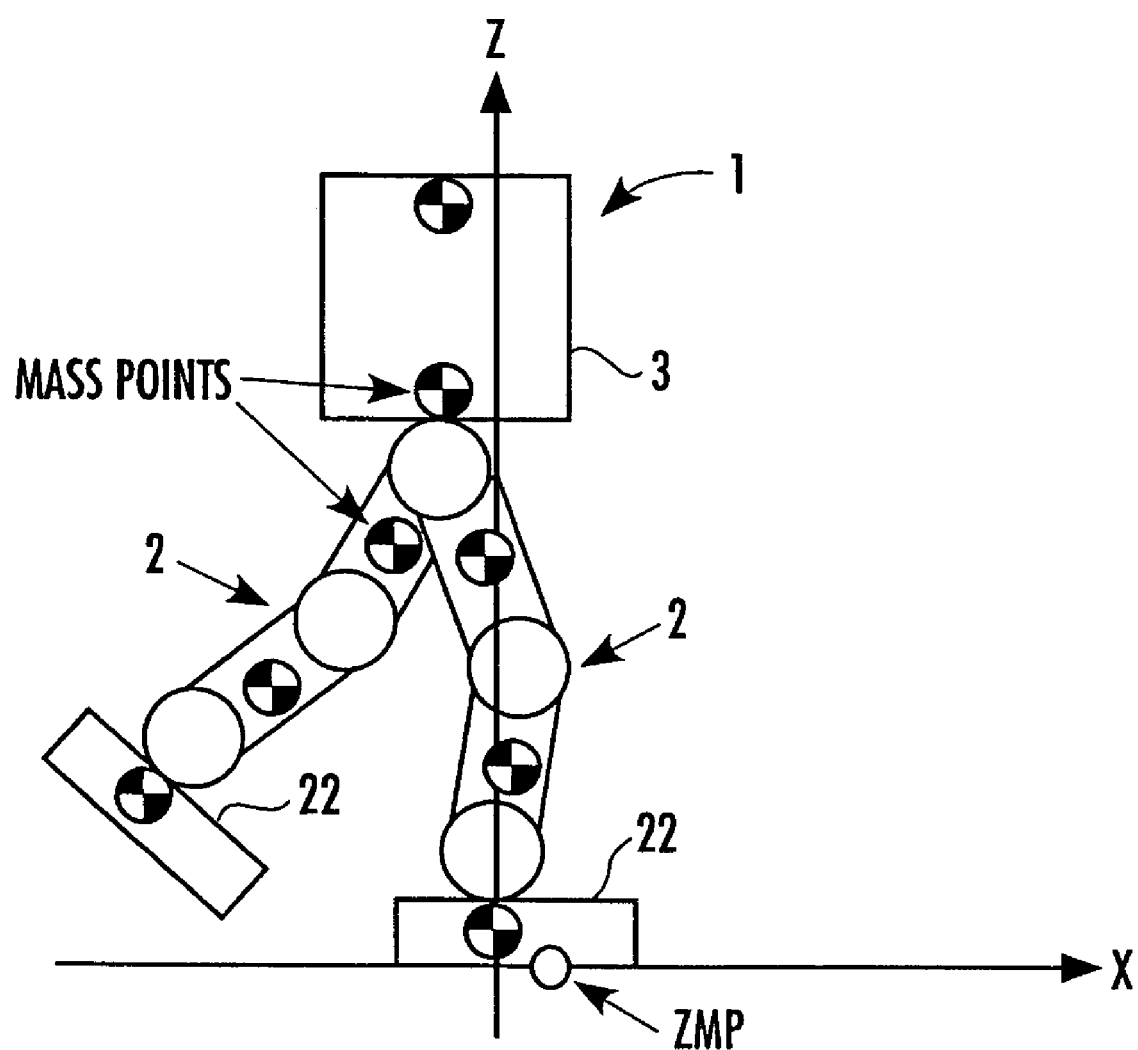
FIG. 49 is a diagram for explaining another example of a dynamic model.

1) Non-linear model having mass points set at a plurality of links, as shown in FIG. 49 (multi-mass-point model). Inertia (inertial moment) may be set at each link of the model.

2) Three-mass-point model disclosed in PCT Kokai publication WO/02/40224 by the present applicant.

3) Model that ignores the moment of an inertial force generated by the body yaw rotation mode or the antiphase arm swing mode.

4) Separate type model that separately has a partial model representing a relationship between a resultant force of gravity and an inertial force (or a floor reaction force balancing therewith) and a body translational motion, and a partial model representing the above resultant force and a body posture rotational motion (a body inclination motion and a body yaw rotational motion). For instance, the mass points shown in FIG. 12 constitute a partial model representing the relationship between the above resultant force and the body translational motion, and the flywheels shown in FIG. 12 constitute a partial model representing the relationship between the above resultant force and a body posture rotational motion.

Any one of 1) through 4) shown above requires a motion mode that generates a moment vertical component of an inertial force.

The same model may be used for each processing or models may be properly used according to processing. For example, the aforementioned normal gait is generated merely to determine a terminal state of the current time gait, so that the dynamic accuracy required of the normal gait is lower than that required of the current time gait. Hence, for example, the processing for generating the current time gait may use the dynamic model shown in FIG. 12 (the model with 3 mass points+flywheels), while the processing for generating a normal gait (particularly S408 and S412 of FIG. 21) may generate a normal gait by using a dynamic model composed of a body mass point 3m corresponding to the body 3 and flywheels FHx, FHy, FHaz, and FHbz (the model of one mass point+flywheels, which corresponds to the model of FIG. 12 from which leg mass points 2m and 2m have been removed), ignoring the mass of each leg 2. The processing for generating the normal gait in this case may carry out the processing of S408 and S412 of FIG. 25 with the mass of the leg mass point being set to zero in the aforesaid reference example. This makes it possible to dramatically reduce the calculation volume in the processing of generating normal gaits.

In the aforesaid reference example, the block charts, the flowcharts, and algorithms or the like may be subject to equivalent modifications, including modified calculation processing sequences. Furthermore, a low-pass filter may be inserted, as necessary.

Although the aforesaid reference example has been explained in conjunction with the bipedal mobile robot; however, it may be applied also to multi-legged robots having three or more feet.

Instead of using the techniques for determining the initial state of a normal gait (primarily an initial horizontal body position/velocity, and initial vertical body position/velocity and antiphase arm swing angle and angular velocity) by using exploratory techniques or partially using analyzing techniques, as in the aforesaid reference example, diverse normal gait parameters may be calculated using the above techniques beforehand and the relationship between the normal gait parameters and the initial states of the normal gait may be mapped or processed into an approximate expression and stored so as to determine the initial values of the normal gait on the basis of the relationship, which has been mapped or formed into approximate expressions, at the time of actual travel.

Further alternatively, a function that combines the aforesaid relationship, which has been mapped or processed into an approximate expression, and the aforesaid function f may be mapped or processed into an approximate expression and stored. More specifically, from the normal gait parameters composed of the aforesaid foot trajectory parameters, the floor reaction force vertical component trajectory parameters, etc., the functions for directly determining the divergent components of normal gaits may be mapped or processed into approximate expressions and the results may be stored. For example, a normal gait may be generated in advance for each set of a plurality of types of typical normal gait parameters, the initial state of the normal gait for each set of normal gait parameters (to be determined in S024 of FIG. 13) may be determined beforehand, and a map that shows the relationship between the normal gait parameters of each set and the normal gait initial states may be prepared in advance. Then, when generating a desired gait, the initial state of a normal gait may be determined by selecting or interpolating from among the sets of the determined normal gait parameters on the basis of the aforesaid map. This arrangement obviates the need for generating a normal gait each time a current time gait is generated, thus permitting a significant reduction in the amount of calculation for the processing of generating a desired gait.

As the method for correcting a current time gait to connect (approximate) it to a normal gait, the desired ZMP parameter of the current time gait has been corrected in the present reference example. However, other parameters may alternatively be corrected.

For instance, the trajectory of a free leg in the air in a current time gait may be changed. If, for example, a horizontal body position is likely to shift farther to the rear than a normal gait, then a free leg is promptly moved forward after it leaves a floor so as to shift the position of the center of gravity of the free leg toward the front. This causes the horizontal body position for satisfying a desired ZMP to be unavoidably further accelerated toward the front. As a result, the horizontal body position moves further forward at the end of the current time gait, making it possible to balance with the normal gait.

Instead of correcting a desired ZMP parameter, the cycle of a current time gait may be corrected. For instance, if the horizontal body position is likely to shift farther backward than a normal gait, then the cycle of the current time gait may be extended. Extending the cycle of the current time gait will extend the time for the horizontal body position to move, permitting extra forward movement to be accomplished accordingly.

However, if a desired ZMP parameter is corrected when determining an appropriate value of the horizontal body position or the like by an exploratory technique, the horizontal body position at the end of the current time gait changes substantially proportionally to a correction amount of the desired ZMP, so that the number of explorations of the appropriate value can be reduced. In comparison to this, correcting the center-of-gravity trajectory of a free leg or the cycle of a gait requires a greater number of explorations for the appropriate value, because the horizontal body position at the end of the current time gait changes considerably nonlinearly in response to the correction.

In the present reference example, the desired ZMP parameter of the current time gait has been corrected, as the method for correcting the current time gait to connect (approximate) it to the normal gait. This method may lead to an excessive correction amount (correction amount a shown in FIG. 34) of the desired ZMP parameter in some cases. For instance, if a request for an abrupt changeover from the gait of hopping at a spot to a high-speed travel (a request for running) is issued, then the desired ZMP parameter must be given an extremely large shift backward relative to an advancing direction in order to ensure connection (approximation) to a high-speed normal gait (normal gait for running). In this case, as discussed above, gait parameters in addition to the desired ZMP parameter are preferably corrected. In this case, however, the request for such an abrupt acceleration itself is actually unreasonable, so that a required value itself may be corrected as an alternative.

To correct the required value, for example, a normal gait satisfying the request (the required parameter) is determined, for the time being, according to the procedure shown in the present reference example, and at the point when a current time gait parameter has been determined so that it connects to the normal gait, it is determined whether the safety margin for the desired ZMP trajectory of the current time gait has been unduly reduced. If the safety margin has reduced too much (if the desired ZMP has deviated from a so-called supporting polygon or the desired ZMP is positioned near an edge of the supporting polygon), then the request may be corrected.

Alternatively, the permissible range of acceleration/deceleration of a gait ((Next time gait initial velocity−Current time gait initial velocity)/Cycle of current time gait) is set beforehand, and at the point when a request (a required parameter related to a gait cycle) is received, the acceleration/deceleration based on the request is determined, and if the determined acceleration/deceleration exceeds the permissible range, then the request may be corrected so that it falls within the permissible range.

Supplementally, if simple dynamic models as discussed above are used, the aforesaid $\Delta Mp$, $\Delta Fp$, $\Delta Mr$, $\Delta Fr$, $\Delta Maz$, and $\Delta Mbz$ may be analytically determined by dynamic calculation; however, if a general, more complicated dynamic model is used, then they may be determined as follows. A floor reaction force in a case where the body 3 is accelerated by an extremely small amount by the body translational mode or accelerated by an extremely small amount by the body inclination mode is determined, and then the difference between this determined floor reaction force and the floor reaction force obtained in a case where the body 3 is not accelerated is determined. Then, the difference is divided by the above extremely small amount.

Alternatively, the average value of each of $\Delta Mp$, $\Delta Fp$, $\Delta Mr$, $\Delta Fr$, $\Delta Maz$, $\Delta Mbz$, and $\Delta Mp/\Delta Mr$ or the like in standard gaits may be determined in advance and may be used. $\Delta Mp$, $\Delta Fp$, $\Delta Mr$, $\Delta Fr$, $\Delta Maz$, $\Delta Mbz$, and $\Delta Mp/\Delta Mr$ vary according to a state (a posture and its changing rate), so that the accuracy slightly deteriorates, as compared with a method in which they are determined for each state at each instant; however, the amount of calculation can be significantly reduced when models that are more complicated than the aforesaid models are used.

The following method may be used as the method for determining the height bzcurr of the trapezoid of the antiphase arm swing restoring angular acceleration pattern of the current time gait.

The antiphase arm swing angle and the angular velocity at the end of the current time gait of the aforesaid gait with a corrected antiphase arm swing restoring angular acceleration (refer to the explanation of S722 of FIG. 42) are denoted by θzcurr and vθzcurr, respectively, and the differences between these and the antiphase arm swing angle and the angular velocity of a normal gait are denoted by $\Delta\theta$zcerr and $\Delta v\theta$zcerr.

A discrete type state equation may be set up, in which a gait cycle is defined as an interval, the differences θzerr and vθzerr between the antiphase arm swing angle and the angular velocity at the end of a provisional current time gait and the initial antiphase arm swing angle and the angular velocity of a normal gait denote a last time's state, bzcurr denotes an input, and $\Delta\theta$zcerr and $\Delta v\theta$zcerr denote a current state, and then a feedback rule may be determined using a modern control theory or the like so as to converge $\Delta\theta$zcerr and $\Delta v\theta$zcerr to zero. The determined feedback rule may be used to obtain bzcurr.

Based mainly on the difference between desired antiphase arm swing angle/angular velocity and reference antiphase arm swing angle/angular velocity at each instant, the value of the antiphase arm swing restoring angular acceleration βarec at each instant may be determined by using a state feedback rule or the like so as to converge the above difference to zero rather than using a trapezoidal pattern to determine the antiphase arm swing restoring angular acceleration βarec of a current time gait and/or a normal gait.

Based on desired antiphase arm swing angle/angular velocity of a current time gait at each instant, the antiphase arm swing restoring angular acceleration βarec at each instant may be determined by using a state feedback rule or the like such that these will approximate initial antiphase arm swing angle/angular velocity of a first turning gait rather than using a trapezoidal pattern to determine the antiphase arm swing restoring angular acceleration βarec of a current time gait and/or a normal gait.

To generate a gait for traveling on a slope (when moving the robot 1 on a slant floor surface), the permissible range of the floor surface horizontal component of a translational floor reaction force (a component parallel to the floor surface), that is, the permissible range of fictional force, or the permissible range of the floor surface horizontal component of a total center-of-gravity acceleration (this is proportionate to a frictional force) may be set in place of a floor reaction force horizontal component permissible range or a total center-of-gravity acceleration horizontal component permissible range. A case, for example, where the permissible range of the floor surface horizontal component (frictional force) of a translational floor reaction force will be explained (this explanation applies also to a case where the permissible range of a floor surface horizontal component of total center-of-gravity acceleration is set). The frictional force is determined according to Equation 72 shown below if an inclination angle relative to the horizontal plane of a floor surface is defined as θf (a slope down forward in the direction in which the robot 1 advances is defined as a positive slope). Therefore, to generate a gait according to the same algorithm as that in the aforesaid reference example, the Equation 72 may be used to convert a frictional force permissible range into a floor reaction force horizontal component permissible range thereby to set the floor reaction force horizontal component permissible range. In this case, a desired floor reaction force vertical component may be used as the floor reaction force vertical component of Equation 72.

Fractional force=Floor reaction force horizontal component*cos(θf)−Floor reaction force vertical component*sin(θf)   Equation 72

When generating a gait for traveling on a slope (when moving the robot 1 on an inclined floor surface), a floor reaction force moment vertical component can be converted into a moment in the direction of the normal line of a floor surface frictional force by Equation 1072, so that the permissible range of the component in a floor surface normal line of a floor reaction force moment, i.e., the permissible range of the moment in the direction of the normal line of a floor surface frictional force, may be set in place of the permissible range of a floor reaction force moment vertical component.

Moment in the direction of the normal line of floor surface frictional force=Vertical component of floor reaction force moment*cos(θf)   Equation 1072

The parameters of a current time gait may be re-determined in the middle of the generation of a current gait, as disclosed in PCT Kokai publication WO/02/40224 by the present applicant, instead of determining them when a preceding gait is completed, as in the aforesaid reference example. This allows an immediate response to be taken if a gait request changes, although it involves an increased calculation volume.

If correction of a gait (re-determination of a current time gait parameter) is not completed within a current control cycle, then an uncorrected gait or provisionally corrected gait (a gait in the middle of exploration, i.e., a gait that does not fully satisfy an exploration completion condition (a deviation of a gait boundary condition being less than a permissible value)) is tentatively output, and a properly corrected (non-provisional) gait may be output by the next control cycle or by a plurality of control cycles later. The corrected desired ZMP trajectory and desired floor reaction force vertical component trajectory are connected, and these do not suddenly change in a short time; therefore, the desired ZMP trajectory and the desired floor reaction force vertical component trajectory of the current time gait will hardly present a problem although they will be slightly staggered.

Figure 50:
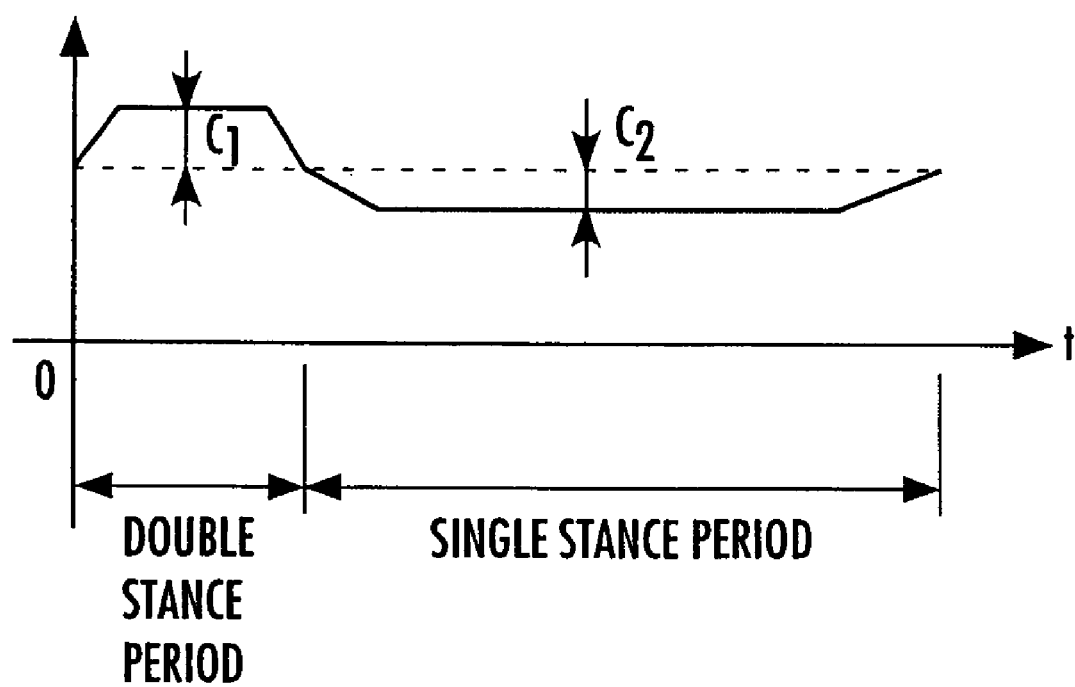
FIG. 50 is a diagram showing a setting example of a desired floor reaction force vertical component in a walking gait.
Figure 51:
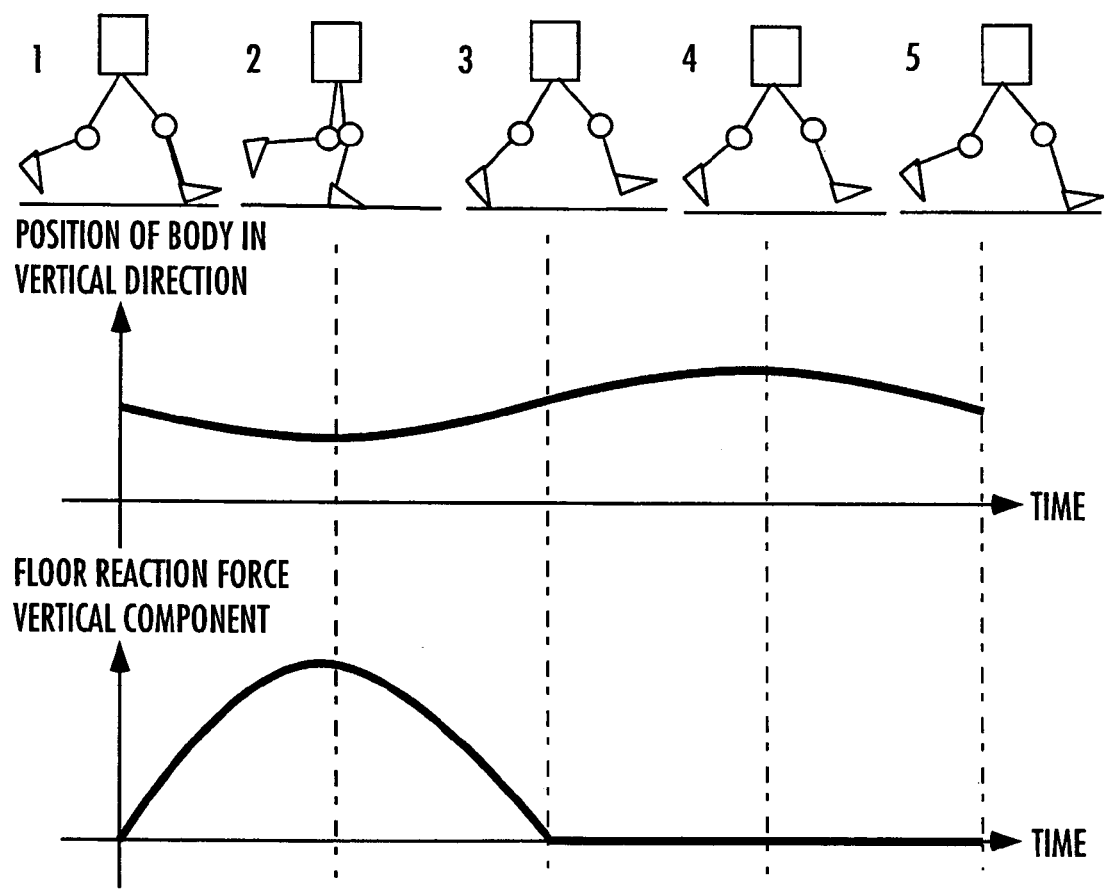
FIG. 51 is a diagram showing a relationship between the position in the body vertical direction and a floor reaction force vertical component in walking gaits of the robot.
Figure 52:
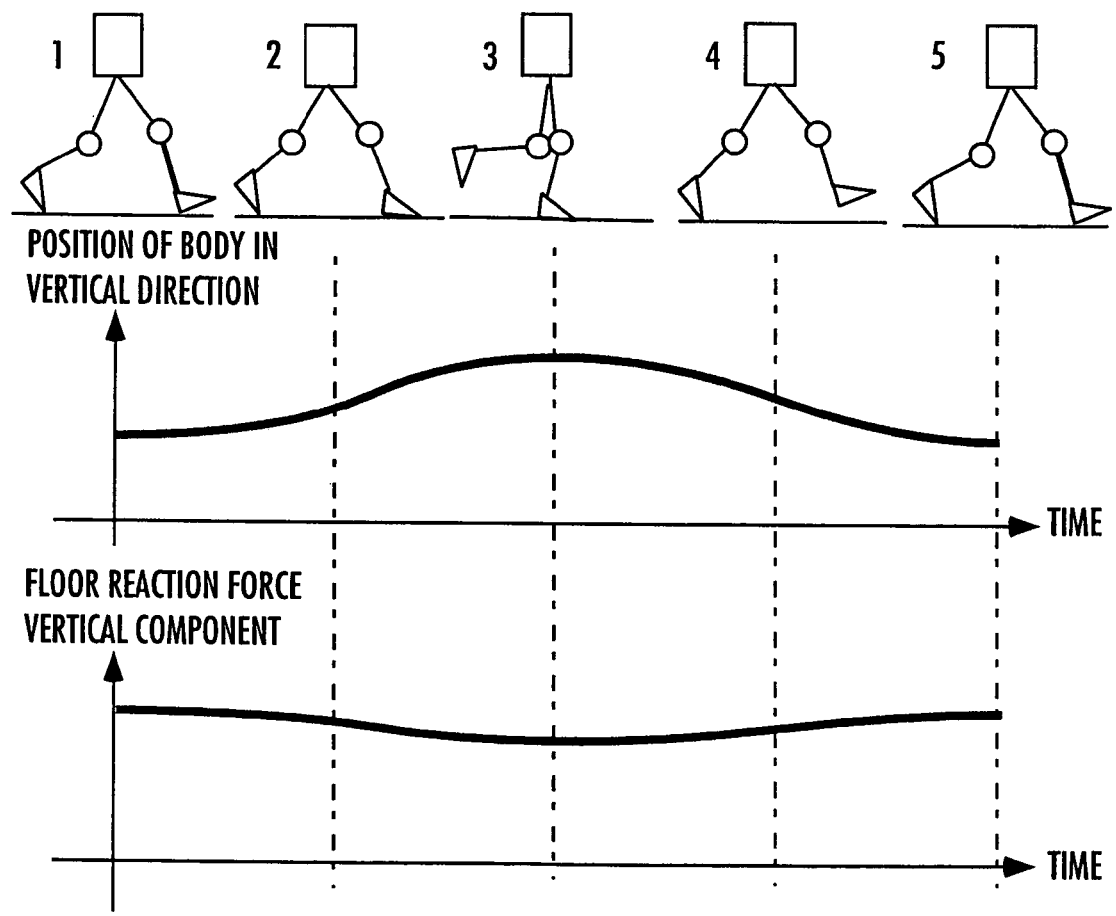
FIG. 52 is a diagram showing a relationship between the position in the body vertical direction and a floor reaction force vertical component in walking gaits of the robot.

The aforesaid reference example has explained the example of the case where the running gait shown in FIG. 5 is generated; however, a desired gait can be generated in the same manner as that in the aforesaid reference example when a walking gait of the robot 1 is generated. In this case, in the aforesaid reference example, for instance, a desired floor reaction force vertical component may be set according to the pattern shown in, for example, FIG. 50 in place of the one shown in FIG. 6 mentioned above. In this example, a floor reaction force vertical component trajectory is set to exhibit a trapezoidal shape projecting to an increasing side of the floor reaction force vertical component in a double stance period, and to exhibit a trapezoidal shape projecting to a decreasing side of the floor reaction force vertical component in a single stance period. The details of the method for setting heights C1 and C2 of the trapezoidal portions, and others are explained in detail in, for example, PCT Kokai publication WO/03/057425/A1 by the present applicant. Hence, the explanation will be omitted.

A first embodiment according to the present invention will now be explained with reference to FIG. 53 through FIG. 58 on the basis of the reference example and the modifications thereof explained above. In the explanation of the present embodiment, like constituent parts or like functional parts as those in the aforesaid reference example will be assigned like reference numerals as those in the aforesaid reference example, and the explanation thereof will be omitted. As previously mentioned, especially in the present embodiment, the aspects explained with reference to FIG. 1 to FIG. 3 and FIG. 5 to FIG. 12 are identical to those in the aforesaid reference example.

An outline of the aspects of the present embodiment that are different from those of the aforesaid reference example will be explained. In the present embodiment, a desired gait is corrected in addition to manipulating a desired floor reaction force for compliance control in order to approximate an actual body posture angle error, which is the difference between a desired body posture angle and an actual body posture angle (an error of an inclination angle and an error of a yaw angle with respect to the vertical direction of the body 3), and/or the changing rate thereof to zero. In particular, the vertical component of a floor reaction force moment about a desired ZMP that dynamically balances with a desired gait (the resultant force of the inertial force and gravity of a motion of a desired gait balances with the vertical component of a moment generated about the desired ZMP) is also corrected on the basis of a yaw angle component and/or its angular velocity out of an actual body posture error.

Figure 53:
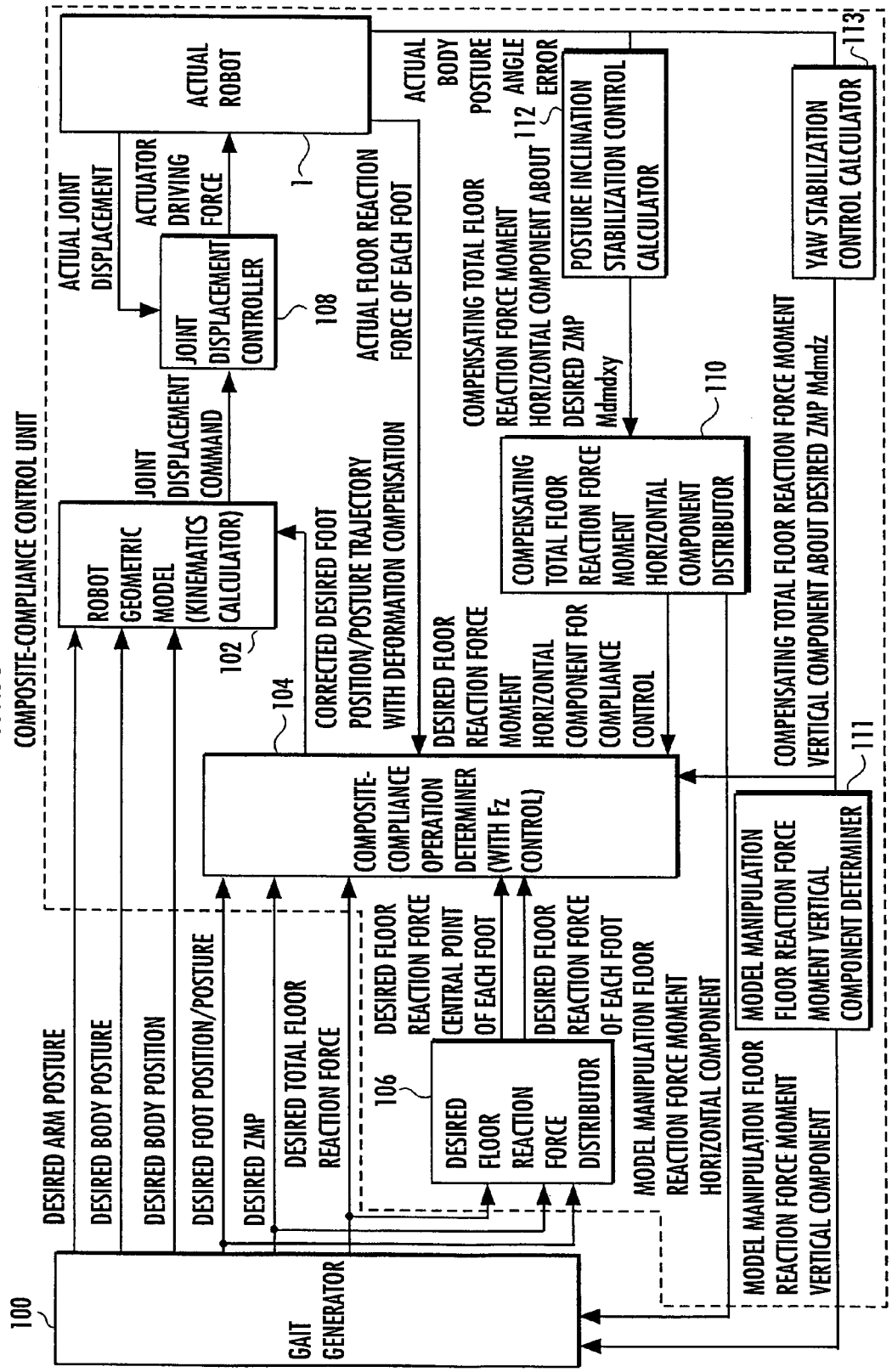
FIG. 53 is a block diagram showing a functional construction of a control unit in a first embodiment of the present invention.

A block diagram showing the functional construction of a control unit 60 in the present embodiment is shown in FIG. 53. The following will explain the aspects of the functional construction of the control unit 60 in the present embodiment that are different from those of the aforesaid reference example (those shown in FIG. 4).

In the present embodiment, the compensating total floor reaction force moment horizontal component Mdmdxy calculated in a posture inclination stabilization control calculator 112 is supplied to a compensating total floor reaction force moment horizontal component distributor 110. The compensating total floor reaction force moment horizontal component distributor 110 divides the compensating total floor reaction force moment horizontal component Mdmdxy into a desired floor reaction force moment horizontal component for compliance control and a model manipulation floor reaction force moment horizontal component. In other words, based on an actual body posture inclination angle error, the desired floor reaction force moment horizontal component for compliance control and a model manipulation floor reaction force moment horizontal component are determined by the posture inclination stabilization control calculator 112 and the compensating total floor reaction force moment horizontal component distributor 110.

Specifically, in the compensating total floor reaction force moment horizontal component distributor 110, a model manipulation floor reaction force moment horizontal component is determined first according to the equation given below. Incidentally, a permissible range of the floor reaction force moment horizontal component is determined in the gait generator 100, as will be discussed hereinafter.

If Mdmdxy>Upper limit value of the permissible range of a floor reaction force moment horizontal component, then Model manipulation floor reaction force moment horizontal component=−$Mdmdxy$+Upper limit value of the permissible range of a floor reaction force moment horizontal component.

If Mdmdxy<Lower limit value of the permissible range of a floor reaction force moment horizontal component, then Model manipulation floor reaction force moment horizontal component=−$Mdmdxy$+Lower limit value of the permissible range of a floor reaction force moment horizontal component.

If the lower limit value of the permissible range of a floor reaction force moment horizontal component≦Mdmdxy, and Mdmdxy≦the upper limit value of the permissible range of a floor reaction force moment horizontal component, then Model manipulation floor reaction force moment horizontal component=0     Equation d27a Then, a desired floor reaction force moment horizontal component for compliance control is determined according to the following equation.

Desired floor reaction force moment horizontal component for compliance control=$Mdmdxy$+Model manipulation floor reaction force moment horizontal component     Equation d27b Accordingly, the floor reaction force moment horizontal components are determined such that the difference between the desired floor reaction force moment horizontal component for compliance control and the model manipulation floor reaction force moment horizontal component is equal to Mdmdxy.

Figure 54:
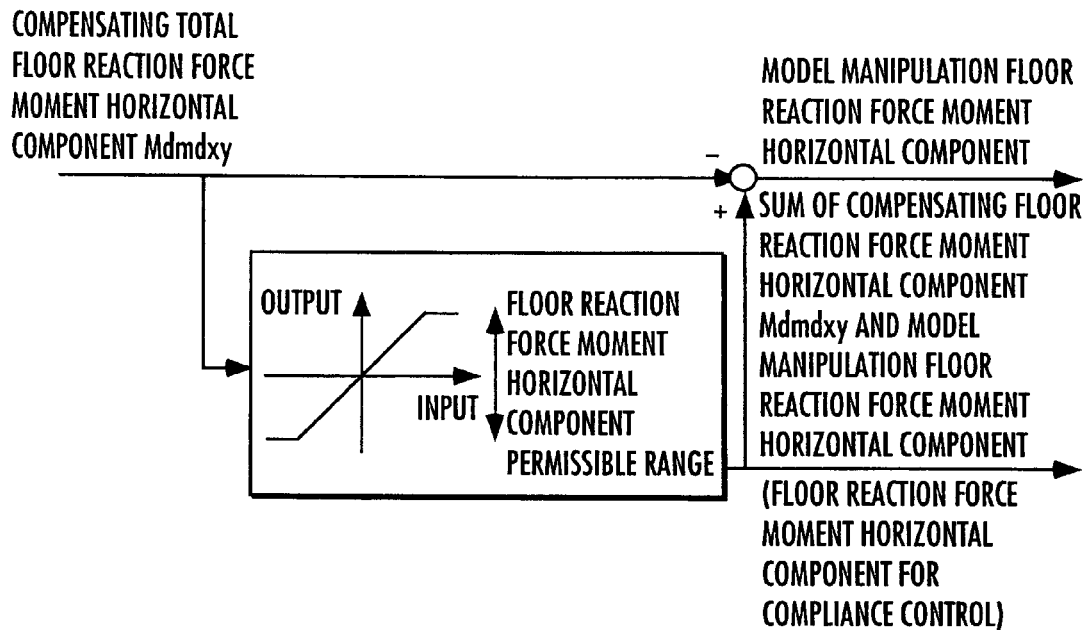
FIG. 54 is a block diagram showing the processing of a compensating total floor reaction force moment horizontal component distributor shown in FIG. 53.

A block diagram of the compensating total floor reaction force moment horizontal component distributor 110 that performs the aforesaid calculations is shown in FIG. 54.

The compensating total floor reaction force moment vertical component Mdmdz determined in the same manner as that in the afore-mentioned reference example in the yaw stabilization control calculator 113 (refer to the aforesaid Equation d26) is supplied to a model manipulation floor reaction force moment vertical component determiner 111. The model manipulation floor reaction force moment vertical component determiner 111 determines a model manipulation floor reaction force moment vertical component on the basis of the compensating total floor reaction force moment vertical component Mdmdz. In other words, the compensating total floor reaction force moment vertical component Mdmdz and the model manipulation floor reaction force moment vertical component are determined on the basis of a body yaw angle error out of an actual body posture angle error by the yaw stabilization control calculator 113 and the model manipulation floor reaction force moment vertical component determiner 111.

Specifically, in the model manipulation floor reaction force moment vertical component determiner 111, a model manipulation floor reaction force moment vertical component is determined according to the equation given below. Incidentally, the permissible range of the floor reaction force moment vertical component compensation amount is determined in the gait generator 100, as will be discussed hereinafter.

If Mdmdz>Upper limit value of the permissible range of a floor reaction force moment vertical component compensation amount, then > Model manipulation floor reaction force moment vertical component=−Mdmdz+Upper limit value of the permissible range of a floor reaction force moment vertical component compensation amount.

If Mdmdz<Lower limit value of the permissible range of a floor reaction force moment vertical component compensation amount, then > Model manipulation floor reaction force moment vertical component=−Mdmdz+Lower limit value of the permissible range of a floor reaction force moment vertical component compensation amount.

Figure 55:
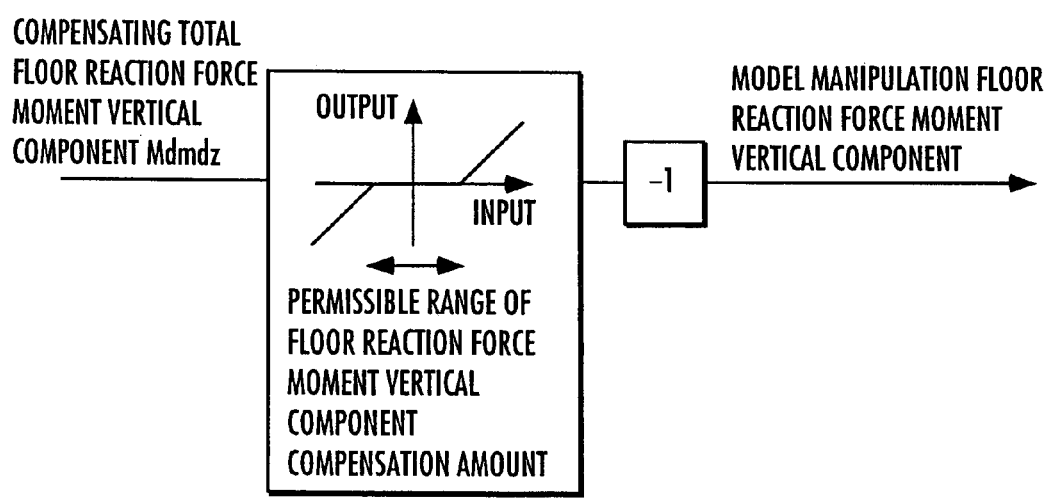
FIG. 55 is a block diagram showing the processing of a model manipulation floor reaction force moment vertical component determiner shown in FIG. 53.

If the lower limit value of the permissible range of a floor reaction force moment vertical component compensation amount≦Mdmdz, and Mdmdz≦the upper limit value of the permissible range of a floor reaction force moment vertical component compensation amount, then > Model manipulation floor reaction force moment vertical component=0    Equation d26b A block diagram of the model manipulation floor reaction force moment vertical component determiner 111 that performs the aforesaid calculations is shown in FIG. 55. Thus, the model manipulation floor reaction force moment vertical component is set to the portion of the compensating total floor reaction force moment vertical component Mdmdz that has deviated from the permissible range of the floor reaction force moment vertical component compensation amount, the sign of the portion being reversed.

The desired floor reaction force moment horizontal component for compliance control and the compensating total floor reaction force moment vertical component Mdmdz are sent to the composite-compliance operation determiner 104.

The model manipulation floor reaction force moment horizontal component and vertical component are sent to the gait generator 100.

In place of the compensating total floor reaction force moment vertical component Mdmdz, the sum of the compensating total floor reaction force moment vertical component Mdmdz and the model manipulation floor reaction force moment vertical component may be sent as a desired value for compliance control to the composite-compliance operation determiner 104.

The composite-compliance operation determiner 104 corrects the desired foot position/posture such that an actual floor reaction force approximates the desired total floor reaction force corrected by adding a desired floor reaction force moment horizontal component for compliance control and the compensating total floor reaction force moment vertical component Mdmdz to a desired total floor reaction force generated by the gait generator 100, while making the motion of the robot 1 follow the motion of a desired gait generated by the gait generator 100, thereby determining a corrected desired foot position/posture (trajectory) with deformation compensation.

In this case, it is actually impossible to make every state of foot position/posture of the robot 1 and floor reaction force agree with a target, so that a trade-off relationship is provided between them to reach compromisingly closest possible agreement, as in the aforesaid reference example.

Although it will be discussed in more detail hereinafter, the gait generator 100 generates the motion of a desired gait (particularly a body position/posture trajectory) by using a dynamic model so that the floor reaction force moment horizontal component about the desired ZMP determined by the gait generator 100 becomes a model manipulation floor reaction force moment horizontal component. Furthermore, the gait generator 100 corrects the motion of the desired gait (particularly an arm swing trajectory) such that a model manipulation floor reaction force moment vertical component is additionally generated in the desired floor reaction force moment vertical component about the desired total floor reaction force central point (the desired ZMP) that dynamically balances with the desired gait (provisional desired gait) generated, assuming the model manipulation floor reaction force moment is zero.

The functional construction of the control unit 60 other than the above is identical to that of the aforesaid reference example. Supplementally, the desired gait generated in the aforesaid reference example is identical to the desired gait generated when the model manipulation floor reaction force moment horizontal component and the model manipulation floor reaction force moment vertical component are steadily set to zero in the present embodiment.

An operation (processing for generating a gait) of the gait generator 100 in a first embodiment will be explained in detail below in conjunction with FIG. 56 showing its main flowchart. From S3010 to S3028, the same processing as that from S010 to S028 shown in FIG. 13 of the aforesaid reference example is carried out.

Subsequently, the processing proceeds to S3030 wherein the parameters defining the permissible ranges of the floor reaction force moment horizontal component about a desired ZMP for compliance control and a floor reaction force moment vertical component compensation amount are determined.

A value obtained by dividing the floor reaction force moment horizontal component by the floor reaction force vertical component represents the amount of deviation of a ZMP (the central point of a floor reaction force) from a desired ZMP. Alternatively, therefore, the permissible range of a floor reaction force moment horizontal component may be divided by a floor reaction force vertical component to set the parameter of the ZMP permissible range converted into a floor reaction force central point (the permissible range of a floor reaction force central point).

Supplementally, based on the parameters of the permissible range of a floor reaction force moment horizontal component for compliance control and the permissible range of a floor reaction force moment vertical component compensation amount that are determined in S3030, the instantaneous values of the permissible ranges will be determined in a subroutine for determining a current time gait instantaneous value (the subroutine of S3032), which will be discussed hereinafter, and the determined instantaneous values are used for the aforesaid processing in the aforesaid compensating total floor reaction force moment horizontal component distributor 110 and model manipulation floor reaction force moment vertical component determiner 111.

Regarding the floor reaction force moment horizontal component permissible range, a method for setting a floor reaction force moment permissible range is described in detail in PCT application PCT/JP03/00435 by the present applicant. Hence, no further explanation will be given in the present description.

The floor reaction force moment vertical component compensation amount means the compensation amount of a floor reaction force moment vertical component that can be added to the floor reaction force moment generated by a motion of a desired gait if the desired gait with a floor reaction force moment vertical component limited to a floor reaction force moment vertical component permissible range (this is set in S3026) for generating a gait is supposedly generated in the gait generator 100. Hence, the permissible range of a floor reaction force moment vertical component compensation amount cannot be widely set unless the floor reaction force moment vertical component permissible range for generating a gait is set to be sufficiently narrower than an actual friction limit.

Figure 41:
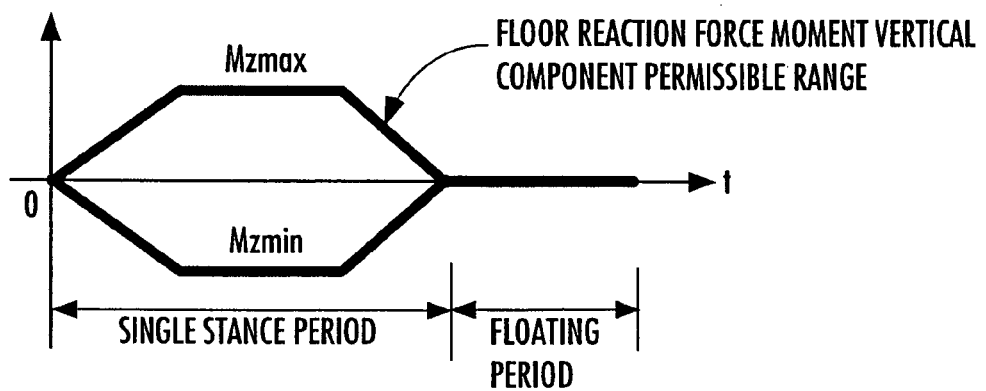
FIG. 41 is a graph showing a setting example of a floor reaction force moment vertical component permissible range of the present gait.

The permissible range of a floor reaction force moment vertical component compensation amount may be set to be similar to the floor reaction force moment vertical component permissible range for generating a gait (refer to the aforesaid FIG. 41). For a floating period of the running gait shown in the aforesaid FIG. 5, the permissible range of a floor reaction force moment vertical component compensation amount for compliance control is set to a range having an upper limit value of zero and a lower limit value of zero.

Returning to FIG. 56, after the parameters defining the permissible ranges of the floor reaction force moment horizontal, component about the desired ZMP for compliance control and the permissible range of the floor reaction force moment vertical component compensation amount are determined in S3030 as described above, or if the determination result of S3016 is NO, then the processing proceeds to S3032 wherein a current time gait instantaneous value is determined. In S3032, a current time gait instantaneous value is determined such that a model manipulation floor reaction force moment horizontal component determined according to the above Equation d27a is generated about the desired ZMP. However, the current time gait instantaneous value is determined such that the floor reaction force moment vertical component that balances with the current time gait (the resultant force of the inertial force and gravity of a motion of the current time gait balances with the vertical component of an inertial force moment generated about the desired ZMP) does not exceed the permissible range of the floor reaction force moment vertical component.

Figure 58:
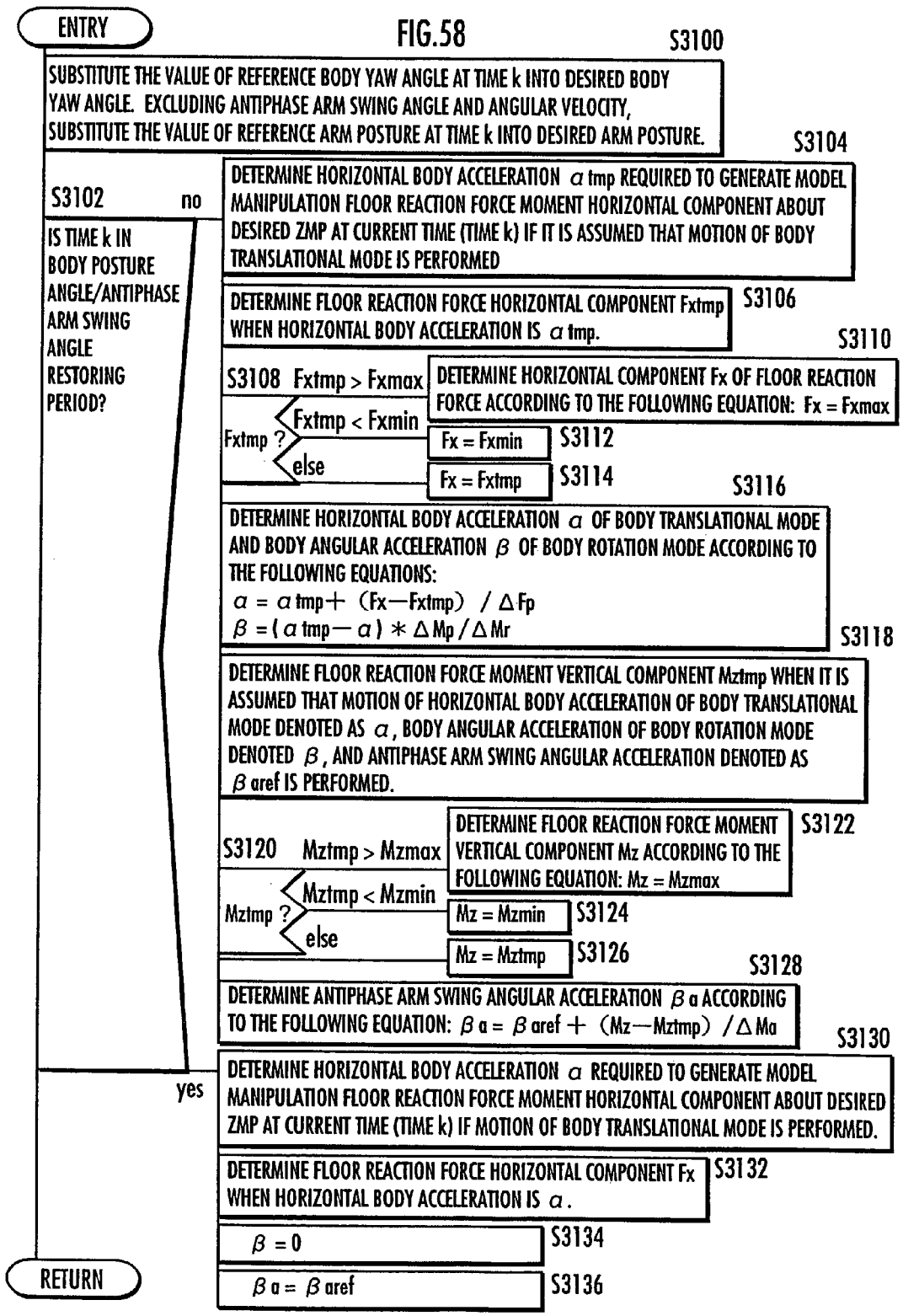
FIG. 58 is a flowchart showing a subroutine processing of S3414 in FIG. 57.

Specifically, gait instantaneous values are determined according to the flowcharts shown in FIG. 57 and FIG. 58. More specifically, in S3030, the processing from S3400 to S3411 of FIG. 57 is executed. The processing from S3400 to S3411 is exactly the same as that from S1400 to S1411 of FIG. 45 mentioned above.

Then, the processing proceeds to S3412 wherein the instantaneous values (the current time values at the current time t) of the floor reaction force moment horizontal component permissible range [Mxymin, Mxymax] and a floor reaction force moment vertical component compensation amount permissible range [Mzcmin, Mzcmax] at the current time are determined on the basis of the parameters of the floor reaction force moment horizontal component permissible range for compliance control and the floor reaction force moment vertical component compensation amount permissible range that have been determined in S3030 of the aforesaid FIG. 56.

The determined floor reaction force moment horizontal component permissible range is sent to the compensating total floor reaction force moment horizontal component distributor 110 (refer to FIG. 53). Then, the current time value (the value at the current time t) of the model manipulation floor reaction force moment calculated according to the above Equation d27a by the distributor 110 is supplied to the gait generator 100.

The determined permissible range of the floor reaction force moment vertical component compensation amount is supplied to the aforesaid model manipulation floor reaction force moment vertical component determiner 111 (refer to FIG. 53). The current time value (the value at the current time t) of the model manipulation floor reaction force moment vertical component calculated according to the aforesaid Equation d26b by the model manipulation floor reaction force moment vertical component determiner 111 is supplied to the gait generator 100.

Subsequently, the processing of the gait generator 100 proceeds to S3414 wherein the body horizontal acceleration and the body posture inclination angular acceleration of the current time gait are determined so that the model manipulation floor reaction force moment horizontal component supplied from the compensating total floor reaction force moment distributor 110 is generated about the desired ZMP. However, the body horizontal acceleration and the body posture angular acceleration (the body inclination angular acceleration) are determined such that the floor reaction force horizontal component Fx does not exceed the floor reaction force horizontal component permissible range [Fxmin, Fxmax] determined in S3410.

In other words, the body horizontal acceleration and the body posture angular acceleration (the body inclination angular acceleration) of the current time gait are determined so that the moment horizontal component generated about the desired ZMP by the resultant force of the inertial force and the gravity of a motion of the robot 1 will be the moment with a reversed sign of the model manipulation floor reaction force moment horizontal component. However, the body horizontal acceleration and the body posture inclination angular acceleration are determined such that the force with the reversed sign of the horizontal component of the inertial force does not exceed the floor reaction force horizontal component permissible range [Fxmin, Fxmax].

Figure 26:
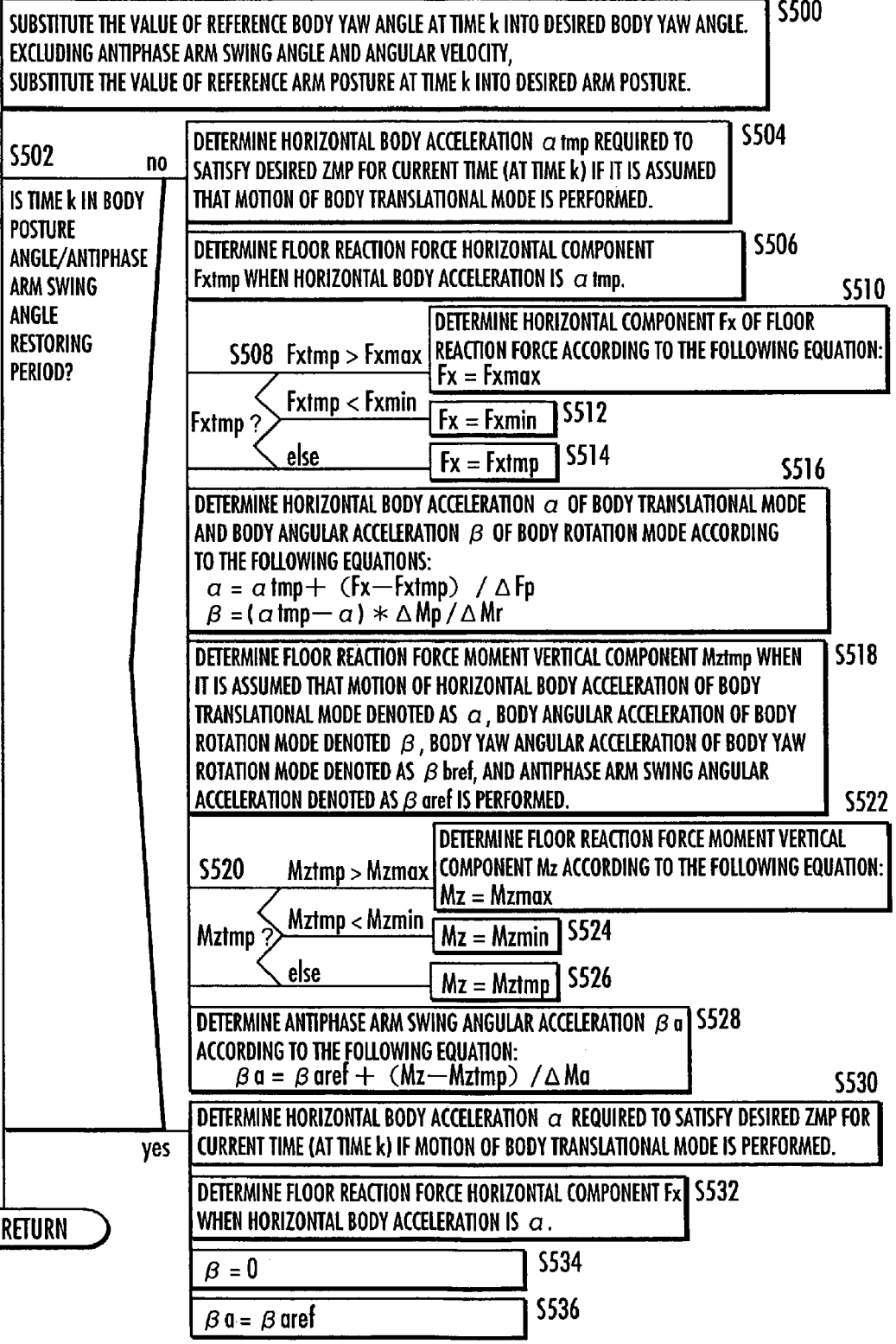
FIG. 26 is a flowchart showing subroutine processing of S412 in FIG. 25.

In S3414, specifically, the body horizontal acceleration and the body posture angular acceleration are determined according to the flowchart shown in FIG. 58. In this flowchart, the same processing as that shown in the aforesaid FIG. 26 is performed except for S3104 and S3130. Unlike S504 and S530 of FIG. 26, S3104 and S3130 determine a body horizontal acceleration ($\alpha tmp$ in S3104 or $\alpha$ in S3130) required for the aforesaid model manipulation floor reaction force moment horizontal component to be generated about the desired ZMP of the current time (time k) in a case where the robot 1 is made to perform a motion of the body translational mode, setting the angular acceleration of the body inclination mode to zero (to be more precise, balancing the angular acceleration of the body inclination mode with a reference body posture angular acceleration) from the last time's instant gait state (the gait state at time k−1) of the robot 1.

The rest of the processing is the same as the processing shown in FIG. 26.

Thus, after the processing of S3414 is completed, the processing proceeds to S3416, wherein the same processing as that of S1414 of FIG. 45 is carried out to determine the horizontal body position and the body posture inclination angle (specifically, the current time values thereof at the current time t).

Subsequently, the processing proceeds to S3418 wherein the same processing as that of S1416 of FIG. 45 is carried out to determine an antiphase arm swing angle and angular velocity of the current time gait (specifically, the current time values thereof at the current time t).

Thus, the processing of S3032 of FIG. 56 is completed.

Then, the processing proceeds to S3034 of FIG. 56 to correct the current time gait instantaneous value generated in S3032 so as to additionally generate a model manipulation floor reaction force moment vertical component about the desired ZMP.

Specifically, a correction amount $\beta aadd$ of an antiphase arm swing angular acceleration corresponding to the model manipulation floor reaction force moment vertical component is determined according to the following equation.

> Correction amount $\beta aadd$ of antiphase arm swing angular acceleration=Model manipulation floor reaction force moment vertical component/ Equivalent inertial moment $\Delta Maz$ of antiphase arm swing motion Further, $\beta aadd$ is integrated during the period of a control cycle to determine a correction amount of the antiphase arm swing angular velocity, and then this is integrated to determine a correction amount of the antiphase arm swing angle.

Lastly, the correction amount of the antiphase arm swing angle and the correction amount of the antiphase arm swing angular velocity are added to the antiphase arm swing angle and the angular velocity, respectively, of the current time gait generated in S3032, thereby correcting the antiphase arm swing angle and the angular velocity of the current time gait.

Subsequently, the processing proceeds to S3036 to add the control cycle $\Delta t$ to time t, and goes back to S3014 to wait for a timer interrupt for each control cycle.

In the first embodiment, as described above, the processing for generating a desired gait is carried out in the gait generator 100, and instantaneous values of a desired body position/ posture, a desired foot position/posture, a desired arm posture (including an antiphase arm swing angle), a desired ZMP, and a desired total floor reaction force are determined and output sequentially.

In this case, regarding the desired total floor reaction force, only a component thereof that is necessary for compliance control may be output. The desired ZMP is deliberately listed here as an output although it is included in the desired total floor reaction force, because it is particularly important. The model manipulation floor reaction force moment horizontal component is not output as a desired floor reaction force to the composite-compliance operation determiner (the portion encircled by a dashed line in FIG. 53). More specifically, for the compliance control, the desired floor reaction force aimed at a zero floor reaction force moment horizontal component about the desired ZMP (the desired floor reaction force satisfying the desired ZMP in the original meaning) is output from the gait generator 100.

The floor reaction force moment vertical component of the current time gait that has been corrected in S3034 is output as a desired value from the gait generator 100 to the composite-compliance control unit.

As a first action of the first embodiment, a motion of a desired gait is generated such that a model manipulation floor reaction force moment horizontal component is produced about a desired ZMP, while the floor reaction force of the actual robot 1 is controlled so as to prevent the model manipulation floor reaction force moment horizontal component from being added. Hence, there is an imbalance (unbalance) between the motion of the desired gait and the floor reaction force by the differential portion of the model manipulation floor reaction force moment horizontal component. This is equivalent to applying a floor reaction force moment horizontal component, which has a sign reversed from the sign of the model manipulation floor reaction force moment horizontal component, to the actual robot 1 from the aspect of the effect for converging a difference between the bony posture inclination angle of the actual robot 1 and the body posture inclination angle of a desired gait.

In other words, the actual robot 1 can be converged to a corrected desired gait (the gait for converging the difference between the body posture inclination angle of the actual robot 1 and the body posture inclination angle of a desired gait) by determining a model manipulation floor reaction force moment horizontal component as appropriate. This means that the posture inclination of the actual robot 1 can be stabilized.

As a second action, the sum of a moment with a reversed sign of a model manipulation floor reaction force moment horizontal component and a desired floor reaction force moment horizontal component for compliance control provides a total inclination restoring force (a force for restoring an actual body posture inclination angle of the robot 1 to a desired body posture inclination angle). This means that the difference between a desired floor reaction force moment horizontal component for compliance control and a model manipulation floor reaction force moment horizontal component provides a total posture inclination restoring force.

As a third action, a model manipulation floor reaction force moment horizontal component can take any value, ignoring the range in which a ZMP can exist, thus making it possible to generate an extremely high posture inclination restoring force.

As a fourth action, a body translational acceleration of the body translational mode and a body posture inclination angular acceleration of the body inclination mode are determined such that a floor reaction force horizontal component does not exceed a floor reaction force horizontal component permissible range. This makes it possible to prevent slippage of the robot 1 even in a period wherein a large floor reaction force horizontal component cannot be generated, such as immediately before a supporting leg 2 leaves a floor or immediately after it lands on a floor in a running gait, or when the robot 1 travels on a floor with a small frictional coefficient.

As a fifth action, the permissible range of a floor reaction force horizontal component is set to zero in the period wherein the translational force vertical component of a floor reaction force is zero, that is, in the period wherein neither of the legs is in contact with the ground, so that a posture inclination is automatically restored by depending upon the body inclination mode rather than depending upon the body translational mode according to the algorithm of the first embodiment discussed above, thus performing the posture restoration without depending upon a frictional force between a floor and a sole. Accordingly, even in this period (floating period), the posture inclination restoring action effectively works, unlike the method wherein only the body translational mode is merely corrected. Incidentally, at this time, the gait is generated so that the floor reaction force horizontal component becomes zero; therefore, the total center-of-gravity horizontal acceleration of the gait will be zero.

Further, as a sixth action, a model manipulation floor reaction force moment horizontal component is not output as a desired floor reaction force for compliance control, as described above. More specifically, even when a gait is generated to produce a model manipulation floor reaction force moment horizontal component about a desired ZMP, a desired floor reaction force intended for setting a floor reaction force moment horizontal component about the desired ZMP to zero for compliance control is supplied from the gait generator 100. Thus, the floor reaction force control by the compliance control will not be interfered with, allowing the floor reaction force control to be properly conducted by compliance control. To be more specific, it is possible to prevent or restrain the occurrence of a problem, such as one in that an originally designed property of a foot 22 to contact the ground is deteriorated, or the sole of a foot 22 incompletely contacts the ground.

As it will be discussed hereinafter, a desired floor reaction force moment horizontal component for compliance control about a desired ZMP will be determined so as not to exceed a floor reaction force moment horizontal L5 component permissible range also in a second embodiment and after.

Incidentally, the first to the sixth actions are the same arts disclosed in PCT/JP03/00435 previously proposed by the present applicant.

As a seventh action, a motion of a desired gait is generated such that a model manipulation floor reaction force moment vertical component is additionally produced about a desired ZMP, and the actual floor reaction force of the actual robot 1 is controlled by composite-compliance control to approximate to a desired value, the desired value being obtained by adding the compensating total floor reaction force moment vertical component Mdmdz to a desired floor reaction force moment vertical component that balances with the desired gait to which a model manipulation floor reaction force moment vertical component has been added by the gait generator 100. As Mdmdz increases, a model manipulation floor reaction force moment vertical component in the opposite direction from Mdmdz is added to the desired gait. Hence, even when the actual floor reaction force is controlled to approximate it to the aforesaid desired value by the composite-compliance control, the vertical component of the moment of the actual floor reaction force will not be excessive. As a result, the effect can be implemented in which the difference between the body posture yaw angle and/or the body posture yaw angular velocity of the actual robot 1 and the body posture yaw angle and/or the yaw angular velocity of a desired gait is converged to zero without causing the actual robot 1 to spin.

In other words, appropriately determining the model manipulation floor reaction force moment vertical component makes it possible to converge the actual robot 1 to the corrected desired gait (the gait that converges the difference between the body posture yaw angle and/or the body posture yaw angular velocity of the actual robot 1 and the body posture yaw angle and/or the yaw angular velocity of the desired gait to zero), while preventing the actual robot 1 from spinning. This means that the yaw rotation of the actual robot 1 can be stabilized.

As an eighth action, the compensating total floor reaction force moment vertical component Mdmdz provides a total yaw rotation restoring force. The compensating total floor reaction force moment vertical component Mdmdz is determined according to a feedback control law so as to approximate a yaw angle error and/or a yaw angular velocity error to zero, thus making it possible to approximate the yaw angle error and/or a yaw angular velocity error to zero while ensuring control stability of yaw angle errors.

As a ninth action, a model manipulation floor reaction force moment vertical component may take any value, ignoring the permissible range (or the frictional limit) of the floor reaction force moment vertical component, so that an extremely high posture yaw rotation restoring force can be generated.

As a tenth action, a final desired floor reaction force moment vertical component is determined for compliance control such that it does not exceed the sum of the permissible range of a floor reaction force moment vertical component and the permissible range of a floor reaction force moment vertical component compensating amount. This makes it possible to properly conduct the floor reaction force control based on the compliance control and therefore makes it possible to prevent the robot 1 from spinning even in a period wherein a large floor reaction force moment vertical component cannot be generated, such as immediately before a supporting leg 2 leaves a floor or immediately after it lands on a floor in a running gait, or when the robot 1 travels on a floor with a small frictional coefficient. To be more specific, it is possible to prevent or restrain the occurrence of a problem, such as one in that an originally designed property of a foot 22 to contact the ground is deteriorated, or the sole of a foot 22 incompletely comes in contact with the ground.

As an eleventh action, the permissible range of a floor reaction force vertical component and the permissible range of a floor reaction force moment vertical component compensation amount are set to zero in the period wherein the translational force vertical component of a floor reaction force is zero, that is, in the period wherein neither of the legs is in contact with the ground, so that yaw rotation is automatically restored by depending upon the antiphase arm swing mode rather than depending on an actual floor reaction force moment vertical component according to the algorithm of the present embodiment discussed above, thus performing the restoration of yaw rotation without depending upon a frictional force between a floor and a sole. Accordingly, even in this period (floating period), the yaw rotation restoring action effectively works, unlike the method wherein only the desired floor reaction force moment vertical component for compliance control is merely corrected.

As a twelfth action, if a gait generated such that the moment horizontal component produced about a desired ZMP is zero is referred to as an original gait, and a gait generated such that the moment horizontal component produced about a desired ZMP provides a model manipulation floor reaction force moment horizontal component and a model manipulation floor reaction force moment vertical component is additionally produced in the moment vertical component produced about the desired ZMP, as in the aforesaid first embodiment, is referred to as a corrected gait, then the original gait and the corrected gait are usually different gaits. The original gait is set so that it gradually approximates to a normal gait, and therefore, the corrected gait is usually a gait that does not gradually approximate to a normal gait.

However, immediately following the completion of the generation of a current time gait (corrected gait), the processing from S3020 to S3028 is carried out again to determine new current time gait parameters such that a new current time gait having a terminal state of the corrected gait as its new initial state gradually approximates a normal gait newly set. This makes it possible to continue generating gaits with continuously (long-range) guaranteed stability.

The twelfth action described above is substantially the same art as that previously proposed in PCT/JP03/00435 by the present applicant. In addition thereto, however, the present embodiment provides the following action. The parameters related to an antiphase arm swing angle trajectory of a new current time gait are determined such that the antiphase arm swing angle trajectory of the new current time gait, which uses the terminal state of the antiphase arm swing angle and angular velocity corrected to restore the yaw angle rotation as the new initial state, gradually approximates to the antiphase arm swing angle trajectory of the normal gait that is newly set. This makes it possible to continue generating gaits with continuously (long-range) guaranteed stability of the antiphase arm swing angle.

In the present embodiment, if the compensating total floor reaction force moment horizontal component Mdmdxy takes a value within a floor reaction force moment horizontal component permissible range, then the model manipulation floor reaction force moment horizontal component will be zero. Alternatively, however, the model manipulation floor reaction force moment horizontal component at this time may be set according to the state amounts of the dynamic model shown in FIG. 12 (e.g., the center-of-gravity position of the robot on the dynamic model, and the position of the body mass point 3m).

Further, in the present embodiment, if the compensating total floor reaction force moment vertical component Mdmdz takes a value within a floor reaction force moment vertical component compensating amount permissible range, then the model manipulation floor reaction force moment vertical component compensating amount will be zero. Alternatively, however, the model manipulation floor reaction force moment vertical component compensating amount at this time may be set according to the state amounts of the dynamic model shown in FIG. 12 (e.g., the antiphase arm swing angle and angular velocity, the body yaw angle, and angular velocity of the robot 1 on the dynamic model).

The first embodiment explained above provide the embodiments of the first invention, the second invention, the fourth to the ninth inventions, and the fifteenth invention of the present invention. In this case, the floor reaction force moment vertical component (the floor reaction force moment vertical component to which Mdmdz has been added) in the first embodiment corresponds to the amount to be limited, a body yaw angle error and/or a body yaw angular velocity error corresponds to the error of the state amount of the robot 1, and Mdmdz corresponds to a compensating floor reaction force moment. Further, the combination of the floor reaction force moment vertical component permissible range [Mzmin, Mzmax] for generating gaits and the floor reaction force moment vertical component compensating amount permissible range in the first embodiment corresponds to the permissible range of the amount to be limited. The motion component of a current time gait instantaneous value determined in S3032 of FIG. 56 corresponds to the provisional instantaneous value of a desired motion, and the value corrected in S3034 corresponds to the instantaneous value of the desired motion. The dynamic model shown in FIG. 12 corresponds to the dynamic model in the invention.

Referring now to FIG. 59 through FIG. 62, a second embodiment of the present invention will be explained. In the explanation of the present embodiment, the like constituent parts or like functional parts as those in the aforesaid reference example or the aforesaid first embodiment will be assigned like reference numerals as those in the aforesaid reference example or the aforesaid first embodiment, and the explanation thereof will be omitted. In the present embodiment, the aspects explained with reference to FIG. 1 to FIG. 3 and FIG. 5 to FIG. 12 are identical to those in the aforesaid reference example.

An outline of the aspects of the present embodiment that are different from those of the aforesaid reference example and the first embodiment will be explained. An original gait and a corrected gait are generated at the same time. The corrected gait is obtained by correcting an original gait to stabilize a body posture (an inclination angle and a yaw angle) of the actual robot 1. Further, in the corrected gait, if the corrected gait still has an allowance (an allowance in a floor reaction force moment that can be generated about a desired ZMP) after generating a floor reaction force moment required for restoring a posture by compliance control, then it is determined to converge to the original gait as much as possible, using the allowance.

Figure 59:
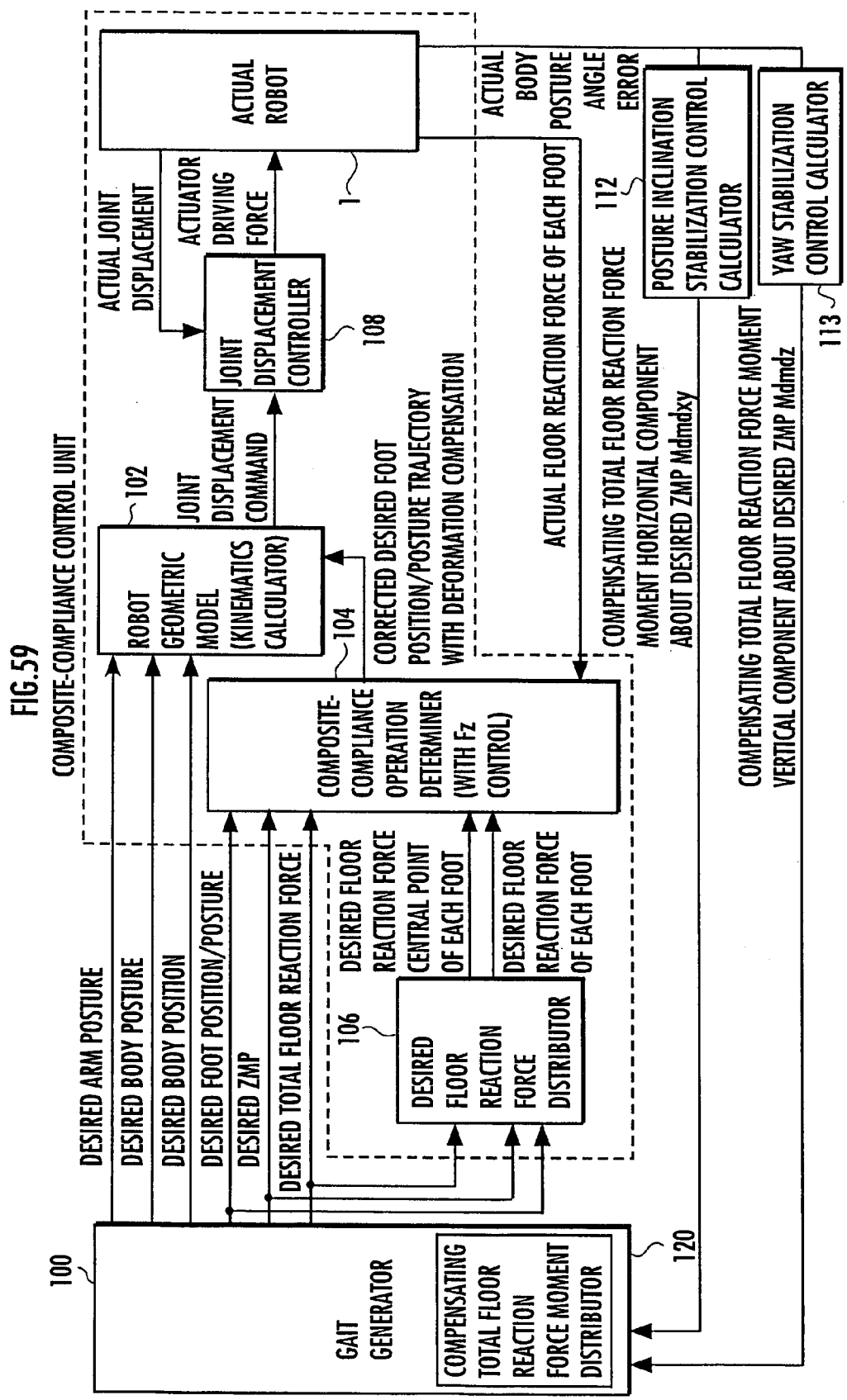
FIG. 59 is a block diagram showing a functional construction of a control unit in a second embodiment of the present invention.

A block diagram showing a functional construction of a control unit 60 in the present embodiment is shown in FIG. 59. In the present embodiment, a compensating total floor reaction force moment horizontal component Mdmdxy determined by a posture inclination stabilization control calculator 112 is supplied to a gait generator 100.

A compensating total floor reaction force moment vertical component Mdmdz determined by a yaw stabilization control calculator 113 is also supplied to the gait generator 100.

Further, a compensating total floor reaction force moment distributor 120 that determines a model manipulation floor reaction force moment (a horizontal component and a vertical component) and a desired floor reaction force moment (a horizontal component and a vertical component) for compliance control on the basis of the Mdmdxy and Mdmdz is incorporated in the gait generator 100. The desired floor reaction force moment for compliance control is output from the gait generator 100 to a composite-compliance operation determiner 104. The compensating total floor reaction force moment distributor 120 in the gait generator 100 performs more complicated processing than the compensating total floor reaction force moment horizontal component distributor 110 and the model manipulation floor reaction force moment vertical component determiner model 111 of the aforesaid first embodiment. The functional construction of the control unit 60 except for the above is identical to that in the first embodiment.

Figure 60:
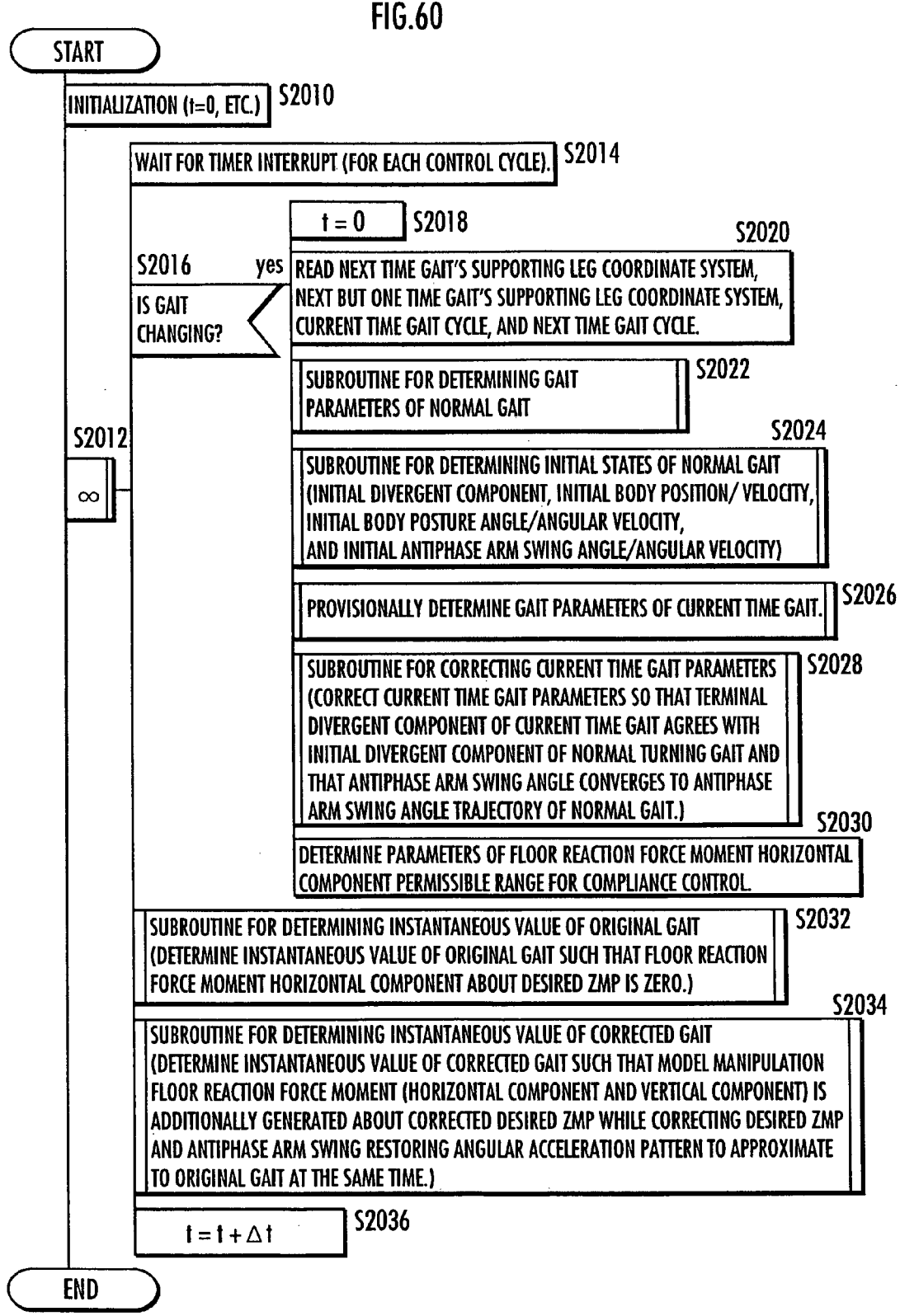
FIG. 60 is a flowchart showing main routine processing of a gait generator in the second embodiment.

FIG. 60 shows the flowchart of the main routine processing of the gait generator 100 in the present embodiment.

In this FIG. 60, the same processing as that from S010 to S028 of the main flowchart (FIG. 13) of the aforesaid reference example is carried out from S2010 to S2028. In the initialization in S800 of the flowchart of FIG. 43 that is the subroutine of S028 (S2028 in the present embodiment), the initial state of a current time gait is obtained by converting the terminal state of the last time's corrected gait (the final gait that the gait generator 100 outputs) into a current time's gait supporting leg coordinate system. The terminal state of the original gait determined in S2032, which will be discussed hereinafter, is not used in S800 of the subroutine of S2028.

Subsequently, the processing proceeds to S2030 wherein the floor reaction force moment horizontal component permissible range for compliance control is determined. The method for determining the floor reaction force moment horizontal component permissible range is the same as that in S3032 (FIG. 56) of the first embodiment.

After completing the processing of S2030, or if the determination result of S2016 is NO, the program proceeds to S2032 wherein an instantaneous value of the original gait (the current time value at time t) is determined. The original gait is a gait that is generated so that the floor reaction force moment horizontal component about a desired ZMP is zero.

This original gait is generated according to an algorithm obtained by partly changing the subroutine processing of S3032 of FIG. 56 in the aforesaid first embodiment. More specifically, in S3104 and S3130 of FIG. 58, which is the subroutine processing in S3032 (precisely, the subroutine processing of S3414 of FIG. 57, which is the subroutine processing of S3032), a body horizontal acceleration αtmp is determined, the model manipulation floor reaction force moment horizontal component being zero (the desired floor reaction force moment horizontal component about a desired ZMP being zero). The processing except for this may be the same as the processing of S3032 of FIG. 56.

Subsequently, the processing proceeds to S2034 wherein the instantaneous value of a corrected gait is determined. The corrected gait is the desired gait finally output from the gait generator 100.

Figure 61:
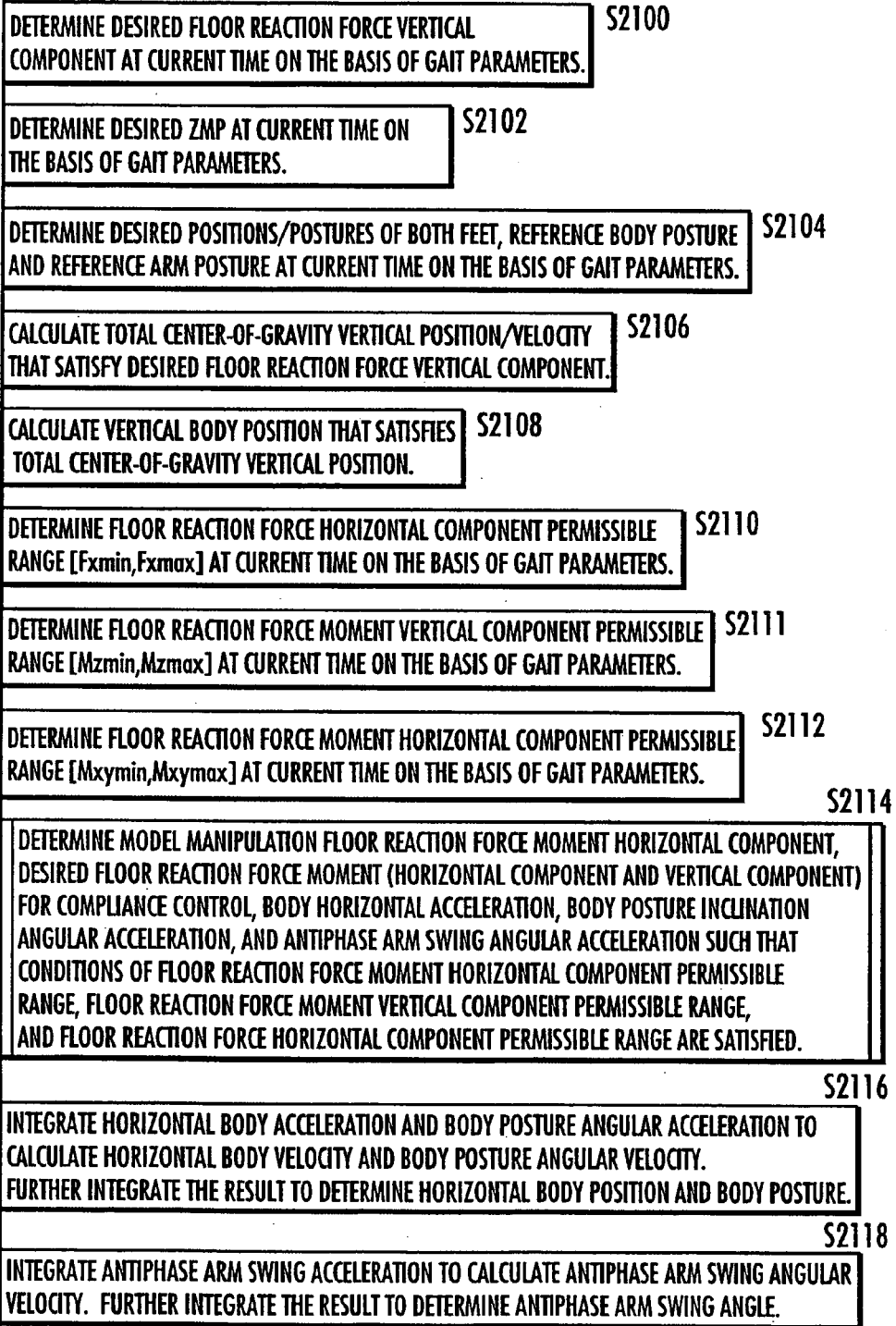
FIG. 61 is a flowchart showing subroutine processing of S2034 in FIG. 60.

The processing of S2034 is implemented by the subroutine processing illustrated by the flowchart of FIG. 61. This will be explained in detail below.

First, from S2100 to S2111, the same processing as that of S3400 to S3411 of FIG. 57 explained in the first embodiment is carried out.

Subsequently, the processing proceeds to S2112 wherein the floor reaction force moment horizontal component permissible range [Mxymin, Mxymax] at the current time is determined on the basis of gait parameters. This is carried out in the same manner as that for determining the floor reaction force moment horizontal component permissible range [Mxymin, Mxymax] in S3412 of FIG. 57.

Subsequently, the processing proceeds to S2114 wherein a model manipulation floor reaction force moment (a horizontal component and a vertical component), a desired floor reaction force moment for compliance control, a body horizontal acceleration, a body posture inclination angular acceleration, and an antiphase arm swing angular acceleration are determined such that the conditions of a floor reaction force moment horizontal component permissible range, a floor reaction force moment vertical component permissible range, and a floor reaction force horizontal component permissible range are satisfied.

The details of S2114 will be explained below in conjunction with the flowchart of FIG. 62 that illustrates the processing.

First, in S2200, the difference in horizontal body position between models, which is the difference between the horizontal body position of the corrected gait and the horizontal body position of the original gait, is determined. At this point, the current time value (the value at time t) of the horizontal body position of the corrected gait has not yet been determined. In S2200, therefore, the last time value (the last value determined in the control cycle at time t−Δt) of the horizontal body position of the corrected gait, and the last time value (the value determined in S2032 in the control cycle at time t−Δt) or a current time value (the value determined in S2032 in the control cycle at time t) of the horizontal body position of the original gait are used to calculate the difference in horizontal body position between models.

Subsequently, the processing proceeds to S2202 wherein the difference in body posture inclination angle between models, which is the difference between the body posture inclination angle of the corrected gait and the body posture inclination angle of the original gait, is determined. In this S2202, the last time value of the body posture inclination angle of the corrected gait and the last time value or the current time value of the body posture inclination angle of the original gait are used to determine the difference in body posture inclination angle between models, as in the case of the processing for calculating the difference in horizontal body position between models in S2200.

Subsequently, the processing proceeds to S2204 wherein the difference in antiphase arm swing angle between models, which is the difference between the antiphase arm swing angle of the corrected gait and the antiphase arm swing angle of the original gait, is determined. In this S2204, the last time value of the antiphase arm swing angle of the corrected gait and the last time value or the current time value of the antiphase arm swing angle of the original gait are used to determine the difference in antiphase arm swing angle between models, as in the case of the processing for calculating the difference in horizontal body position between models in S2200

Subsequently, the processing proceeds to S2206 wherein, based on the difference in horizontal body position between models, a required value Mpfdmd of model horizontal body position stabilization floor reaction force moment that is necessary for converging the difference to zero is determined. If the floor reaction force moment for generating a body horizontal acceleration of the body translational mode of the corrected gait is merely balanced with the floor reaction force moment for generating a body horizontal acceleration of the body translational mode of the original gait, then the difference in horizontal body position between models diverges. The required value Mpfdmd of model horizontal body position stabilization floor reaction force moment has a meaning as a moment resulting from subtracting the floor reaction force moment for generating the body horizontal acceleration of the body translational mode of the original gait from the floor reaction force moment generated when a motion is made to return the horizontal body position of the corrected gait to the horizontal body position of the original gait by the aforesaid body translational mode.

Specifically, the required value Mpfdmd of model horizontal body position stabilization floor reaction force moment is determined according to, for example, the feedback control law of the equation given below. In this example, the PD control law is used as the feedback control law; alternatively, however, other feedback control laws, such as PID, may be applied.

$Mpfdmd = Kmp*$Difference in horizontal body position between models$+Kmpv*$Temporal differential value of the difference in horizontal body position between models       Equation d28 where Kmp and Kmpv denote feedback gains (a proportional gain and a differential gain)

Subsequently, the processing proceeds to S2208 wherein, based on the difference in body posture inclination angle between models, a required value Mrfdmd of the floor reaction force moment for stabilizing a model body posture inclination angle that is necessary for converging the difference to zero is determined. If the floor reaction force moment for generating a body posture inclination angular acceleration of the body inclination mode of the corrected gait is merely balanced with the floor reaction force moment for generating a body posture inclination angular acceleration of the body inclination mode of the original gait, then the difference in body posture inclination angle between models does not converge to zero. The required value Mrfdmd of the floor reaction force moment for stabilizing a model body posture inclination angle has a meaning as a moment resulting from subtracting the floor reaction force moment for generating the body posture inclination angle acceleration of the body inclination mode of the original gait from the floor reaction force moment generated when a motion is made to return the body posture inclination angle of the corrected gait to the body posture inclination angle of the original gait by the aforesaid body inclination mode.

Specifically, the required value Mrfdmd of the floor reaction force moment for stabilizing a model body posture inclination angle is determined according to, for example, the feedback control law of the equation given below. In this example, the PD control law is used as the feedback control law; alternatively, however, other feedback control laws, such as PID, may be applied.

$$Mrfdmd=Kmr*\text{Difference in body posture inclination angle between models}+Kmrv*\text{Temporal differential value of the difference in body posture inclination angle between models} \quad \text{Equation d29}$$

where Kmr and Kmrv denote feedback gains (a proportional gain and a differential gain)

Subsequently, the processing proceeds to S2210 wherein, based on the difference in antiphase arm swing angle between models, a required value Mafdmd of the floor reaction force moment for stabilizing a model antiphase arm swing angle that is necessary for converging the difference to zero is determined. If the floor reaction force moment for generating an antiphase arm swing angular acceleration of the antiphase arm swing mode of the corrected gait is merely balanced with the floor reaction force moment for generating an antiphase arm swing angular acceleration of the antiphase arm swing mode of the original gait, then the difference in antiphase arm swing angle between models does not converge to zero. The required value Mafdmd of the floor reaction force moment for stabilizing a model antiphase arm swing angle has a meaning as a moment resulting from subtracting the floor reaction force moment for generating the antiphase arm swing angular acceleration of the antiphase arm swing mode of the original gait from the floor reaction force moment generated when a motion is made to return the antiphase arm swing angle of the corrected gait to the antiphase arm swing angle of the original gait by an antiphase arm swing mode.

Specifically, the required value Mafdmd of the floor reaction force moment for stabilizing a model antiphase arm swing angle is determined according to, for example, the feedback control law of the equation given below. In this example, the PD control law is used as the feedback control law; alternatively, however, other feedback control laws, such as PID, may be applied.

$$Mafdmd=Ka*\text{Difference in antiphase arm swing angle between models}+Kav*\text{Temporal differential value of the difference in antiphase arm swing angle between models} \quad \text{Equation d29b}$$

where Kar and Kav denote feedback gains (a proportional gain and a differential gain).

Incidentally, the moment obtained by subtracting the floor reaction force moment horizontal component for generating a body horizontal acceleration of the body translational mode of an original gait from the floor reaction force moment horizontal component generated by the body translational mode of a finally determined corrected gait is called a floor reaction force moment for stabilizing a model horizontal body position. Further, the moment obtained by subtracting the floor reaction force moment horizontal component for generating a body posture inclination angular acceleration of the body inclination motion mode of an original gait from the floor reaction force moment horizontal component generated by the body inclination motion mode of a finally determined corrected gait is called a floor reaction force moment for stabilizing a model body posture inclination angle. Further, the moment obtained by subtracting the floor reaction force moment vertical component for generating an antiphase arm swing angular acceleration of the antiphase arm swing mode of an original gait from the floor reaction force moment vertical component generated by the antiphase arm swing mode of a finally determined corrected gait is called a floor reaction force moment for stabilizing a model antiphase arm swing angle.

Meanwhile, linearity approximately holds between a perturbation motion and a perturbation floor reaction force. In other words, the floor reaction force of a motion obtained by adding a different perturbation motion to the motion of an original gait substantially agrees with the floor reaction force of the original gait to which the perturbation floor reaction force generated by each perturbation motion has been added. In the antiphase arm swing mode, a floor reaction force moment horizontal component remains unchanged. Hence, the following equation approximately holds.

$$\text{Model manipulation floor reaction force moment horizontal component}=\text{Model horizontal body position stabilizing floor reaction force moment}+\text{Model body posture inclination angle stabilizing floor reaction force moment} \quad \text{Equation d30}$$

Taking into account that the Equation d30 approximately holds, and a floor reaction force moment vertical component changes in proportion to an antiphase arm swing angular acceleration, if a model horizontal body position stabilizing floor reaction force moment is determined so that it agrees with or approximates as much as possible to the required value Mpfdmd of model horizontal body position stabilizing floor reaction force moment, and a model body posture inclination angle stabilizing floor reaction force moment is determined so that it agrees with or approximates as much as possible to the required value Mrfdmd of a model body posture inclination angle stabilizing floor reaction force moment, and a model antiphase arm swing angle stabilizing floor reaction force moment is determined so that it agrees with or approximates as much as possible to the required value Mafdmd of a model antiphase arm swing angle stabilizing floor reaction force moment, then a model manipulation floor reaction force moment appropriate for a corrected gait can be generated to converge the body horizontal acceleration and the body posture inclination angular acceleration of a corrected gait to possible ranges for the body horizontal acceleration and the body posture inclination angular acceleration, respectively, of an original gait, while satisfying the restoring conditions shown below.

Thus, after S2210, the processing proceeds to S2212 wherein a model horizontal body position stabilizing floor reaction force moment (the floor reaction force moment of the body translational mode), a model body posture inclination angle stabilizing floor reaction force moment (the floor reaction force moment of the body inclination mode), and a model antiphase arm swing angle stabilizing floor reaction force moment are determined to satisfy the conditions shown below (these are called "restoring conditions") as much as possible. Furthermore, the body horizontal acceleration, the body posture inclination angular acceleration, and the antiphase arm swing angular acceleration of a corrected gait are determined to satisfy the definitions of the model horizontal body position stabilizing floor reaction force moment, the model body posture inclination angle stabilizing floor reaction force moment, and the model antiphase arm swing angle stabilizing floor reaction force moment described above. Regarding the restoring conditions shown below, conditions with smaller numbers have higher priorities. In other words, if conflicting, incompatible conditions are encountered, then priority goes to a condition with a smaller number will be satisfied (met). However, restoring conditions of 1, 2 and 3 must always be satisfied (met).

Restoring condition 1) The sum of the compensating total floor reaction force moment horizontal component Mdmdxy and a model manipulation floor reaction force moment (this corresponds to a desired floor reaction force moment horizontal component for compliance control if the above Equation d27b holds) does not exceed a floor reaction force moment horizontal component permissible range.

Restoring condition 2) The floor reaction force horizontal component of a corrected gait does not exceed a floor reaction force horizontal component permissible range.

Restoring condition 3) The sum of the floor reaction force moment vertical component of a corrected gait and a compensating total floor reaction force moment vertical component Mdmdz (this corresponds to a desired floor reaction force moment vertical component for compliance control) does not exceed a floor reaction force moment vertical component permissible range.

Restoring condition 4) A model body posture inclination angle stabilization floor reaction force moment agrees with or is close as much as possible to a required model body posture inclination angle stabilization floor reaction force moment value Mrfdmd. This condition is the condition for the body posture inclination angle of a corrected gait to converge to the body posture inclination angle of an original gait (originally planned gait).

Restoring condition 5) A model horizontal body position stabilization floor reaction force moment agrees with or is close as much as possible to a required value Mpfdmd of model horizontal body position stabilization floor reaction force moment. This condition is the condition for a horizontal body position of a corrected gait to converge to the horizontal body position of an original gait (originally planned gait).

Restoring condition 6) A model antiphase arm swing angle stabilization floor reaction force moment agrees with or is close as much as possible to a required value Mafdmd of model antiphase arm swing angle stabilization floor reaction force moment. This condition is the condition for the antiphase arm swing angle of a corrected gait to converge to the antiphase arm swing angle of an original gait (originally planned gait).

Restoring condition 7) A model body posture inclination angle stabilization floor reaction force moment, a model horizontal body position stabilization floor reaction force moment, and a model antiphase arm swing angle stabilization floor reaction force moment are all continuous.

The processing of S2212 for determining a body horizontal acceleration, a body posture inclination angle acceleration, an antiphase arm swing angular acceleration, etc. that satisfy the restoring conditions 1 through 6 described above is carried out, for example, as follows.

First, in order to satisfy the aforesaid restoring conditions 1, 2, 4, and 5, a model horizontal body position stabilization floor reaction force moment and a model body posture inclination angle stabilization floor reaction force moment are determined, and further a body horizontal acceleration and a body posture inclination angular acceleration are determined. This processing is discussed in detail in the art of PCT/JP03/00435 previously proposed by the present applicant, so that the explanation thereof will be omitted here.

Subsequently, the model antiphase arm swing stabilization floor reaction force moment is determined to satisfy the aforesaid restoring conditions 3 and 6, and further, the antiphase arm swing angular acceleration is determined.

Specifically, a floor reaction force moment vertical component about a desired ZMP that is generated (dynamically balancing the motion) if a motion is provisionally implemented at the body horizontal acceleration and the body posture inclination angular acceleration determined as described above and at an antiphase arm swing angular acceleration $\beta aorg$ of an original gait is determined. Hereinafter, this will be referred to as a floor reaction force moment vertical component without correction.

Subsequently, a sum Msumz of a floor reaction force moment vertical component without correction, the required value Mafdmd of model antiphase arm swing angle stabilization floor reaction force moment, and a compensating total floor reaction force moment vertical component Mdmdz is determined according to the following equation.

$Msumz$=Floor reaction force moment vertical component without correction+$Mafdmd$+$Mdmdz$ Subsequently, a model antiphase arm swing stabilization floor reaction force moment is determined according to the following equation.

If Msumz>Upper limit value of a floor reaction force moment vertical component permissible range, then Model antiphase arm swing stabilization floor reaction force moment=−$Mdmdz$−Floor reaction force moment vertical component without correction+ Upper limit value of the floor reaction force moment vertical component permissible range.

If Msumz<Lower limit value of a floor reaction force moment vertical component permissible range, then Model antiphase arm swing stabilization floor reaction force moment=−$Mdmdz$−Floor reaction force moment vertical component without correction+ Lower limit value of the floor reaction force moment vertical component permissible range.

If a lower limit value of a floor reaction force moment vertical component permissible range≦Msumz and Msumz≦Upper limit value of the floor reaction force moment vertical component permissible range, then Model antiphase arm swing stabilization floor reaction force moment=Required value Mafdmd of model antiphase arm swing angle stabilization floor reaction force moment     Equation d26c Subsequently, the antiphase arm swing angular acceleration of a corrected gait is determined according to the following equation.

Antiphase arm swing angular acceleration of corrected gait=Original gait antiphase arm swing angular acceleration $\beta aorg$+Model antiphase arm swing stabilization floor reaction force moment/ Equivalent inertial moment of arm swing motion $\Delta Maz$ The floor reaction force moment vertical component of the corrected gait is the sum of the antiphase arm swing angular acceleration of the original gait $\beta aorg$ and the model antiphase arm swing stabilization floor reaction force moment. Therefore, the aforesaid restoring condition 3 is satisfied by determining the model antiphase arm swing stabilization floor reaction force moment according to the above equations.

After carrying out the processing of S2212 as described above, the program processing proceeds to S2214 wherein a model manipulation floor reaction force moment horizontal component is determined according to the above equation d30. More specifically, the sum of the model horizontal body position stabilization floor reaction force moment and the model body posture inclination angle stabilization floor reaction force moment that has been obtained in S2208 is determined as the model manipulation floor reaction force moment horizontal component. Alternatively, the floor reaction force moment about a desired ZMP may be directly calculated on the basis of a current time instantaneous value of the motion of a finally determined corrected gait, and the calculation result may be defined as the model manipulation floor reaction force moment.

Subsequently, the processing proceeds to S2216 wherein a desired floor reaction force moment horizontal component for compliance control is determined according to the above equation d27b. More specifically, the sum of the compensating total floor reaction force moment horizontal component Mdmdxy and the model manipulation floor reaction force moment horizontal component obtained in S2214 is determined as the desired floor reaction force moment horizontal component for compliance control.

Subsequently, the processing proceeds to S2218 wherein a desired floor reaction force moment vertical component for compliance control is determined according to the equation shown in the figure. The floor reaction force moment vertical component that balances with the corrected gait in the equation shown in the figure (dynamically balances with the motion of the corrected gait) is the sum of a floor reaction force moment vertical component without correction and a model antiphase arm swing stabilization floor reaction force moment. Alternatively, however, the floor reaction force moment vertical component about a desired ZMP may be directly calculated on the basis of a current time instantaneous value of the motion of a finally determined corrected gait.

Thus, the processing of S2114 of FIG. 61 is finished, and then the processing proceeds to S2116. The processing of this S2116 is the same as that of S3416 of FIG. 57 in the aforesaid first embodiment; the current time value of a horizontal body position is determined by the second order integration of a body horizontal acceleration and the current value of a body posture inclination angle is determined by the second order integration of a body posture inclination angle acceleration.

Subsequently, the processing proceeds to S2118. The processing in this S2118 is the same as that of S3418 of FIG. 57 in the aforesaid first embodiment; the current time value of an antiphase arm swing angle is determined by the second order integration of an antiphase arm swing angular acceleration.

Subsequently, the processing proceeds to S2036 of FIG. 60 to add a control cycle Δt to time t, and then returns to S2014 wherein it waits for a timer interrupt for each control cycle.

Supplementally, to determine a gait instantaneous value on the basis of a dynamic model in the present embodiment, the state amount of the dynamic model (or the last time's or the last but one time's gait instantaneous values) are also necessary, so that two dynamic models, for generating a corrected gait and for generating an original gait are necessary. In the present embodiment, the dynamic models are the dynamic model shown in FIG. 12.

In the present embodiment, as discussed above, an original gait and a corrected gait are generated in parallel, and the corrected gait is corrected to stabilize the posture (the inclination angle and the yaw angle) of the actual robot 1. If there is still an allowance even after a floor reaction force moment (a horizontal component and a vertical component) required for posture restoration by compliance control is generated, then the allowance is used for convergence to an original gait as much as possible. Therefore, in addition to the action advantages of the aforesaid first embodiment, a gait close to an initially set original gait, that is, a gait approximated to the gait initially required, can be generated. Hence, if a preset travel path is provided, then it will be possible to prevent significant deviation from the travel path. Moreover, a priority has been given to the convergence of the body posture inclination angle of the corrected gait to the body posture inclination angle of an original gait (the initially determined gait) rather than to the convergence of the horizontal body position of the corrected gait to the horizontal body position of the original gait (the initially determined gait) (the motion of the body translational mode has been adjusted as much as possible within the range in which a floor reaction force horizontal component permissible range is satisfied), thus making it possible to restrain a significant change in the body posture inclination angle.

The second embodiment explained above provides the embodiment of the first to the ninth inventions and the fifteenth invention of the present invention. In this case, the floor reaction force moment vertical component (the floor reaction force moment vertical component to which Mdmdz has been added) in the second embodiment corresponds to the amount to be limited, a body yaw angle error and/or a body yaw angular velocity error corresponds to the error of the state amount of the robot 1, and Mdmdz corresponds to a compensating floor reaction force moment. Further, the floor reaction force moment vertical component permissible range [Mzmin, Mzmax] for generating gaits in the second embodiment corresponds to the permissible range of the amount to be limited. Further, the required model antiphase arm swing angle stabilization moment value Mafdmd in the second embodiment corresponds to the model corrected floor reaction force moment in the third embodiment. Further, the motion when a floor reaction force moment vertical component without correction is determined in the subroutine of S2114 of FIG. 61 corresponds to a predetermined provisional instantaneous value in the second invention. Further, the dynamic model shown in FIG. 12 corresponds to the dynamic model in the invention.

Referring now to FIG. 63 through FIG. 70, a third embodiment of the present invention will be explained. In the explanation of the present embodiment, the like constituent parts or like functional parts as those in the aforesaid reference example or the aforesaid first to second embodiments will be assigned like reference numerals as those in the aforesaid reference example or the aforesaid first to second embodiments, and detailed explanation thereof will be omitted.

In the present embodiment, the functional construction of a control unit 60 is the same as that of the second embodiment, that is, the same as that shown in FIG. 59 mentioned above. However, in the present embodiment, the algorithm for generating gaits executed by a gait generator 100 is different from that of the aforesaid second embodiment. And the processing of units other than the gait generator 100 is identical to that of the aforesaid second embodiment.

Figure 63:
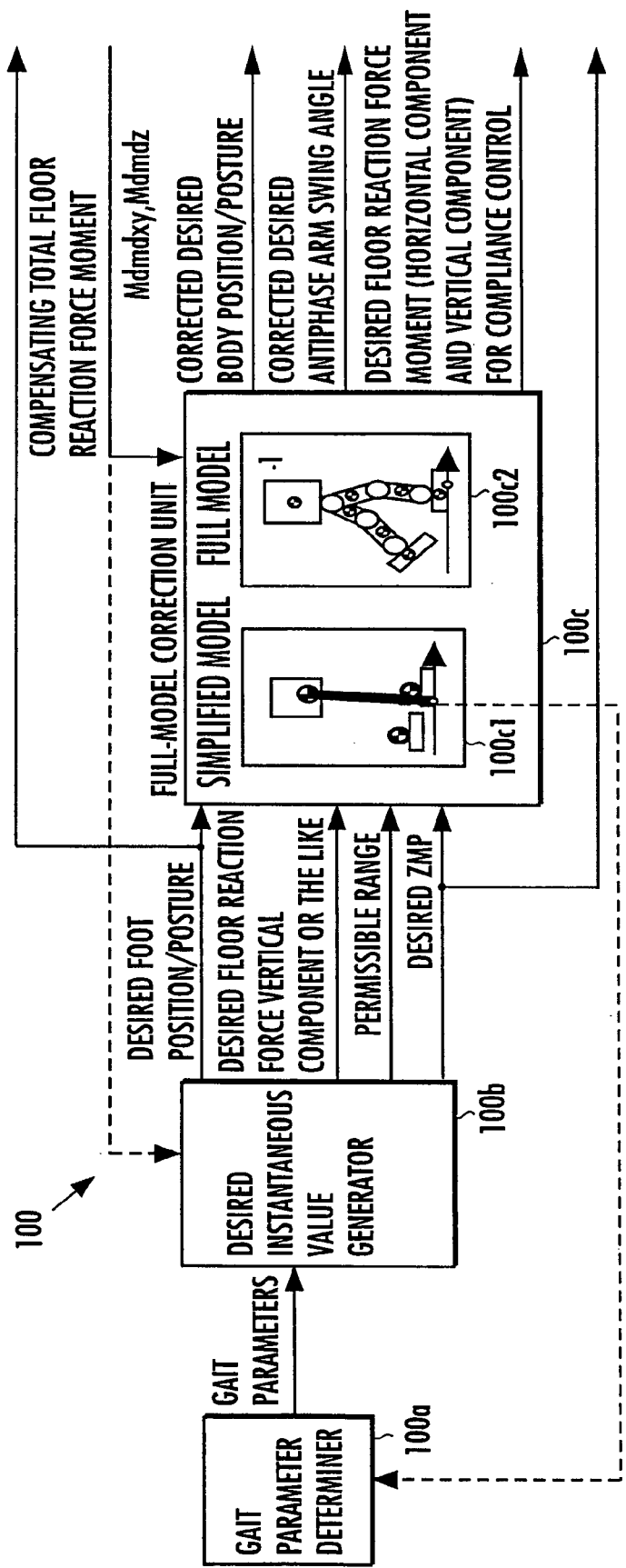
FIG. 63 is a block diagram showing a functional construction of a gait generator in a third embodiment of the present invention.

FIG. 63 is a block diagram showing an outline of the processing of the gait generator 100 in the present embodiment. Referring to this FIG. 63, an outline of the processing of the gait generator 100 will be explained below. Incidentally, the outline of the processing to be explained below in conjunction with FIG. 63 will apply also to a fourth to a sixth embodiments to be discussed hereinafter. In the present embodiment and the fourth to the sixth embodiments to be discussed hereinafter, the dynamic model of the aforesaid FIG. 12 will be referred to as a simplified model.

As illustrated, the gait generator 100 is equipped with a gait parameter determiner 10a. The gait parameter determiner 100a determines a value of a parameter of a desired gait (the parameter defining the desired gait) or a time series table thereof. This corresponds to the processing of S3520 through S3530 of the flowchart of FIG. 65 to be discussed hereinafter.

Although details will be given hereinafter, parameters determined by the gait parameter determiner 10a includes the parameters that define a desired foot position/posture trajectory, a desired arm posture trajectory, a reference body posture trajectory, a desired ZMP trajectory, a desired floor reaction force vertical component trajectory, etc. in addition to a parameter that defines a floor reaction force horizontal component permissible range, a parameter that defines a ZMP permissible range (or a floor reaction force moment horizontal component permissible range), and a parameter that defines a floor reaction force moment vertical component permissible range. In this case, the floor reaction force horizontal component permissible range and the floor reaction force moment vertical component permissible range to be set in the present embodiment come in two types, one for simplified model gaits set by the processing of S3526 to be described later and the other for correcting gait to be set in S3530. Meanwhile, a ZMP permissible range (or a floor reaction force moment horizontal component permissible range) comes in only one type for full model correction (for correcting a gait) set by the processing of S3530. In the present embodiment, S3530 sets a parameter for defining the ZMP permissible range. This is equivalent to setting a parameter that defines a floor reaction force moment horizontal component permissible range. This is because the value obtained by dividing a floor reaction force moment horizontal component by a desired floor reaction force vertical component represents the amount of the deviation of a ZMP (floor reaction force central point) from a desired ZMP, as has been explained in relation to S3030 of FIG. 56 in the aforesaid first embodiment.

Figure 64:
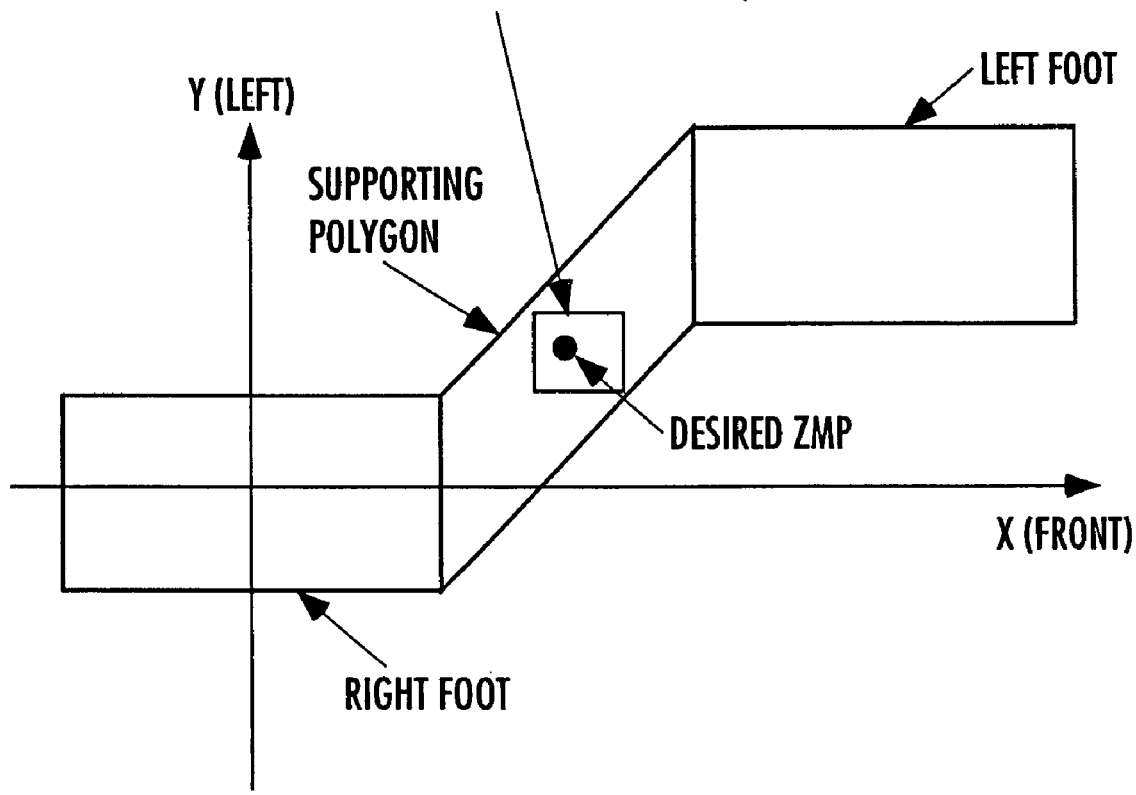
FIG. 64 is a diagram showing a setting example of a ZMP permissible range in the third embodiment.

Here, the ZMP permissible range to be set in the present embodiment will be set as shown in FIG. 64. The details have been given in PCT/JP03/00435, so that further explanation will be omitted.

A gait parameter determined by the gait parameter determiner 100a is input to a desired instantaneous value generator 10b. Based on the input gait parameter, the desired instantaneous value generator 100b sequentially calculates (generates) the instantaneous values of desired foot position/posture, a desired ZMP, a desired floor reaction force vertical component, a desired arm posture, a desired total center-of-gravity vertical position, a desired vertical body position, a floor reaction force horizontal component permissible range, a ZMP permissible range, a reference body posture angle, and a reference antiphase arm swing angle at current time t (FIG. 63 describes only a part of desired instantaneous values). The processing of the desired instantaneous value generator 100b corresponds to the processing of S3400 through S3412 of FIG. 57 carried out in the processing of S3532 of the flowchart of FIG. 65 to be discussed hereinafter and the processing of S3534 of FIG. 65. In the present embodiment, of the desired instantaneous values calculated by the desired instantaneous value generator 10b, some instantaneous values (specifically, the instantaneous value of a desired vertical body position) are provisional values, which will be corrected later.

The instantaneous values of the floor reaction force horizontal component permissible range and the floor reaction force moment vertical component permissible range calculated by the desired instantaneous value generator 100b come in the instantaneous values for simplified model gaits and the instantaneous values for correcting gaits.

Desired instantaneous values (some are provisional instantaneous values) calculated (generated) by the desired instantaneous value generator 100b are input to a full-model correction unit 100c. Also input to the full-model correction unit 100c are the compensating total floor reaction force moment horizontal component Mdmdxy determined by the aforesaid posture inclination stabilization control calculator 112 (refer to FIG. 59) and the compensating total floor reaction force moment vertical component Mdmdz determined by the aforesaid yaw stabilization control calculator 113 (refer to FIG. 59). The full-model correction unit 100c is provided with a simplified model 100c1 and a full model 100c2 as dynamic models. Based on the simplified model 100c1, the full-model correction unit 100c determines the provisional instantaneous values or the like of a desired body position/posture and an antiphase arm swing angle from the input values, and further corrects the provisional instantaneous values or the like of the determined body position/posture and the antiphase arm swing angle by using the full model 100c2.

As an alternative construction, the simplified model 100c1 may not be included in the full-model correction unit 100c. The full model 100c2 includes either an inverse full model (an inverse dynamic full model) or a forward full model (a forward dynamic full model), as will be discussed hereinafter.

The full-model correction unit 100c basically executes the processing of B to satisfy the following conditions A1 through A4. Specifically, the full-model correction unit 100c carries out B) given below to satisfy the following conditions:

A1) the value obtained by adding the compensating total floor reaction force moment horizontal component Mdmdxy and the compensating total floor reaction force moment vertical component Mdmdz to the floor reaction force moment balancing the motion of a corrected gait generated by the full-model correction unit 100c agrees with the floor reaction force moment for compliance control that is output from the full-model correction unit 100c, A2) a true ZMP (the ZMP that satisfies the original definition corrected by generating a desired floor reaction force moment for compliance control about a desired ZMP) lies in a ZMP permissible range (a permissible range that allows a sufficient stability allowance to be maintained), A3) a floor reaction force horizontal component lies in the floor reaction force horizontal component permissible range for correcting a gait, and A4) a desired floor reaction force moment vertical component for compliance control to be generated about a desired ZMP lies in a floor reaction force moment vertical component permissible range.

B) The full-model correction unit 100c corrects the body position/posture of a simplified model gait determined using the simplified model, and outputs the desired floor reaction force moment for compliance control about the desired ZMP.

The above condition A2 is equivalent to restricting a floor reaction force moment generated about the desired ZMP to a floor reaction force moment horizontal component permissible range that corresponds to a ZMP permissible range.

Here, the aforesaid simplified model 100c1 and the aforesaid full model 100c2 will be explained. The simplified model 100c1 is a dynamic model with an emphasis placed on a reduced volume of calculation or the ease of behavior analysis rather than dynamic accuracy, and may ignore some dynamic elements (e.g., ignore a change in the angular momentum about the center of gravity) or may have contradiction (lack in preciseness). In the present embodiment, the dynamic model of FIG. 12 explained in the aforesaid reference example (the dynamic model described in conjunction with the above Equations 01 to 05) is used as the simplified model 100c1.

The full model 100c2 means a robot dynamic model that is different from the simplified model 100c1. This is desirably a robot dynamic model having a higher approximation accuracy than that of the simplified model 100c1. This will be explained in conjunction with the illustrated example. As previously described, in the present embodiment, the dynamic model shown in the above FIG. 12 is used as the simplified model 100; therefore, a dynamic model having a higher approximation accuracy than that, such as the robot dynamic model like the multi-mass point model (the model having a mass point for each link of the robot 1) shown in, for example, FIG. 49 mentioned above, is desirably used as a full model 100c2. In this case, the full model 100c2 may be such that an inertial moment is set about a mass point.

However, the simplified model 100c and the full model 100c2 do not have to necessarily have different model approximation accuracy. The simplified model 100c1 and the full model 100c2 may share the same dynamic equations and have different floor reaction force horizontal component permissible ranges and/or floor reaction force moment vertical component permissible ranges, that is, they may be different only in the permissible range for simplified model gaits and the permissible range for gait correction (for full model correction). For instance, the floor reaction force horizontal component permissible range and the floor reaction force moment vertical component permissible range for generating gaits by the simplified model 100c1 may be merely set to be wide (may even exceed a frictional limit), while setting narrow ranges for the floor reaction force horizontal component permissible range and the floor reaction force moment vertical component permissible range applied for correcting gaits using the full model 100c2, thereby making it difficult for the robot 1 to slip or spin.

In the present description, the model used to calculate (output) body position/posture and an antiphase arm swing angle on the basis of (by entering) desired foot position/posture, a desired floor reaction force (particularly, a desired ZMP and a desired floor reaction force vertical component) is called the "forward dynamic model." The model used to calculate (output) a floor reaction force (especially a desired ZMP or a floor reaction force moment (a horizontal component and a vertical component) and a floor reaction force horizontal component) on the basis of (by entering) desired foot position/posture, a desired body posture, a desired body position and an antiphase arm swing angle is called the "inverse dynamic model." An input of the forward dynamic model includes at least a desired floor reaction force, while an input of the inverse dynamic model includes at least a desired motion.

The full model 10c2 provided in the full-model correction unit 100c is equipped with an inverse dynamic full model (frequently referred to simply as "inverse full model") or a forward dynamic full model (frequently referred to simply as "forward full model"). In general, the volume of calculation of a forward dynamic model tends to be greater than that of an inverse dynamic model.

The above is the outline of the processing in the gait generator 100 in the present embodiment (the third embodiment).

The processing of the gait generator 100 in the present embodiment will now be explained in detail. The gait generator 10C in the present embodiment carries out the processing shown in the flowchart of FIG. 65 to generate gaits.

First, the same processing as the processing from S3010 to S3028 of FIG. 56 explained in the aforesaid first embodiment is carried out in S3510 to S3528. The floor reaction force horizontal component permissible range for a current time gait determined in S608 of FIG. 39, which is the subroutine of S3026, and the floor reaction force moment vertical component permissible range determined in S610 require less strict consideration given to the limit of a frictional force than in the case of the aforementioned reference example, the first embodiment and the second embodiment, and may be set to ranges that exceed the limit of the frictional force. This is because the floor reaction force horizontal component and the floor reaction force moment vertical component will be eventually restricted by a floor reaction force horizontal component permissible range and a floor reaction force moment vertical component permissible range for full model correction by the full model correction, which will be discussed hereinafter.

Subsequently, the processing proceeds to S3530 wherein the parameters defining the floor reaction force horizontal component permissible range, the floor reaction force moment vertical component permissible range, and the ZMP permissible range (floor reaction force central point permissible range) for full model correction (for gait correction) are determined. In this case, the floor reaction force horizontal component permissible range for full model correction is set to have a pattern, as shown in the aforesaid FIG. 30, on the basis of a floor reaction force vertical component trajectory and the above Equation 12 for the X-axis direction (the longitudinal direction) and the Y-axis direction (the lateral direction), respectively, as in the case of, for example, the floor reaction force horizontal component permissible range for the aforesaid simplified model gaits. Then, for example, the value of ka*μ of the above Equation 12 is set as the parameter that defines the floor reaction force horizontal component permissible range for full model correction. However, the floor reaction force horizontal component permissible range is desirably set to that it securely falls within the range of a frictional limit by, for example, setting the value of coefficient ka of Equation 12 to be smaller than the floor reaction force horizontal component permissible range for simplified model gaits.

The floor reaction force moment vertical component permissible range is set in the same manner as that for the floor reaction force horizontal component permissible range. More specifically, the floor reaction force moment vertical component permissible range is set to the pattern, as shown in the aforesaid FIG. 41, according to the aforesaid Equation 1012.

The ZMP permissible range is set in the same manner as that for the case explained in conjunction with the setting of the floor reaction force moment horizontal component permissible range in S3030 of FIG. 56 in the aforementioned first embodiment. The ZMP permissible range may be of course converted into a floor reaction force moment horizontal component permissible range equivalent thereto by multiplying the ZMP permissible range by a desired floor reaction force vertical component.

Subsequently, the processing proceeds to S3532 wherein the instantaneous value of the current time gait (the value at the current time t) is determined using the aforesaid simplified model (the dynamic model shown in FIG. 12). The processing of this S3532 is identical to the processing of S030 of FIG. 13 in the aforesaid reference example.

The instantaneous value of the gait at the current time t generated by the processing up to S3532 explained above will be hereinafter referred to as the simplified model gait instantaneous value. In the present embodiment, the simplified model gait instantaneous value is determined using a simplified model (the dynamic model shown in FIG. 12) such that the floor reaction force moment horizontal component generated about a desired ZMP by the resultant force of the inertial force and gravity generated in the robot 1 by a motion thereof is zero (such that a dynamic balance condition related to the desired ZMP is satisfied).

In this case, of the simplified model gait instantaneous values, the instantaneous values of a horizontal body position and a body posture inclination angle, the instantaneous value of a vertical body position, and an instantaneous value of an antiphase arm swing angle are provisional instantaneous values and will be corrected by full model correction to be discussed later. Further, of the simplified model gait instantaneous values in the present embodiment, the instantaneous value of the desired floor reaction force moment horizontal component about the desired ZMP is normally zero, whereas a desired floor reaction force moment horizontal component for compliance control as the desired value of the floor reaction force moment horizontal component generated about the desired ZMP by the full model correction, which will be discussed later, is generated.

Subsequently, the processing proceeds to S3534 wherein the instantaneous values (the values at the current time t) of the floor reaction force horizontal component permissible range, the floor reaction force moment vertical component permissible range, and the ZMP permissible range for gait correction are determined on the basis of the parameters (which have been set in S3530) that define the floor reaction force horizontal component permissible range, the floor reaction force moment vertical component permissible range, and the ZMP permissible range for gait correction (for full model correction).

Subsequently, the processing proceeds to S3536 wherein the full model is used to generate a corrected gait (to correct the gait) so as to determine the instantaneous value of a final desired gait. More specifically, as explained with reference to the aforesaid FIG. 63, the calculation (determination) of corrected desired body position/posture, a corrected desired antiphase arm swing angle, and a desired floor reaction force moment (a horizontal component and a vertical component) for compliance control as a desired floor reaction force moment (a horizontal component and a vertical component) about a desired ZMP is mainly performed.

Subsequently, the processing proceeds to S3538 to increment the time t by Δt, and returns to S3514 again to repeat the processing from S3514 to S3538.

The processing of S3536 described above, which constitutes a characteristic of the present embodiment, will be explained in detail below. The gait correcting technique of a device in accordance with the present embodiment is a full-model feedforward correction type. Furthermore, the gait correction technique uses an inverse dynamic full model (inverse full mode), and it is a technique that does not correct an input of a simplified model gait, and it is a technique that uses a perturbation model.

Figure 65:
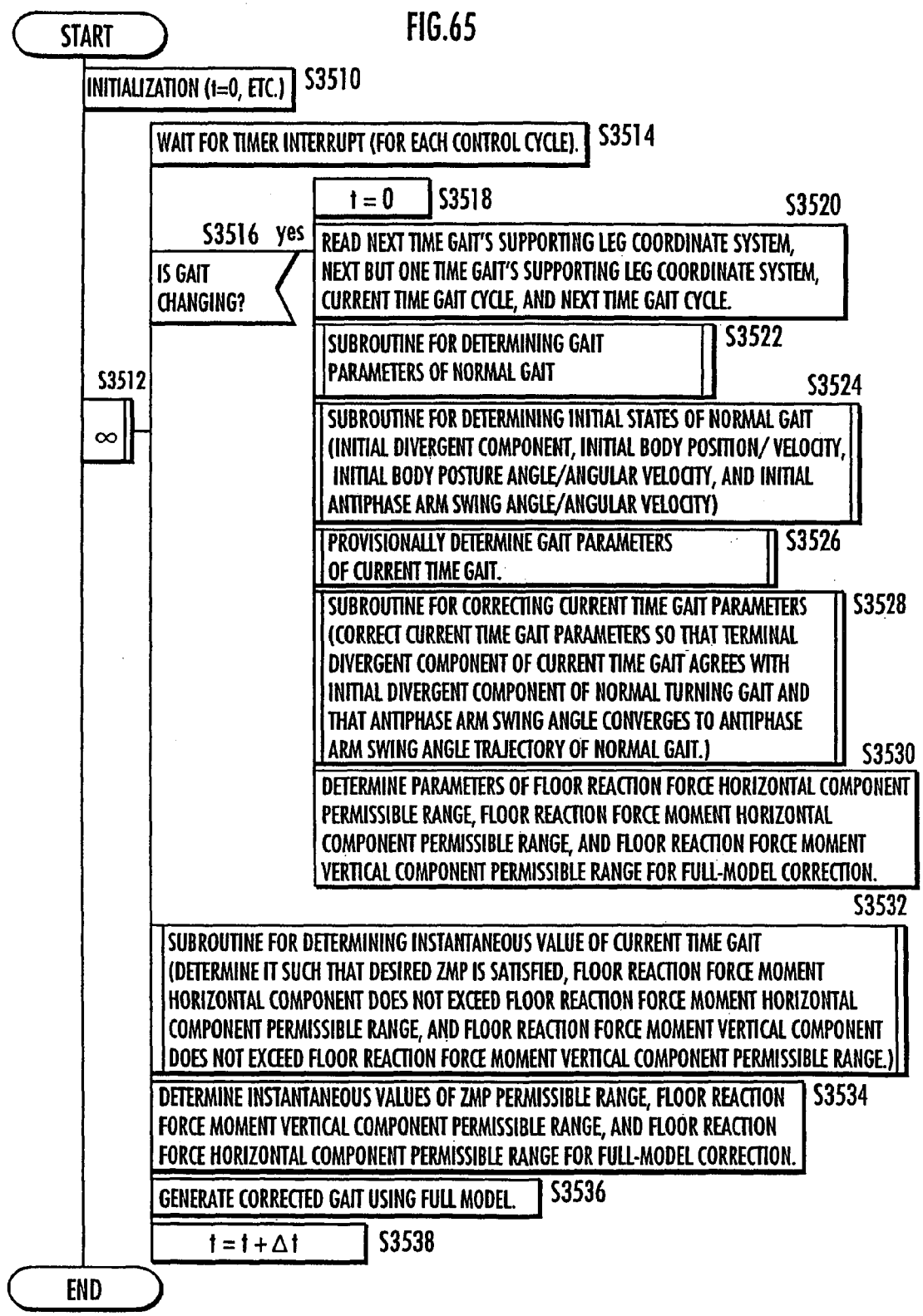
FIG. 65 is a flowchart showing main routine processing of the gait generator in the third embodiment.
Figure 66:
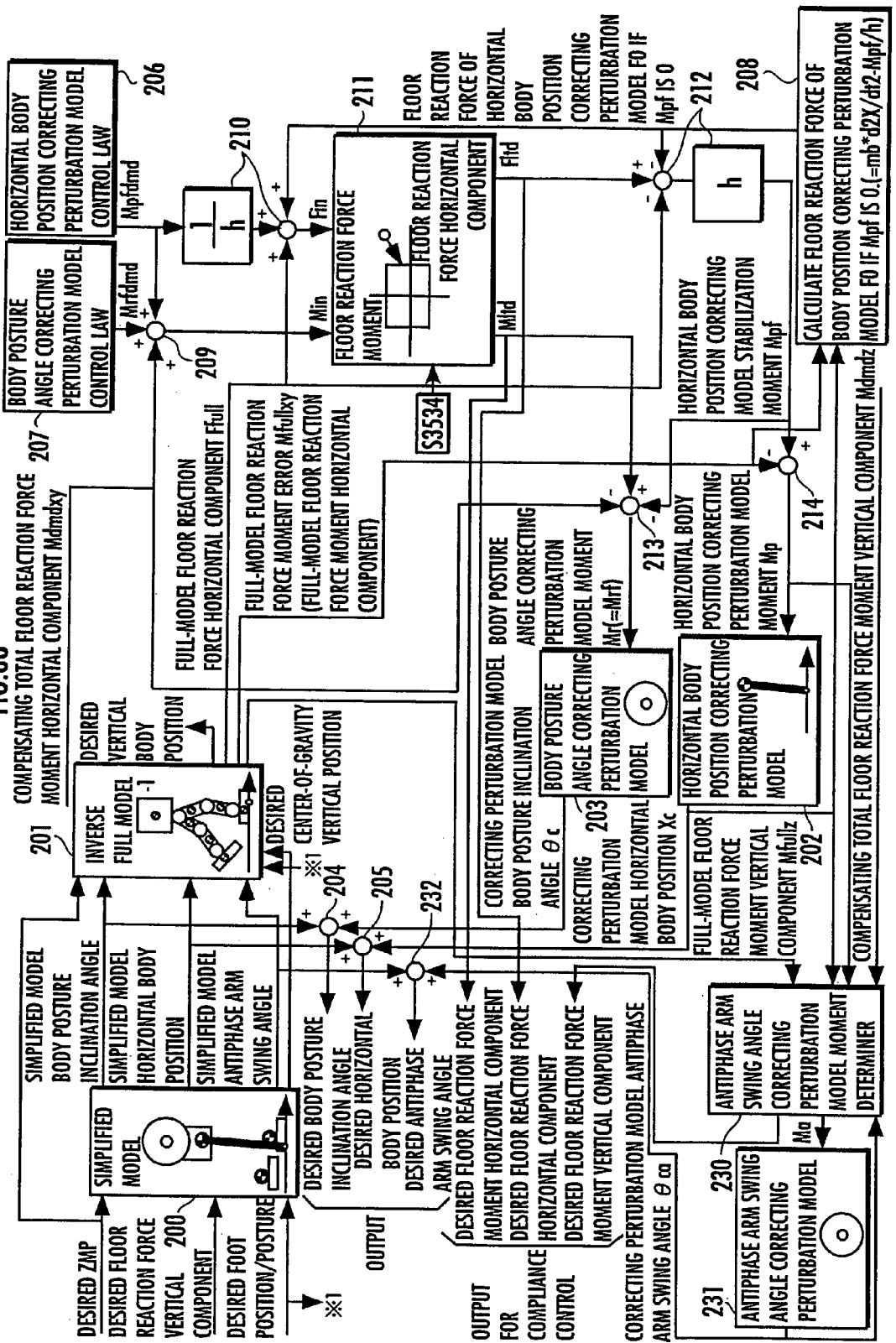
FIG. 66 is a block diagram showing processing of S3536 in FIG. 65.

FIG. 66 is a functional block diagram explaining the operation of the gait generator 100 according to the present embodiment, specifically, the technique for correcting a gait in S3536 of the flowchart of FIG. 65. A simplified model 200 shown in FIG. 66 represents not only a dynamic model but the processing of S3510 to S3532 discussed above, namely, the processing of calculating (determining) the instantaneous value of a simplified model gait. In FIG. 66, therefore, the portion beyond the simplified model 200 corresponds to the processing of S3536.

The processing for determining the instantaneous values of the floor reaction force horizontal component permissible range and the ZMP permissible range for gait correction (for full model correction) is shown using a reference mark S3534 of the flowchart of FIG. 65.

The actual processing is implemented by a single computer, so that it is implemented in order toward a downstream side (toward a gait output side) from an upstream side of the block diagram after the block diagram is broken up. However, a feedback amount returned to the upstream side uses a value (a state amount) calculated in the last control cycle (time t−Δt with respect to the current time t). Hereinafter, the value calculated in the last time control cycle (time t−Δt) will be abbreviated as a last time value.

Each time the processing of S3536 is carried out, the calculation for one control cycle in the block diagram is performed.

In S3536, first, the instantaneous values of variables representing a motion (this is called a motion variable), such as the desired body posture angle (hereinafter referred to as the simplified model body posture angle. Further, an inclination angle component thereof will be referred to as the simplified model body posture inclination angle), the desired horizontal body position (hereinafter referred to as the simplified model horizontal body position), the desired center-of-gravity position, the desired foot position/posture, and the desired arm posture (including the desired antiphase arm swing angle) of the simplified model gait obtained as described above, and the instantaneous value of a desired ZMP are input to the aforesaid inverse dynamic full model (inverse full model) 201. The floor reaction force horizontal component and the floor reaction force moment about the desired ZMP (a horizontal component and a vertical component), balancing the motion represented by the input motion variables (in other words, a full model is generated by the motion), are calculated by the calculation processing of the inverse full model 201. In the present embodiment, the floor reaction force moment horizontal component about the desired ZMP in the simplified model gait is zero, so that the floor reaction force moment horizontal component about the desired ZMP calculated by the inverse full model 201 has a meaning as an error of a simplified model gait. Incidentally, the floor reaction force horizontal component, the floor reaction force moment horizontal component, and the floor reaction force moment vertical component determined by the inverse full model 201 are called "the full-model floor reaction force horizontal component," "the full-model floor reaction force moment horizontal component," and "the full-model floor reaction force moment vertical component," respectively. Hereinafter, the full-model floor reaction force horizontal component will be frequently abbreviated as Ffull, the full-model floor reaction force moment horizontal component will be frequently abbreviated as Mfullxy, and the full-model floor reaction force moment vertical component will be frequently abbreviated as Mfullz.

Furthermore, the aforesaid inverse full model 201 calculates the vertical body position that satisfies a desired center-of-gravity position. Although not shown, the inverse full model 201 also calculates the center-of-gravity horizontal position.

Supplementally, a desired total center-of-gravity vertical position is input to the full model, and a desired floor reaction force vertical component is determined from the second order differential value of the desired total center-of-gravity vertical position. Hence, there is no particular need to input a desired floor reaction force vertical component to the full model. For a reason of achieving a reduction of calculation or the like, a desired floor reaction force vertical component may be input to the full model even if it is redundant.

A perturbation model used for gait correction will now be explained.

The perturbation model is composed of a horizontal body position correcting perturbation model 202, a body posture inclination angle correcting perturbation model 203, and an antiphase arm swing angle correcting perturbation model 231. The perturbation model may be a single model shown in FIG. 12 rather than being composed of such three separate models. The body posture inclination angle correcting perturbation model 203 is abbreviated as the body posture angle correcting perturbation model 203 in the figure.

The horizontal body position correcting perturbation model 202 represents the relationship between the perturbation of a floor reaction force and the perturbation of a horizontal body position in the aforesaid body translational mode.

The horizontal body position correcting perturbation model 202 receives a correction amount of a desired floor reaction force moment and calculates a correction amount of a desired horizontal body position that dynamically balances with the received correction amount of the desired floor reaction force moment. This input (the correction amount of the desired floor reaction force moment) is called a perturbation model moment for correcting horizontal body position Mp. An output (the correction amount of a desired horizontal body position) of the horizontal body position correcting perturbation model 202 is called a correcting perturbation model horizontal body position Xc. The floor reaction force horizontal component generated by the horizontal body position correcting perturbation model 202 is called a perturbation model floor reaction force horizontal component for correcting horizontal body position Fp.

Figure 67:
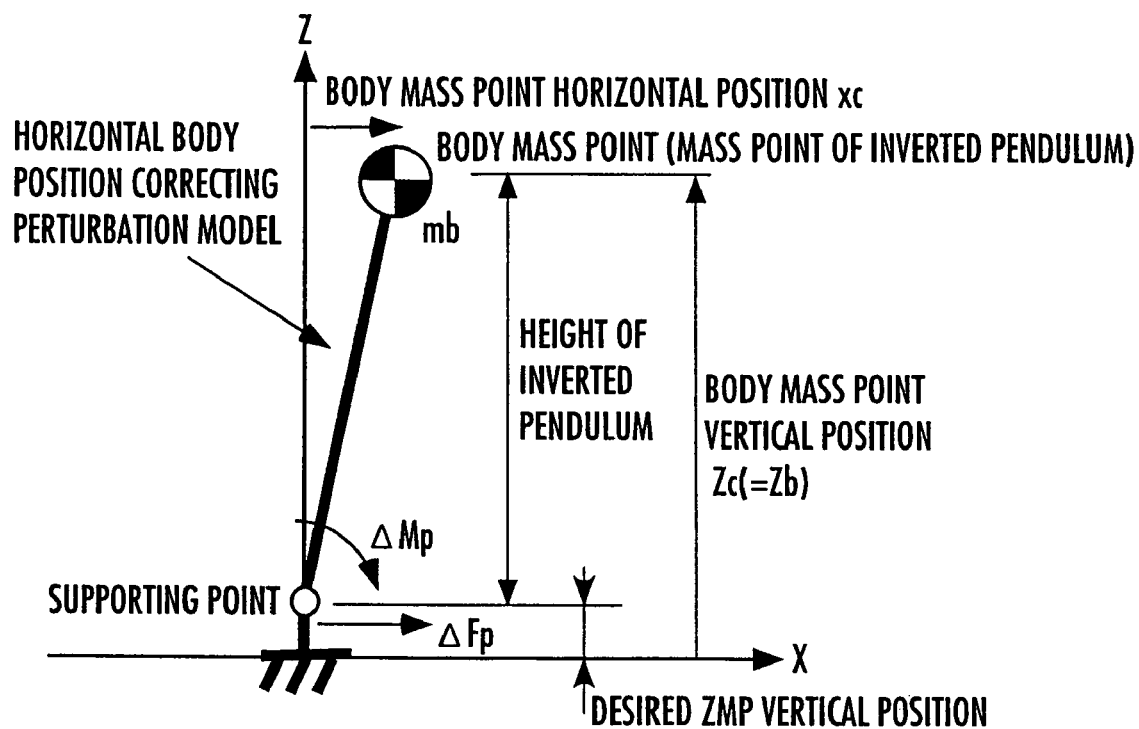
FIG. 67 is a diagram for explaining a horizontal body position perturbation model shown in FIG. 66.

The horizontal body position correcting perturbation model 202 is represented by an inverted pendulum composed of a support point, an inverted pendulum mass point (body mass point) and an extensible support rod connecting them, as shown in FIG. 67. The position of the support point is set so that the horizontal position of the support point agrees with the horizontal position of the origin of the current time's gait supporting leg coordinate system described above, and the vertical position of the support point agrees with the vertical position of a desired ZMP. A mass mb of the inverted pendulum mass point is identical to the mass of the body mass point of the aforesaid simplified model (the model with 3 mass points+flywheels) shown in FIG. 12. A vertical position Zc of the inverted pendulum mass point is to be identical to a vertical position Zb of the body mass point position of the simplified model shown in FIG. 12, which corresponds to a simplified gait.

The horizontal body position correcting perturbation model 202 shows the relationship between a perturbation ΔMy of a floor reaction force moment and a perturbation ΔXb of a body mass point horizontal position in the aforesaid simplified model.

Hence, assuming that parameters other than My, Xb, and Zb take constants, if the relationship between the perturbation ΔMy of a floor reaction force moment and the perturbation ΔXb of a body mass point horizontal position is determined from the above Equation 03y, then the following equation will be obtained.

$$\Delta My = -mb^* \Delta Xb^* (g + d2Zb/dt2) + mb^* (Zb - Zzmp) \\ {}^* d2\Delta Xb/dt2 \qquad \text{Equation a12}$$

Similarly, assuming that parameters other than Fx and Xb take constants, if the relationship between the perturbation ΔFx of a floor reaction force horizontal component and the perturbation ΔXb of a body mass point horizontal position is determined from the above Equation 02x, then the following equation will be obtained.

$$\Delta Fx = mb^* d2\Delta Xb/dt2 \qquad \text{Equation a13}$$

A body translational mode floor reaction force ratio h, which is the ratio of ΔMp to ΔFp generated by a horizontal body acceleration, is the ratio of the term generated by the horizontal body acceleration (that is, the second term) of the right side of Equation a12 to Equation a13, so that the following equation will be obtained.

$$H = (Zb - Zzmp) \qquad \text{Equation a14}$$

In other words, the body translational mode floor reaction force ratio h corresponds to the height from the support point of the body mass point (the inverted pendulum mass point) of the simplified model.

Accordingly, the following equation is derived from Equation a12 and Equation a14.

$$\Delta My = -mb^* \Delta Xb^* (g + d2Zb/dt2) + mb^* h^* d2\Delta Xb/dt2 \qquad \text{Equation a15}$$

Meanwhile, the floor reaction force vertical component that balances with the translational force vertical component of the resultant force of the gravity and the inertial force acting on the body mass point (the inverted pendulum mass point) is referred to as a body floor reaction force vertical component Fbz. Specifically, the body floor reaction force vertical component Fbz is defined by the following equation.

$$Fbz = mb^* (g - d2Zb/dt2) \qquad \text{Equation a16}$$

And, from the Equation a16 and the aforesaid Equation 01, the body floor reaction force vertical component Fbz is determined from the following equation.

$$Fbz = Fz - msup^* (g + d2Zsup/dt2) - mswg^* (g + d2Zswg/ \\ dt2) \qquad \text{Equation a17}$$

In other words, the body floor reaction force vertical component is equal to the sum of the floor reaction force vertical component Fz and the translational force vertical component of the resultant force of the gravity and the inertial force acting on both leg mass points of the aforesaid simplified model (the model with 3 mass points+flywheels) shown in FIG. 12.

Substituting Equation a16 into Equation a15 provides the following equation.

$$\Delta My = -Fbz^* \Delta Xb + mb^* h^* d2\Delta Xb/dt2 \qquad \text{Equation a18}$$

Associating ΔMy of Equation a18 with the perturbation model moment for correcting horizontal body position Mp, and associating ΔXb with the correcting perturbation model horizontal body position Xc (substituting the perturbation model moment for correcting horizontal body position Mp into ΔMy of Equation a18, and substituting the correcting perturbation model horizontal body position Xc into ΔXb) provide the following equation.

$$Mp = -Fbz^* Xc + mb^* h^* d2Xc/dt2 \qquad \text{Equation a19}$$

In other words, the horizontal body position correcting perturbation model 202 is expressed by Equation a19 by using the body translational mode floor reaction force ratio h determined according to Equation a14 and the body floor reaction force vertical component Fbz determined according to Equation a17.

Further, associating ΔFx of Equation a13 with the perturbation model floor reaction force horizontal component for correcting horizontal body position Fp provides the following equation.

$$Fp = mb * d2Xc/dt2 \qquad \text{Equation a20}$$

In other words, the horizontal body position correcting perturbation model 202 is described by Equation a14, Equation a17, Equation a19, and Equation a20.

Supplementally, it is regarded here that the perturbation of a body mass point position and the perturbation of a body position (the position of a body representative point) agree; strictly speaking, however, they do not always agree. Accordingly, to determine the relationship among Mp, Fp, and Xc, a model that expresses a geometric relationship between the horizontal position of a body mass point and a body position is further necessary.

Meanwhile, a body posture inclination angle correcting perturbation model 203 represents a relationship between the perturbation of a floor reaction force and a body posture inclination angle in the aforesaid body inclination mode.

The body posture inclination angle correcting perturbation model 203 receives a correction amount of a floor reaction force moment horizontal component and calculates a correction amount of a desired body posture inclination angle that dynamically balances with the received correction amount of the floor reaction force moment horizontal component. This input (the correction amount of the floor reaction force moment) is called a perturbation model moment for correcting body posture inclination angle Mr (abbreviated to a perturbation model for correcting body posture angle Mr in some cases). An output (the correction amount of a desired body posture inclination angle) of the body posture inclination angle correcting perturbation model 203 is called a correcting perturbation model body posture inclination angle θc. The floor reaction force horizontal component generated by the body posture inclination angle correcting perturbation model 203 is called a perturbation model floor reaction force horizontal component for correcting horizontal body position Fr. Fr is zero as mentioned above. This means that the following equation always holds.

$$Fr = 0 \qquad \text{Equation a21}$$

Figure 68:
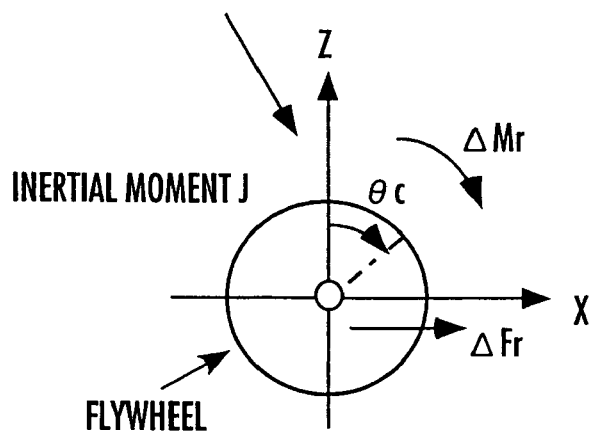
FIG. 68 is a diagram for explaining a perturbation model for correcting body posture angle shown in FIG. 66.

The body posture inclination angle correcting perturbation model 203 is expressed by a flywheel, as shown in FIG. 68. Supplementally, FIG. 68 shows only the flywheel that rotates about the Y-axis; however, the body posture inclination angle correcting perturbation model 203 actually requires a flywheel that rotates about the X-axis in addition to the flywheel rotating about the Y-axis. The inertia of those flywheels are the same as the flywheels FHx and FHy of the aforesaid simplified model (the model with 3 mass points+flywheels) shown in FIG. 12. The rotational angle of a flywheel of the body posture inclination angle correcting perturbation model 203 corresponds to the correcting perturbation model body posture inclination angle θc, and the floor reaction force moment Horizontal component generated by the flywheel corresponds to the perturbation model moment Mr for correcting body posture inclination angle. In the following explanation, for the convenience of understanding, the explanation will center around the flywheel that rotates about the Y-axis. The same applies to the flywheel that rotates about the X-axis.

The body posture inclination angle correcting perturbation model 203 (more specifically, the model related to a sagittal plane) expresses a relationship between the floor reaction force moment perturbation ΔMy and the body posture inclination angle perturbation Δθby in the aforesaid Equation 03y of the dynamic equation of the aforesaid simplified model (the model with 3 mass points+flywheels).

Accordingly, if parameters other than My and θby are regarded as constants, and if the relationship between the floor reaction force moment horizontal component perturbation ΔMy and the body posture inclination angle perturbation Δθby is determined according to Equation 03y, then the following equation will be obtained.

$$\Delta My = J * d2\Delta\theta by/dt2 \qquad \text{Equation a22}$$

Associating ΔMy of Equation a22 with the perturbation model moment for correcting body posture inclination angle Mr, and associating Δθby with the correcting perturbation model body posture inclination angle θc provide the following equation.

$$Mr = J * d2\Delta\theta c/dt2 \qquad \text{Equation a23}$$

In other words, the body posture inclination angle correcting perturbation model 203 is represented by equation a23. The perturbation model floor reaction force horizontal component for correcting horizontal body position Fr is determined according to Equation a21 as described above (Fr=0). In the above description, the dynamics of the body posture inclination angle correcting perturbation model 203 has been explained on the sagittal plane. The dynamics on a lateral plane is represented by the same type as Equation a23.

An antiphase arm swing angle correcting perturbation model 231 shows the relationship between the perturbation of a floor reaction force and the perturbation of an antiphase arm swing angle in the antiphase arm swing mode.

The antiphase arm swing angle correcting perturbation model 231 receives a correction amount of a floor reaction force moment vertical component and calculates a correction amount of a desired antiphase arm swing angle that dynamically balances with the received correction amount of the floor reaction force moment vertical component. This input (the correction amount of the floor reaction force moment vertical component) is called a perturbation model moment for correcting antiphase arm swing angle Ma. An output (the correction amount of a desired antiphase arm swing angle) of the antiphase arm swing angle correcting perturbation model 203 is called a correcting perturbation model antiphase arm swing angle θca. The floor reaction force horizontal component generated by the perturbation model for correcting antiphase arm swing angle is called a perturbation model floor reaction force horizontal component for correcting antiphase arm swing angle Fa. Fa is zero as described above. This means that the following equation always holds.

$$Fa = 0 \qquad \text{Equation a21c}$$

Figure 69:
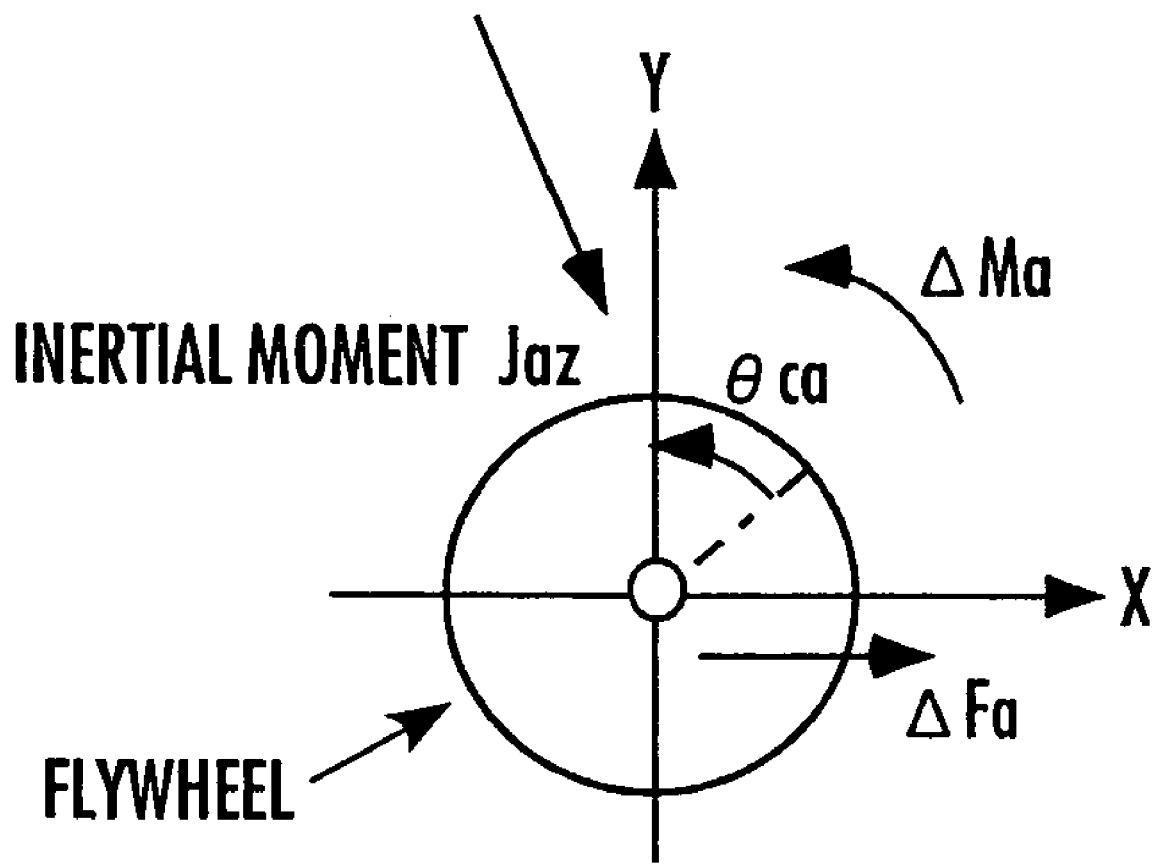
FIG. 69 is a diagram for explaining a perturbation model for correcting antiphase arm swing angle shown in FIG. 66.

The antiphase arm swing angle correcting perturbation model 231 is expressed by a flywheel, as shown in FIG. 69. The inertia of the flywheel is the same as the flywheel FHaz of the aforesaid simplified model (the model with 3 mass points+flywheels) shown in FIG. 12. The rotational angle of the flywheel of the antiphase arm swing angle correcting perturbation model 231 corresponds to the correcting perturbation model antiphase arm swing angle θca, and the floor reaction force moment vertical component generated by the flywheel corresponds to the perturbation model moment for correcting antiphase arm swing angle Ma.

The antiphase arm swing angle correcting perturbation model 231 expresses a relationship between the floor reaction force moment perturbation ΔMz and the antiphase arm swing angle perturbation Δθaz in the aforesaid Equation 03z of the dynamic equation of the aforesaid simplified model (the model with 3 mass points+flywheels).

Accordingly, if parameters other than Mz and θaz are regarded as constants, and if the relationship between the floor reaction force moment perturbation ΔMz and the antiphase arm swing angle perturbation Δθaz is determined according to Equation 03z, then the following equation will be obtained.

$$\Delta Mz = Jaz * d2\Delta\theta az/dt2 \quad \text{Equation a22c}$$

Associating ΔMz of Equation a22c with the perturbation model moment for correcting antiphase arm swing angle Ma, and associating Δθaz with the correcting perturbation model antiphase arm swing angle θca provide the following equation.

$$Ma = Jaz * d2\Delta\theta ca/dt2 \quad \text{Equation a23c}$$

In other words, the antiphase arm swing angle correcting perturbation model 231 is represented by equation a23c. The perturbation model floor reaction force horizontal component for correcting antiphase arm swing angle Fa is determined according to Equation a21c as described above (Fa=0).

As it will be discussed later, in S3536, a corrected gait (to be more specific, a desired instantaneous value with some instantaneous values of a simplified model gait corrected) are eventually generated (output). A desired body posture inclination angle of the corrected gait (hereinafter referred to as the corrected desired body posture inclination angle) is obtained by adding the aforesaid correcting perturbation model body posture inclination angle θc (the value determined in the control cycle at the current time t) to the instantaneous value of the aforesaid determined simplified model body posture inclination angle (the instantaneous value of the desired body posture inclination angle at the current time t of the current time gait determined in S3532) by a calculator 204. The desired horizontal body position of the corrected gait (hereinafter referred to as the corrected desired horizontal body position) is obtained by adding the correcting perturbation model horizontal body position Xc (the value determined in the control cycle at the current time t) to the instantaneous value of the aforesaid determined simplified model horizontal body position (the instantaneous value of the desired horizontal body position at the current time t of the current time gait determined in S3532) by a calculator 205. Further, a desired antiphase arm swing angle of a corrected gait (hereinafter referred to as the corrected desired antiphase arm swing angle) is obtained by adding the correcting perturbation model antiphase arm swing angle θca (the value determined in the control cycle at the current time t) to the instantaneous value of the aforesaid determined simplified model antiphase arm swing angle (the instantaneous value of the desired antiphase arm swing angle at the current time t of the current time gait determined in S3532) by a calculator 232.

The desired floor reaction force of the corrected gait is also corrected. Specifically, the floor reaction force moment horizontal component about the desired ZMP is no longer zero, and the desired floor reaction force moment horizontal component for compliance control is output as a desired value. Further, the desired floor reaction force horizontal component is also corrected to a corrected desired floor reaction force horizontal component and output. In addition, the desired floor reaction force moment vertical component is corrected to a corrected desired floor reaction force moment vertical component and output.

As described above, the motion of the corrected gait is the motion obtained by adding (combining) the motions of perturbation models (to be more specific, the motions of the horizontal body position correcting perturbation model 202 and the body posture inclination angle correcting perturbation model 203 and the motion of the antiphase arm swing angle correcting perturbation model 231) to the motion of a simplified model gait.

In general, the floor reaction force generated by a motion obtained by adding a certain perturbation motion to a certain reference motion is approximated by the sum of the floor reaction force generated by the reference motion (the floor reaction force counterbalancing the gravity and the inertial force generated by the motion) and the perturbational portion of the floor reaction force generated by the perturbation motion.

Considering that the floor reaction force horizontal component generated by the body inclination mode, the floor reaction force moment vertical component generated by the body inclination mode, the floor reaction force horizontal component generated by the antiphase arm swing mode, and the floor reaction force moment horizontal component generated by the antiphase arm swing mode are all zero, the three equations given below must be satisfied in order for the result, which is obtained by adding the compensating total floor reaction force moment horizontal component Mdmdxy and the compensating total floor reaction force moment vertical component Mdmdz to the floor reaction force moment that balances with the motion of a corrected gait on the inverse full model 201, to agree with a corrected desired floor reaction force moment (to satisfy the condition of A1 described above).

Full-model floor reaction force moment horizontal component *M*full*xy*+Perturbation model moment for correcting horizontal body position *Mp*+Perturbation model moment for correcting body posture inclination angle *Mr*+Compensating total floor reaction force moment horizontal component *Mdmdxy*=Corrected desired floor reaction force moment horizontal component    Equation h5

Full-model floor reaction force horizontal component *F*full+Perturbation model floor reaction force horizontal component for correcting horizontal body position *Fp*=Corrected desired floor reaction force horizontal component    Equation h6

Full-model floor reaction force moment vertical component *M*full*z*+Perturbation model moment vertical component for correcting horizontal body position *Mpz*+Perturbation model moment vertical component for correcting antiphase arm swing angle *Maz*+Compensating total floor reaction force moment vertical component *Mdmdz*=Corrected desired floor reaction force moment vertical component    Equation h1006 where the perturbation model moment vertical component for correcting horizontal body position Mpz denotes the floor reaction force moment vertical component generated on the inverse full model 201 by a motion of the perturbation model for correcting horizontal body position. The moments of Equation h5 and Equation h1006 are the moments about an original (simplified model's) desired ZMP.

The true ZMP of a corrected gait is changed to a point deviated from the desired ZMP (ideal desired ZMP) of a simplified model gait by the value obtained by dividing a corrected desired floor reaction force moment by a desired floor reaction force vertical component.

True *ZMP* of corrected gait=Desired *ZMP*+Corrected desired floor reaction force moment/Desired floor reaction force vertical component    Equation h7

To calculate the component in the X direction (longitudinal direction) of the true ZMP of a corrected gait, the component about the Y-axis (lateral axis) of a corrected desired floor reaction force moment is used. Further, to calculate the component in the Y direction of the true ZMP of a corrected gait, the component about the X-axis (longitudinal axis) of a corrected desired floor reaction force moment is used. However, when calculating the component in the Y direction of the true ZMP of a corrected gait, "+" of the right side of Equation h7 must be changed to "−".

Supplementally, a corrected desired floor reaction force moment vertical component about the true ZMP of a corrected gait may be calculated, as an alternative.

The corrected desired floor reaction force moment vertical component about the true ZMP of a corrected gait will be the outcome obtained by adding the outer product of the difference between the true ZMP of a corrected gait and a desired ZMP and the corrected desired floor reaction force horizontal component determined according to Equation h6 to the moment about an original desired ZMP.

The true ZMP of the corrected gait determined according to Equation h7 must fall within a ZMP permissible range. This is called a ZMP restriction condition.

The corrected desired floor reaction force horizontal component must fall within a floor reaction force horizon-al component permissible range for correcting gait (for full-model correction). This is called a floor reaction force horizontal component restriction condition.

The corrected desired floor reaction force moment vertical component must fall within a floor reaction force moment vertical component permissible range for correcting gait (for full-model correction). This is called a floor reaction force moment vertical component restriction condition.

As described above, a corrected gait must satisfy Equation h5, Equation h6, Equation h1006, the ZMP restriction condition (the condition of a range in which the true ZMP of the corrected gait obtained from Equation h7 exists), the floor reaction force horizontal component restriction condition, and the floor reaction force moment vertical component restriction condition.

However, merely satisfying these equations and conditions would cause divergence of the aforesaid correcting perturbation model body position, the aforesaid correcting perturbation model body posture inclination angle, and the aforesaid correcting perturbation model antiphase arm swing angle.

Therefore, on the basis of the state amounts of the aforesaid horizontal body position correcting perturbation model 202, the aforesaid body posture inclination angle correcting perturbation model 203, and the aforesaid antiphase arm swing angle correcting perturbation model 231 (to be more specific, correcting perturbation model's horizontal body position/velocity, correcting perturbation model's body posture inclination angle/angular velocity, and correcting perturbation model's antiphase arm swing angle/angular velocity, etc.), the stabilization control of the correcting perturbation models 202, 203, and 231 is conducted so as to converge (stabilize) these state amounts to predetermined states.

First, the stabilization control of the horizontal body position correcting perturbation model 202 will be explained in detail.

The control law for converging (stabilizing) the horizontal body position correcting perturbation model 202 to a desired steady position is referred to as a perturbation model control law 206 for correcting horizontal body position, and the feedback amount (manipulation amount) determined by this control law is referred to as a required value Mpfdmd of perturbation model stabilization moment for correcting horizontal body position. The term "required value" has been added because restriction is added to the value determined according to the above control law to correct it such that the true ZMP exits in the aforesaid ZMP permissible range and the floor reaction force horizontal component falls within a floor reaction force horizontal component permissible range, as it will be discussed hereinafter. The moment corrected by adding restriction thereto is referred to as the horizontal body position correcting perturbation model stabilization moment Mpf.

Specifically, the perturbation model control law 206 for correcting horizontal body position uses Equation h10. However, a desired steady position is given by Equation h8. Further, mtotal denotes the total weight of the aforesaid robot, mb denotes the mass of the aforesaid body mass point (the mass of the inverted pendulum), and XGf denotes the center-of-gravity horizontal position calculated using a full model on the basis of an instantaneous posture of a simplified model gait, that is, the center-of-gravity horizontal position calculated by the aforesaid inverse full model. Further, Kpp and Kpv denote the gains of feedback control.

Desired steady position=−$m$total/$mb$*($XGf$−$XGs$)  Equation h8

Required value $Mpfdmd$ of perturbation model stabilizing moment for correcting horizontal body position=$Kpp$*(Correcting perturbation model horizontal body position $Xc$−Desired steady position)+$Kpv$*Correcting perturbation model horizontal body velocity $dXc/dt$−Correcting perturbation model horizontal body position $Xc$*Body floor reaction force vertical component Fbz  Equation h10

To determine the component about the X-axis (longitudinal axis) of the required value Mpfdmd of perturbation model stabilizing moment for correcting horizontal body position, a correcting perturbation model horizontal body position velocity and a desired steady position use a component in the Y-axis direction (lateral direction).

To determine the component about the Y-axis (lateral axis) of the required value Mpfdmd of perturbation model stabilizing moment for correcting horizontal body position, a correcting perturbation model horizontal body position velocity and a desired steady position use a component in the X-axis direction (longitudinal direction), and "−" in the third term of the right side is replaced by "+".

The details have been described in PCT/JP03/00435 previously proposed by the present applicant, so that further explanation will be omitted.

The stabilization control of the body posture inclination angle correcting perturbation model 203 will be explained in detail.

According to the state of the body posture inclination angle correcting perturbation model 203, a feedback amount (manipulation amount) is determined according to a feedback control law, such as the PI control, so that a corrected desired body posture inclination angle, that is, the inclination angle obtained by adding a correcting perturbation model body posture inclination angle to a desired body posture inclination angle based on a simplified model, stabilizes to or follows a reference body posture inclination angle (determined in S3404 of FIG. 57) output by the desired instantaneous value generator 100b or a desired body posture inclination angle (obtained in S3414 of FIG. 57) based on a simplified model, and the determined feedback amount is additionally input to the body posture inclination angle correcting perturbation model 203.

This control law is referred to as a body posture inclination angle correcting perturbation model control law 207 (abbreviated as the body posture angle correcting perturbation model control law 207 in some cases), and the feedback amount (manipulation amount) is referred to as a required value Mrfdmd of perturbation model stabilizing moment for correcting body posture inclination angle. The term "required value" has been added for the same reason as that for the required value Mpfdmd of perturbation model stabilizing moment for correcting horizontal body position. The moment corrected by adding restriction thereto is referred to as perturbation model stabilizing moment Mrf for correcting body posture inclination angle.

Specifically, the body posture inclination angle correcting perturbation model control law 207 for determining the required value Mrfdmd of perturbation model stabilizing moment for correcting body posture inclination angle is implemented according to the equation given below.

> Required value *Mrfdmd* of perturbation model stabilizing moment for correcting body posture inclination angle=*Krp**(Correcting perturbation model body posture inclination angle θc–(Reference body posture inclination angle–Desired body posture inclination angle based on simplified model))+*Krv**Correcting perturbation model body posture inclination angular velocity *dθc/dt*   Equation h11 where Krp and Krv denote feedback control gains.

In Equation h11, (Reference body posture inclination angle–Desired body posture inclination angle based on simplified model) may be replaced by zero.

The processing in S3536 will be explained by referring back to the functional block diagram of FIG. 66. As described above, the required value Mpfdmd of perturbation model stabilization moment for correcting horizontal body position is determined according to the perturbation model control law 206 for correcting horizontal body position (Equation h10). Further, the required value Mrfdmd of perturbation model stabilization moment for correcting body posture inclination angle is determined according to the body posture inclination angle correcting perturbation model control law 207 (Equation h11).

Subsequently, an estimated (calculated) value F0 of floor reaction force of the perturbation model for correcting body position when it is assumed that the horizontal body position correcting perturbation model stabilization moment Mpf is zero is determined by a F0 calculator 208. As it will be discussed hereinafter, the full-model floor reaction force moment horizontal component Mfullxy to which the horizontal body position correcting perturbation model stabilization moment Mpf has been added is supplied to the horizontal body position correcting perturbation model 202. Hence, F0 is the floor reaction force generated by the horizontal body position correcting perturbation model 202 if only the full-model floor reaction force moment horizontal component Mfullxy with a reversed sign is supplied to the horizontal body position correcting perturbation model 202.

Specifically, F0 is determined according to the equation given below.

$$F0=mb*d2Xc/dt2-1/h*Mpf \qquad \text{Equation h12}$$

The first term of the right side denotes a floor reaction force horizontal component of the horizontal body position correcting perturbation model 202 of the last time (time t−Δt).

The second term of the right side denotes the floor reaction force horizontal component directly generated in (i.e., a direct term of) the horizontal body position correcting perturbation model 202 by the horizontal body position correcting perturbation model stabilizing moment Mpf of the last time.

More specifically, the estimated value of the floor reaction force F0 of a body position correcting perturbation model when it is assumed that Mpf is zero is determined by subtracting the value, which is obtained by dividing the horizontal body position correcting perturbation model stabilization moment Mpf of the last time by the body translational mode floor reaction force ratio h, from the value obtained by multiplying the body mass point horizontal acceleration of the last time of the horizontal body position correcting perturbation model 202 by the mass mb of the body mass point.

Subsequently, if it is assumed that the horizontal body position correcting perturbation model stabilization moment Mpf is matched with the required value Mpfdmd of horizontal body position correcting perturbation model stabilization moment, the body posture inclination angle correcting perturbation model stabilization moment Mrf is matched with the required value Mrfdmd of body posture inclination angle correcting perturbation model stabilization moment, a desired floor reaction force moment for compliance control as a desired floor reaction force moment horizontal component about a desired ZMP is matched with the total sum of the compensating total floor reaction force moment horizontal component Mdmdxy, Mpf, and Mrf, while ignoring the aforesaid restriction (the floor reaction force horizontal component restrictive condition and the ZMP restrictive condition), then the floor reaction force moment horizontal component Min generated about the desired ZMP is determined by a Min calculator 209. This floor reaction force moment horizontal component is referred to as a corrected desired floor reaction force moment horizontal component without restriction Min. The corrected desired floor reaction force moment horizontal component without restriction Min is determined according to the following equation.

$$\text{Min}=Mpfdmd+Mrfdmd+Mdmdxy \qquad \text{Equation h13}$$

This means that the corrected desired floor reaction force moment horizontal component without restriction Min is obtained by adding the required value Mpfdmd of horizontal body position correcting perturbation model stabilization moment, the required value Mrfdmd of body posture inclination angle correcting perturbation model stabilization moment, and the compensating total floor reaction force moment horizontal component Mdmdxy.

Subsequently, if it is assumed that the horizontal body position correcting perturbation model stabilization moment Mpf is matched with the required value Mpfdmd of horizontal body position correcting perturbation model stabilization moment, the body posture inclination angle correcting perturbation model stabilization moment Mrf is matched with the required value Mrfdmd of body posture inclination angle correcting perturbation model stabilization moment, and a desired floor reaction force moment for compliance control is matched with the total sum of the compensating total floor reaction force moment horizontal component Mdmdxy, Mpf, and Mrf, while ignoring the aforesaid restriction (the floor reaction force horizontal component restrictive condition and the ZMP restrictive condition), then the floor reaction force horizontal component Fin to be generated is determined by a Fin calculator 210. This floor reaction force horizontal component is referred to as a corrected desired floor reaction force horizontal component without restriction Fin.

The corrected desired floor reaction force horizontal component is obtained by the above Equation h6. As described above, no floor reaction force horizontal component is generated in the body posture inclination angle correcting perturbation model 203 by a behavior of the body posture inclination angle correcting perturbation model 203, meaning that Fr is zero. Accordingly, the corrected desired floor reaction force horizontal component without restriction Fin is obtained by adding the floor reaction force horizontal component, which is increased by changing the horizontal body position correcting perturbation model stabilization moment Mpf from zero to the required value Mpfdmd of horizontal body position correcting perturbation model stabilization moment, to the corrected desired floor reaction force horizontal component in a case where it is assumed that the horizontal body position correcting perturbation model stabilization moment Mpf is zero.

Incidentally, the floor reaction force horizontal component, which is increased by changing the horizontal body position correcting perturbation model stabilization moment Mpf from zero to the required value Mpfdmd of horizontal body position correcting perturbation model stabilization moment, takes a value obtained by dividing the required value Mpfdmd of horizontal body position correcting perturbation model stabilization moment by the body translational mode floor reaction force ratio h.

Hence, as shown by Equation h15, the corrected desired floor reaction force horizontal component without restriction Fin is obtained by adding the aforesaid determined full-model floor reaction force horizontal component Ffull to the value obtained by dividing the required value Mpfdmd of horizontal body position correcting perturbation model stabilization moment by the body translational mode floor reaction force ratio h, and further by adding the calculated value F0 of the floor reaction force of the body position correcting perturbation model when it is assumed that the horizontal body position correcting perturbation model stabilization moment Mpf is zero.

$$Fin = 1/h*Mpfdmd + Ffull + F0 \quad \text{Equation h15}$$

Subsequently, based on the corrected desired floor reaction force moment horizontal component without restriction Min and the corrected desired floor reaction force horizontal component without restriction Fin, a corrected desired floor reaction force moment horizontal component with restriction Mltd and a corrected desired floor reaction force horizontal component with restriction Fltd (about a desired ZMP), which are the values that have added restriction thereto, are determined by a restricting means (restriction processing unit) 211. In the present embodiment, a desired floor reaction force moment horizontal component for compliance control agrees with the corrected desired floor reaction force moment horizontal component with restriction Mltd, and the floor reaction force horizontal component of a corrected gait agrees with a corrected desired floor reaction force horizontal component with restriction Fltd.

The corrected desired floor reaction force moment horizontal component with restriction Mltd and the corrected desired floor reaction force horizontal component with restriction Fltd are determined such that the true ZMP of the corrected gait (including the desired floor reaction force moment horizontal component for compliance control) falls within the aforesaid ZMP permissible range and the floor reaction force horizontal component of the corrected gait falls within a floor reaction force horizontal component permissible range. In other words, Mltd and Fltd are determined such that the ZMP restrictive condition and the floor reaction force horizontal component restrictive condition are satisfied.

Furthermore, under the aforesaid restrictive condition, a horizontal body position correcting perturbation model stabilization moment Mp is determined to agree with or approximate to the required value Mpfdmd of horizontal body position correcting perturbation model stabilization moment as much as possible. Similarly, a body posture inclination angle correcting perturbation model stabilization moment Mr is determined to be a value that agrees with or approximate to the required value Mrfdmd of body posture inclination angle correcting perturbation model stabilization moment as much as possible. This stabilizes the aforesaid correcting perturbation model body position Xc and the aforesaid correcting perturbation model body posture inclination angle θc, thus preventing divergence.

The details of the restricting means (restriction processing unit) 211 are given in PCT/JP03/00435 previously proposed by the present applicant, so that further explanation will be omitted herein.

Subsequently, according to the following equation, the horizontal body position correcting perturbation model stabilization moment Mpf and the body posture inclination angle correcting perturbation model stabilization moment Mrf are determined by an Mpf calculator 212 and an Mrf calculator 213, respectively.

$$Mpf = (Fltd - Ffull - F0)*h \quad \text{Equation h20}$$

$$Mrf = Mltd - Mpf - Mdmdxy \quad \text{Equation h21}$$

More specifically, the Mpf calculator 212 multiplies the value, which is obtained by subtracting the full-model floor reaction force horizontal component Ffull from the corrected desired floor reaction force horizontal component with restriction Fltd and subtracting therefrom the calculated value F0 of the floor reaction force of the body position correcting perturbation model 202 in the case where Mp is assumed to be zero, by the body translational mode floor reaction force ratio h so as to obtain the horizontal body position correcting perturbation model stabilization moment Mpf. The Mrf calculator 213 subtracts the aforesaid horizontal body position correcting perturbation model stabilization moment Mpf and the compensating total floor reaction force moment horizontal component Mdmdxy from the corrected desired floor reaction force moment horizontal component with restriction Mltd about the desired ZMP to obtain the body posture inclination angle correcting perturbation model stabilization moment Mrf.

Subsequently, according to the equations shown below, the horizontal body position correcting perturbation model floor reaction force moment Mp and the body posture inclination angle correcting perturbation model floor reaction force moment Mr are determined.

$$Mp = Mpf - Mfull \quad \text{Equation h22}$$

$$Mr = Mrf \quad \text{Equation h23}$$

This means that an Mp calculator 214 subtracts a full-model floor reaction force moment horizontal component Mfullxy from the horizontal body position correcting perturbation model stabilizing moment Mpf to obtain the horizontal body position correcting perturbation model floor reaction force moment Mp. The body posture inclination angle correcting perturbation model floor reaction force moment Mr takes the same value as that of the body posture inclination angle correcting perturbation model stabilization moment Mrf.

Subsequently, the horizontal body position correcting perturbation model floor reaction force moment Mp is supplied to the body position correcting perturbation model 202 in which the correcting perturbation model body position Xc balancing the supplied floor reaction force moment is calculated.

Further, the body posture inclination angle correcting perturbation model floor reaction force moment Mr is supplied to the body posture inclination angle correcting perturbation model 203 in which the correcting perturbation model body posture inclination angle θc balancing the supplied floor reaction force moment horizontal component is calculated.

Subsequently, calculators 205 and 204 determine a corrected desired horizontal body position and a corrected desired body posture inclination angle according to the following Equation h24 and Equation h25, respectively, and the determined values are output as the final desired instantaneous values of the horizontal body position/posture.

> Corrected desired horizontal body position=Simplified model horizontal body position+Corrected perturbation model body position $Xc$     Equation h24

> Corrected desired body posture inclination angle=Simplified model body posture inclination angle+Corrected perturbation model body posture inclination angle θc     Equation h25

In other words, the correcting perturbation model body position Xc is added to the simplified model horizontal body position to obtain the corrected desired horizontal body position, and this is output as a final desired horizontal body position. The correcting perturbation model body posture inclination angle θc is added to the simplified model body posture inclination angle to provide the corrected desired body posture inclination angle, and this is output as a final desired body posture inclination angle.

In addition, the corrected desired floor reaction force moment horizontal component with restriction Mltd is output as a desired floor reaction force moment horizontal component for compliance control about the desired ZMP, and a corrected desired floor reaction force horizontal component with restriction Fltd is output as a corrected desired floor reaction force horizontal component.

More specifically, according to Equation h26 and Equation h27 shown below, the corrected desired floor reaction force horizontal component and the corrected desired floor reaction force moment horizontal component about the desired ZMP are determined as the final desired instantaneous values of the floor reaction force horizontal component and the floor reaction force moment horizontal component (the moment horizontal component about the desired ZMP), respectively, and these are output.

> Desired floor reaction force moment horizontal component for compliance control=Corrected desired floor reaction force moment horizontal component with restriction Mltd     Equation h26

> Corrected desired floor reaction force horizontal component=Corrected desired floor reaction force horizontal component with restriction Fltd     Equation h27

The processing up to the above in S3536 is as per PCT/JP03/00435 by the present applicant, so that no further explanation will be given.

Further, in the present embodiment, an antiphase arm swing angle correcting perturbation model moment Ma and a desired floor reaction force moment vertical component to be input to the antiphase arm swing angle correcting perturbation model 231 are determined in the antiphase arm swing angle correcting perturbation model moment determiner 230. Then, an antiphase arm swing angle correcting perturbation model moment Ma is input to the antiphase arm swing angle correcting perturbation model 231 to determine a correcting perturbation model antiphase arm swing angle θca.

Supplementally, the antiphase arm swing angle correcting perturbation model moment determiner 230 determines a feedback amount (manipulation amount) according to a feedback control law on the basis of the state of the antiphase arm swing angle correcting perturbation model 231, such as the PT control, so that a F0 corrected desired antiphase arm swing angle, that is, the arm swing angle obtained by adding a correcting perturbation model antiphase arm swing angle to a desired antiphase arm swing angle based on a simplified model, stabilizes to or follows a reference antiphase arm swing angle (determined in S3404 of FIG. 57) output by the desired instantaneous value generator 100b or a desired antiphase arm swing angle (obtained in S3414 of FIG. 57) based on a simplified model, and the determined feedback amount is additionally input to the antiphase arm swing angle correcting perturbation model 231.

This control law is referred to as an antiphase arm swing angle correcting perturbation model control law, and the feedback amount (manipulation amount) is referred to as a required value Mafdmd of perturbation model stabilizing moment for correcting antiphase arm swing angle. The term "required value" has been added for the same reason as that for the required value Mpfdmd of perturbation model stabilizing moment for correcting horizontal body position. The moment corrected by adding restriction thereto is referred to as perturbation model stabilizing moment Maf for correcting antiphase arm swing angle. In the present embodiment, this Maf is supplied as an antiphase arm swing angle correcting perturbation model moment Ma to the antiphase arm swing angle correcting perturbation model 231.

Specifically, the antiphase arm swing angle correcting perturbation model control law for determining the required value Mafdmd of perturbation model stabilizing moment for correcting antiphase arm swing angle is implemented according to the equation given below.

> Required value $Mafdmd$ of perturbation model stabilizing moment for correcting antiphase arm swing angle=$Kap$*(Correcting perturbation model antiphase arm swing angle θca−(Reference antiphase arm swing angle−Desired antiphase arm swing angle based on simplified model))+$Kav$*Correcting perturbation model antiphase arm swing angular velocity $dθca/dt$     Equation h30 where Kap and Kav denote feedback control law gains.

In Equation h30, (Reference antiphase arm swing angle−Desired antiphase arm swing angle based on simplified model) may be replaced by zero.

Figure 70:
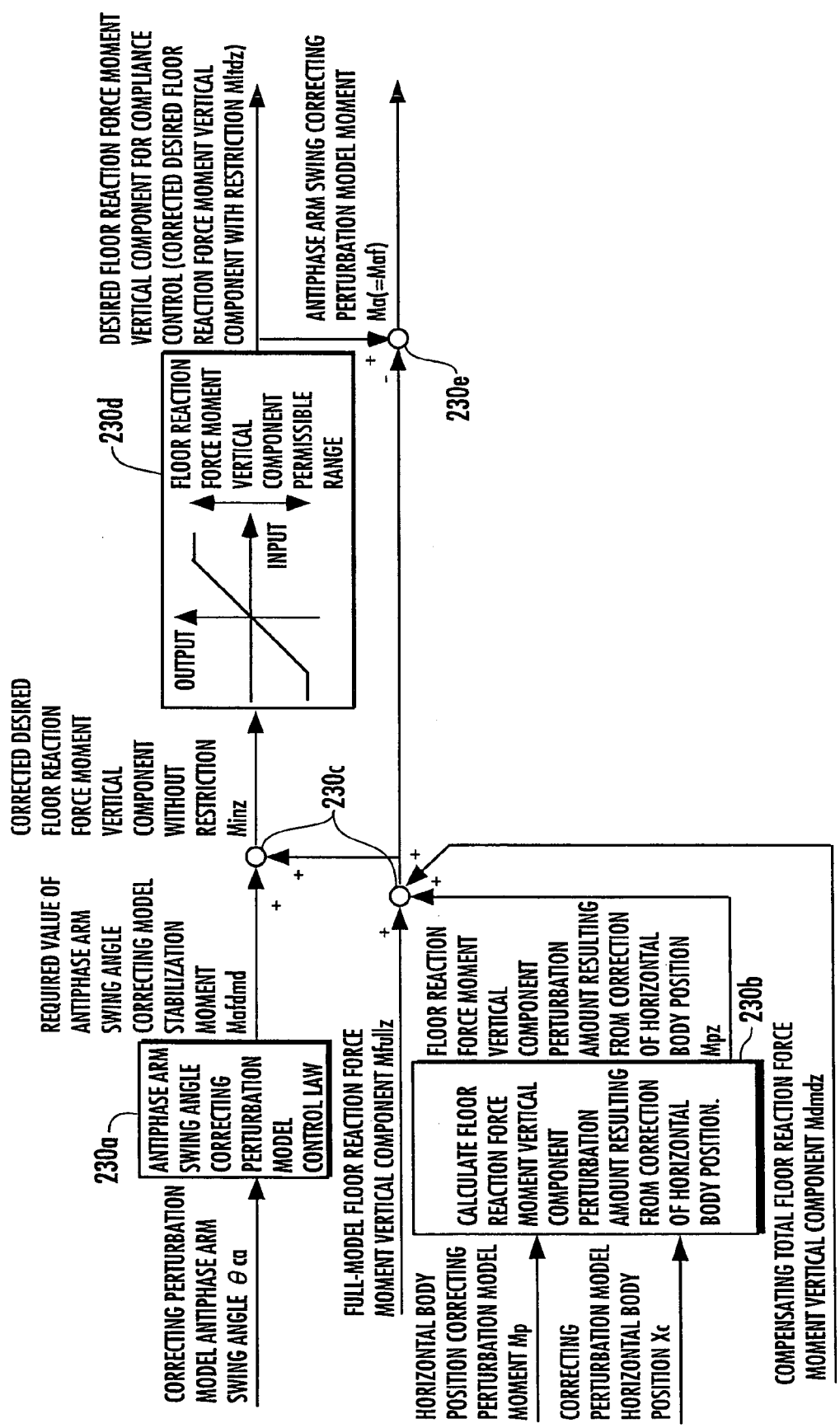
FIG. 70 is a block diagram showing processing of a moment determiner of the perturbation model for correcting the antiphase arm swing angle shown in FIG. 66.

The operation of the antiphase arm swing angle correcting perturbation model moment determiner 230 will be explained in conjunction with FIG. 70 showing the functional block diagram thereof.

First, as described above, the required value Mafdmd of perturbation model stabilizing moment for correcting antiphase arm swing angle is determined according to the antiphase arm swing angle correcting perturbation model control law 230a (Equation h30).

Subsequently, a floor reaction force moment vertical component perturbation amount Mpz resulting from the correction of a horizontal body position using the horizontal body position correcting perturbation model 202 is determined by a calculator 230b of a floor reaction force moment vertical component perturbation amount resulting from a correction of a horizontal body position.

Specifically, it is determined according to the following equation.

> $Mpz$=(Position of simplified model body mass point+Correcting perturbation model body position $Xc$−Desired $ZMP$)*(Simplified model body mass point horizontal acceleration+Correcting perturbation model body acceleration $d2Xc/dt2$)−(Simplified model body mass point position−Desired $ZMP$)*(Simplified model body mass point horizontal acceleration)     Equation h31

Alternatively, the following equation approximating the above equation may be used.

$Mpz \approx$ Correcting perturbation model body position $Xc^*$(Simplified model body mass point horizontal acceleration+Correcting perturbation model body acceleration $d2Xc/dt2$)+(Simplified model body mass point position−Desired $ZMP$)+Correcting perturbation model body acceleration $d2Xc/dt2$)  Equation h32

Subsequently, if it is assumed that the antiphase arm swing angle correcting perturbation model stabilization moment Maf is matched with the required value Mafdmd of antiphase arm swing angle correcting perturbation model stabilization moment, and a desired floor reaction force moment vertical component for compliance control as a desired floor reaction force moment vertical component about a desired ZMP is matched with the total sum of the compensating total floor reaction force moment vertical component Mdmdz, Maf, Mfullz, and Mpz, while ignoring the aforesaid restrictive condition on floor reaction force moment vertical component, then the floor reaction force moment vertical component Minz generated about the desired ZMP is determined by a calculator 230c. This floor reaction force moment vertical component is referred to as a corrected desired floor reaction force moment vertical component without restriction Minz. The corrected desired floor reaction force moment vertical component without restriction Minz is determined according to the following equation.

$Minz = Mafdmd + Mdmdz + Mfullz + Mpz$  Equation h33

This means that the corrected desired floor reaction force moment vertical component without restriction Minz is obtained by adding the required value Mafdmd of antiphase arm swing angle correcting perturbation model stabilization moment, the compensating total floor reaction force moment vertical component Mdmdz, the full-model floor reaction force moment vertical component Mfullz, and the horizontal body position correcting perturbation model moment vertical component Mpz.

Subsequently, based on the corrected desired floor reaction force moment vertical component without restriction Minz, a corrected desired floor reaction force moment vertical component with restriction Mltdz (about a desired ZMP), which is the value that has added restriction thereto, is determined by a restricting means (restriction processing unit) 230d. In the present embodiment, a desired floor reaction force moment vertical component for compliance control agrees with the corrected desired floor reaction force moment vertical component with restriction Mltdz.

The corrected desired floor reaction force moment vertical component with restriction Mltdz is determined such that it falls within a floor reaction force moment vertical component permissible range. In other words, Mltdz is determined so that it satisfies a floor reaction force moment vertical component restrictive condition.

Furthermore, under the aforesaid floor reaction force moment vertical component restrictive condition, the antiphase arm swing angle correcting perturbation model stabilization moment Maf is determined to agree with or be as close as possible to the required value Mafdmd of antiphase arm swing angle correcting perturbation model stabilization moment. This stabilizes the aforesaid correcting perturbation model antiphase arm swing angle θca, thus preventing divergence.

A restricting means (restriction processing unit) 230d is a function having a saturation characteristic represented by the following equation.

If Minz>Upper limit value of a floor reaction force moment vertical component permissible range, then Mltdz=Upper limit value of the floor reaction force moment vertical component permissible range.

If Minz<Lower limit value of a floor reaction force moment vertical component permissible range, then Mltdz=Lower limit value of the floor reaction force moment vertical component permissible range.

If the lower value of a floor reaction force moment vertical component permissible range≦Minz, and Minz≦Upper limit value of the floor reaction force moment vertical component permissible range, then Mltdz=Minz  Equation h34

Subsequently, according to the equation shown below, an antiphase arm swing angle correcting perturbation model moment Ma (=Antiphase arm swing angle correcting perturbation model stabilization moment Maf) is determined by a Maf calculator 230e.

$Ma = Mltdz - (Mdmdz + Mfullz + Mpz)$  Equation h35

This means that in the Maf calculator 230e, an antiphase arm swing angle correcting perturbation model moment Ma as the antiphase arm swing angle correcting perturbation model stabilization moment Maf is obtained by subtracting the compensating total floor reaction force moment vertical component Mdmdz, the full-model floor reaction force moment vertical component Mfullz, and the horizontal body position correcting perturbation model moment vertical component Mpz from the corrected desired floor reaction force moment vertical component with restriction Mltdz.

Meanwhile, the corrected desired floor reaction force moment vertical component with restriction Mltdz is output as the desired floor reaction force moment vertical component for compliance control about a desired ZMP.

More specifically, according to the following Equation h36, a corrected desired floor reaction force moment vertical component about the desired ZMP is determined as the final desired instantaneous value of the floor reaction force moment vertical component (the moment vertical component about the desired ZMP), these are output.

Desired floor reaction force moment vertical component for compliance control=Corrected desired floor reaction force moment vertical component with restriction Mltdz  Equation h36

After the processing of the antiphase arm swing angle correcting perturbation model moment determiner 230 is carried out as described above, the antiphase arm swing angle correcting perturbation model moment Ma is supplied to the antiphase arm swing angle correcting model 231 shown in FIG. 66, and the correcting perturbation model antiphase arm swing angle θca that balances with the supplied antiphase arm swing angle correcting perturbation model moment Ma is calculated by using Equation a23c (by integrating).

Subsequently, in the calculator 232, the corrected desired antiphase arm swing angle is determined according to the following Equation h37, and this is output as the final desired instantaneous value of the antiphase arm swing angle.

Corrected desired antiphase arm swing angle=Simplified model antiphase arm swing angle+Correcting perturbation model antiphase arm swing angle θca        Equation h37

This means that the corrected desired antiphase arm swing angle is obtained by adding the correcting perturbation model antiphase arm swing angle θca to the simplified model antiphase arm swing angle, and this is output as the final desired antiphase arm swing angle.

The gait correction of S3536 is made as described above.

Supplementally, the present embodiment is the feedforward type correction, and the perturbation dynamic models are not precise models. For this reason, even if gaits are corrected so as to satisfy Equation h5, Equation h6, and Equation h1006, as described above, dynamic balance conditions are not satisfied in the strict sense although the dynamic balance conditions are approximately satisfied.

Furthermore, in the present embodiment, at the end of a one-step gait (the end of the current time gait), for example, the state amounts of the horizontal body position correcting perturbation model 202, the body posture inclination angle correcting perturbation model 203, and the antiphase arm swing angle correcting perturbation model 231, e.g., the horizontal position of the body mass point (the inverted pendulum mass point) of the horizontal body position correcting perturbation model 202, the rotational angle of the flywheel of the body posture inclination angle correcting perturbation model 203, and the rotational angle of the flywheel of the antiphase arm swing angle correcting perturbation model 231, are added as the state amount of the simplified model 200. In other words, the state amount of the simplified model 200 at the end of the current time gait is corrected to the state amount obtained by adding the body motion of the horizontal body position correcting perturbation model 202 and the state amounts of the body posture inclination angle correcting perturbation model 203 and the antiphase arm swing angle correcting perturbation model 231. Further, the state amount of each of the perturbation models 202, 203, and 231 is initialized (e.g., the horizontal position of the body mass point (the inverted pendulum mass point) of the horizontal body position correcting perturbation model 202, the rotational angle of the flywheel of the body posture inclination angle correcting perturbation model 203, and the rotational angle of the flywheel of the antiphase arm swing angle correcting perturbation model 231 are reset to zero). Then, a next time gait is generated, taking the state amount of the simplified model 200 that has been corrected as described above as the initial value of the next time gait, and the correcting perturbation model horizontal body position Xc, the correcting perturbation model body posture inclination angle θc, and the correcting perturbation model antiphase arm swing angle θca of the individual perturbation models 202, 203, and 231 are calculated. This makes it possible to further enhance the stability of the behaviors of the individual perturbation models 202, 203, and 231. The state amounts of the simplified model 200 described above may be corrected as necessary while a gait is being generated. Conversely, the correction of the state amounts of the simplified model 200 or the resetting of the perturbation models described above may not be carried out while a gait is being generated.

The aforesaid correction of state amounts of the simplified model 200 will be implemented in the same manner in a fourth and a fifth embodiments, which will be discussed hereinafter.

In the present embodiment, the aforementioned restoring conditions are all satisfied. Accordingly, the same operations and advantages as those of the aforementioned second embodiment can be obtained.

Furthermore, in addition to the operations and advantages of the second embodiment, the calculation volume can be reduced to be relatively small when determining a horizontal body position, a body posture inclination angle, and an antiphase arm swing angle so that the aforementioned restoring conditions are satisfied.

The third embodiment explained above provides the embodiments of the first to the tenth inventions, the twelfth to the fifteenth inventions, the twentieth to the twenty-second inventions, the twenty-fourth to the twenty-sixth inventions, and the twenty-eighth to the thirtieth inventions in the present invention. In this case, the floor reaction force moment vertical component in the third embodiment (a floor reaction force moment vertical component to which Mdmdz has been added) corresponds to the amount to be controlled, a body yaw angle error and/or a body yaw angular velocity error corresponds to an error of the state amount of the robot 1, and Mdmdz corresponds to a compensating floor reaction force moment. Further, the floor reaction force moment vertical component permissible range [Mzmin, Mzmax] for generating a gait (for full-model correction) in the third embodiment corresponds to the permissible range of the amount to be limited. Further, a motional component of a simplified model gait corresponds to a provisional instantaneous value of a desired motion, and the provisional instantaneous value corrected in S3536 corresponds to the instantaneous value of the desired motion. A full model (including an antiphase arm swing angle correcting perturbation model) corresponds to the dynamic model in the invention. And the aforesaid antiphase arm swing angle correcting perturbation model moment Ma corresponds to a moment correction manipulated variable in the tenth invention and the perturbation model manipulated variable in the twenty-second invention, and the correcting perturbation model antiphase arm swing angle θca corresponds to the correction amount of a provisional instantaneous value of a desired motion in the second invention and the correction amount of a desired motion in the twenty-second invention. Furthermore, the corrected desired floor reaction force moment vertical component without restriction Minz corresponds to an estimated value of a restriction object amount in the twenty-sixth invention, and the antiphase arm swing angle correcting model stabilization moment Mafdmd corresponds to a model correcting floor reaction force moment in the third invention and the required value of a perturbation model manipulated variable in the twenty-fourth invention. The full-model floor reaction force moment vertical component Mfullz in the third embodiment to which the floor reaction force moment vertical component Mpz resulting from the correction of a horizontal body position has been added corresponds to the vertical component of the floor reaction force moment that substantially balances with the provisional instantaneous value of a desired motion on a full model (dynamic model). And, the result of adding Mdmdz to this by the calculator 230c shown in FIG. 70 corresponds to the instantaneous value of a model restriction object amount in the twentieth invention.

In the third embodiment, Mafdmd does not steadily become zero; however, if this is steadily set to zero, then the twenty-third invention will be constructed.

A fourth embodiment of the present invention will now be explained with reference to FIG. 71 and FIG. 72. The correcting technique of a device according to the fourth embodiment differs from that of the aforesaid third embodiment only in the processing of the gait generator 100 (the processing of S3536 of FIG. 65), and it is a full-model feedback correction type. It is a technique that uses an inverse dynamic full model (inverse full model), does not correct an input of a simplified model gait, and uses a perturbation model.

Figure 71:
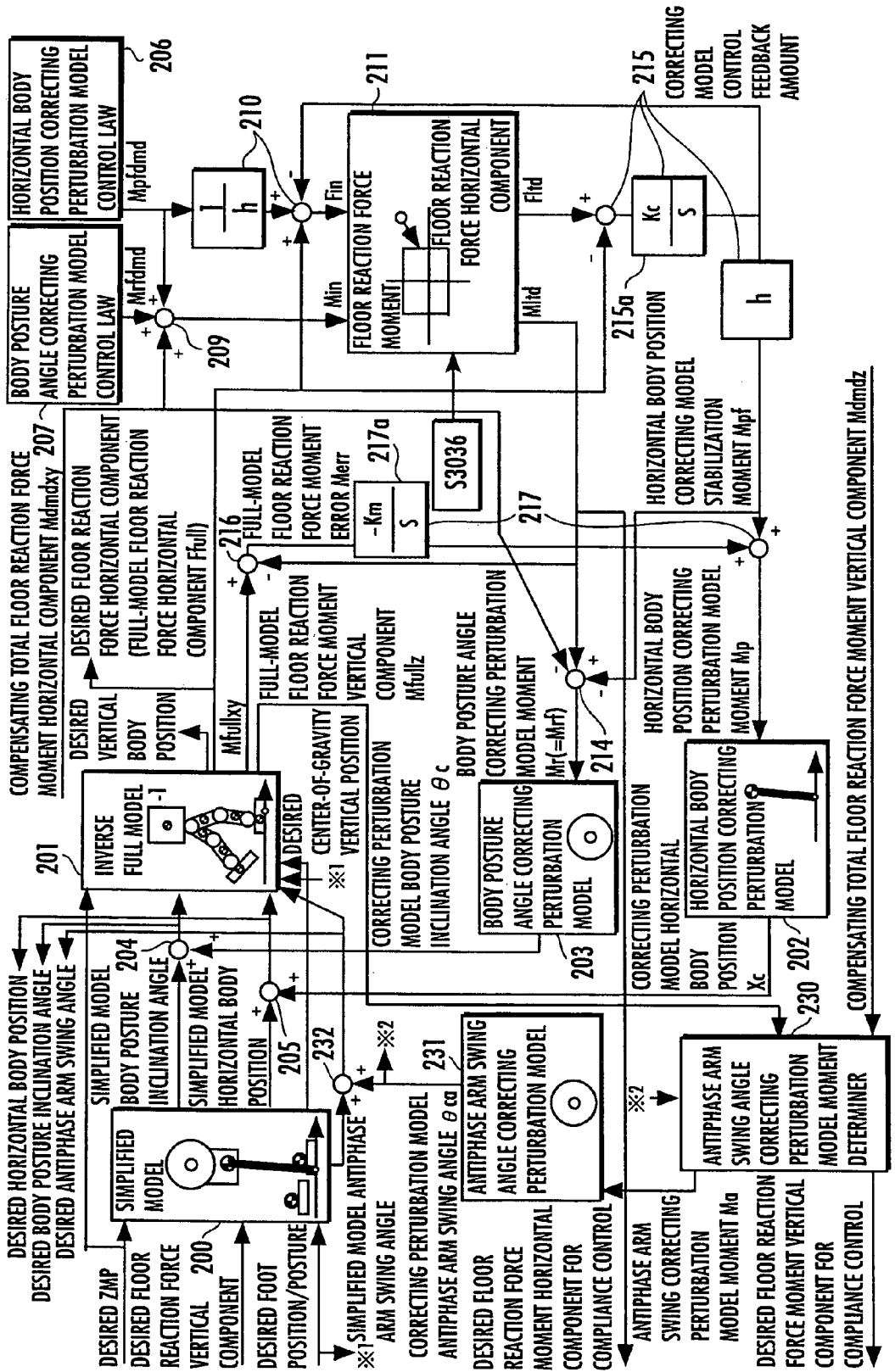
FIG. 71 is a block diagram showing processing of S3536 in FIG. 65 in a fourth embodiment of the present invention and FIG. 72 is a block diagram showing processing of the moment determiner of the perturbation model for correcting antiphase arm swing angle shown in FIG. 71.

FIG. 71 is a functional block diagram explaining an operation of the device according to the fourth embodiment, specifically, the gait correcting technique of S3536 of the flowchart of FIG. 65. However, a simplified model 200 shown in FIG. 71 represents not only a dynamic model but also the processing from S3510 to S3532 of FIG. 65, i.e., the processing for calculating (determining) a simplified model gait instantaneous value, as in the case of the aforesaid third embodiment. Hence, in FIG. 71, the portion beyond the simplified model 200 corresponds to the processing of S3536. Of the functional portions in FIG. 71, like functional portions as those in FIG. 66 according to the third embodiment will be assigned like reference marks in FIG. 66 and detailed explanation thereof will be omitted.

Since the construction other than the processing of S3536 is the same as that of the third embodiment, the explanation thereof will be omitted, and the following will explain the processing of S3536 in detail in conjunction with FIG. 71.

In S3536, first, as previously described, a correcting perturbation model horizontal body position Xc, which will be discussed later, calculated at the last time control cycle (time t−Δt) is added by a calculator 205 to an instantaneous value of a desired horizontal body position of a simplified model gait determined in S3532 of FIG. 65, thereby determining a final desired horizontal body position (corrected desired horizontal body position). Further, a correcting perturbation model body posture inclination angle θc, which will be discussed later, calculated at the last time control cycle (time t−Δt) is added by a calculator 204 to an instantaneous value (a provisional instantaneous value determined in the control cycle at current time t) of a desired body posture inclination angle of a simplified model gait determined in S3532 of FIG. 65, thereby determining a final desired body posture inclination angle (corrected desired body posture inclination angle). Further, a correcting perturbation model antiphase arm swing angle θca, which will be discussed later, calculated at the last time control cycle (time t−Δt) is added by a calculator 232 to an instantaneous value (provisional instantaneous value determined in the control cycle at current time t) of a desired antiphase arm swing angle of a simplified model gait determined in S3532 of FIG. 65, thereby determining a final desired antiphase arm swing angle (corrected desired antiphase arm swing angle).

Then, these corrected desired horizontal body position, corrected desired body posture inclination angle, and corrected desired antiphase arm swing angle are output as the final desired instantaneous values of the horizontal body position, the body posture inclination angle, and the antiphase arm swing angle, respectively.

More specifically, the corrected desired horizontal body position, the corrected desired body posture inclination angle, and the corrected desired antiphase arm swing angle are determined according to the aforesaid Equation h24, Equation h25, and Equation h37.

Subsequently, the desired horizontal body position (the corrected desired horizontal body position), the desired body posture inclination angle (the corrected desired body posture inclination angle), and the desired antiphase arm swing angle (the corrected desired antiphase arm swing angle) obtained by correcting the simplified model gait as described above, and the instantaneous values of the motional variables, such as the desired center-of-gravity position, the desired foot position/posture, and the desired arm posture, of the simplified model gait obtained as previously described, and the instantaneous value of the desired ZMP are input to the aforesaid inverse dynamic full model 201, and then the floor reaction force horizontal component and the floor reaction force moment about the desired ZMP (a horizontal component and a vertical component) that balance with the motion expressed by the input motional variables (i.e., that are generated by the inverse full model 201 by the motion) are calculated. Thus, according to the present embodiment, in addition to the simplified model horizontal body position, body posture inclination angle, and antiphase arm swing angle, the correcting perturbation model horizontal body position Xc, the correcting perturbation model body posture inclination angle θc, and a correcting perturbation model antiphase arm swing angle θca are also input to the inverse full model 201. Hereinafter, as in the third embodiment, the floor reaction force horizontal component, the floor reaction force moment horizontal component, and the floor reaction force moment vertical component calculated by the inverse full model 201 will be referred to as a full-model floor reaction force horizontal component Ffullxy, a full-model floor reaction force moment horizontal component Mfullxy, and a full-model floor reaction force moment vertical component Mfullz.

The full-model floor reaction force horizontal component Ffull is output as a corrected desired floor reaction force horizontal component (a final desired instantaneous value of the floor reaction force horizontal component at the current time t).

More specifically, a corrected desired floor reaction force horizontal component is determined according to the equation given below and output.

Corrected desired floor reaction force horizontal component=Full-model floor reaction force horizontal component Ffull     Equation h48

As can be seen from the above processing, according to the present embodiment, a full-model corrected gait is constituted by adding a behavior of the horizontal body position correcting perturbation model 202, a behavior of the body posture inclination angle correcting perturbation model 203, and a behavior of the antiphase arm swing angle correcting perturbation model 231 to a simplified model gait. Further, the equation shown below holds, considering that the floor reaction force horizontal component generated by the body inclination mode and the floor reaction force horizontal component generated by the antiphase arm swing mode are both zero. However, a simplified model floor reaction force horizontal component is the translational force horizontal component of the floor reaction force generated by a motion of a simplified model gait, the floor reaction force being calculated using the inverse full model 201.

Full-model floor reaction force horizontal component Ffull=Simplified model floor reaction force horizontal component+Horizontal body position correcting perturbation model floor reaction force horizontal component Fp     Equation h51

Subsequently, a required value Mpfdmd of horizontal body position correcting perturbation model stabilization moment is determined according to a horizontal body position correcting perturbation model control law 206. The horizontal body position correcting perturbation model control law 206 in the present embodiment is set as proposed by the present applicant in Japanese Patent Application No. 2001-133621. For example, the control law 206 is determined according to the following equation.

Required value Mpfdmd of horizontal body position correcting perturbation model stabilization moment=Kpg*Difference in center of gravity+Kvg*Correcting perturbation model horizontal body velocity dXc/dt     Equation h52 where the difference in center of gravity is determined according to the following equation.

Difference in center of gravity=Horizontal position of full-model center of gravity−Horizontal position of simplified model center of gravity    Equation h53 where Kpg and Kvg in Equation h52 denote the gains of a feedback control law, the horizontal position of full-model center of gravity, the horizontal position of simplified model center of gravity, and the correcting perturbation model horizontal body velocity dXc/dt are the horizontal position of the center of gravity of a full-model gait instantaneous value, the horizontal position of the center of gravity of a simplified model gait instantaneous value (a center-of-gravity horizontal position XGs calculated using a simplified model on the basis of an instantaneous posture of a simplified model gait), and a correcting perturbation model horizontal body velocity dXc/dt, respectively, which are calculated last time (time t−Δt), as it will be discussed later.

More specifically, a perturbation model control feedback amount (manipulated variable) is calculated on the basis of the difference in center of gravity obtained by subtracting the center-of-gravity horizontal position of a simplified model from the center-of-gravity horizontal position of a full model and a perturbation model body velocity, which is one of the state amounts of a perturbation model. Such a perturbation model control law makes it possible to control the temporal average value of the difference in center of gravity to substantially zero.

Subsequently, a required value Mrfdmd of a body posture correcting perturbation model stabilization moment is determined according to a body posture inclination angle correcting perturbation model control law 207. For this purpose, the same control law as that in the third embodiment may be used. Thus, as the control law 207, the aforesaid Equation h11, for example, may be used.

Subsequently, a corrected desired floor reaction force moment without restriction Min is determined (estimated) by a Min calculator 209. As in the third embodiment, the corrected desired floor reaction force moment without restriction Min is the floor reaction force moment horizontal component generated about a desired ZMP when a horizontal body position correcting perturbation model stabilization moment Mpf is matched with the required value Mpfdmd of horizontal body position correcting perturbation model stabilization moment, a body posture inclination angle correcting perturbation model stabilization moment Mrf is matched with the required value Mrfdmd of body posture inclination angle correcting perturbation model stabilization moment, and a desired floor reaction force moment horizontal component for compliance control as a desired floor reaction force moment about a desired ZMP is matched with the total sum of a compensating total floor reaction force moment horizontal component Mdmdxy, Mpf, and Mrf, while ignoring the aforesaid restriction (the ZMP restrictive condition and the floor reaction force horizontal component restrictive condition).

A corrected desired floor reaction force moment horizontal component without restriction Min is determined by the calculation according to the aforesaid Equation h13, as in the third embodiment. More specifically, the corrected desired floor reaction force moment horizontal component without restriction Min is obtained by adding the required value Mpfdmd of horizontal body position correcting perturbation model stabilization moment, the required value Mrfdmd of body posture inclination angle correcting perturbation model stabilization moment, and the total sum of a compensating total floor reaction force moment horizontal component Mdmdxy.

Furthermore, a corrected desired floor reaction force horizontal component without restriction Fin is also determined (estimated) by a Fin calculator 210. As in the third embodiment, the corrected desired floor reaction force horizontal component without restriction Fin is the floor reaction force horizontal component (corresponding to Ffull) generated by the inverted full model 201 when the horizontal body position correcting perturbation model stabilization moment Mpf is matched with the required value Mpfdmd of horizontal body position correcting perturbation model stabilization moment, the body posture inclination angle correcting perturbation model stabilization moment Mrf is matched with the required value Mrfdmd of body posture inclination angle correcting perturbation model stabilization moment, and the desired floor reaction force moment horizontal component for compliance control is matched with the total sum of the compensating total floor reaction force moment horizontal component Mdmdxy, Mpf, and Mrf, while ignoring the aforesaid restriction (the ZMP restrictive condition and the floor reaction force horizontal component restrictive condition).

Unlike the third embodiment, the corrected desired floor reaction force horizontal component without restriction Fin is determined according to the following equation.

Corrected desired floor reaction force horizontal component without restriction $Fin$=Full-model floor reaction force horizontal component $Ffull+1/h^*$ (Required value Mpfdmd of horizontal body position correcting perturbation model stabilization moment−Horizontal body position correcting perturbation model stabilization moment $Mpf$)    Equation h54 where the horizontal body position correcting perturbation model stabilization moment Mpf uses a last time value (the value at time t−Δt). More specifically, the difference between the required value Mpfdmd of horizontal body position correcting perturbation model stabilization moment and the horizontal body position correcting perturbation model stabilization moment Mpf is determined, and the amount of an increase in a full-model floor reaction force horizontal component Ffull resulting from increasing the input of the horizontal body position correcting perturbation model by the above difference is estimated by dividing the above difference by a body translational mode floor reaction force ratio h. Further, the full-model floor reaction force horizontal component Ffull is added thereto so as to estimate the corrected desired floor reaction force horizontal component without restriction Fin.

Subsequently, based on the corrected desired floor reaction force moment horizontal component without restriction Min and the corrected desired floor reaction force horizontal component without restriction Fin, a corrected desired floor reaction force moment horizontal component with restriction Mltd and a corrected desired floor reaction force horizontal component with restriction Fltd (about a desired ZMP), which are the values that have added restriction thereto, are determined by a restricting means (restriction processing unit 211) similar to that in the third embodiment such that the aforesaid restrictions (the ZMP restrictive condition and the floor reaction force horizontal component restrictive condition) are satisfied. This processing technique is the same as that in the third embodiment.

In the present embodiment also, the desired floor reaction force moment horizontal component for compliance control is matched with the corrected desired floor reaction force moment horizontal component with restriction Mltd, and the corrected desired floor reaction force horizontal component substantially agrees with the corrected desired floor reaction force horizontal component with restriction Fltd; therefore, the desired floor reaction force moment horizontal component for compliance control and the corrected desired floor reaction force horizontal component substantially satisfy the ZMP restrictive condition and the floor reaction force horizontal component restrictive condition by determining the corrected desired floor reaction force moment horizontal component with restriction Mltd and the corrected desired floor reaction force horizontal component with restriction Fltd as described above.

Subsequently, the horizontal body position correcting perturbation model stabilization moment Mpf is determined by an Mpf calculator 215. More detailedly, the value obtained by multiplying the value, which is obtained by subtracting the full-model floor reaction force horizontal component Ffull from the corrected desired floor reaction force horizontal component with restriction Fltd, by the gain Kc is integrated by an integrator 215a, and further, the obtained integrated value is multiplied by the body translational mode floor reaction force ratio h to determine the horizontal body position correcting perturbation model stabilization moment Mpf. In other words, the horizontal body position correcting perturbation model stabilization moment Mpf is obtained according to the following equation.

$$Mpf = h * \int Kc(Fltd - Ffull) dt \qquad \text{Equation h55}$$

Subsequently, by an Mrf calculator 214, the body posture inclination angle correcting perturbation model stabilization moment Mrf is determined by subtracting the horizontal body position correcting perturbation model stabilization moment Mpf and the compensating total floor reaction force moment horizontal component Mdmdxy from the corrected desired floor reaction force moment horizontal component with restriction Mltd. In other words, the body posture inclination angle correcting perturbation model stabilization moment Mrf is obtained according to the aforesaid Equation h21.

Furthermore, according to the aforesaid Equation h23, the body posture inclination angle correcting perturbation model floor reaction force moment Mr is determined. In other words, the body posture inclination angle correcting perturbation model stabilization moment Mrf, which is an output of the Mrf calculator 214, is directly determined as the body posture inclination angle correcting perturbation model floor reaction force moment Mr.

Subsequently, a full-model floor reaction force moment error Merr defined by the following equation is calculated by a Merr calculator 216.

Full-model floor reaction force moment error $Merr$=Full-model floor reaction force moment horizontal component $Mfullxy$–Corrected desired floor reaction force moment horizontal component with restriction $Mltd$ \qquad Equation h56

Subsequently, an Mp calculator 217 determines the horizontal body position correcting perturbation model floor reaction force moment Mp according to the following equation.

$$Mp = Mpf - \int Km * Merr \, dt \qquad \text{Equation h57}$$

This means that the value obtained by multiplying the full-model floor reaction force moment error Merr by an integration gain Km is integrated by the integrator 217a, and the sign of the integrated value is reversed. Further, the output of the integrator 217a is added to the horizontal body position correcting perturbation model stabilization moment Mpf to determine the horizontal body position correcting perturbation model floor reaction force moment Mp.

Subsequently, the horizontal body position correcting perturbation model floor reaction force moment Mp is supplied to the body position correcting perturbation model 202, and a correcting perturbation model body position Xc that balances with the supplied floor reaction force moment horizontal component is calculated.

In addition, the body posture inclination angle correcting perturbation model floor reaction force moment Mr is supplied to a body posture inclination angle correcting perturbation model 203, and the correcting perturbation model body posture inclination angle θc that balances with the supplied floor reaction force moment horizontal component is calculated.

The processing up to the above in S3536 is as per PCT/JP03/00435, so that no further explanation will be given.

Further, in the present embodiment, an antiphase arm swing angle correcting perturbation model moment Ma is determined in the antiphase arm swing angle correcting perturbation model moment determiner 230.

Furthermore, the antiphase arm swing angle correcting perturbation model moment Ma is input to an antiphase arm swing angle correcting perturbation model 231 to determine a correcting perturbation model antiphase arm swing angle θca.

Figure 72:
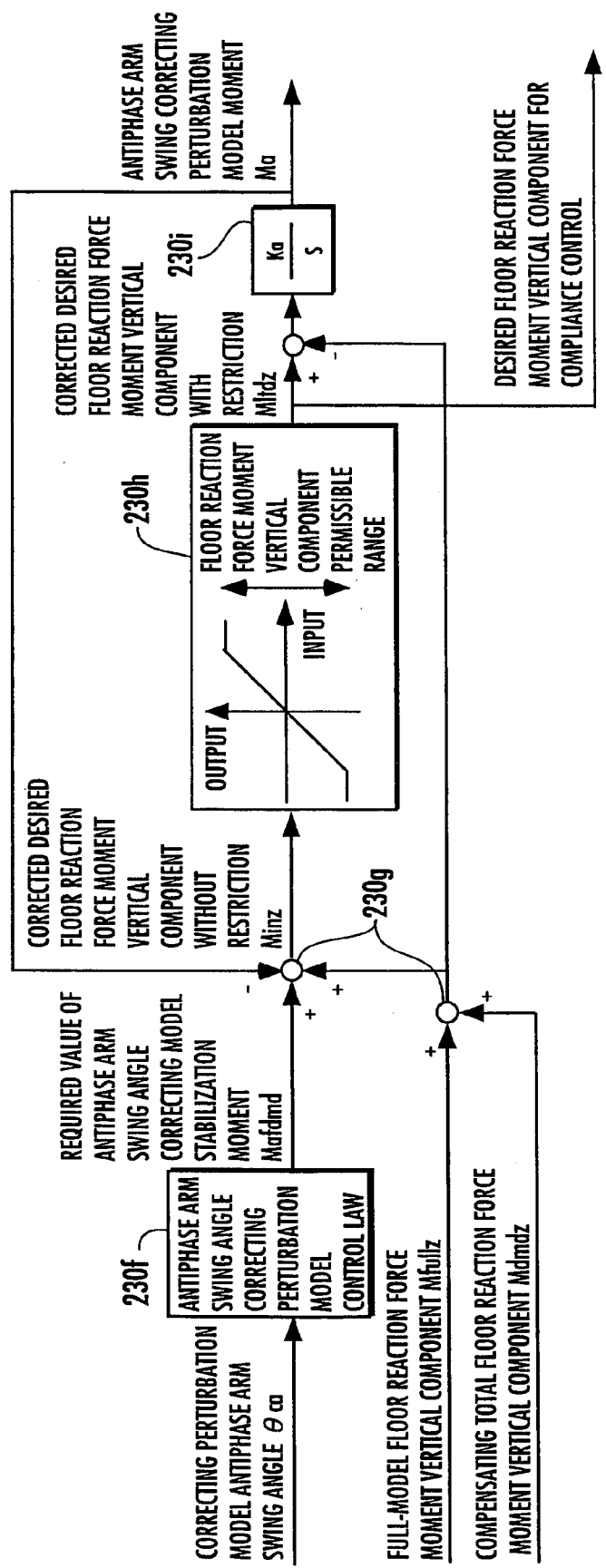

The following will explain in detail the operation of the antiphase arm swing angle correcting perturbation model moment determiner 230 in conjunction with FIG. 72, which is a functional block diagram thereof.

First, the required value Mafdmd of antiphase arm swing angle correcting perturbation model stabilization moment is determined according to an antiphase arm swing angle correcting perturbation model control law 230f. For this purpose, the same control law as that in the third embodiment may be used. Thus, as the control law, the aforesaid Equation h30, for example, may be used.

Subsequently, in a calculator 230g, a corrected desired floor reaction force moment vertical component without restriction Minz is determined by subtracting the last time value (an output of an integrator, which will be discussed later) of the antiphase arm swing angle correcting perturbation model moment Ma from the sum of the full-model floor reaction force moment vertical component Mfullz, the compensating total floor reaction force moment vertical component Mdmdz, and the required value Mafdmd of antiphase arm swing angle correcting perturbation model stabilization moment. Then, in a restricting means (restriction processing unit) 230h, a restriction is added to the corrected desired floor reaction force moment vertical component without restriction Minz so that it does not exceed a floor reaction force vertical component moment permissible range (that is, passing it through a shown saturation characteristic function), thereby determining the corrected desired floor reaction force moment vertical component with restriction Mltdz. Next, the value obtained by subtracting the sum of the full-model floor reaction force moment vertical component Mfullz, the compensating total floor reaction force moment vertical component Mdmdz, and the required value Mafdmd of antiphase arm swing angle correcting perturbation model stabilization moment from the corrected desired floor reaction force moment vertical component with restriction Mltdz is integrated by an integrator 230i using an integration gain Ka so as to determine the antiphase arm swing correcting perturbation model moment Ma, which is output. In addition, the corrected desired floor reaction force moment vertical component with restriction Mltdz is output as the desired floor reaction force moment vertical component for compliance control.

The antiphase arm swing correcting perturbation model moment Ma and the desired floor reaction force moment vertical component for compliance control are determined in the antiphase arm swing angle correcting perturbation model moment determiner 230 as described above.

The determined correcting perturbation model body position Xc, the correcting perturbation model body posture inclination angle θc, the correcting perturbation model antiphase arm swing angle θca, the horizontal body position correcting perturbation model stabilization moment Mpf, and the antiphase arm swing correcting perturbation model moment Ma are used as the last time values at the next time control cycle (time t+Δt) as previously described.

The rest of the construction and processing are the same as those of the third embodiment. According to the fourth embodiment, the same operations and advantages as those of the third embodiment can be obtained.

The fourth embodiment explained above provides the embodiments of the first to the tenth inventions, the twelfth to the fifteenth inventions, the twentieth to the twenty-second inventions, and the twenty-fourth to the thirtieth inventions in the present invention. In this case, the floor reaction force moment vertical component in the fourth embodiment (a floor reaction force moment vertical component to which Mdmdz has been added) corresponds to the amount to be controlled, a body yaw angle error and/or a body yaw angular velocity error corresponds to an error of the state amount of the robot 1, and Mdmdz corresponds to a compensating floor reaction force moment. Further, the floor reaction force moment vertical component permissible range [Mzmin, Mzmax] for generating a gait (for full-model correction) in the fourth embodiment corresponds to the permissible range of the amount to be restricted. Further, a motional component of a simplified model gait corresponds to a provisional instantaneous value of a desired motion, and the provisional instantaneous value corrected in S3536 corresponds to the instantaneous value of the desired motion. A full model (including an antiphase arm swing angle correcting perturbation model) corresponds to the dynamic model in the invention. And the aforesaid antiphase arm swing angle correcting perturbation model moment Ma corresponds to a model correcting floor reaction force moment in the third invention, a moment correction manipulated variable in the tenth invention, and the perturbation model manipulated variable in the twenty-second invention, and the correcting perturbation model antiphase arm swing angle θca corresponds to the correction amount of a provisional instantaneous value of a desired motion in the second invention and the eleventh invention, and the correction amount of a desired motion in the twenty-second invention. Furthermore, the corrected desired floor reaction force moment vertical component without restriction Minz in the fourth embodiment corresponds to an estimated value of a restriction object amount in the twenty-sixth invention, and the required value Mafdmd of antiphase arm swing angle correcting model stabilization moment in the fourth embodiment corresponds to a model correcting floor reaction force moment in the third invention and the required value of a perturbation model manipulated variable in the twenty-fourth invention. The full-model floor reaction force moment vertical component Mfullz in the fourth embodiment corresponds to the vertical component of the floor reaction force moment that substantially balances with the provisional instantaneous value of a desired motion on a full model (dynamic model). And, the result of adding Mdmdz to this by the calculator 230g shown in FIG. 72 corresponds to the instantaneous value of a model restriction object amount in the twentieth invention. In the fourth embodiment, as in the twenty-seventh invention, the correction amount (the correcting perturbation model antiphase arm swing angle θca) of a desired motion is additionally input to the full model, which is a dynamic model.

In the fourth embodiment, Mafdmd does not steadily become zero; however, if this is steadily set to zero, then an embodiment of the twenty-third invention of the present invention will be constructed.

A fifth embodiment according to the present invention will now be explained with reference to FIG. 73 and FIG. 74. The fifth embodiment is based on a technique that generates a gait while correcting the gait by using a forward dynamic model (to be more precise, a pseudo forward dynamic model) in place of the inverse dynamic full model (inverse full model) 201 used in the aforementioned third and fourth embodiments.

Figure 73:
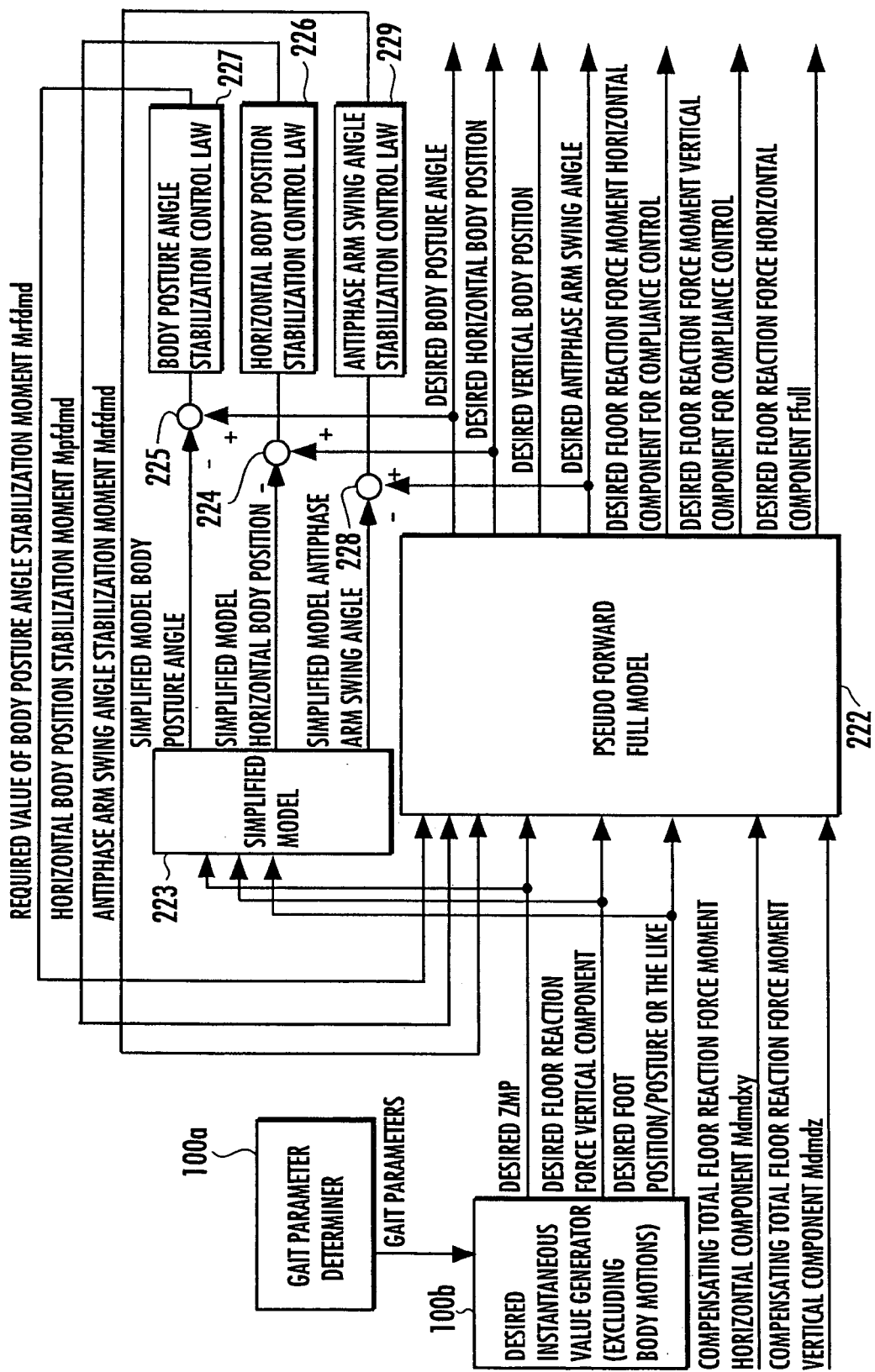
FIG. 73 is a block diagram showing a functional construction of a gait generator in a fifth embodiment of the present invention.

FIG. 73 is a functional block diagram explaining an operation of a device according to the fifth embodiment. As shown in FIG. 73, the present embodiment is provided with a pseudo forward full model (pseudo forward dynamic full model) 222.

The pseudo forward full model 222 receives the required value Mpfdmd of horizontal body position stabilization moment, the required value Mrfdmd of body posture inclination angle stabilization moment, the required value Mafdmd of antiphase arm swing angle stabilization moment, a desired ZMP, a desired floor reaction force vertical component, a compensating total floor reaction force moment horizontal component Mdmdxy, a compensating total floor reaction force moment vertical component Mdmdz, and the motional states of parts excluding a body 3, such as desired foot position/posture and a desired arm posture, and outputs a desired vertical body position, a desired horizontal body position, a desired body posture inclination angle, a desired antiphase arm swing angle, a desired floor reaction force moment (a horizontal component and a vertical component) for compliance control as the desired floor reaction force moment about a desired ZMP, and a desired floor reaction force horizontal component. A desired value input of the pseudo forward full model 222 is generated by a desired instantaneous value generator 100b on the basis of a gait parameter determined by a gait parameter determiner 100a, as explained with reference to the aforesaid FIG. 63.

Figure 74:
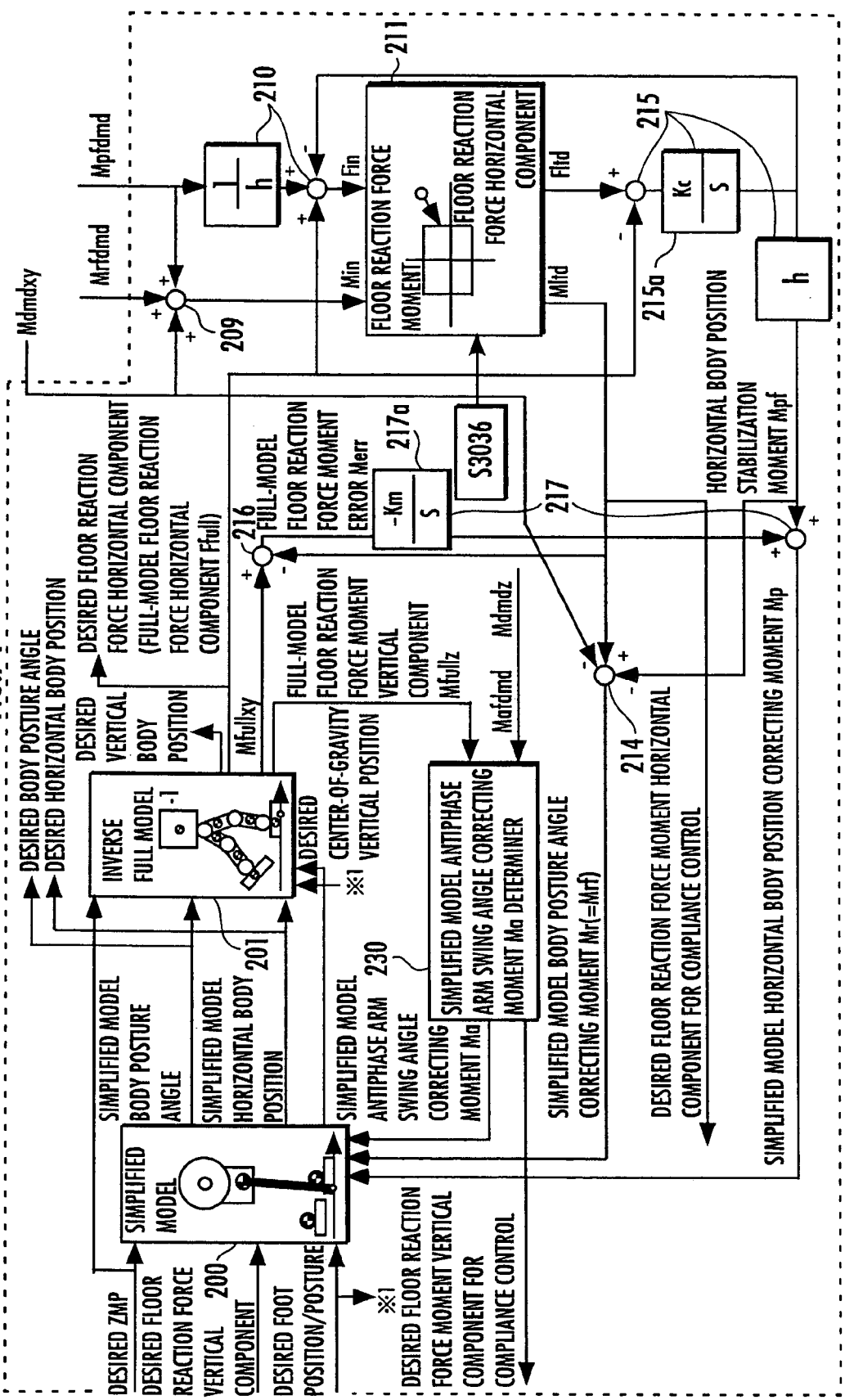
FIG. 74 is a block diagram showing processing of a pseudo order full model shown in FIG. 73.

Specifically, the above pseudo forward full model 222 is represented by the functional block diagram of FIG. 74, and the portion encircled by a dashed line in FIG. 74 corresponds to the pseudo forward full model 222. In this functional block diagram, the same functional parts as those in FIG. 71 of the aforementioned fourth embodiment will use the same reference marks as those in FIG. 71.

A simplified model 200 in FIG. 74 represents not merely represents a dynamic model, but it also represents the processing from S3510 to S3532 of FIG. 65 described above, namely, the processing for calculating (determining) a simplified model gait instantaneous value. Further, in the processing for calculating (determining) a current time gait instantaneous value (the gait instantaneous value of a simplified model) in S3532, as explained in the above third embodiment, the instantaneous value of a gait is generated, setting the model manipulation floor reaction force moment horizontal component about a desired ZMP to zero, then a perturbational motion of a body inclination mode that generates a simplified gait body posture inclination angle correcting moment Mr (last time value), which corresponds to the body posture inclination angle correcting perturbation mode moment Mr described in the third embodiment, a perturbational motion of a body translational mode that generates a simplified model horizontal body position correcting moment Mp (last time value), which corresponds to the horizontal body position correcting perturbation model moment Mp described in the third embodiment, and a perturbational motion of an antiphase arm swing mode that generates a simplified model antiphase arm swing angle correcting moment Ma (last time value), which corresponds to the antiphase arm swing angle correcting perturbation model moment Ma described in the third embodiment are added thereto. Thus, the instantaneous value of a gait output by the simplified model 200 is corrected.

To explain more specifically, in the processing of S3532 of FIG. 65 in the present embodiment, the body horizontal acceleration obtained by adding, as a perturbational portion, a body horizontal acceleration (d2Xb/dt2) determined according to an equation in which the second term of the right side of the aforesaid Equation 03y is equal to Mp (last time value), namely, the equation of Mp=mb*(Zb−Zzmp)*(d2Xb/dt2), to the body horizontal acceleration determined by the simplified model 200 is integrated to the second order from the beginning of the current time gait to current time t, thereby determining the instantaneous value of the horizontal body position at the current time t in S3414 and S3416 of FIG. 557, which constitute subroutine processing thereof. Furthermore, in S3414 of FIG. 57, the body posture inclination angular acceleration obtained by adding, as a perturbational portion, a body posture inclination angular acceleration (d2θby/dt2) determined according to an equation in which the seventh term of the right side of the aforesaid Equation 03y is equal to Mr (last time value), namely, the equation of Mr=J*d2θby/dt2, to the body posture inclination angular acceleration determined by the simplified model 200 is integrated to the second order from the beginning of the current time gait to the current time t, thereby determining the instantaneous value of the body posture inclination angle at the current time t. Furthermore, in S3414 of FIG. 57, the antiphase arm swing angular acceleration obtained by adding, as a perturbational portion, an antiphase arm swing angular acceleration (d2θaz/dt2) determined according to an equation in which the eighth term of the right side of the aforesaid Equation 03z is equal to Ma (last time value), namely, the equation of Ma=Jaz*d2θaz/dt2, to the antiphase arm swing angular acceleration determined by the simplified model 200 is integrated to the second order from the beginning of the current time gait to the current time t, thereby determining the instantaneous value of the antiphase arm swing angle at the current time t.

Supplementally, for the horizontal body position and the body posture inclination angle, the description has been given of the instantaneous values on a sagittal plane; however, the instantaneous values on a lateral plane are also determined in the same manner.

In FIG. 74, the portion beyond the simplified model 200 is the portion that carries out the processing that corresponds to the processing of S3536. The processing in S3536 will be explained in detail in conjunction with FIG. 74.

In S3536, first, the simplified model horizontal body position that has been corrected on the basis of the simplified model horizontal body position correcting moment Mp (to be specific, the last time value in the control cycle at time (t−Δt)) as described above is output as a desired horizontal body position (a final desired instantaneous value of the horizontal body position at time t) in S3032. Furthermore, a simplified model body posture inclination angle that has been corrected on the basis of a simplified model body posture inclination angle correcting moment Mr (to be specific, the last time value in the control cycle at time (t−Δt)) is output as a desired body posture inclination angle (a final desired instantaneous value of the body posture inclination angle at time t). Furthermore, a simplified model antiphase arm swing angle that has been corrected on the basis of a simplified model antiphase arm swing angle correcting model moment Ma (to be specific, the last time value in the control cycle at time (t−Δt)) is output as a desired antiphase arm swing angle (a final desired instantaneous value of the antiphase arm swing angle at time t).

More specifically, the final desired horizontal body position and desired body posture inclination angle are determined according to Equation h100, Equation h101, and Equation h102.

Desired horizontal body position=Simplified model horizontal body position    Equation h100

Desired body posture inclination angle=Simplified model body posture inclination angle    Equation h101

Desired antiphase arm swing angle=Simplified model antiphase arm swing angle    Equation h102

Subsequently, the desired horizontal body position (i.e., the simplified model horizontal body position), the desired body posture inclination angle (i.e., the simplified model body posture inclination angle), the desired antiphase arm swing angle (i.e., the simplified model antiphase arm swing angle), and the instantaneous values of the motion variables, such as the desired total center-of-gravity position, the desired foot position/posture, and the desired arm posture of the simplified model gait, and the instantaneous value of the desired ZMP obtained as described above are input to the aforesaid inverse dynamic full model (inverse full model) 201, and then a floor reaction force horizontal component and a floor reaction force moment (a horizontal component and a vertical component) about the desired ZMP that balance with the motion represented by the input motional variables (i.e., generated by the inverse full model 201 by the motion) are calculated. Thereafter, as in the fourth embodiment, these calculated floor reaction force horizontal component, the floor reaction force moment horizontal component, and the floor reaction force moment vertical component will be referred to as a full-model floor reaction force horizontal component Ffull, the full-model floor reaction force moment horizontal component Mfullxy, and the floor reaction force moment vertical component Mfullz.

As in the fourth embodiment, the full-model floor reaction force horizontal component Ffull is output as a desired floor reaction force horizontal component (a final desired instantaneous value of the floor reaction force horizontal component at time t).

The present embodiment is not provided with a body posture inclination angle correcting perturbation model, a horizontal body position correcting perturbation model, and an antiphase arm swing angle correcting perturbation model. Therefore, the processing that corresponds to the horizontal body position correcting perturbation model control law, the body posture inclination angle correcting perturbation model control law, and the antiphase arm swing angle correcting perturbation model control law is different from that in the fourth embodiment, as it will be discussed later.

Except for this, after the aforesaid processing, the same processing as that for determining the body posture inclination angle correcting perturbation model moment Mr, the horizontal body position correcting perturbation model moment Mp, and the antiphase arm swing angle correcting perturbation model moment Ma in the fourth embodiment is carried out until the simplified model body posture inclination angle correcting moment Mr, the simplified model horizontal body position correcting moment Mp, and the simplified model antiphase arm swing angle correcting moment Ma are determined. In other words, the processing of a Min calculator 209, a Fin calculator 210, a restriction processing unit 211 (restricting means), an Mpf calculator 215, a Merr calculator 216, an Mrf calculator 217 (=Mr calculator), and an Mp calculator 214 is the same as that in the fourth embodiment. Moreover, except for the processing that corresponds to the antiphase arm swing angle correcting perturbation model control law, the processing of a simplified model antiphase arm swing angle correcting moment determiner 230 is identical to the processing of the antiphase arm swing angle correcting perturbation model moment determiner 230 in the fourth embodiment. In the present embodiment, Mr, Mp and Ma correspond to the body posture inclination angle correcting perturbation model moment Mr, the horizontal body position correcting perturbation model moment Mp, and the antiphase arm swing angle correcting perturbation model moment Ma, respectively, in the fourth embodiment; however, they are not input to perturbation models, but they are input to the simplified model 200. For this reason, the Mr, Mp and Ma are referred to as the simplified model body posture inclination angle correcting moment, the simplified model horizontal body position correcting moment, and the simplified model antiphase arm swing angle correcting moment.

The simplified model body posture inclination angle correcting moment Mr, the simplified model horizontal body position correcting moment Mp, and the simplified model antiphase arm swing angle correcting moment Ma determined as described above are used as last time values when determining (generating) simplified model gait instantaneous values at the next time control cycle (time t+Δt), as previously described.

The rest of the construction and processing is the same as that of the fourth embodiment.

The following will explain the processing for determining the required value Mrfdmd of body posture inclination angle stabilization moment, the required value Mpfdmd of horizontal body position stabilization moment, and the required value Mafdmd of antiphase arm swing angle stabilization moment with reference to FIG. 73.

As shown in FIG. 73, the present embodiment is provided with a simplified model 223 separate from the simplified model 200 provided in the pseudo forward full model 222, as previously mentioned. The function of the simplified model 223 in the present embodiment is identical to that of the aforesaid simplified model 200, and the simplified model 223 represents not only a dynamic model but also the processing from S3510 to S3532 of FIG. 65 described above, i.e., the processing for calculating (determining) simplified model gait instantaneous values. The simplified model 223, in actual operation, does not necessarily have to perform all processing from S3510 to S3532 off FIG. 65, as long as it is capable of determining the instantaneous values of body posture inclination angles and the instantaneous values of horizontal body positions.

The following will explain in detail the processing for determining Mpfdmd and Mrfdmd in the present embodiment in conjunction with FIG. 73.

In the present embodiment, the differences in the horizontal body position, the body posture inclination angle, and the antiphase arm swing angle between the gaits generated using the simplified model 223 and the gaits calculated as described above using the aforesaid pseudo forward dynamic full model 222 are determined by calculators 224, 225 and 228. Then, based on these differences, the required value Mpfdmd of horizontal body position stabilization moment, the required value Mrfdmd of body posture inclination angle stabilization moment, and the required value Mafdmd of antiphase arm swing angle stabilization moment are determined by a feedback control law, such as PID, so as to converge the differences to zero. More specifically, Mpfdmd is determined by a horizontal body position stabilization control law 226 composed of a feedback control law on the basis of the difference between the horizontal body position by the simplified model 223 and the horizontal body position by the pseudo forward full model 222. Further, Mrfdmd is determined by a body posture inclination angle stabilization control law 227 composed of a feedback control law on the basis of the difference between the body posture inclination angle by the simplified model 223 and the body posture inclination angle by the pseudo forward full model 222. Further, Mafdmd is determined by an antiphase arm swing angle stabilization control law composed of a feedback control law on the basis of the difference between the antiphase arm swing angle by the simplified model 223 and the antiphase arm swing angle by the pseudo forward full model 222. Then, the determined Mpfdmd, Mrfdmd and Mafdmd are fed back and input to the aforesaid pseudo forward dynamic full model.

In the present embodiment, the gait generator 100 outputs, as the final desired instantaneous values of a current time gait, a desired ZMP, a desired floor reaction force vertical component, desired foot position/posture, and a desired arm posture or the like, which are some of inputs to the aforesaid pseudo forward dynamic full model 222, and a desired vertical body position, a desired horizontal body position, a desired body posture inclination angle, a desired antiphase arm swing angle, a desired floor reaction force horizontal component, and a desired floor reaction force moment (a horizontal component and a vertical component) for compliance control, which are outputs from the aforesaid pseudo forward dynamic full model 222.

The fifth embodiment explained above is capable of providing the operations and advantages similar to those of the aforementioned fourth embodiment.

In the aforementioned fifth embodiment, the required value Mrfdmd of body posture inclination angle stabilization moment, the required value Mpfdmd of horizontal body position stabilization moment, and the required value Mafdmd of antiphase arm swing angle stabilization moment have been input only to the pseudo forward full model 222. Alternatively, however, Mrfdmd, Mpfdmd and Mafdmd may be input to the simplified model 223 or they may be divided and supplied to the simplified model 223 and the pseudo forward full model 222. Furthermore, the compensating total floor reaction force moment vertical component Mdmdz may be input to the simplified model 223 and a simplified model antiphase arm swing angle may be determined such that the Mdmdz is additionally generated.

The fifth embodiment explained above is the embodiment of a forty-fourth to a forty-seventh inventions of the present invention. In this case, the floor reaction force moment vertical component (the floor reaction force moment vertical component to which Mdmdz has been added) in the fifth embodiment corresponds to a control object amount, a body yaw angle error and/or a body yaw angular velocity error correspond to an error of a state amount of the robot 1, and Mdmdz corresponds to a compensating floor reaction force moment. A floor reaction force moment vertical component permissible range [Mzmin, Mzmax] for generating gaits (for full-model correction) in the fifth embodiment corresponds to the permissible range of a restriction object amount. A motional component of a simplified model gait corresponds to a provisional instantaneous value of a desired motion, and the result of correcting this in S3536 corresponds to the instantaneous value of the desired motion. The floor reaction force depending on the current time gait parameter determined in S3528 corresponds to the provisional instantaneous value of a desired floor reaction force. The simplified model 223 and the pseudo forward full model shown in FIG. 73 correspond to a first dynamic model and a second dynamic model in the forty-fourth invention. The simplified model in FIG. 12, the inverse full model in FIG. 74, and the simplified model 223 in FIG. 73 correspond to a first dynamic model, a second dynamic model, and a third dynamic model, respectively, in the forty-seventh invention. The antiphase arm swing angle stabilization moment Mafdmd in the fifth embodiment corresponds to the manipulated variable of the floor reaction force moment in the forty-fourth invention and the required value of a floor reaction force moment correction amount in the forth-seventh invention, and this is additionally input to a pseudo forward full model (specifically, a simplified model antiphase arm swing angle correcting moment determiner 230 of FIG. 74).

Figure 75:
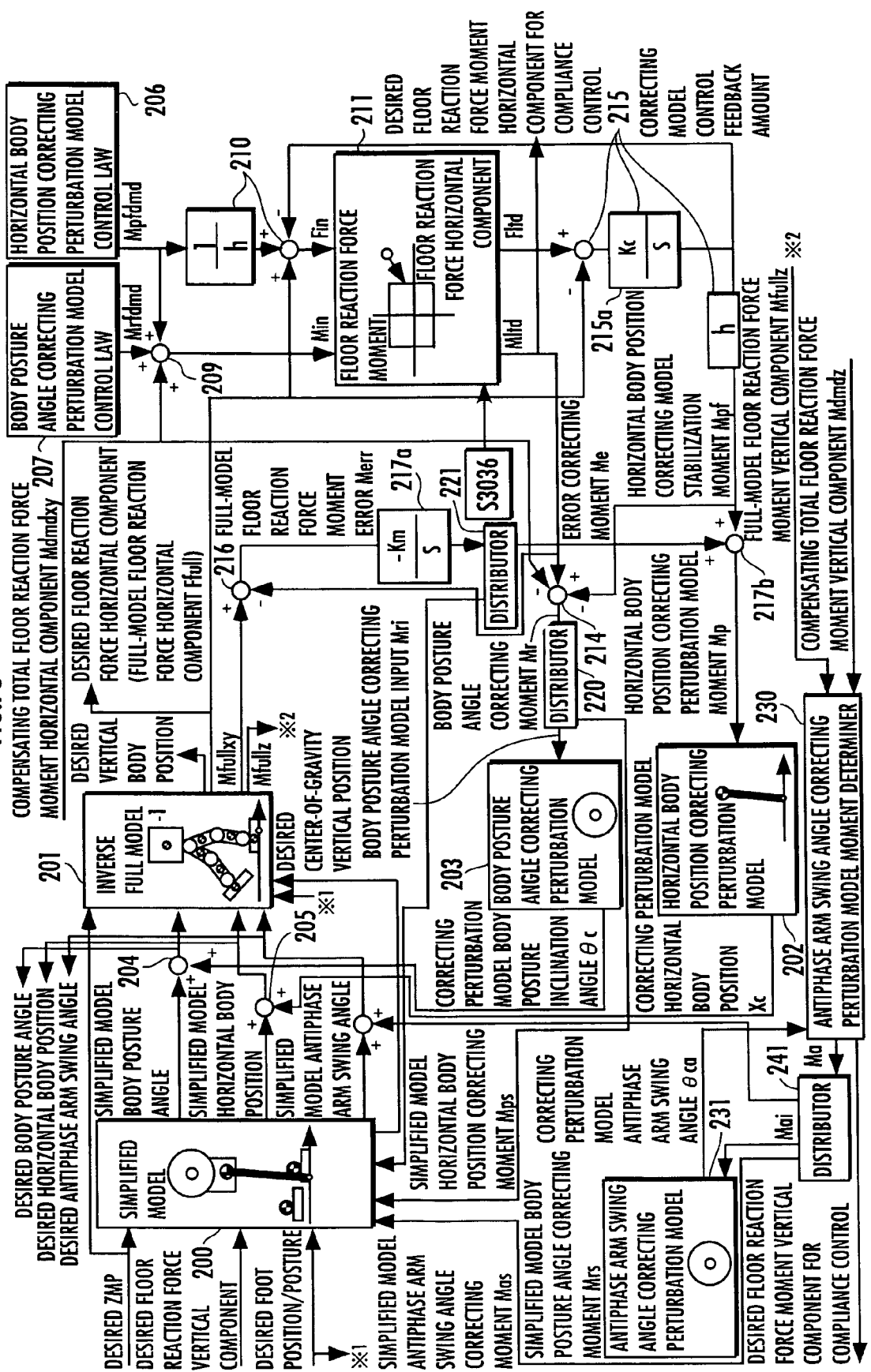
FIG. 75 is a block diagram showing processing of S3536 in FIG. 65 in a sixth embodiment of the present invention.

A sixth embodiment of the present invention will now be explained with reference to FIG. 75. FIG. 75 is a functional block diagram illustrating the operation of a device according to the sixth embodiment of the present invention, specifically, a gait correcting technique in S3536 of the flowchart of FIG. 65. Incidentally, in FIG. 75, the same functional parts as those in the third embodiment or the fourth embodiment will use the same reference marks as those in FIG. 66 or FIG. 71.

The sixth embodiment is provided with a horizontal body position correcting perturbation model 202, a body posture inclination angle correcting perturbation model 203, and an antiphase arm swing angle correcting perturbation model 231. The sixth embodiment is provided also with three distributors 220, 221, and 241.

The distributors 220, 221, and 241 are all defined as 1-input, 2-output transmission blocks, and they are transmission blocks that determine one output on the basis of an input (e.g., signal processing of a frequency characteristic, a dead-zone characteristic, a saturation characteristic, or the like is carried out on an input to determine one output) and determine the other output such that the sum of the two outputs agrees or substantially agrees with the input.

A body posture inclination angle correcting moment Mr, which is the value (an output of an Mr calculator 214) obtained by subtracting a horizontal body position correcting perturbation model stabilization moment Mpf and a compensating total floor reaction force moment horizontal component Mdmdxy from a corrected desired floor reaction force moment horizontal component with restriction Mltdxy, is supplied to the distributor 220, and divided into a body posture inclination angle correcting perturbation model input Mri to be supplied to the body posture inclination angle correcting perturbation model 203 and a simplified model body posture inclination angle correcting moment Mrs to be supplied to the simplified model 200. At this time, the body posture inclination angle correcting perturbation model input Mri and the simplified model body posture inclination angle correcting moment Mrs are determined (output) such that the sum of the body posture inclination angle correcting perturbation model input Mri and the simplified model body posture inclination angle correcting moment Mrs agrees with the body posture inclination angle correcting moment Mr.

To be more specific, the body posture inclination angle correcting perturbation model input Mri is determined on the basis of the body posture inclination angle correcting moment Mr. For example, the body posture inclination angle correcting moment Mr is subjected to the processing of signals having a dead-zone characteristic, a saturation characteristic or a frequency characteristic so as to determine body posture inclination angle correcting perturbation model input Mri. The result obtained by subtracting the body posture inclination angle correcting perturbation model input Mri from the body posture inclination angle correcting moment Mr is determined as the simplified model body posture inclination angle correcting moment Mrs. To explain more specifically, in the present embodiment, the distributor 220 outputs a low-frequency component (DC component), which is obtained by passing an input (Body posture inclination angle correcting moment Mr=Mltd−Mpf−Mdmdxy) through a low-pass filter, as a simplified model body posture inclination angle correcting moment Mrs, and also outputs the component obtained by subtracting Mrs from the input (body posture inclination angle correcting moment Mr) as the body posture inclination angle correcting perturbation model input Mri. In this case, the dead-zone characteristic is imparted to the simplified model body posture inclination angle correcting moment Mrs, which is the low-frequency component (DC component), such that, in a state wherein an output of the low-pass filter lies within a predetermined range centering around a certain predetermined value, the Mrs is maintained at that predetermined value (e.g., zero).

The body posture inclination angle correcting perturbation model input Mri, which is an output of the distributor 220, is supplied to the body posture do inclination angle correcting perturbation model 203, and a correcting perturbation model body posture inclination angle θc is determined by the body posture inclination angle correcting perturbation model 203.

The simplified model body posture inclination angle correcting moment Mrs, which is the other output of the distributor 220, is supplied to the simplified model 200. This corresponds to supplying the simplified model body posture inclination angle correcting moment Mr to the simplified model 200 in FIG. 74 in the aforementioned fifth embodiment.

The distributor 221 receives a value obtained by integrating the value, which is obtained by multiplying a full-model floor reaction force moment horizontal component error Merr by a gain Km, by an integrator 217a and reversing the sign thereof.

An input to the distributor 221 is divided into a simplified model horizontal body position correcting moment Mps to be supplied to the simplified model 200 and an error correcting moment Me to be supplied to a horizontal body position correcting perturbation model 202, as in the case of the distributor 220. To be more specific, an error correcting moment Me is determined on the basis of an output of the integrator 217a. For instance, the error correcting moment Me is determined by subjecting an output of the integrator 217a (an input of the distributor 220) to the processing of signals having a dead-zone characteristic, a saturation characteristic or a frequency characteristic. The result obtained by subtracting the error correcting moment Me from an output of the integrator 217a is determined as the simplified model body posture inclination angle correcting moment Mrs. To explain more specifically, in the present embodiment, the distributor 221 outputs a low-frequency component (DC component), which is obtained by passing an input (an output of the integrator 217a) through a low-pass filter, as a simplified model horizontal body position correcting moment Mps, and also outputs the component obtained by subtracting Mps from the input (the output of the integrator 217a) as the error correcting moment Me. In this case, the dead-zone characteristic is imparted to the simplified model horizontal body position correcting moment Mps, which is the low-frequency component (DC component), such that, in a state wherein an output of the low-pass filter lies within a predetermined range centering around a certain predetermined value, the Mps is maintained at that predetermined value (e.g., zero).

The horizontal body position correcting perturbation model moment Mp is determined by adding a horizontal body position correcting model stabilization moment Mpf to the error correcting moment Me, which is an output of the distributor 221, by an Mp calculator 217b. Then, the horizontal body position correcting perturbation model moment Mp is supplied to the horizontal body position correcting perturbation model 202, and the correcting perturbation model horizontal body position Xc is determined by the horizontal body position correcting perturbation model 202.

The simplified model horizontal body position correcting moment Mps, which is the other output of the distributor 221, is supplied to the simplified model 200. This is equivalent to supplying the simplified model horizontal body position correcting moment Mp to the simplified model 200 in FIG. 74 of the aforementioned fifth embodiment.

An antiphase arm swing angle correcting perturbation model moment determiner 230 is identical to the antiphase arm swing angle correcting perturbation model moment determiner shown in FIG. 72 used in the fourth embodiment. However, the antiphase arm swing angle correcting perturbation model moment Ma, which is an output shown in FIG. 72, is supplied to the distributor 241 rather than being directly supplied to the antiphase arm swing angle correcting perturbation model 231. In the present embodiment, therefore, the designation of the antiphase arm swing angle correcting perturbation model moment Ma is modified to the antiphase arm swing angle correcting model moment Ma.

The distributor 241 receives, as an input, the antiphase arm swing angle correcting model moment Ma determined by the antiphase arm swing angle correcting perturbation model moment determiner 230.

As in the case of the distributor 220, an input to the distributor 241 is divided into a simplified model antiphase arm swing angle correcting moment Mas to be supplied to the simplified model 200 and an antiphase arm swing angle correcting perturbation model input Mai to be supplied to the antiphase arm swing angle correcting perturbation model 231.

At this time, the antiphase arm swing angle correcting perturbation model input Mai and the simplified model antiphase arm swing angle correcting moment Mas are determined (output) such that the sum of the antiphase arm swing angle correcting perturbation model input Mai and the simplified model antiphase arm swing angle correcting moment Mas agrees with the antiphase arm swing angle correcting model moment Ma.

To be more specific, antiphase arm swing angle correcting perturbation model input Mai is determined on the basis of the antiphase arm swing angle correcting model moment Ma. For example, the antiphase arm swing angle correcting model moment Ma is subjected to the processing of signals having a dead-zone characteristic, a saturation characteristic or a frequency characteristic so as to determine antiphase arm swing angle correcting perturbation model input Mai. The result obtained by subtracting the antiphase arm swing angle correcting perturbation model input Mai from the antiphase arm swing angle correcting model moment Ma is determined as the simplified model antiphase arm swing angle correcting moment Mas. To explain more specifically, in the present embodiment, the distributor 241 outputs a low-frequency component (DC component), which is obtained by passing an input (the antiphase arm swing angle correcting model moment Ma) through a low-pass filter, as a simplified model antiphase arm swing angle correcting moment Mas, and also outputs the component obtained by subtracting the Mas from the input (antiphase arm swing angle correcting model moment Ma) as the antiphase arm swing angle correcting perturbation model input Mai. In this case, the dead-zone characteristic is imparted to the simplified model antiphase arm swing angle correcting moment Mas, which is the low-frequency component (DC component), such that, in a state wherein an output of the low-pass filter lies within a predetermined range centering around a certain predetermined value, the Mas is maintained at that predetermined value (e.g., zero).

The antiphase arm swing angle correcting perturbation model input Mai, which is an output of the distributor 241, is supplied to the antiphase arm swing angle correcting perturbation model 231, and a correcting perturbation model antiphase arm swing angle θca is determined by the antiphase arm swing angle correcting perturbation model 231.

The simplified model antiphase arm swing angle correcting moment Mas, which is the other output of the distributor 241, is supplied to the simplified model 200. This corresponds to supplying the simplified model antiphase arm swing angle correcting moment Ma to the simplified model 200 in FIG. 74 in the aforementioned fifth embodiment.

As in the aforesaid fifth embodiment, the simplified model 200 generates the instantaneous value of a gait such that no floor reaction force moment horizontal component is generated about a desired ZMP (setting the model manipulation floor reaction force moment to zero) in the processing for calculating (determining) the instantaneous value of a simplified model gait, adds a perturbational motion of a body inclination mode that generates a simplified model body posture inclination angle correcting moment Mrs (last time value), adds a perturbational motion of a body translational mode that generates a simplified model horizontal body position correcting moment Mps (last time value), and further adds a perturbational motion of an antiphase arm swing mode that generates the simplified model antiphase arm swing angle correcting moment Mas, thereby correcting the instantaneous value of the gait.

In the present embodiment, in S800 of FIG. 43, which is a part of the processing of S3528 of FIG. 65, the state amount of a simplified model at the end of the last time gait is used as the terminal state of the last time gait. Therefore, if there is a moment when Mrs, Mps and Mas output to a simplified model from the distributors 220, 221, and 241 take values other than zero, then the behavior of the simplified model deviates from its original behavior, so that gait parameters are corrected accordingly as necessary in S3528. As the aforesaid dead-zone area is set to be wider, then the absolute values of Mrs, Mps, and Mas become smaller, so that the absolute values of the correction amounts of the gait parameters become also smaller.

The rest of the construction and processing are the same as those of the fourth embodiment. More detailedly, the processing of calculators 204 and 205, a calculator for calculating a desired horizontal body position, a Merr calculator 216, a body posture inclination angle correcting perturbation model control law 207, a horizontal body position correcting perturbation model control law 206, a Min calculator 209, a Fin calculator 210, a restriction processing unit 211, an Mpf calculator 215, and an antiphase arm swing angle correcting perturbation model moment determiner 240 is the same as that of the aforementioned fourth embodiment.

In the present embodiment, it is not necessary to carry out the processing for correcting the state amount of the simplified model 200 on the basis of the state amounts of the perturbation models 202, 203, and 231 at the end of a current time gait or the like as explained in the aforesaid third embodiment. This is because the simplified model body posture inclination angle correcting moment Mrs, the simplified model horizontal body position correcting moment Mps, and the simplified model antiphase arm swing angle correcting moment Mas are additionally supplied from the distributors 220, 221, and 241.

In the present embodiment described above is capable of providing the operations and advantages similar to those of the aforesaid fourth embodiment or the fifth embodiment.

In the present embodiment, one of the two outputs of each of the distributors 220, 221, and 241 may be set to zero, while the other is matched with an input.

In this case, if, for example, the simplified model body posture inclination angle correcting moment Mrs, which is an output of the distributor 220, is set to zero, the simplified model horizontal body position correcting moment Mps, which is an output of the distributor 221, is set to zero, and the simplified model antiphase arm swing angle correcting moment Mas, which is an output of the distributor 241, is set to zero, then the same operations and advantages of the fourth embodiment will be provided (actually, the same construction as that of the fourth embodiment will be provided).

Alternatively, the value obtained by adding the horizontal body position correcting model stabilization moment Mpf to the error correcting moment Me may be supplied to a third distributor, not shown, and one of the outputs thereof may be supplied to the horizontal body position correcting perturbation model 202, while the other output may be added to the simplified model horizontal body position correcting moment Mps. In this case, the simplified model horizontal body position correcting moment Mps, which is an output of the distributor 221, may be set to zero. In other words, the distributor 221 may be omitted, and the value obtained by multiplying the full-model floor reaction force moment error Merr by the gain Km may be integrated. The sign of the integrated value may be reversed and added to the horizontal body position correcting model stabilization moment Mpf, and the resulting value may be supplied to the third distributor.

The sixth embodiment explained above is the embodiment of a first to a tenth inventions, a twelfth to a fifteenth inventions, a twentieth to a twenty-second inventions, a twenty-fourth to a thirty-second inventions, a thirty-fourth to a forty-first inventions, and a forty-third invention of the present invention. In this case, the floor reaction force moment vertical component (the floor reaction force moment vertical component to which Mdmdz has been added) in the sixth embodiment corresponds to a control object amount, a body yaw angle error and/or a body yaw angular velocity error correspond to an error of a state amount of the robot 1, and Mdmdz corresponds to a compensating floor reaction force moment. A floor reaction force moment vertical component permissible range [Mzmin, Mzmax] for generating gaits (for full-model correction) in the sixth embodiment corresponds to the permissible range of a restriction object amount. A motional component of a simplified model gait corresponds to a provisional instantaneous value of a desired motion, and the result of correcting this in S3536 corresponds to the instantaneous value of the desired motion. The floor reaction force depending on the current time gait parameter determined in S3528 corresponds to the provisional instantaneous value of a desired floor reaction force. Inverse full models (including an antiphase arm swing angle correcting perturbation model) correspond to the dynamic models in the first invention, the sixth invention, the tenth invention, and the twentieth invention, and the simplified model and the inverse full model shown in FIG. 12 correspond to the first dynamic model and the second dynamic model, respectively, in the thirty-first invention. The antiphase arm swing angle correcting moment Ma corresponds to the model correcting floor reaction force moment in the third invention, a moment correction manipulated variable in the tenth invention, and a manipulated variable of a floor reaction force moment manipulated variable in the thirty-sixth invention, the simplified model antiphase arm swing angle correcting moment Mas of the Ma corresponds to a floor reaction force moment correction amount in the thirty-first invention, and antiphase arm swing angle correcting perturbation model input Mai corresponds to a perturbation model manipulation amount in the thirty-sixth invention. The required value Mafdmd of antiphase arm swing angle correcting model stabilization moment in the sixth embodiment corresponds to a model correcting floor reaction force moment in the third invention, the required value of a perturbation model manipulated variable in the twenty-fourth invention, the required value of a floor reaction force moment correction amount in the thirty-fourth invention, and the required value of a manipulated variable of a floor reaction force moment in the thirty-seventh invention. The correcting perturbation model antiphase arm swing angle θca corresponds to the correction amount of a provisional instantaneous value of a desired motion in the second invention, the correction amount of a desired motion in the twenty-second invention, and the correction amount of a desired motion in the thirty-fifth invention. Furthermore, a corrected desired floor reaction force moment vertical component without restriction Minz in the sixth embodiment corresponds to the estimated value of a restriction object amount in the forty-third invention. Furthermore, the full-model floor reaction force moment vertical component Mfullz in the sixth embodiment corresponds to the vertical component of a floor reaction force moment that balances with the provisional instantaneous value of a desired motion on a full model (dynamic model). And the value obtained by adding Mdmdz to this by the calculator 230g in FIG. 72 corresponds to a model restriction object amount instantaneous value in the twentieth invention and the thirty-first invention. In the sixth embodiment, the correction amount (the correcting perturbation model antiphase arm swing angle θca) of a desired motion is additionally supplied to an inverse full model, which is a dynamic model, as in the twenty-seventh invention. Moreover, in the sixth embodiment, the simplified model antiphase arm swing angle correcting moment Mas is additionally supplied to a simplified model working as a first dynamic model, as in the thirty-first invention.

In the aforesaid sixth embodiment, Mafdmd does not steadily become zero, but if this is steadily set to zero, then it constitutes the embodiment of the twenty-third invention, the thirty-third invention, and the forty-second invention in the present invention.

In the third to the sixth embodiments explained above, the instantaneous value of the current time gait (the provisional instantaneous value of a desired motion) has been determined such that the desired ZMP is satisfied, that is, the floor reaction force moment horizontal component about the desired ZMP is zero, in S3532 of FIG. 65. Alternatively, however, the instantaneous value of the current time gait may be determined such that a model manipulation floor reaction force moment horizontal component is generated about the desired ZMP, as in S3032 of FIG. 56 in the first embodiment. In this case, the model manipulation floor reaction force moment horizontal component may be supplied to the gait generator 100 from the compensating total floor reaction force moment horizontal component distributor 110, as shown in FIG. 53.

In the first to the sixth embodiments explained above, the compensating total floor reaction force moment horizontal component Mdmdxy may be determined on the basis of the state amounts of other postures of the robot 1, such as total center-of-gravity horizontal position/velocity, in place of the body posture angle/angular velocity.

A seventh embodiment in accordance with the present invention will now be explained with reference to FIG. 76 to FIG. 83.

Figure 76:
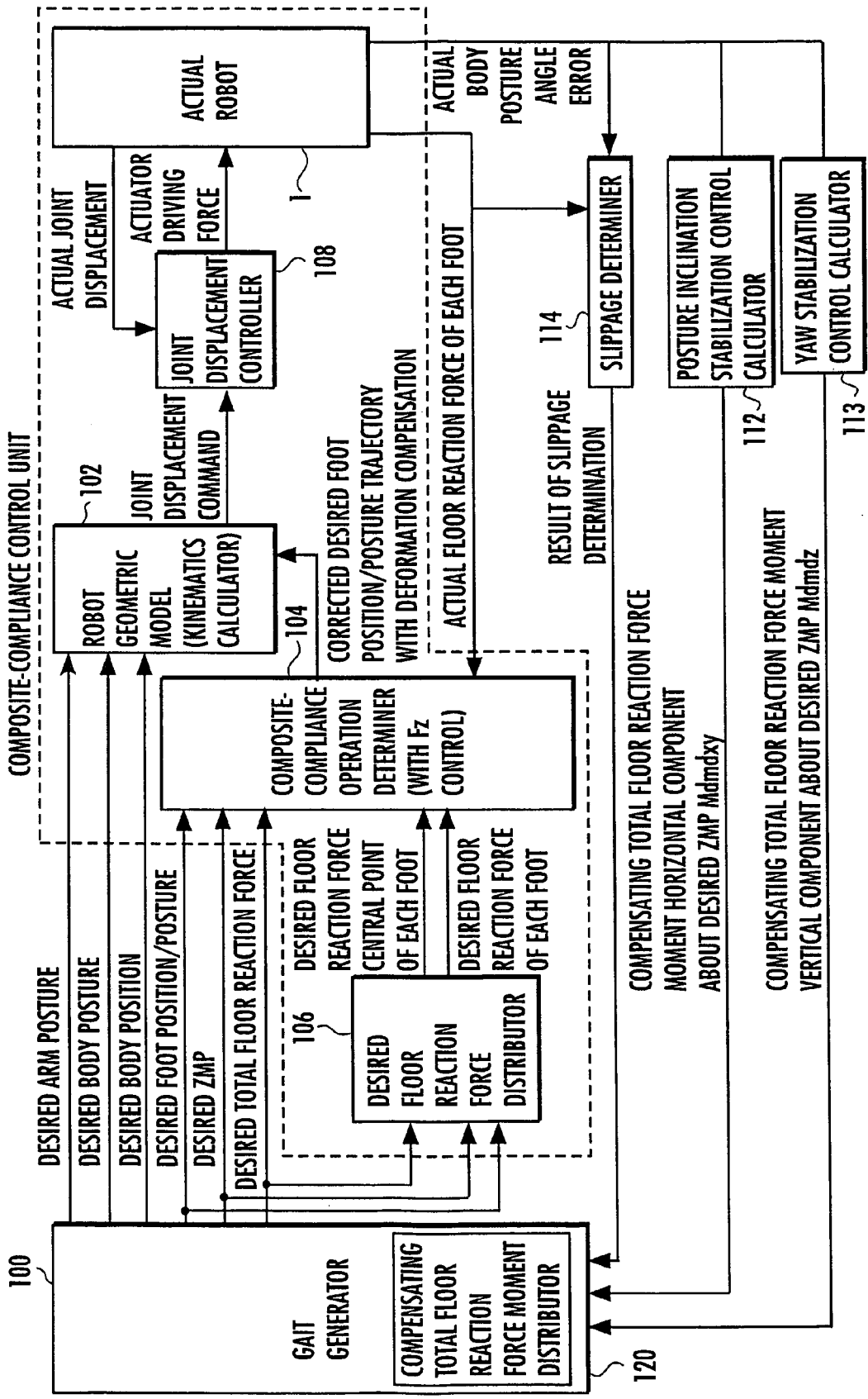
FIG. 76 is a block diagram showing a functional construction of a control unit in a seventh embodiment of the present invention.

The functional block diagram of a control unit 60 in the present embodiment is shown in FIG. 76. In the present embodiment, the same constituent parts or the same functional parts as those of the aforesaid second embodiment will be assigned the same reference marks as those of the second embodiment.

In comparison with the second embodiment (refer to FIG. 59), the present embodiment has added thereto a slippage determiner 114 that determines the presence of slippage of an actual robot 1. A slippage determination result output from the slippage determiner 114 is supplied to a gait generator 100. The gait generator 100 narrows a floor reaction force horizontal component permissible range and a floor reaction force moment vertical component permissible range that are determined on the basis of gait parameters if a slippage determination result indicates the presence of a slippage. If a slippage determination result indicates the absence of a slippage, then the gait generator 100 restores the floor reaction force horizontal component permissible range and the floor reaction force moment vertical component permissible range that are determined on the basis of gait parameters. The rest of the construction and processing are the same as those of the aforesaid second embodiment.

Figure 79:
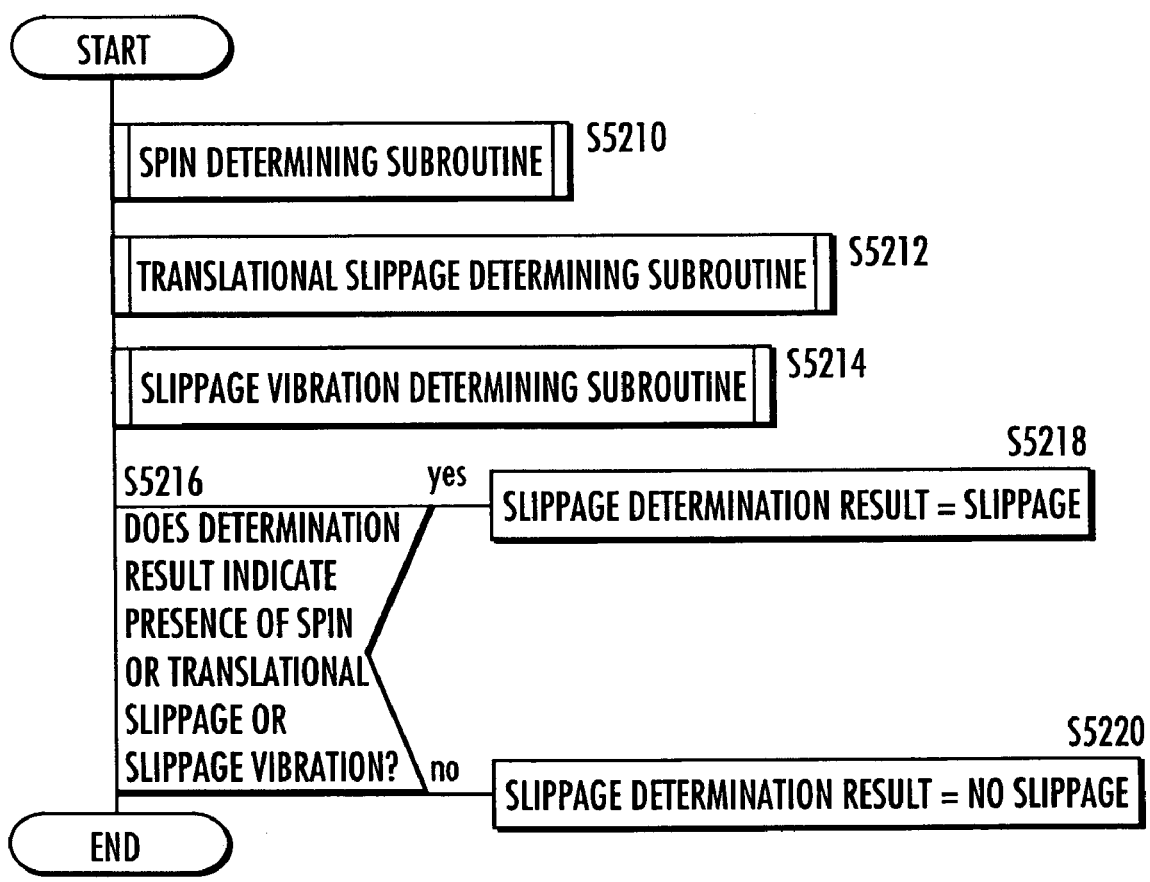
FIG. 79 is a flowchart showing the processing of a slippage determiner shown in FIG. 76, FIG. 80 to FIG. 82 are flowcharts showing subroutine processing of S5210, S5212, and S5214, respectively, in FIG. 79.
Figure 80:
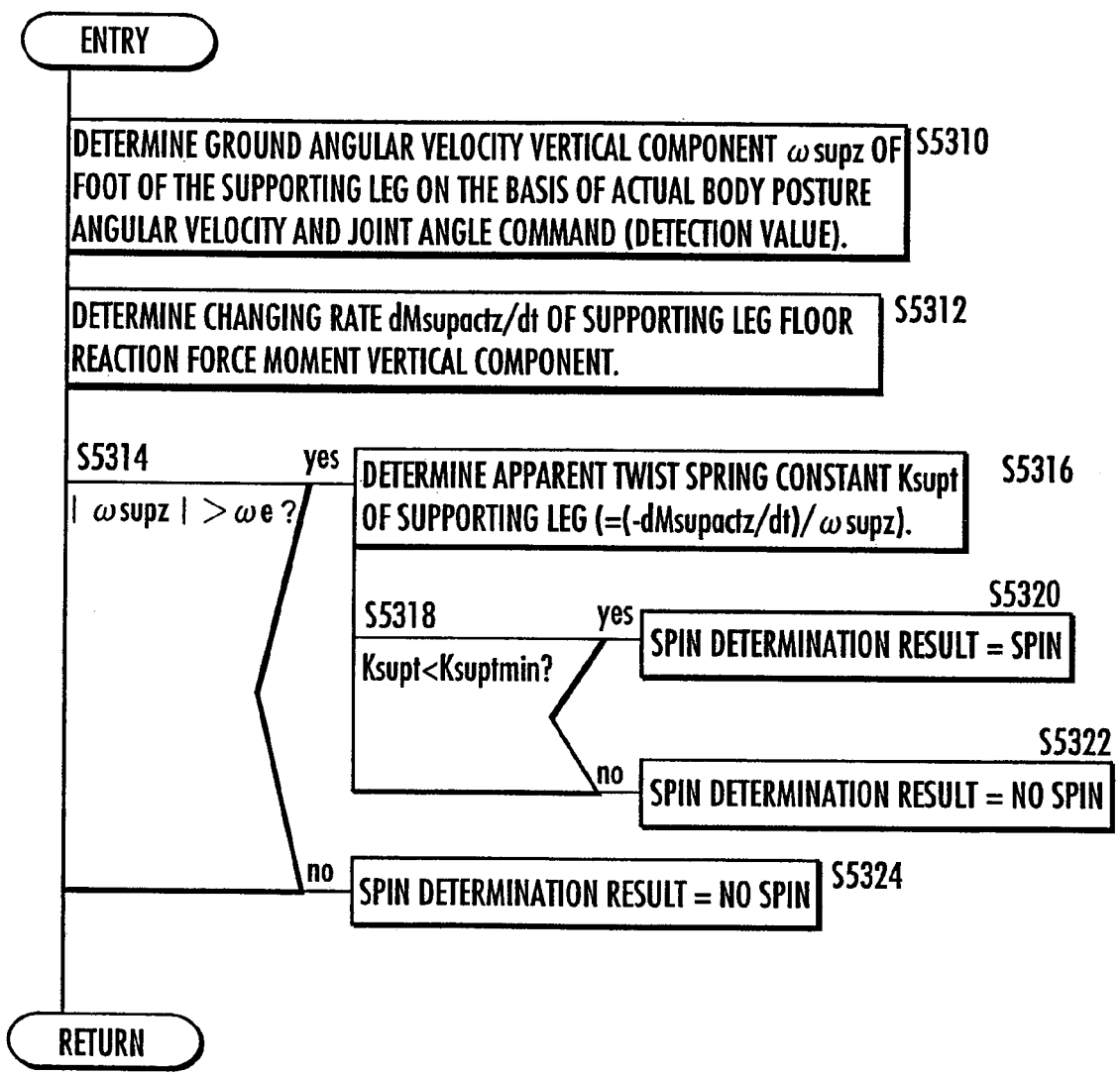

The slippage determiner 114 will be explained in detail in conjunction with FIG. 79, which is a flowchart illustrating the processing thereof. First, a spin determining subroutine is implemented in S5210. The spin determining subroutine proceeds to S5310 of FIG. 80, which is the flowchart thereof, to determine a ground angular velocity vertical component ωsupz of a supporting leg foot 22 on the basis of an actual body posture angular velocity and a joint angle command (detection value). Then, the processing proceeds to S5312 wherein a changing rate dMsupactz/dt of a supporting leg floor reaction force moment vertical component, which is the temporal changing rate of an actual floor reaction force moment vertical component acting on the supporting leg is determined on the basis of a detection value (actual floor reaction force) of a 6-axis force sensor 50 of the foot 22. Next, the processing proceeds to S5314 wherein it is determined whether the absolute value of the ground angular velocity vertical component ωsupz of the supporting leg foot 22 exceeds a predetermined value ωe. If the absolute value exceeds it, then the processing proceeds to S5316 wherein the changing rate dMsupactz/dt of the supporting leg floor reaction force moment vertical component is divided by the aforesaid ground angular velocity vertical component ωsupz of the supporting leg foot, and the sign of the obtained value is reversed to determine an apparent torsion spring constant Ksupt of the supporting leg. Then, the processing proceeds to S5318 wherein it is determined whether Ksupt is smaller than a predetermined value Ksuptmin, and if it is smaller, then the processing proceeds to S5320 wherein the presence of a spin is determined as a spin determination result, or if it is not, then the processing proceeds to S5322 wherein the absence of a spin is determined as the spin determination result. Furthermore, if it is determined in S5314 that the absolute value of the ground angular velocity vertical component ωsupz of the supporting leg foot does not exceed the aforesaid predetermined value ωe, then the processing proceeds to S5324 wherein the absence of a spin is determined as a spin determination result. Determining the presence of a spin as described above makes it possible to avoid such a situation wherein the presence of a spin is erroneously determined when the absolute value of ωsupz exceeds the predetermined value ωe due to flexure (elastic deformation) of the foot 22 or the like.

After finishing the processing of S5210 as described above, the processing proceeds to S5212 wherein a translational slippage determining subroutine is implemented.

Figure 81:
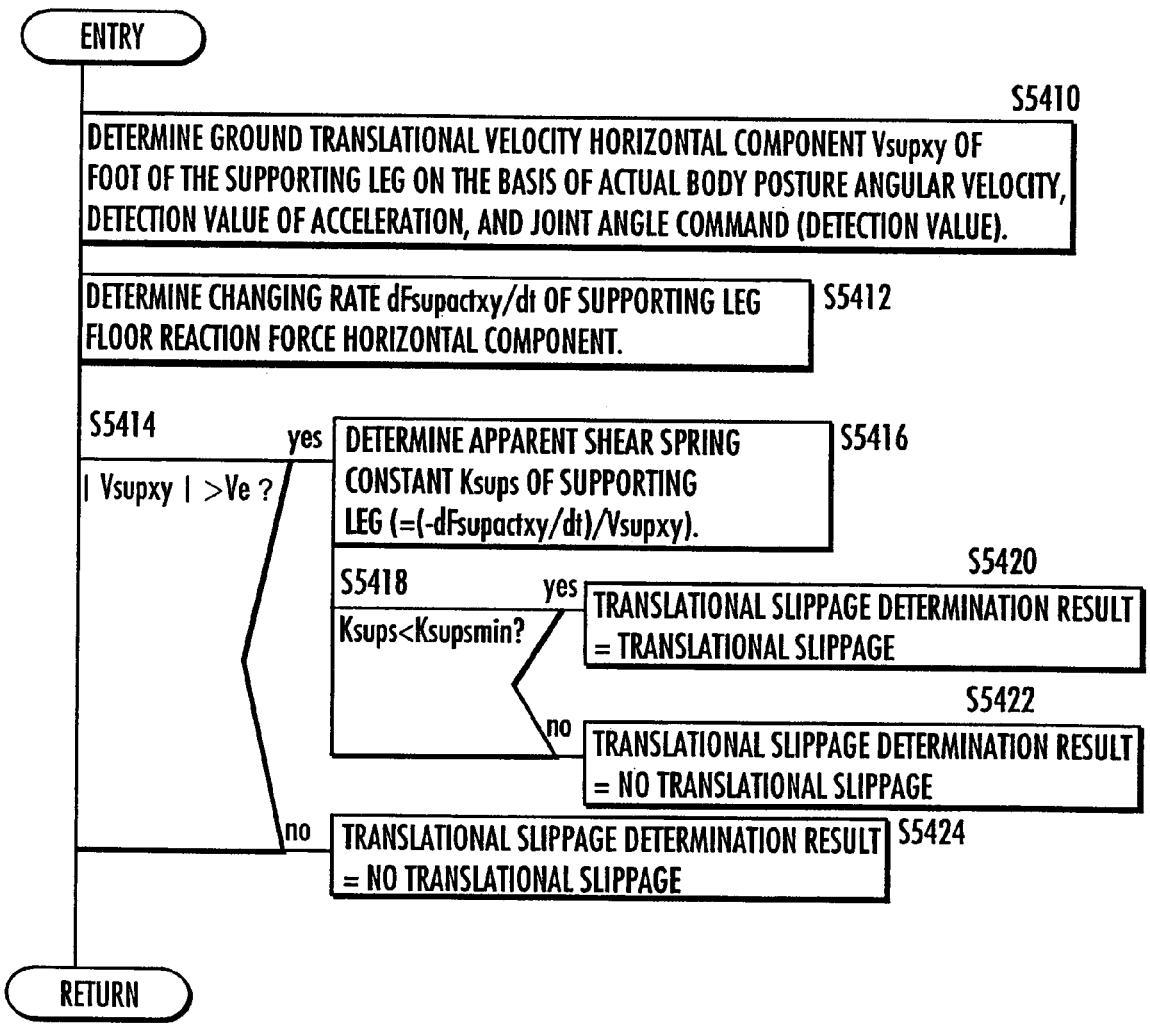

The translational slippage determining subroutine proceeds to S5410 of FIG. 81, which is the flowchart thereof, to determine a ground translational velocity horizontal component Vsupxy of a supporting leg foot 22 on the basis of an actual body posture angular velocity, an acceleration detection value, and a joint angle command (detection value). Then, the processing proceeds to S5412 wherein a changing rate dFsupactxy/dt of a supporting leg floor reaction force horizontal component, which is the temporal changing rate of an actual floor reaction force horizontal component acting on the supporting leg is determined on the basis of a detection value (actual floor reaction force) of the 6-axis force sensor 50 of the foot 22. Next, the processing proceeds to S5414 wherein it is determined whether the absolute value of the ground translational velocity horizontal component Vsupxy of the supporting leg foot exceeds a predetermined value Ve. If the absolute value exceeds it, then the processing proceeds to S5416 wherein the changing rate dFsupactxy/dt of the supporting leg floor reaction force horizontal component is divided by the aforesaid ground translational velocity horizontal component Vsupxy of the supporting leg foot 22, and the sign of the obtained value is reversed to determine an apparent shear spring constant Ksups (=(-dFsupactxy/dt)/Vsupxy) of the supporting leg. Then, the processing proceeds to S5418 wherein it is determined whether Ksups is smaller than a predetermined value Ksupsmin, and if it is smaller, then the processing proceeds to S5420 wherein the presence of a translational slippage is determined as a translational slippage determination result, or if it is not, then the processing proceeds to S5422 wherein the absence of a translational slippage is determined as the translational slippage determination result. Furthermore, if it is determined in S5414 that the absolute value of the ground translational velocity horizontal component Vsupxy of the supporting leg foot does not exceed the aforesaid predetermined value Ve, then the processing proceeds to S5424 wherein the absence of a translational slippage is determined as a translational slippage determination result. Determining the presence of a translational slippage as described above makes it possible to avoid such a situation wherein the presence of a translational slippage is erroneously determined when the absolute value of Ksups exceeds the predetermined value Ksupsmin due to flexure (elastic deformation) of the foot 22 or the like.

After finishing the processing of S5212 as described above, the processing proceeds to S5214 wherein a slippage vibration determining subroutine is implemented.

Figure 82:
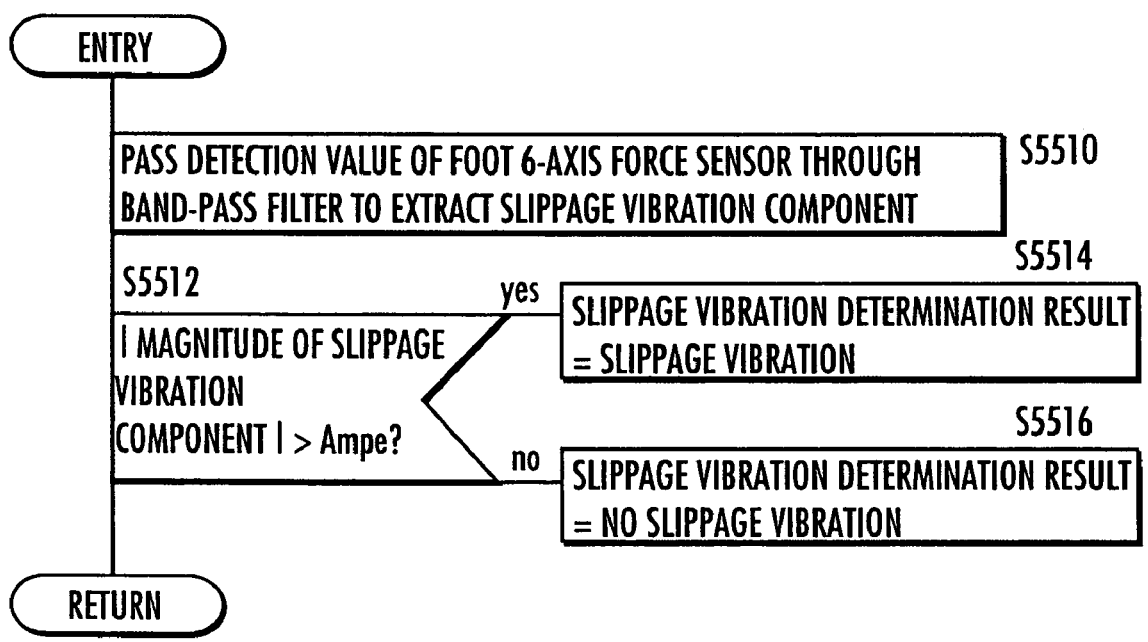

The slippage vibration determining subroutine proceeds to S5510 of FIG. 82, which is the flowchart thereof, and passes the detection value (a translational force horizontal component and/or a moment vertical component) of the 6-axis force sensor 50 of the foot 22 through a band-pass filter to extract a slippage vibration component. Instead of using the detection value of the 6-axis force sensor 50 of the foot 22, the foot 22 may be provided with a yaw rate sensor, an acceleration sensor or the like to use the detection values thereof. The passing frequency band of the band-pass filter is preset according to the material or the like of the sole of the foot 22 and a floor surface. Then, the processing proceeds to S5512 wherein it is determined whether the absolute value of the size of the detected slippage vibration component exceeds a certain predetermined value Ampe. If the absolute value exceeds the predetermined value, then the processing proceeds to S5514 wherein a slippage vibration determination result that indicates the presence of a slippage vibration is given. If the absolute value does not exceed it, then the processing proceeds to S5516 wherein a slippage vibration determination result that indicates the absence of a slippage vibration is given.

After finishing the processing of S5214 as described above, the processing proceeds S5216, and if a spin determination result indicates the presence of a spin, or if a translational slippage determination result indicates the presence of a translational slippage, or if a slippage vibration determination result indicates the presence of a slippage vibration, then the processing proceeds to S5218 wherein a slippage determination result, which is an overall determination result, is given to indicate the presence of a slippage. If not, then the processing proceeds to S5220 wherein the slippage determination result, which is the overall determination result, is given to indicate the absence of a slippage. This completes the processing of the slippage determiner 114.

Figure 77:
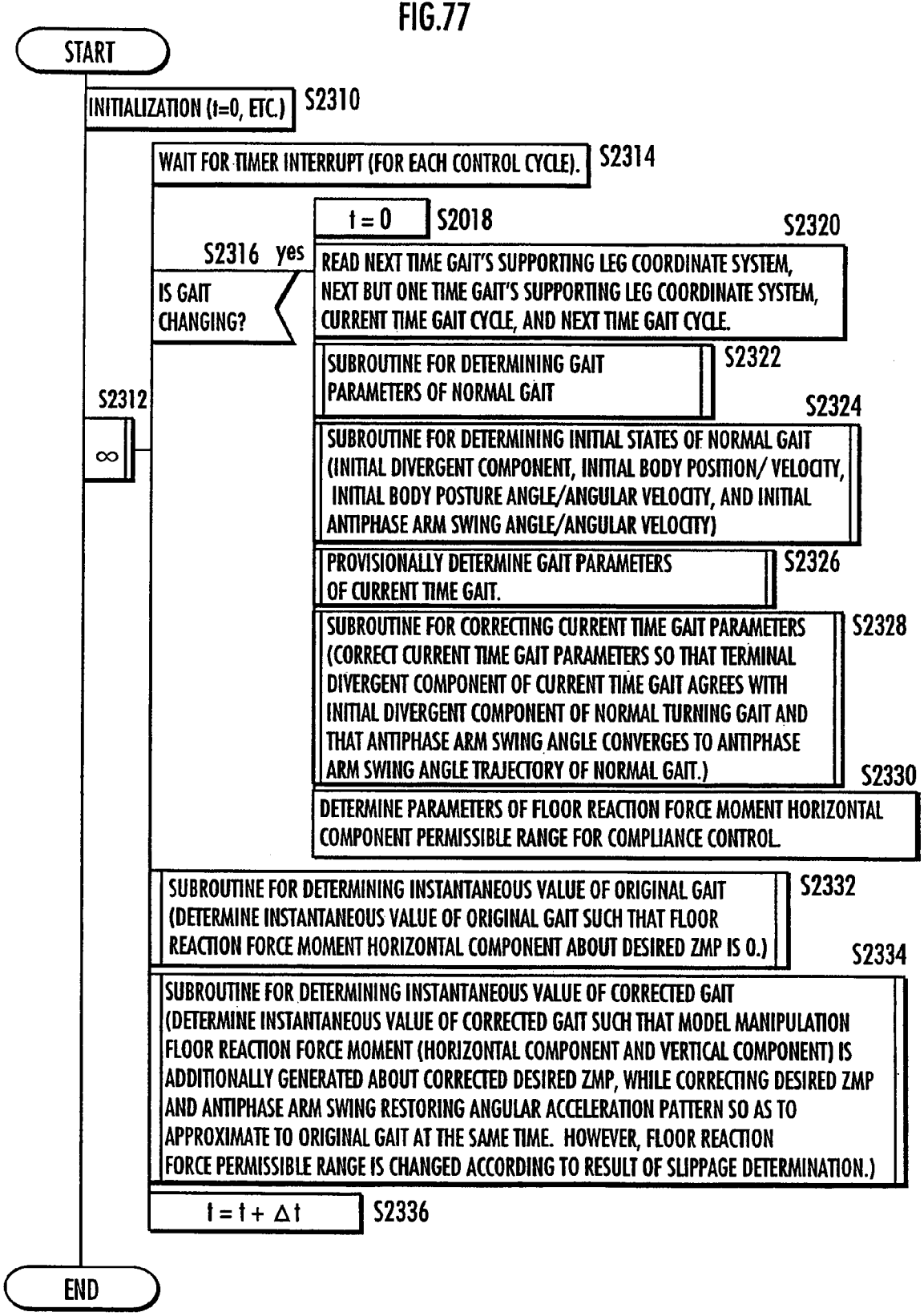
FIG. 77 is a flowchart showing main routine processing of a gait generator in the seventh embodiment.

FIG. 77 shows the flowchart of the main routine processing of the gait generator 100 in the present embodiment.

In this FIG. 77, from S2310 to S2332, the same processing as that from S2010 to S2032 of the flowchart (FIG. 60) of the second embodiment is carried out.

Subsequently, the processing proceeds to S2334 wherein a subroutine for determining a corrected gait instantaneous value is implemented.

In the present embodiment, a corrected gait instantaneous value determining subroutine determines a corrected gait instantaneous value such that a desired ZMP and an antiphase arm swing restoring angular acceleration pattern are corrected so as to approximate them to an original gait, and also a model manipulation floor reaction force moment (a horizontal component and a vertical component) is additionally generated about a corrected desired ZMP. The floor reaction force permissible range is changed according to a slippage determination result. This aspect is different from the second embodiment.

Figure 78:
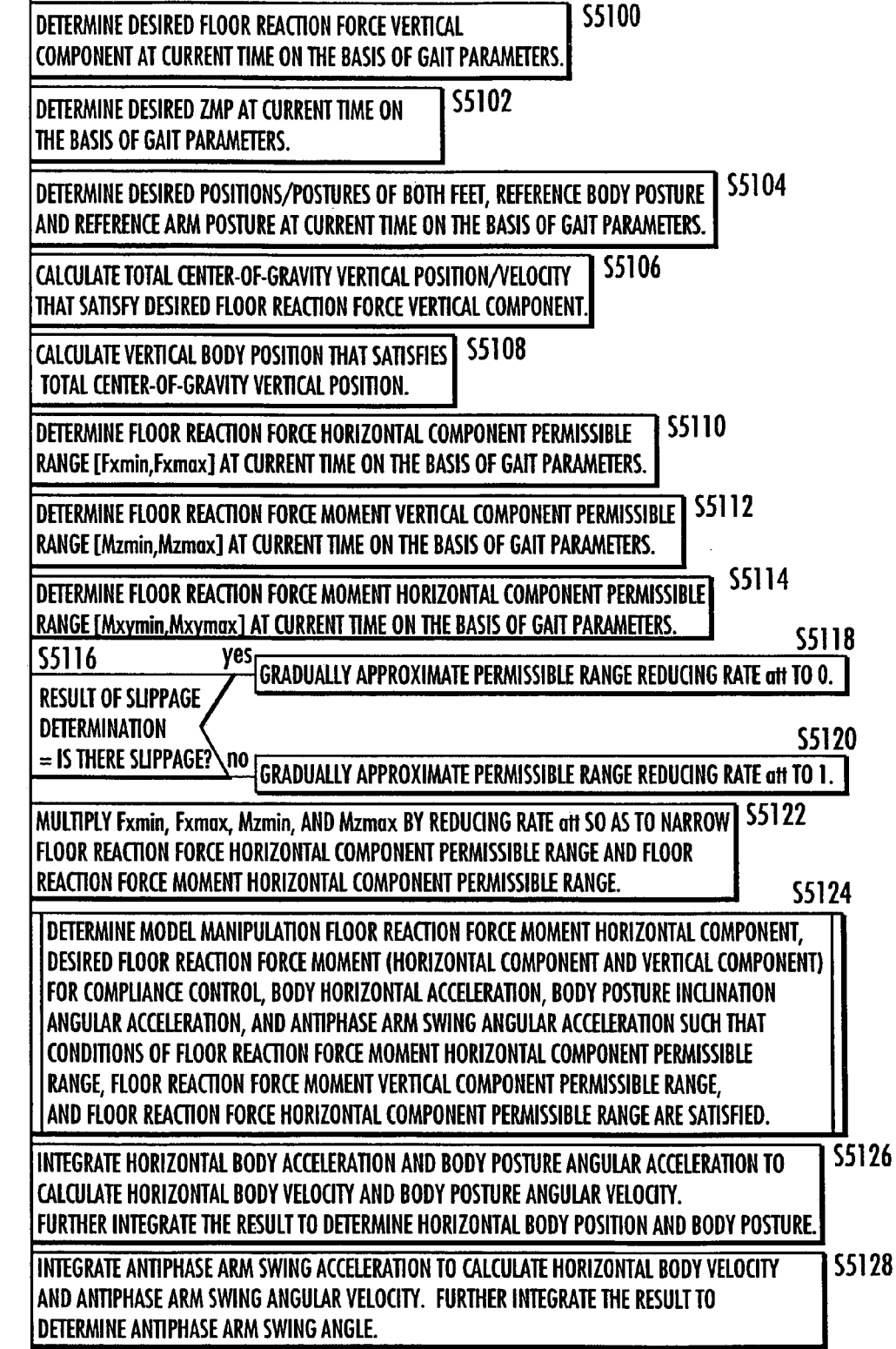
FIG. 78 is a flowchart showing processing of S2334 in FIG. 77.

FIG. 78 shows the flowchart of the corrected gait instantaneous value determining subroutine. In the corrected gait instantaneous value determining subroutine, the processing from S5100 to S5114 is first carried out in the same manner as that from S2100 to S2112 of FIG. 61, which is the corrected gait instantaneous value determining subroutine of the second embodiment. Then, the processing proceeds to S5116 wherein it determines whether the slippage determination result by the aforesaid slippage determiner 114 indicates the presence of a slippage, and if the slippage determination result indicates the presence of a slippage, then the processing proceeds to S5118 wherein a permissible range reducing rate att is gradually approximated to zero (decreased substantially continuously). Incidentally, the permissible range reducing rate att is to take a value from 0 to 1. If it is determined in S5116 that the slippage determination result indicates no slippage, then the processing proceeds to S5120 wherein the permissible range reducing rate att is gradually approximated to 1 (increased substantially continuously).

Subsequently, the processing proceeds to S5122 wherein Fxmin, Fxmax, Mzmin and Mzmax, which are the upper limit values and the lower limit values of the permissible ranges of the floor reaction force horizontal component and the floor reaction force moment vertical component, respectively, determined in S5110 and S5112, are multiplied by the permissible range reducing rate att so as to narrow the floor reaction force horizontal component permissible range and the floor reaction force moment vertical component permissible range. Hereinafter, the floor reaction force horizontal component permissible range and the floor reaction force moment vertical component permissible range determined in this S5122 will be generically referred to as final floor reaction force permissible ranges. It is a matter of course that, if the reducing rate is 1, then the final floor reaction force permissible range agrees with the permissible ranges of the floor reaction force horizontal component and the floor reaction force moment vertical component determined in S5110 and S5112 (hereinafter referred to original floor reaction force permissible ranges), and the original floor reaction force permissible ranges will not be narrowed.

Figure 83:
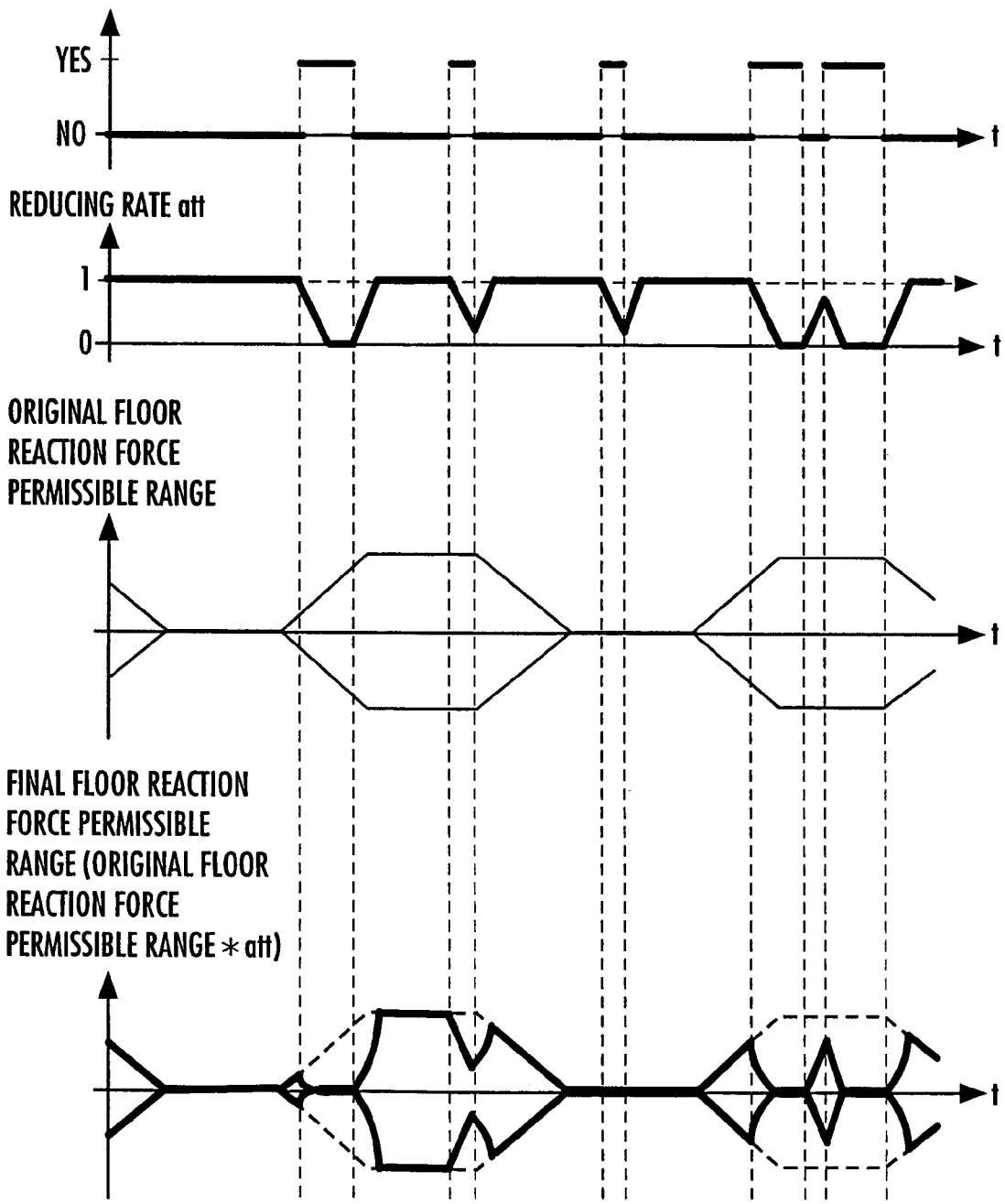
FIG. 83 is a graph showing examples of determination results of the slippage determiner, reducing rates of a permissible range, and floor reaction force permissible ranges.

FIG. 83 shows an example illustrating how the permissible range reducing rate att, the final floor reaction force permissible ranges (specifically, a floor reaction force horizontal component permissible range and a floor reaction force moment vertical component permissible range) change according to slippage determination results.

If a slippage occurs, the robot 1 may fall unless a gripping state is promptly restored. Hence, if it is determined that a slippage has occurred, then the final floor reaction force permissible range should be quickly narrowed. However, unduly sudden narrowing would lead to an excessive change in acceleration of a gait with a resultant impact; therefore, a proper value that does not lead to a sudden change should be set.

If it is determined that there is no longer a slippage, then the final floor reaction force permissible range should be quickly set back to the original floor reaction force permissible range. If the final floor reaction force permissible range remains narrower, then a corrected gait wilt significantly deviate from an original gait. However, unduly sudden restoration would lead to an excessive change in acceleration of the motion of the gait, resulting in a slippage again due to an impact; therefore, a proper value that does not cause an unduly sudden restoration should be set.

Subsequently, the processing proceeds to S5124 wherein a model manipulation floor reaction force moment horizontal component, a desired floor reaction force moment for compliance control (a horizontal component and a vertical component), a horizontal body acceleration, a body posture inclination angular acceleration, and an antiphase arm swing angular acceleration are determined such that the conditions of the floor reaction force moment horizontal component permissible range, the floor reaction force moment vertical component permissible range, and the floor reaction force horizontal component permissible range are satisfied, as in S2114 of FIG. 61.

Subsequently, the processing proceeds from S5126 to S5128 to carry out the same processing as that of S2116 to S2118 of FIG. 61.

The corrected gait instantaneous value determining subroutine is implemented as described above. Then, the processing proceeds to S2336 of FIG. 77 wherein current time t is incremented by Δt, and returns to S2314 again to continue generating gaits.

The above is the processing of the gait generator 100 in the present embodiment.

As described above, in the seventh embodiment, the floor reaction force horizontal component permissible range and the floor reaction force moment vertical component permissible range are changed according to a slippage determination result. Alternatively, however, only one of the floor reaction force horizontal component permissible range and the floor reaction force moment vertical component permissible range may be changed.

Generally, if the foot 22 slips parallel on a floor surface (if it slips in a shearing direction), then the gripping force in a spin direction (yaw direction) accordingly decreases. Conversely, if the foot 22 slips in the spin direction (yaw direction), then the foot 22 easily slips parallel on the floor surface. Hence, narrowing (setting to zero) both the floor reaction force horizontal component permissible range and the floor reaction force moment vertical component permissible range when either slippage is detected will achieve more effective recovery from the slippage.

The seventh embodiment explained above is the embodiment of the first to the ninth inventions of the present invention and the fifteenth invention and also the embodiment of the sixteenth to the nineteenth invention, as in the case of the aforementioned second embodiment.

Further, as the gait generator 100 in the seventh embodiment, the one in any of the first and the third to the sixth embodiments may be used in place of the one in the second embodiment. To make permissible ranges variable in the first embodiment, as in the seventh embodiment, the processing of S5116 to S5122 of FIG. 78 is to be implemented between S3412 and S3414 of FIG. 57. In this case, a floor reaction force moment vertical component compensation amount permissible range may be also set so that it can be changed according to the determination result of the occurrence of a slippage. Moreover, as previously described, in the third to the sixth embodiments, the floor reaction force horizontal component permissible range and the floor reaction force moment vertical component permissible range come in two types, namely, one for simplified model gaits and the other for gait correction (for full-model correction). All these permissible ranges may be changed. Alternatively, at least the permissible range of either one for gait correction should be changed according to a slippage determination result. In this case, before implementing the processing of the aforesaid restricting means (restriction processing unit) 211, 230d, or 230h, the processing of S5116 to S5122 of FIG. 78 may be implemented to set the permissible range in a variable manner. Supplementally, setting the permissible ranges according to slippage determination results as described above in the third to the sixth embodiments will constitute the embodiment of the forty-eighth to the fifty-first inventions of the present invention.

In the seventh embodiment, as the method for determining slippages, any one of the following may be used in addition to the methods described in the embodiments. Alternatively, these results may be comprehensively determined (using logical operations, including logical sums and products).

1) The angular velocity of the foot 22 with respect to a floor is determined using an angular velocity detector or the like, and if the absolute value of this value exceeds a predetermined value, then it is determined that a slippage has occurred.

2) If the absolute value of a floor reaction force moment of either leg 2 exceeds a predetermined value, then it is determined that a slippage has occurred.

3) If the absolute value of a total floor reaction force moment (the moment of the resulting force of the floor reaction forces of both legs 2 and 2) exceeds a predetermined value, then it is determined that a slippage has occurred.

4) In a double stance period, if the value obtained by multiplying the ratio of the changing rate of a total floor reaction force moment to a body posture angular velocity error by (−1) is smaller than a predetermined value (the torsional rigidity when both legs are in contact with the ground), then it is determined that a slippage has occurred 5) If the absolute values of detections values (estimated values) of a non-contact type ground velocity or angular velocity detector using a visual sensor, a spatial filter or the like, or of a contact-type ground velocity or angular velocity detector exceed a predetermined value, then it is determined that a slippage has occurred.

Modifications according to the aforementioned first to the seventh embodiments will now be explained.

In the aforesaid third to seventh embodiments, the compensating total floor reaction force moment horizontal component and the compensating total floor reaction force moment vertical component have been determined; alternatively, however, the compensating total floor reaction force moment horizontal component may be set to zero. In this case, however, the body posture inclination restoring effect provided by correcting a gait by using a full model is not available.

In the aforementioned third to seventh embodiments, the generation of gaits by the simplified model 200 (the generation of simplified model gaits) may be performed using the gait generators according to the first embodiment and the second embodiment in the Japanese Unexamined Patent Application Publication No. 5-337849 previously proposed by the present applicant. The correction amount by a full model can be reduced, making it possible to prevent a corrected gait from significantly deviating from a simplified model gait.

In the aforesaid first embodiment, if the compensating total floor reaction force moment horizontal component Mdmdxy exceeds a floor reaction force moment permissible range horizontal component (in the third embodiment and after, if the sum of the compensating total floor reaction force moment horizontal component Mdmdxy and a model manipulation floor reaction force moment horizontal component exceeds a floor reaction force moment permissible range), then a desired floor reaction force moment horizontal component for compliance control takes an upper limit value or a lower limit value of the floor reaction force moment horizontal component permissible range. Alternatively, however, the desired floor reaction force moment horizontal component for compliance control may be increased or decreased as the compensating total floor reaction force moment horizontal component Mdmdxy (in the third embodiment and after, the sum of the compensating total floor reaction force moment horizontal component Mdmdxy and the model manipulation floor reaction force moment horizontal component) increases or decreases even if the compensating total floor reaction force moment horizontal component Mdmdxy (in the third embodiment and after, the sum of the compensating total floor reaction force moment horizontal component Mdmdxy and the model manipulation floor reaction force moment horizontal component) exceeds the floor reaction force moment horizontal component permissible range. This is because, as the desired floor reaction force moment horizontal component for compliance control approximates to a floor reaction force moment horizontal component permissible range, an actual floor reaction force moment horizontal component controlled by the compliance control tends to be smaller than the desired value, and therefore, even if the desired floor reaction force moment horizontal component for compliance control slightly exceeds a permissible range, it is very likely that this does not immediately cause a problem, such as a deteriorated intrinsic ground contacting property of the foot 22 or floating of the sole of the foot 22.

For the same reason, the floor reaction force moment horizontal component permissible range may be set to exceed a permissible range obtained by converting the range, in which ZMP can exist and which his represented by a supporting polygon (in a strict expression, the permissible range in which actual floor reaction force points of action exist), into moment horizontal components.

Undue dependence on the floor reaction force moment horizontal component produced by compliance control causes a problem, such as a deteriorated intrinsic ground contacting property of the foot 22 or floating of the sole of the foot 22, as described above. Hence, the floor reaction force moment horizontal component permissible range may be said to be the permissible range of actual floor reaction force moment horizontal components that posture control expects of the compliance control.

The floor reaction force moment horizontal component permissible range may alternatively be determined on the basis of also detected actual floor reaction forces rather than only on the basis of gait parameters. Further, it may be also determined on the basis of detection values of ground contact regions of the foot 22, such as edge position detection values on stairs.

Meanwhile, undue dependence on the floor reaction force moment vertical component produced by compliance control causes a problem, such as spinning. Hence, the floor reaction force moment vertical component permissible range may be said to be the permissible range of actual floor reaction force moment vertical components that posture control expects of the compliance control.

The processing of the main flowchart may be changed so as to implement the correction of a current time gait parameter (the correction of a desired ZMP) in S3028 of FIG. 56 of the first embodiment for each control cycle.

If a corrected gait (desired gait) considerably deviates (diverges) from an original gait, it will have excessively deviated (excessively diverged) by the time the gait parameter correction of the next gait is implemented, making it difficult to generate a desired gait that continuously remains stable for long periods simply by correcting gait parameters of the next gait. This problem can be solved to a great extent by correcting the current time gait parameter (by correcting a desired ZMP) for each control cycle.

Furthermore, depending on deviation from an original gait, a foot landing position or landing time of the current time gait may be changed for each control cycle.

Specifically, the processing flow is changed so as to carry out the processing from S3020 to S3030 for each control cycle, and then in S3020, at least one of the next time's gait supporting leg coordinate system (the next time's gait supporting leg coordinate system corresponding to the next foot landing position/posture), the next but one time's gait supporting leg coordinate system (the next but one time's gait supporting leg coordinate system corresponding to the next but one time foot landing position/posture), the current time gait cycle (the current time gait cycle corresponding to the next foot landing time), and the next time gait cycle (the next time gait cycle corresponding to the cycle of normal gait) is changed as necessary to reduce the correction of the current time gait parameter in S3028 (the correction of the desired ZMP in particular) (that is, to maintain a high stability allowance of the current time gait).

Furthermore, different gait parameters from those mentioned above may be changed.

The deviation of a corrected gait from an original gait can be estimated, using a dynamic model, primarily from a simplified model body posture inclination angle correcting moment Mr, a simplified model horizontal body position correcting moment Mp, and a simplified model antiphase arm swing angle correcting moment Ma. Hence, based on Mr, Mp and Ma, model behavior deviations may be estimated and gait parameters may be corrected on the basis of the estimated behavior deviations. Alternatively, the relationship between Mr, Mp and Ma and the proper values of gait parameter correction amounts may be determined beforehand and mapped so as to determine the correction amounts of gait parameters according to the map on the basis of Mr, Mp and Ma.

The processing flow may be changed also for other embodiments (the third to the sixth embodiments) in the same manner as described above.

In addition to the aforementioned conditions, other kinematic conditions and dynamic conditions, e.g., whether joint angles exceed a permissible range, whether legs or the like are interfering, or whether a joint angular velocity or torque is too high, may be added to the restoring conditions.

Accordingly, the following may be added as one of the restoring conditions: if the processing of a main flowchart has been changed so as to implement the correction of a current time gait parameters (the correction of a desired ZMP or a landing position, time or the like) for each control cycle as described above, then the value of the gait parameter, which is changed as necessary to maintain a high stability allowance of a current gait, is set to a proper value (to satisfy a certain restrictive condition).

The landing position and the landing time determined (read in) at a gait switching point are determined in response to an instruction from a higher control unit (mainly an instruction from a walking plan determiner or from an operator. This is referred to as an original request). Thus, the landing position and the landing time of a corrected gait should be returned to the landing position and the landing time determined (read in) at the gait switching point as much as possible. For this reason, the landing position and the landing time determined (read in) at the gait switching point may be stored, and the landing position and the landing time of a corrected gait may be matched to or approximated to the stored landing position and landing time as much as possible. This may be added to the restoring conditions. Actually, however, the landing position and the landing time of a corrected gait are arranged so as to gradually return, as much as possible, to the landing position and the landing time determined (read in) at a gait switching point by the aforementioned restoring conditions 4, 5 and 6; therefore, it is not essential to add the above additional condition.

Another condition, in which an original request is changed in response to a change of a situation and the gait parameter changed as necessary to maintain a high stability allowance of a gait as described above is matched with or approximated to, as much as possible, a gait parameter that satisfies the changed request, may be added to the restoring conditions. In this case, the aforementioned restoring conditions 4, 5 and 6 should be deleted.

As the method for determining a model horizontal body position stabilization floor reaction force moment and a model body posture inclination angle stabilization floor reaction force moment that satisfy the various restoring conditions described above, a linear programming (e.g., simplex method) or a retrieval method for determining optimum values under restrictive conditions may be used. Alternatively, a fuzzy inference may be used.

When changing a landing position, a situation wherein obstacles in a walking environment or the like have to be taken into account is conceivable. To make it possible to cope with such a situation, a corrected gait should be determined by also adding the processing that belongs to the field of artificial intelligence, such as recognition of environments and determination of actions.

The same applies to the method for determining a model antiphase arm swing angle stabilization floor reaction force moment.

The block diagrams before and after the limiting means (the restriction processing unit) in the aforementioned third to sixth embodiments may be subjected to equivalent conversion or approximate conversion as shown in, for example, PCT/JP02/13593 by the present applicant.

Figure 84:
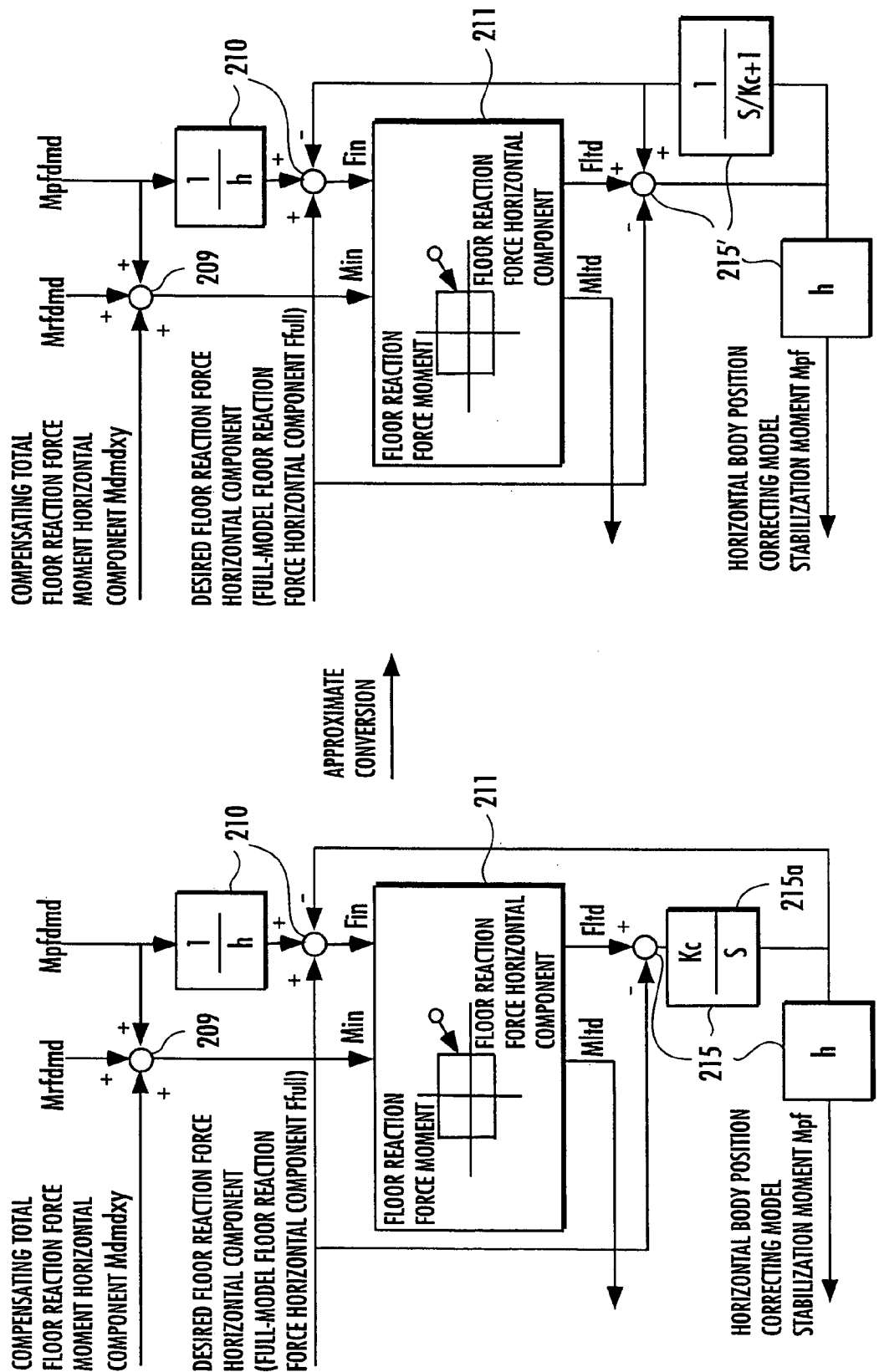
FIG. 84 is a block diagram showing modification examples related to the fourth to the sixth embodiments.

In this case, the value obtained by subtracting the value obtained by passing the value, which has been obtained by dividing a horizontal body position correcting model stabilization moment Mpf by h, through a low-pass filter from a corrected desired floor reaction force horizontal component (a full-model floor reaction force horizontal component Ffull) corresponds to a biased estimated value destm in the above PCT application. Hence, for example, the integration of the gain Kc in the aforementioned fourth to sixth embodiments may be replaced into a positive feedback system having the first-order lag of a time constant 1/Kc as a feedback element to perform the approximate conversion as shown in FIG. 84. In this example, the Mpf calculator 215 in the fourth to the sixth embodiments is subjected to the approximate conversion as illustrated in the figure.

The antiphase arm swing angle correcting perturbation model moment may be also determined by implementing the equivalent conversion or approximate conversion in the same manner.

Figure 85:
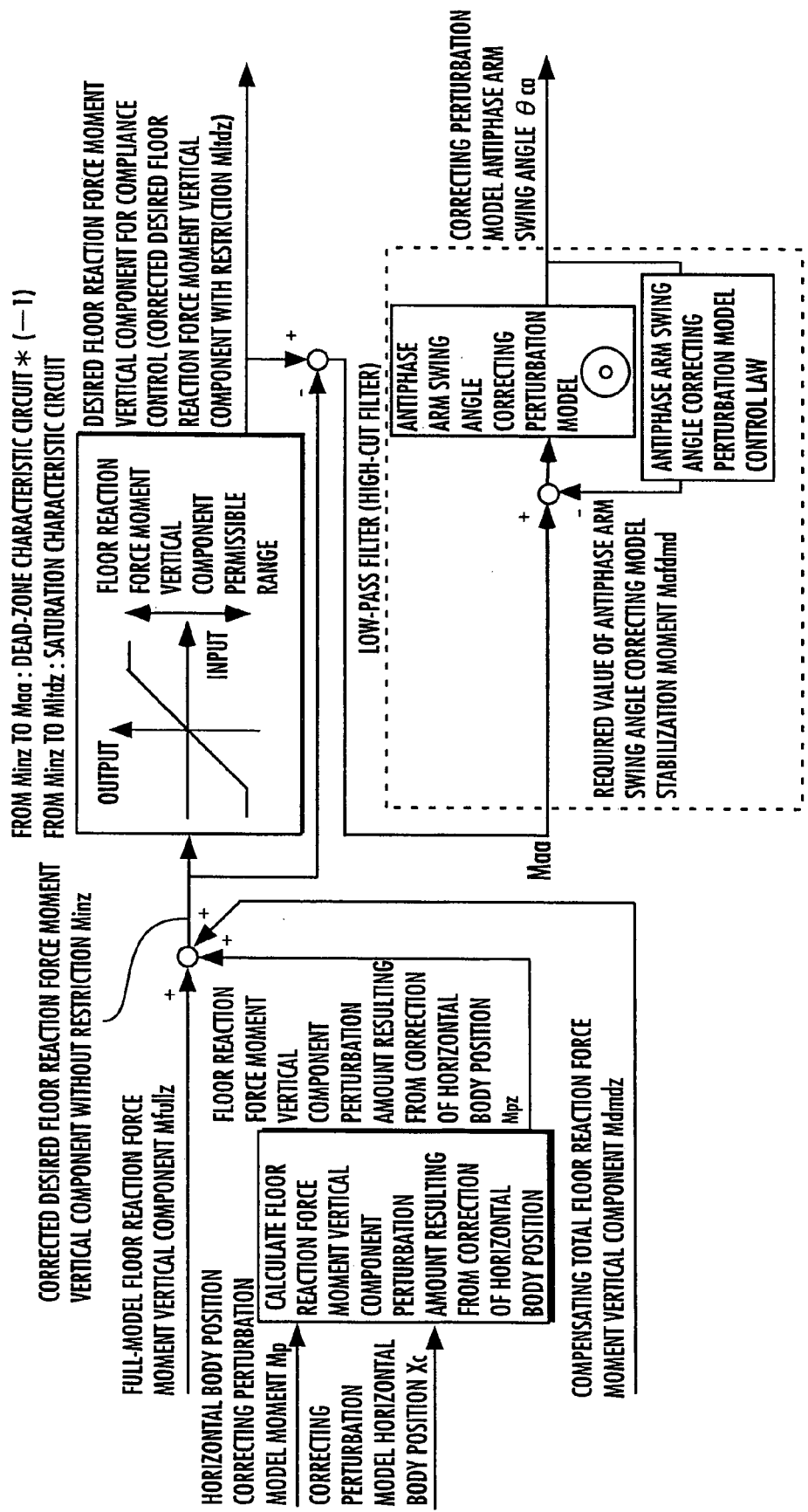
FIG. 85 is a block diagram showing a modification example (an eighth embodiment) of the processing of the moment determiner of a perturbation model for correcting antiphase arm swing angle related to the third embodiment.

In the aforementioned third embodiment, for the aforesaid antiphase arm swing angle correcting perturbation model moment, the processing of the functional block diagram shown in FIG. 85 may be carried out in place of the functional block diagram shown in FIG. 70. This will be explained below, taking this as an eighth embodiment. In FIG. 70, the behavior of an antiphase arm swing angle correcting model has been decided by determining whether a floor reaction force moment vertical component, including the moment vertical component generated by a motion restored by an antiphase arm swing angle correcting model, exceeds a floor reaction force moment vertical component permissible range. In the processing of the functional block diagram shown in FIG. 85, the moment vertical component generated by the motion restored by an antiphase arm swing angle correcting model is ignored in determining whether the floor reaction force moment permissible range is exceeded.

The processing of the functional block diagram shown in FIG. 85 will be explained in detail. The sum of a full-model floor reaction force moment vertical component Mfullz, a floor reaction force moment vertical component perturbation amount Mpz attributable to the correction of a horizontal body position, and a compensating total floor reaction force moment vertical component Mdmdz is defined as a corrected desired floor reaction force moment vertical component without restriction Minz, and a restriction is added thereto in the same manner as that shown in FIG. 70 to determine a corrected desired floor reaction force moment vertical component with restriction Mltdz. The corrected desired floor reaction force moment vertical component with restriction Mltdz is output as a desired floor reaction force moment vertical component for compliance control. Furthermore, the value obtained by subtracting the corrected desired floor reaction force moment vertical component without restriction Minz from the corrected desired floor reaction force moment vertical component with restriction Mltdz, i.e., a portion Maa, which is the portion of the corrected desired floor reaction force moment vertical component without restriction Minz that exceeds the floor reaction force moment vertical component permissible range, is determined. Then, based on the last time value of a correcting perturbation model antiphase arm swing angle θca, a required value Mafdmd of antiphase arm swing angle correcting model stabilization moment is determined according to an antiphase arm swing angle correcting perturbation model control law using PD control or the like, and the value (moment) obtained by subtracting the determined value from Maa is supplied to an antiphase arm swing angle correcting perturbation model to obtain the correcting perturbation model antiphase arm swing angle θca.

The transfer functions from Maa to the correcting perturbation model antiphase arm swing angle θca provide the transfer functions of a low-pass filter.

More specifically, in other words, a floor reaction force moment vertical component (a floor reaction force moment vertical component without restriction) generated when the floor reaction force moment vertical component by the antiphase arm swing angle correcting model is not canceled (excess preventing operation is not performed) is passed through a restricting means (saturating means) that restricts it so as not to exceed the floor reaction force moment vertical component permissible range, thereby obtaining a desired floor reaction force moment vertical component for compliance control (a corrected desired floor reaction forte moment vertical component with restriction Mltdz). In addition, the value obtained by passing the floor reaction force moment vertical component without restriction through a dead-zone means for determining the portion exceeding the floor reaction force moment vertical component permissible range is passed through a low-pass filter (i.e., a high-cut filter) to obtain the correcting perturbation model antiphase arm swing angle θca.

The eighth embodiment explained above provides the embodiment of the first invention, the second invention, the fourth to the fifteenth inventions, the twentieth to the twenty-third inventions, and the twenty-eighth to the thirtieth inventions of the present invention. In this case, the floor reaction force moment vertical component (the floor reaction force moment vertical component to which Mdmdz has been added) in the eighth embodiment corresponds to a control object amount, the body yaw angle error and/or the body yaw angular velocity error corresponds to the error of a state amount of the robot 1, and Mdmdz corresponds to a compensating floor reaction force moment. The floor reaction force moment vertical component permissible range [Mzmin, Mzmax] for generating gaits (for full-model correction) in the eighth embodiment corresponds to the permissible range of a restriction object amount. The motional component of a simplified model gait corresponds to the provisional instantaneous value of a desired motion, and the value obtained by correcting this in S3536 corresponds to the instantaneous value of the desired motion. Full models (including an antiphase arm swing angle correcting perturbation model) correspond to the dynamic models in the inventions. And Maa corresponds to the moment correction manipulated variable in the tenth invention, and the correcting perturbation model antiphase arm swing angle θca corresponds to the correction amount of a provisional instantaneous value of a desired motion in the second invention and the eleventh invention and the correction amount of a desired motion in the twenty-second invention. Further, the corrected desired floor reaction force moment vertical component without restriction Minz in the eighth embodiment corresponds to the estimated value of a restriction object amount in the twenty-third invention. Further, the value obtained by adding the floor reaction force moment vertical component Mpz resulting from the correction of a horizontal body position to the full-model floor reaction force moment vertical component Mfullz in the eighth embodiment corresponds to the vertical component of the floor reaction force moment that substantially balances with the provisional instantaneous value of a desired motion on an inverse full model (dynamic model). The value obtained by adding Mdmdz to this corresponds to the instantaneous value of a model restriction object amount in the twentieth invention.

In the aforementioned eighth embodiment, the floor reaction force horizontal component permissible range and/or the floor reaction force moment vertical component permissible range may be set to be variable according to slippage determination results, as in the aforementioned seventh embodiment.

According to the aforementioned first embodiment, in addition to the construction described in Japanese Unexamined Patent Application Publication 5-337849 proposed by the present applicant, the behaviors of two motion modes having different generating ratios of a floor reaction force horizontal component and the floor reaction force moment horizontal component about a desired ZMP, e.g., the body translational acceleration of the body translational motion mode and the body posture inclination angle acceleration of the body inclination motion mode, are determined such that the translational force horizontal component of a floor reaction force does not exceed the permissible range of floor reaction force horizontal component, thus allowing the actual robot 1 to converge to a corrected desired gait (the gait lastly output from the gait generator 100). This means that the posture of the actual robot 1 can be stabilized.

The difference between a desired floor reaction force moment horizontal component for compliance control and a model manipulation floor reaction force moment horizontal component provides a total restoring force.

The model manipulation floor reaction force moment horizontal component can take any value, ignoring the range in which a ZMP can exist, so that it is possible to generate an extremely high restoring force.

The translational force horizontal component of a floor reaction force does not exceed the permissible range of a floor reaction force horizontal component, making it possible to prevent slippages of the robot 1.

A floor reaction force moment vertical component (a desired floor reaction force moment vertical component for compliance control) and eventually an actual floor reaction force moment vertical component do not exceed the permissible range of floor reaction force moment vertical component, making it possible to effect further prevention of slippages of the robot 1.

During a period in which a floor reaction force vertical component is zero, that is, during a period in which neither of both legs 2 and 2 is in contact with the ground, posture restoration depending on a body rotation motion mode is carried out without depending on the body translational motion mode, so that the posture restoration is effectively implemented without dependence on the frictional force between a floor and the foot 22.

An actual floor reaction force moment can be prevented from unduly increasing, thus making it possible to prevent or restrain the occurrence of a problem, such as deteriorated intrinsic ground contacting property of the foot 22 or the sole of the foot 22 floating.

A current time gait parameter is determined or changed such that a new current time gait using the terminal state of a corrected gait for one step as its initial state gradually approximates to a normal gait, thus making it possible to continue generating gaits with continuously (long-term) ensured stability.

In the aforementioned second embodiment, as described above, an original gait and a corrected gait are simultaneously generated, and the corrected gait is corrected to stabilize the posture of the actual robot 1. In addition, if there is still an allowance after generating the floor reaction force moment (a horizontal component and a vertical component) necessary for posture restoration by compliance control, then this allowance is used to converge to the original gait within a possible range. Hence, in addition to the advantages of the first embodiment, it is possible to generate a gait that is close to the original gait initially set, i.e., the gait as per in initial request. Thus, if there is a preset travel path, significant deviation from the travel path can be prevented. Furthermore, a priority is given to the convergence of the body posture angle of a corrected gait to the body posture angle of the original gait (originally determined gait) rather than to the convergence of the horizontal body position of a corrected gait to the horizontal body position of the original gait (originally determined gait), making it possible to restrain a body posture angle from considerably varying.

In the aforementioned first to sixth embodiments, the floor reaction force horizontal component permissible range has been set. Alternatively, however, since a floor reaction force horizontal component and the total center-of-gravity horizontal acceleration of the robot share a proportional relationship, the total center-of-gravity horizontal acceleration of the robot and its permissible range may be used in place of the floor reaction force horizontal component and its permissible range in each of the aforesaid embodiments. Furthermore, a parameter related to the horizontal acceleration trajectory of a part having a behavior close to a total center-of-gravity horizontal trajectory of the robot may be explicitly set. For instance, if the mass of the legs 2 and 2 is sufficiently smaller than the mass of the body 3, then the body horizontal acceleration trajectory and the total center-of-gravity horizontal acceleration trajectory of the robot 1 are substantially identical or have a proportional relationship. Therefore, the body horizontal acceleration and its permissible range may be used in place of a floor reaction force horizontal component and its permissible range.

Moreover, when generating gaits for traveling on a slope (when moving the robot 1 on an inclined floor surface), the floor surface parallel component (the component parallel to the floor surface) of a translational floor reaction force, that is, the permissible range of a frictional force, or the permissible range of the floor surface parallel component of a total center-of-gravity acceleration (this is proportional to a frictional force, provided a gravity component is excluded) may be set in place of the floor reaction force horizontal component permissible range or the permissible range of total center-of-gravity acceleration horizontal component. An explanation of, for example, a case where the permissible range of a floor surface parallel component (frictional force) of a translational floor reaction force is set will be given (this explanation applies also to the case where the permissible range of the floor surface parallel component of a total center-of-gravity acceleration is set). For the frictional force, the relationship of Equation c72 given below holds when the inclination angle with respect to the horizontal plane of the floor surface is denoted by θf (defined as positive for a slope inclining forward in the direction in which the robot 1 advances). Hence, to generate a gait according to the algorithm similar to that in the aforementioned embodiment, a frictional force permissible range may be converted into a floor reaction force horizontal component permissible range by using the relationship of the Equation c72 so as to set the floor reaction force horizontal component permissible range. In this case, a desired floor reaction force vertical component may be used as the floor reaction force vertical component in Equation c72.

Frictional force=Floor reaction force horizontal component*cos(θf)−Floor reaction force vertical component*sin(θf)   Equation c72

In generating a gait for traveling on a slope (when moving the robot 1 on an inclined floor surface), the component in the direction of floor surface normal line of a floor reaction force moment, i.e., the permissible range of a frictional force moment, may be set in place of a floor reaction force moment vertical component permissible range. For example, the relationship of Equation c73 given below holds for the frictional force moment when the inclination angle with respect to the horizontal plane of the floor surface is denoted by θf (defined as positive for a slope inclining forward in the direction in which the robot 1 advances). Hence, to generate a gait according to the algorithm similar to that in the aforementioned embodiment, this relationship of Equation c73 may be used to calculate the frictional force moment from a floor reaction force moment vertical component and a floor reaction force moment horizontal component, and then the processing may be changed so that this value does not exceed the permissible range of the frictional force moment.

Frictional force moment=Floor reaction force moment vertical component*cos(θf)+Floor reaction force moment horizontal component*sin(θf)   Equation c73

As explained in the modification related to the aforementioned reference example, the two motion modes, namely, the body inclination mode and the body translational mode, have been used in the aforementioned embodiment to set the floor reaction force horizontal component and the floor reaction force moment horizontal component about a desired ZMP to proper values; however, different motion modes from them may alternatively be used. In this case, it is not required that one of the motion modes be a motion mode that does not generate a floor reaction force horizontal component. This is because, arbitrary floor reaction force horizontal component and floor reaction force moment about a desired ZMP can be generated as in the above example by any combination of modes as long as two motion modes that generate a floor reaction force horizontal component and a floor reaction force moment about a desired ZMP at different ratios are used.

Furthermore, a motion mode other than a body posture may be used. However, a motion mode should be selected that permits generation of a large floor reaction force horizontal component or a large floor reaction force moment about a desired ZMP with a minimum of displacement as much as possible.

For instance, a motion mode for swing right and left arms in the same rotational direction or a motion for perturbating the position of a foot not in contact with the ground (floating) may be selected. However, if a free leg trajectory is to be perturbated, the perturbation amount should be reset virtually to zero by immediately before landing so as not to disturb a landing position.

Alternatively, three or more motion modes may be used.

The ratios of generating a floor reaction force horizontal component and a floor reaction force moment about a desired ZMP of at least two of selected modes must be different from each other. Otherwise, in general, no solution of a simultaneous equation will be obtained.

In addition, it is desirable to combine, as much as possible, a motion mode that allows a sufficiently large change to take place in the floor reaction force moment about a desired ZMP without changing a floor reaction force horizontal component much, and a motion mode that allows a sufficiently large change to take place in the floor reaction force horizontal component without changing a floor reaction force moment about a desired ZMP much.

In other words, it is desirable to combine a motion mode that allows a sufficiently large change to take place in an angular momentum without changing a total center of gravity much and a motion mode that allows a sufficiently large change to take place in the total center of gravity without changing the angular momentum much. This is because displacements in the motion modes will be smaller.

In the aforementioned embodiment, the antiphase arm swing mode has been used to set the floor reaction force moment vertical component to a proper value; however, other motion mode may be used. For example, as explained about the modification of the aforementioned reference example, the body yaw rotation mode may be used or the body yaw rotation mode and the antiphase arm swing mode may be used in combination.

Further, it is not required that the motion mode used to set the floor reaction force moment vertical component to a proper value be a motion mode that does not generate a floor reaction force horizontal component and a floor reaction force moment horizontal component. For instance, a motion mode for swing a free leg back and forth may be used. This is because the floor reaction force horizontal component and the floor reaction force moment horizontal component generated by the motion mode can be offset by adjusting the two motion modes, namely, the body inclination mode and the body translational mode.

In an embodiment using a full model, the following models, in addition to the dynamic model (the model of FIG. 12) used in the aforementioned embodiments, may be used as the aforementioned simplified models.

1) A nonlinear model having mass points set on a plurality of links, as shown in FIG. 49 (multi-mass-point model)

2) Three-mass-point model disclosed in PCT Kokai publication WO/02/40224 by the present applicant 3) One-mass-point model having a mass only in the body 4) Model that ignores the moment of the inertial force generated by a change in the angular momentum about a total center of gravity 5) Separate type model that separately has a partial model representing the relationship between a resultant force of gravity and an inertial force (or a floor reaction force) and a body translational motion, and a partial model representing the relationship between the above resultant force and a body rotational motion. For instance, the mass points shown in FIG. 12 constitute a partial model indicating the relationship between the above resultant force and a body translational motion, and the flywheel shown in FIG. 12 is a partial model indicating the relationship between the above resultant force and a body rotational motion.

However, for an embodiment in which a simplified model body posture inclination angle correcting moment is added to a simplified model, the models of 2), 3) and 4) above cannot be used.

Preferably, a full model basically uses a dynamic model having a higher approximation accuracy than that of a simplified model; however, a dynamic model having an approximation accuracy equivalent to that of a simplified model may be used.

Furthermore, in the embodiments described above, the block diagrams, the flowcharts, the algorithms and the like may be subjected to equivalent modifications, such as changing the order of calculation processing. In addition, low-pass filters may be inserted, as necessary.

The aforementioned embodiments have been explained in conjunction with bipedal mobile robots; however, the present invention can be applied also to one-foot or multi-leg robots having three or more legs.

INDUSTRIAL APPLICABILITY

As described above, even in a circumstance in which the frictional force between a legged mobile robot, such as a bipedal mobile robot, and a floor surface is small, the present invention is useful for enabling the robot to smoothly move without causing a spin of the robot and while maintaining stable postures of the robot at the same time.

The invention claimed is:

1. A control device of a legged mobile robot that travels by moving legs extended from its body, said control device being configured to sequentially determine instantaneous values of a desired motion and a desired floor reaction force of the legged mobile robot by using a dynamic model that expresses a relationship between at least a motion of the robot and a floor reaction force, and also to control an operation of the robot at the same time so as to make the robot follow the determined instantaneous values of the desired motion and the desired floor reaction force, comprising:

means for setting a permissible range of a restriction object amount, the restriction object amount being a vertical component of a floor reaction force moment or a component of the floor reaction force moment in floor surface normal line direction to be applied to a robot in operation, following the desired motion and the desired floor reaction force; and means for determining instantaneous values of the desired motion and the desired floor reaction force, on the basis of the permissible range and at least a difference between a desired state amount, related to a posture of the robot about a vertical axis or about a floor surface normal line axis, and an actual state amount, related to the posture of the robot about the vertical axis or about the floor surface normal line axis, of the robot, such that a deviation between a floor reaction force moment balancing with the desired motion on the dynamic model and a floor reaction force moment of the desired floor reaction force approximates the difference to zero, while having the restriction object amount, which is associated with the desired floor reaction force, fall within the permissible range.

2. The control device of a legged mobile robot according to claim 1, wherein the means for determining instantaneous values comprises means for determining a compensating floor reaction force moment, which is an additional floor reaction force moment for approximating the difference to zero on the basis of the difference, and means for determining a correction amount of a predetermined provisional instantaneous value such that the restriction object amount does not exceed the permissible range on the basis of at least a floor reaction force moment that balances with the predetermined provisional instantaneous value of the desired motion on the dynamic model and the compensating floor reaction force moment, wherein the provisional instantaneous value is corrected on the basis of the determined correction amount so as to determine an instantaneous value of the desired motion.

3. The control device of a legged mobile robot according to claim 2, further comprising means for determining a model correction floor reaction force moment, which is an additional floor reaction force moment for approximating a state amount of the dynamic model to a predetermined state amount, wherein the means for determining a correction amount of a predetermined provisional instantaneous value of the desired motion determines a correction amount of a provisional instantaneous value of the desired motion such that the restriction object amount does not exceed the permissible range on the basis of at least a floor reaction force moment that balances with the predetermined provisional instantaneous value on the dynamic model, the compensating floor reaction force moment, and the model correction floor reaction force moment.

4. The control device of a legged mobile robot according to claim 2, wherein the correction amount of the predetermined provisional instantaneous value is a correction amount of a motion that changes a vertical component or a component in floor surface normal line direction of an angular momentum changing rate of the robot.

5. The control device of a legged mobile robot according to claim 4, wherein the motion that changes the vertical component or the component in floor surface normal line direction of the angular momentum changing rate of the robot is a motion of a body of the robot and/or an arm extended from the body of the robot.

6. The control device of a legged mobile robot according to claim 1, wherein the state amount related to a posture of the robot includes a yaw angle or a yaw angular velocity of the body of the robot.

7. The control device of a legged mobile robot according to claim 1, further comprising means for determining occurrence of a slippage of the robot, wherein the means for setting a permissible range variably sets the permissible range according to a determination result of the slippage determining means.

8. The control device of a legged mobile robot according to claim 7, wherein the means for determining occurrence of a slippage of the robot determines the occurrence of a slippage on the basis of at least the ground speed of a distal portion of a leg in contact with the ground.

9. The control device of a legged mobile robot according to claim 7, wherein the means for determining occurrence of a slippage of the robot comprises means for determining, on the basis of at least a temporal changing rate of an actual floor reaction force acting on a leg in contact with the ground and the ground speed of a distal portion of the leg, an apparent spring constant of the leg, and determines the occurrence of a slippage on the basis of at least the apparent spring constant.

10. The control device of a legged mobile robot according to claim 7, wherein the means for determining occurrence of a slippage of the robot determines the occurrence of a slippage on the basis of at least a result obtained by passing an actual floor reaction force acting on a leg in contact with the ground through a band-pass filter having a frequency passing characteristic in a range near a predetermined frequency.

11. A control device of a legged mobile robot that travels by moving legs extended from its body, said control device being configured to sequentially determine an instantaneous value of a desired motion of the legged mobile robot by using a dynamic model that expresses a relationship between at least a motion of the robot and a floor reaction force, and also to control an operation of the robot at the same time so as to make the robot follow the determined instantaneous value of the desired motion, comprising:

means for setting a permissible range of a restriction object amount, the restriction object amount being a vertical component of a floor reaction force moment or a component of the floor reaction force moment in floor surface normal line direction to be applied to a robot in operation, following the desired motion;

means for determining a compensating floor reaction force moment, which is an additional floor reaction force moment for bringing a difference between a desired state amount related to a posture of the robot about a vertical axis or a floor surface normal line axis and an actual state amount of the robot close to zero on the basis of at least the difference; and means for determining an instantaneous value of the desired motion such that the restriction object amount, which is determined on the basis of a floor reaction force moment balancing with the desired motion on the dynamic model and the compensating floor reaction force moment, falls within the permissible range.

12. The control device of a legged mobile robot according to claim 11, further comprising means that defines the restriction object amount falling within the permissible range as a desired floor reaction force moment, and controls the operation of the robot so as to make the robot follow the desired floor reaction force moment.

13. The control device of a legged mobile robot according to claim 11, wherein the means for determining an instantaneous value of the desired motion determines an instantaneous value of the desired motion by adjusting a motion that changes a vertical component or a component in floor surface normal line direction of an angular momentum changing rate of the robot among motions of the robot in order to hold the restriction object amount, which depends on a floor reaction force moment balancing with the desired motion on the dynamic model and the compensating floor reaction force moment, within the permissible range.

14. The control device of a legged mobile robot according to claim 13, wherein the motion that changes a vertical component or a component in floor surface normal line direction of an angular momentum changing rate of the robot is a motion of a body of the robot and/or an arm extended from the body.

15. A control device of a legged mobile robot that travels by moving legs extended from its body, said control device being configured to sequentially determine an instantaneous value of a desired motion of the legged mobile robot by using a dynamic model expressing at least a relationship between a motion of the robot and a floor reaction force, and also to control an operation of the robot at the same time so as to make the robot follow the determined instantaneous value of the desired motion, comprising:

means for setting a permissible range of a restriction object amount, the restriction object amount being a vertical component of a floor reaction force moment or a component of the floor reaction force moment in floor surface normal line direction to be applied to a robot in operation, following the desired motion;

means for sequentially determining a provisional instantaneous value of the desired motion;

means for determining a compensating floor reaction force moment, which is an additional floor reaction force moment for bringing a difference between a desired state amount related to a posture of the robot about a vertical axis or a floor surface normal line axis and an actual state amount of the robot close to zero on the basis of at least the difference; and means for determining an instantaneous value of the desired motion by defining a portion of the restriction object amount, which deviates from the permissible range, as a moment correction manipulated variable, the restriction object amount being determined on the basis of a floor reaction force moment balancing with a provisional instantaneous value of the desired motion on the dynamic model and the compensating floor reaction force moment, and by correcting the provisional instantaneous value of the desired motion on the basis of the moment correction manipulated variable such that the deviating portion indicates a tendency to decrease.

16. The control device of a legged mobile robot according to claim 15, wherein the means for determining an instantaneous value of the desired motion determines an instantaneous value of the desired motion by determining a correction amount of a provisional instantaneous value of the desired motion on the basis of a result obtained by passing the moment correction manipulated variable through a low-pass filter, and then by correcting the provisional instantaneous value on the basis of the determined correction amount.

17. The control device of a legged mobile robot according to claim 15, further comprising means for defining, as a desired floor reaction force moment, a floor reaction force moment corresponding to an already restricted restriction object amount that has been limited by restricting the restriction object amount, which is determined on the basis of a floor reaction force moment balancing with a provisional instantaneous value of the desired motion on the dynamic model and the compensating floor reaction force moment, to fall within the permissible range, and for controlling an operation of a robot so as to make the robot follow the desired floor reaction force moment.

18. The control device of a legged mobile robot according to claim 10, wherein the means for determining an instantaneous value of the desired motion determines an instantaneous value of the desired motion by correcting a motion for changing a vertical component or a component in floor surface normal line direction of an angular momentum changing rate of the robot on the basis of a provisional instantaneous value of the desired motion.

19. The control device of a legged mobile robot according to claim 18, wherein the motion for changing a vertical component or a component in floor surface normal line direction of an angular momentum changing rate of the robot is a motion of a body of the robot and/or an arm extended from the body.

* * * * *